US00RE42877E

(19) United States
(12) Reissued Patent
Lirette et al.

(10) Patent Number: US RE42,877 E
(45) Date of Reissued Patent: Nov. 1, 2011

(54) METHODS AND APPARATUS FOR WELLBORE CONSTRUCTION AND COMPLETION

(75) Inventors: Brent J. Lirette, Cypress, TX (US); David J. Brunnert, Cypress, TX (US)

(73) Assignee: Weatherford/Lamb, Inc., Houston, TX (US)

(21) Appl. No.: 12/833,679

(22) Filed: Jul. 9, 2010

Related U.S. Patent Documents

Reissue of:
(64) Patent No.: 7,311,148
Issued: Dec. 25, 2007
Appl. No.: 10/775,048
Filed: Feb. 9, 2004

U.S. Applications:
(60) Provisional application No. 60/446,046, filed on Feb. 7, 2003.

(51) Int. Cl.
*E21B 33/16* (2006.01)
(52) U.S. Cl. ..... 166/285; 166/177.4; 175/57; 175/324
(58) Field of Classification Search ..... 166/177.4, 166/285; 175/57, 324
See application file for complete search history.

(56) References Cited

U.S. PATENT DOCUMENTS

| | | | |
|---|---|---|---|
| 122,514 | A | 1/1872 | Bullock |
| 761,518 | A | 5/1904 | Lykken |
| 1,077,772 | A | 11/1913 | Weathersby |
| 1,185,582 | A | 5/1916 | Bignell |
| 1,301,285 | A | 4/1919 | Leonard |
| 1,324,303 | A | 12/1919 | Carmichael |
| 1,342,424 | A | 6/1920 | Cotten |
| 1,418,766 | A | 6/1922 | Wilson |
| 1,459,990 | A | 6/1923 | Reed |
| 1,471,526 | A | 10/1923 | Pickin |
| 1,545,039 | A | 7/1925 | Deavers |
| 1,561,418 | A | 11/1925 | Duda |
| 1,569,729 | A | 1/1926 | Duda |
| 1,585,069 | A | 5/1926 | Youle |
| 1,597,212 | A | 8/1926 | Spengler |
| 1,728,136 | A | 9/1929 | Power |

(Continued)

FOREIGN PATENT DOCUMENTS

CA 2 335 192 11/2001

(Continued)

OTHER PUBLICATIONS

Alexander Sas-Jaworsky and J. G. Williams, Development of Composite Coiled Tubing For Oilfield Services, SPE 26536, Society of Petroleum Engineers, Inc., 1993.

(Continued)

*Primary Examiner* — Hoang Dang
(74) *Attorney, Agent, or Firm* — Patterson & Sheridan, LLP

(57) ABSTRACT

The present invention relates methods and apparatus for lining a wellbore. In one aspect, a drilling assembly having an earth removal member and a wellbore lining conduit is manipulated to advance into the earth. The drilling assembly includes a first fluid flow path and a second fluid flow path. Fluid is flowed through the first fluid flow path, and at least a portion of which may return through the second fluid flow path. In one embodiment, the drilling assembly is provided with a third fluid flow path. After drilling has been completed, wellbore lining conduit may be cemented in the wellbore.

48 Claims, 74 Drawing Sheets

U.S. PATENT DOCUMENTS

| | | | |
|---|---|---|---|
| 1,777,592 | A | 10/1930 | Thomas |
| 1,825,026 | A | 9/1931 | Thomas |
| 1,830,625 | A | 11/1931 | Schrock |
| 1,842,638 | A | 1/1932 | Wigle |
| 1,851,289 | A | 3/1932 | Owen |
| 1,880,218 | A | 10/1932 | Simmons |
| 1,917,135 | A | 7/1933 | Littell |
| 1,930,825 | A | 10/1933 | Raymond |
| 1,981,525 | A | 11/1934 | Price |
| 1,998,833 | A | 4/1935 | Crowell |
| 2,017,451 | A | 10/1935 | Wickersham |
| 2,049,450 | A | 8/1936 | Johnson |
| 2,060,352 | A | 11/1936 | Stokes |
| 2,102,555 | A | 12/1937 | Dyer |
| 2,105,885 | A | 1/1938 | Hinderliter |
| 2,167,338 | A | 7/1939 | Murcell |
| 2,214,226 | A | 9/1940 | English |
| 2,214,429 | A | 9/1940 | Miller |
| 2,216,226 | A | 10/1940 | Bumpous |
| 2,216,895 | A | 10/1940 | Stokes |
| 2,228,503 | A | 1/1941 | Boyd et al. |
| 2,295,803 | A | 9/1942 | O'Leary |
| 2,305,082 | A | 12/1942 | Church et al. |
| 2,324,679 | A | 7/1943 | Cox |
| 2,344,120 | A | 3/1944 | Baker |
| 2,345,308 | A | 3/1944 | Wallace |
| 2,370,832 | A | 3/1945 | Baker |
| 2,379,800 | A | 7/1945 | Hare |
| 2,383,214 | A | 8/1945 | Prout |
| 2,414,719 | A | 1/1947 | Cloud |
| 2,499,630 | A | 3/1950 | Clark |
| 2,522,444 | A | 9/1950 | Grable |
| 2,536,458 | A | 1/1951 | Munsinger |
| 2,610,690 | A | 9/1952 | Beatty |
| 2,621,742 | A | 12/1952 | Brown |
| 2,627,891 | A | 2/1953 | Clark |
| 2,641,444 | A | 6/1953 | Moon |
| 2,650,314 | A | 8/1953 | Hennigh et al. |
| 2,663,073 | A | 12/1953 | Bieber et al. |
| 2,668,689 | A | 2/1954 | Cormany |
| 2,692,059 | A | 10/1954 | Bolling, Jr. |
| 2,696,367 | A | 12/1954 | Robishaw |
| 2,720,267 | A | 10/1955 | Brown |
| 2,738,011 | A | 3/1956 | Mabry |
| 2,741,907 | A | 4/1956 | Genender et al. |
| 2,743,087 | A | 4/1956 | Layne et al. |
| 2,743,495 | A | 5/1956 | Eklund |
| 2,764,329 | A | 9/1956 | Hampton |
| 2,765,146 | A | 10/1956 | Williams |
| 2,805,043 | A | 9/1957 | Williams |
| 2,898,971 | A | 8/1959 | Hempel |
| 2,953,406 | A | 9/1960 | Young |
| 2,978,047 | A | 4/1961 | DeVaan |
| 3,001,585 | A | 9/1961 | Shiplet |
| 3,006,415 | A | 10/1961 | Burns et al. |
| 3,041,901 | A | 7/1962 | Knights |
| 3,054,100 | A | 9/1962 | Jones |
| 3,087,546 | A | 4/1963 | Wooley |
| 3,090,031 | A | 5/1963 | Lord |
| 3,102,599 | A | 9/1963 | Hillburn |
| 3,111,179 | A | 11/1963 | Albers et al. |
| 3,117,636 | A | 1/1964 | Wilcox et al. |
| 3,122,811 | A | 3/1964 | Gilreath |
| 3,123,160 | A | 3/1964 | Kammerer |
| 3,124,023 | A | 3/1964 | Marquis et al. |
| 3,131,769 | A | 5/1964 | Rochernont |
| 3,159,219 | A | 12/1964 | Scott |
| 3,169,592 | A | 2/1965 | Kammerer |
| 3,191,677 | A | 6/1965 | Kinley |
| 3,191,680 | A | 6/1965 | Vincent |
| 3,193,116 | A | 7/1965 | Kenneday et al. |
| 3,195,646 | A | 7/1965 | Brown |
| 3,273,660 | A | 9/1966 | Jackson et al. |
| 3,353,599 | A | 11/1967 | Swift |
| 3,380,528 | A | 4/1968 | Timmons |
| 3,387,893 | A | 6/1968 | Hoever |
| 3,392,609 | A | 7/1968 | Bartos |
| 3,419,079 | A | 12/1968 | Current |
| 3,467,180 | A | 9/1969 | Pensotti |
| 3,477,527 | A | 11/1969 | Koot |
| 3,489,220 | A | 1/1970 | Kinley |
| 3,518,903 | A | 7/1970 | Ham et al. |
| 3,548,936 | A | 12/1970 | Kilgore et al. |
| 3,550,684 | A | 12/1970 | Cubberly, Jr. |
| 3,552,507 | A | 1/1971 | Brown |
| 3,552,508 | A | 1/1971 | Brown |
| 3,552,509 | A | 1/1971 | Brown |
| 3,552,510 | A | 1/1971 | Brown |
| 3,552,848 | A | 1/1971 | Van Wagner |
| 3,559,739 | A | 2/1971 | Hutchison |
| 3,566,505 | A | 3/1971 | Martin |
| 3,570,598 | A | 3/1971 | Johnson |
| 3,575,245 | A | 4/1971 | Cordary et al. |
| 3,602,302 | A | 8/1971 | Kluth |
| 3,603,411 | A | 9/1971 | Link |
| 3,603,412 | A | 9/1971 | Kammerer, Jr. et al. |
| 3,603,413 | A | 9/1971 | Grill et al. |
| 3,606,664 | A | 9/1971 | Weiner |
| 3,621,910 | A | 11/1971 | Sanford |
| 3,624,760 | A | 11/1971 | Bodine |
| 3,635,105 | A | 1/1972 | Dickmann et al. |
| 3,656,564 | A | 4/1972 | Brown |
| 3,662,842 | A | 5/1972 | Bromell |
| 3,669,190 | A | 6/1972 | Sizer et al. |
| 3,680,412 | A | 8/1972 | Mayer et al. |
| 3,691,624 | A | 9/1972 | Kinley |
| 3,691,825 | A | 9/1972 | Dyer |
| 3,692,126 | A | 9/1972 | Rushing et al. |
| 3,696,332 | A | 10/1972 | Dickson, Jr. et al. |
| 3,700,048 | A | 10/1972 | Desmoulins |
| 3,712,376 | A | 1/1973 | Owen et al. |
| 3,729,057 | A | 4/1973 | Werner |
| 3,746,330 | A | 7/1973 | Taciuk |
| 3,747,675 | A | 7/1973 | Brown |
| 3,760,894 | A | 9/1973 | Pitifer |
| 3,776,307 | A | 12/1973 | Young |
| 3,776,320 | A | 12/1973 | Brown |
| 3,776,991 | A | 12/1973 | Marcus |
| 3,785,193 | A | 1/1974 | Kinley et al. |
| 3,808,916 | A | 5/1974 | Porter et al. |
| 3,818,734 | A | 6/1974 | Bateman |
| 3,838,613 | A | 10/1974 | Wilms |
| 3,840,128 | A | 10/1974 | Swoboda, Jr. et al. |
| 3,848,684 | A | 11/1974 | West |
| 3,857,450 | A | 12/1974 | Guier |
| 3,870,114 | A | 3/1975 | Pulk et al. |
| 3,881,375 | A | 5/1975 | Kelly |
| 3,885,679 | A | 5/1975 | Swoboda, Jr. et al. |
| 3,901,331 | A | 8/1975 | Djurovic |
| 3,911,707 | A | 10/1975 | Minakov et al. |
| 3,913,687 | A | 10/1975 | Gyongyosi et al. |
| 3,915,244 | A | 10/1975 | Brown |
| 3,934,660 | A | 1/1976 | Nelson |
| 3,935,910 | A | 2/1976 | Gaudy et al. |
| 3,945,444 | A | 3/1976 | Knudson |
| 3,947,009 | A | 3/1976 | Nelmark |
| 3,948,321 | A | 4/1976 | Owen et al. |
| 3,964,556 | A | 6/1976 | Gearhart et al. |
| 3,980,143 | A | 9/1976 | Swartz et al. |
| 4,049,066 | A | 9/1977 | Richey |
| 4,054,332 | A | 10/1977 | Bryan, Jr. |
| 4,054,426 | A | 10/1977 | White |
| 4,064,939 | A | 12/1977 | Marquis |
| 4,069,573 | A | 1/1978 | Rogers, Jr. et al. |
| 4,077,525 | A | 3/1978 | Callegari et al. |
| 4,082,144 | A | 4/1978 | Marquis |
| 4,083,405 | A | 4/1978 | Shirley |
| 4,085,808 | A | 4/1978 | Kling |
| 4,095,865 | A | 6/1978 | Denison et al. |
| 4,100,968 | A | 7/1978 | Delano |
| 4,100,981 | A | 7/1978 | Chaffin |
| 4,127,168 | A | 11/1978 | Hanson et al. |
| 4,127,927 | A | 12/1978 | Hauk et al. |
| 4,133,396 | A | 1/1979 | Tschirky |
| 4,142,739 | A | 3/1979 | Billingsley |
| 4,159,564 | A | 7/1979 | Cooper, Jr. |
| 4,173,457 | A | 11/1979 | Smith |

4,175,619 A 11/1979 Davis
4,182,423 A 1/1980 Ziebarth et al.
4,186,628 A 2/1980 Bonnice
4,189,185 A 2/1980 Kammerer, Jr. et al.
4,194,383 A 3/1980 Huzyak
4,221,269 A 9/1980 Hudson
4,227,197 A 10/1980 Nimmo et al.
4,241,878 A 12/1980 Underwood
4,257,442 A 3/1981 Claycomb
4,262,693 A 4/1981 Giebeler
4,274,777 A 6/1981 Scaggs
4,274,778 A 6/1981 Putnam et al.
4,277,197 A 7/1981 Bingham
4,280,380 A 7/1981 Eshghy
4,281,722 A 8/1981 Tucker et al.
4,287,949 A 9/1981 Lindsey, Jr.
4,288,082 A 9/1981 Setterberg, Jr.
4,311,195 A 1/1982 Mullins, II
4,315,553 A 2/1982 Stallings
4,319,393 A 3/1982 Pogonowski
4,320,915 A 3/1982 Abbott et al.
4,324,407 A 4/1982 Upham et al.
4,336,415 A 6/1982 Walling
4,384,627 A 5/1983 Ramirez-Jauregui
4,392,534 A 7/1983 Miida
4,396,076 A 8/1983 Inoue
4,396,077 A 8/1983 Radtke
4,407,378 A 10/1983 Thomas
4,408,669 A 10/1983 Wiredal
4,413,682 A 11/1983 Callihan et al.
4,427,063 A 1/1984 Skinner
4,429,620 A 2/1984 Burkhardt et al.
4,437,363 A 3/1984 Haynes
4,440,220 A 4/1984 McArthur
4,445,734 A 5/1984 Cunningham
4,446,745 A 5/1984 Stone et al.
4,449,596 A 5/1984 Boyadjieff
4,460,053 A 7/1984 Jurgens et al.
4,463,814 A 8/1984 Horstmeyer et al.
4,466,498 A 8/1984 Bardwell
4,469,174 A 9/1984 Freeman
4,470,470 A 9/1984 Takano
4,472,002 A 9/1984 Beney et al.
4,474,243 A 10/1984 Gaines
4,483,399 A 11/1984 Colgate
4,489,793 A 12/1984 Boren
4,489,794 A 12/1984 Boyadjieff
4,492,134 A 1/1985 Reinholdt et al.
4,494,424 A 1/1985 Bates
4,515,045 A 5/1985 Gnatchenko et al.
4,529,045 A 7/1985 Boyadjieff et al.
4,531,581 A 7/1985 Pringle et al.
4,544,041 A 10/1985 Rinaldi
4,545,443 A 10/1985 Wiredal
4,570,706 A 2/1986 Pugnet
4,580,631 A 4/1986 Baugh
4,583,603 A 4/1986 Dorleans et al.
4,588,030 A 5/1986 Blizzard
4,589,495 A 5/1986 Langer et al.
4,592,125 A 6/1986 Skene
4,593,773 A 6/1986 Skeie
4,595,058 A 6/1986 Nations
4,604,724 A 8/1986 Shaginian et al.
4,604,818 A 8/1986 Inoue
4,605,077 A 8/1986 Boyadjieff
4,605,268 A 8/1986 Meador
4,610,320 A 9/1986 Beakley
4,613,161 A 9/1986 Brisco
4,620,600 A 11/1986 Persson
4,625,796 A 12/1986 Boyadjieff
4,630,691 A 12/1986 Hooper
4,646,827 A 3/1987 Cobb
4,649,777 A 3/1987 Buck
4,651,837 A 3/1987 Mayfield
4,652,195 A 3/1987 McArthur
4,655,286 A 4/1987 Wood
4,667,752 A 5/1987 Berry et al.
4,671,358 A 6/1987 Lindsey, Jr. et al.
4,676,310 A 6/1987 Scherbatskoy et al.
4,676,312 A 6/1987 Mosing et al.
4,678,031 A 7/1987 Blandford et al.
4,681,158 A 7/1987 Pennison
4,681,162 A 7/1987 Boyd
4,683,962 A 8/1987 True
4,686,873 A 8/1987 Lang et al.
4,691,587 A 9/1987 Farrand et al.
4,693,316 A 9/1987 Ringgenberg et al.
4,697,640 A 10/1987 Szarka
4,699,224 A 10/1987 Burton
4,708,202 A 11/1987 Sukup et al.
4,709,599 A 12/1987 Buck
4,709,766 A 12/1987 Boyadjieff
4,725,179 A 2/1988 Woolslayer et al.
4,735,270 A 4/1988 Fenyvesi
4,738,145 A 4/1988 Vincent et al.
4,742,876 A 5/1988 Barthelemy et al.
4,744,426 A 5/1988 Reed
4,759,239 A 7/1988 Hamilton et al.
4,760,882 A * 8/1988 Novak ..... 166/295
4,762,187 A 8/1988 Haney
4,765,401 A 8/1988 Boyadjieff
4,765,416 A 8/1988 Bjerking et al.
4,770,259 A 9/1988 Jansson
4,773,689 A 9/1988 Wolters
4,775,009 A 10/1988 Wittrisch et al.
4,778,008 A 10/1988 Gonzalez et al.
4,781,359 A 11/1988 Matus
4,788,544 A 11/1988 Howard
4,791,997 A 12/1988 Krasnov
4,793,422 A 12/1988 Krasnov
4,800,968 A 1/1989 Shaw et al.
4,806,928 A 2/1989 Veneruso
4,813,493 A 3/1989 Shaw et al.
4,813,495 A 3/1989 Leach
4,821,814 A 4/1989 Willis et al.
4,825,947 A 5/1989 Mikolajczyk
4,832,552 A 5/1989 Skelly
4,836,064 A 6/1989 Slator
4,836,299 A 6/1989 Bodine
4,842,081 A 6/1989 Parant
4,843,945 A 7/1989 Dinsdale
4,848,469 A 7/1989 Baugh et al.
4,854,386 A 8/1989 Baker et al.
4,858,705 A 8/1989 Thiery
4,867,236 A 9/1989 Haney et al.
4,878,546 A 11/1989 Shaw et al.
4,880,058 A 11/1989 Lindsey et al.
4,883,125 A 11/1989 Wilson et al.
4,901,069 A 2/1990 Veneruso
4,904,119 A 2/1990 Legendre et al.
4,909,741 A 3/1990 Schasteen et al.
4,915,181 A 4/1990 Labrosse
4,921,386 A 5/1990 McArthur
4,936,382 A 6/1990 Thomas
4,960,173 A 10/1990 Cognevich et al.
4,962,579 A 10/1990 Moyer et al.
4,962,819 A 10/1990 Bailey et al.
4,962,822 A 10/1990 Pascale
4,997,042 A 3/1991 Jordan et al.
5,009,265 A 4/1991 Bailey et al.
5,022,472 A 6/1991 Bailey et al.
5,024,273 A 6/1991 Coone et al.
5,027,914 A 7/1991 Wilson
5,036,927 A 8/1991 Willis
5,049,020 A 9/1991 McArthur
5,052,483 A 10/1991 Hudson
5,060,542 A 10/1991 Hauk
5,060,737 A 10/1991 Mohn
5,062,756 A 11/1991 McArthur et al.
5,069,297 A 12/1991 Krueger
5,074,366 A 12/1991 Karlsson et al.
5,082,069 A 1/1992 Seiler et al.
5,083,608 A 1/1992 Abdrakhmanov et al.
5,085,273 A 2/1992 Coone
5,096,465 A 3/1992 Chen et al.
5,109,924 A 5/1992 Jurgens et al.
5,111,893 A 5/1992 Kvello-Aune
5,141,063 A 8/1992 Quesenbury RE34,063 E 9/1992 Vincent et al.
5,148,875 A 9/1992 Karlsson et al.
5,156,213 A 10/1992 George et al.
5,160,925 A 11/1992 Dailey et al.
5,168,942 A 12/1992 Wydrinski
5,172,765 A 12/1992 Sas-Jaworsky
5,176,518 A 1/1993 Hordijk et al.
5,181,571 A 1/1993 Mueller
5,186,265 A 2/1993 Henson et al.
5,191,932 A 3/1993 Seefried et al.
5,191,939 A 3/1993 Stokley
5,197,553 A 3/1993 Leturno
5,224,540 A 7/1993 Streich et al.
5,233,742 A 8/1993 Gray et al.
5,234,052 A 8/1993 Coone et al.
5,245,265 A 9/1993 Clay
5,251,709 A 10/1993 Richardson
5,255,741 A 10/1993 Alexander
5,255,751 A 10/1993 Stogner
5,271,468 A 12/1993 Streich et al.
5,271,472 A 12/1993 Leturno
5,272,925 A 12/1993 Henneuse et al.
5,282,653 A 2/1994 LaFleur et al.
5,284,210 A 2/1994 Helms et al.
5,285,008 A 2/1994 Sas-Jaworsky
5,285,204 A 2/1994 Sas-Jaworsky
5,291,956 A 3/1994 Mueller et al.
5,294,228 A 3/1994 Willis et al.
5,297,833 A 3/1994 Willis et al.
5,303,772 A 4/1994 George et al.
5,305,830 A 4/1994 Wittrisch
5,305,839 A 4/1994 Kalsi et al.
5,311,952 A 5/1994 Eddison et al.
5,318,122 A 6/1994 Murray et al.
5,320,178 A 6/1994 Cornette
5,322,127 A 6/1994 McNair et al.
5,323,858 A 6/1994 Jones et al.
5,332,043 A 7/1994 Ferguson
5,332,048 A 7/1994 Underwood et al.
5,340,182 A 8/1994 Busink et al.
5,343,950 A 9/1994 Hale et al.
5,343,951 A 9/1994 Cowan et al.
5,343,968 A * 9/1994 Glowka ..... 175/231
5,348,095 A 9/1994 Worrall et al.
5,351,767 A 10/1994 Stogner et al.
5,353,872 A 10/1994 Wittrisch
5,354,150 A 10/1994 Canales
5,355,967 A 10/1994 Mueller et al.
5,361,859 A 11/1994 Tibbitts
5,368,113 A 11/1994 Schulze-Beckinghausen
5,375,668 A 12/1994 Hallundbaek
5,379,835 A 1/1995 Streich
5,386,746 A 2/1995 Hauk
5,388,651 A 2/1995 Berry
5,392,715 A 2/1995 Pelrine
5,394,823 A 3/1995 Lenze
5,402,856 A 4/1995 Warren et al.
5,409,059 A 4/1995 McHardy
5,433,279 A 7/1995 Tassari et al.
5,435,386 A 7/1995 LaFleur
5,435,400 A 7/1995 Smith
5,452,923 A 9/1995 Smith
5,456,317 A 10/1995 Hood, III et al.
5,458,209 A 10/1995 Hayes et al.
5,461,905 A 10/1995 Penisson
5,462,120 A 10/1995 Gondouin
5,472,057 A 12/1995 Winfree
5,477,925 A 12/1995 Trahan et al.
5,494,122 A 2/1996 Larsen et al.
5,497,840 A 3/1996 Hudson
5,501,286 A 3/1996 Berry
5,503,234 A 4/1996 Clanton
5,520,255 A 5/1996 Barr et al.
5,526,880 A 6/1996 Jordan, Jr. et al.
5,535,824 A 7/1996 Hudson
5,535,838 A 7/1996 Keshavan et al.
5,540,279 A 7/1996 Branch et al.
5,542,472 A 8/1996 Pringle et al.
5,542,473 A 8/1996 Pringle et al.
5,547,029 A 8/1996 Rubbo et al.
5,551,521 A 9/1996 Vail, III
5,553,672 A 9/1996 Smith, Jr. et al.
5,553,679 A 9/1996 Thorp
5,560,426 A 10/1996 Trahan et al.
5,560,437 A 10/1996 Dickel et al.
5,560,440 A 10/1996 Tibbitts
5,566,772 A 10/1996 Coone et al.
5,575,344 A 11/1996 Wireman
5,577,566 A 11/1996 Albright et al.
5,582,259 A 12/1996 Barr
5,584,343 A 12/1996 Coone
5,588,916 A 12/1996 Moore
5,611,397 A 3/1997 Wood
5,613,567 A 3/1997 Hudson
5,615,747 A 4/1997 Vail, III
5,645,131 A 7/1997 Trevisani
5,651,420 A 7/1997 Tibbitts et al.
5,661,888 A 9/1997 Hanslik
5,662,170 A 9/1997 Donovan et al.
5,662,182 A 9/1997 McLeod et al.
5,667,011 A 9/1997 Gill et al.
5,667,023 A 9/1997 Harrell et al.
5,667,026 A 9/1997 Lorenz et al.
5,685,369 A 11/1997 Ellis et al.
5,685,373 A 11/1997 Collins et al.
5,697,442 A 12/1997 Baldridge
5,706,894 A 1/1998 Hawkins, III
5,706,905 A 1/1998 Barr
5,711,382 A 1/1998 Hansen et al.
5,717,334 A 2/1998 Vail, III et al.
5,718,288 A 2/1998 Bertet et al.
5,720,356 A 2/1998 Gardes
5,730,221 A 3/1998 Longbottom et al.
5,730,471 A 3/1998 Schulze-Beckinghausen et al.
5,732,776 A 3/1998 Tubel et al.
5,735,348 A 4/1998 Hawkins, III
5,735,351 A 4/1998 Helms
5,743,344 A 4/1998 McLeod et al.
5,746,276 A 5/1998 Stuart
5,755,299 A 5/1998 Langford, Jr. et al.
5,772,514 A 6/1998 Moore
5,785,132 A 7/1998 Richardson et al.
5,785,134 A 7/1998 McLeod et al.
5,787,978 A 8/1998 Carter et al.
5,791,410 A 8/1998 Castille et al.
5,791,416 A 8/1998 White et al.
5,794,703 A 8/1998 Newman et al.
5,803,191 A 9/1998 Mackintosh
5,803,666 A 9/1998 Keller
5,813,456 A 9/1998 Milner et al.
5,823,264 A 10/1998 Ringgenberg
5,826,651 A 10/1998 Lee et al.
5,828,003 A 10/1998 Thomeer et al.
5,829,520 A 11/1998 Johnson
5,829,539 A 11/1998 Newton et al.
5,833,002 A 11/1998 Holcombe
5,836,395 A 11/1998 Budde
5,836,409 A 11/1998 Vail, III
5,839,330 A 11/1998 Stokka
5,839,515 A 11/1998 Yuan et al.
5,839,519 A 11/1998 Spedale, Jr.
5,842,149 A 11/1998 Harrell et al.
5,842,530 A 12/1998 Smith et al.
5,845,722 A 12/1998 Makohl et al.
5,850,877 A 12/1998 Albright et al.
5,860,474 A 1/1999 Stoltz et al.
5,878,815 A 3/1999 Collins
5,887,655 A 3/1999 Haugen et al.
5,887,668 A 3/1999 Haugen et al.
5,890,537 A 4/1999 Lavaure et al.
5,890,540 A * 4/1999 Pia et al. ..... 166/321
5,890,549 A 4/1999 Sprehe
5,894,897 A 4/1999 Vail, III
5,901,787 A 5/1999 Boyle
5,907,664 A 5/1999 Wang et al.
5,908,049 A 6/1999 Williams et al.
5,909,768 A 6/1999 Castille et al.
5,913,337 A 6/1999 Williams et al.

5,921,285 A 7/1999 Quigley et al.
5,921,332 A 7/1999 Spedale, Jr.
5,931,231 A 8/1999 Mock
5,947,213 A 9/1999 Angle et al.
5,950,742 A 9/1999 Caraway
5,954,131 A 9/1999 Sallwasser
5,957,225 A 9/1999 Sinor
5,960,881 A 10/1999 Allamon et al.
5,971,079 A 10/1999 Mullins
5,971,086 A 10/1999 Bee et al.
5,984,007 A 11/1999 Yuan et al.
5,988,273 A 11/1999 Monjure et al.
6,000,472 A 12/1999 Albright et al.
6,012,529 A 1/2000 Mikolajczyk et al.
6,021,850 A 2/2000 Wood et al.
6,024,169 A 2/2000 Haugen
6,026,911 A 2/2000 Angle et al.
6,029,748 A 2/2000 Forsyth et al.
6,035,953 A 3/2000 Rear
6,056,060 A 5/2000 Abrahamsen et al.
6,059,051 A 5/2000 Jewkes et al.
6,059,053 A 5/2000 McLeod
6,061,000 A 5/2000 Edwards
6,062,326 A 5/2000 Strong et al.
6,065,550 A 5/2000 Gardes
6,070,500 A 6/2000 Dlask et al.
6,070,671 A 6/2000 Cumming et al.
6,079,498 A 6/2000 Lima et al.
6,079,509 A 6/2000 Bee et al.
6,082,461 A 7/2000 Newman et al.
6,085,838 A 7/2000 Vercaemer et al.
6,089,323 A 7/2000 Newman et al.
6,098,717 A 8/2000 Bailey et al.
6,106,200 A 8/2000 Mocivnik et al.
6,119,772 A 9/2000 Pruet
6,135,208 A 10/2000 Gano et al.
6,142,545 A 11/2000 Penman et al.
6,155,360 A 12/2000 McLeod
6,158,531 A 12/2000 Vail, III
6,161,617 A 12/2000 Gjedebo
6,170,573 B1 1/2001 Brunet et al.
6,172,010 B1 1/2001 Argillier et al.
6,173,777 B1 1/2001 Mullins
6,179,055 B1 1/2001 Sallwasser et al.
6,182,776 B1 2/2001 Asberg
6,186,233 B1 2/2001 Brunet
6,189,616 B1 2/2001 Gano et al.
6,189,621 B1 2/2001 Vail, III
6,196,336 B1 3/2001 Fincher et al.
6,199,641 B1 3/2001 Downie et al.
6,202,764 B1 3/2001 Ables et al.
6,206,112 B1 3/2001 Dickinson, III et al.
6,216,533 B1 4/2001 Woloson et al.
6,217,258 B1 4/2001 Yamamoto et al.
6,220,117 B1 4/2001 Butcher
6,223,823 B1 5/2001 Head
6,224,112 B1 5/2001 Eriksen et al.
6,227,587 B1 5/2001 Terral
6,234,257 B1 5/2001 Ciglenec et al.
6,237,684 B1 5/2001 Bouligny, Jr. et al.
6,244,363 B1 6/2001 McLeod
6,263,987 B1 7/2001 Vail, III
6,273,189 B1 8/2001 Gissler et al.
6,275,938 B1 8/2001 Bond et al.
6,290,432 B1 9/2001 Exley et al.
6,296,066 B1 10/2001 Terry et al.
6,305,469 B1 10/2001 Coenen et al.
6,309,002 B1 10/2001 Bouligny
6,311,792 B1 11/2001 Scott et al.
6,315,051 B1 11/2001 Ayling
6,325,148 B1 12/2001 Trahan et al.
6,343,649 B1 2/2002 Beck et al.
6,347,674 B1 2/2002 Bloom et al.
6,349,764 B1 2/2002 Adams et al.
6,357,485 B2 3/2002 Quigley et al.
6,359,569 B2 3/2002 Beck et al.
6,360,633 B2 3/2002 Pietras
6,367,552 B1 4/2002 Scott et al.
6,367,566 B1 4/2002 Hill
6,371,203 B2 4/2002 Frank et al.
6,374,506 B1 4/2002 Schutte et al.
6,374,924 B1 4/2002 Hanton et al.
6,378,627 B1 4/2002 Tubel et al.
6,378,630 B1 4/2002 Ritorto et al.
6,378,633 B1 4/2002 Moore
6,390,190 B2 5/2002 Mullins
6,392,317 B1 5/2002 Hall et al.
6,397,946 B1 6/2002 Vail, III
6,401,820 B1 6/2002 Kirk et al.
6,405,798 B1 6/2002 Barrett et al.
6,408,943 B1 6/2002 Schultz et al.
6,412,554 B1 7/2002 Allen et al.
6,412,574 B1 * 7/2002 Wardley et al. ..... 175/7
6,419,014 B1 7/2002 Meek et al.
6,419,033 B1 7/2002 Hahn et al.
6,425,444 B1 7/2002 Metcalfe et al.
6,427,776 B1 8/2002 Hoffman et al.
6,429,784 B1 8/2002 Beique et al.
6,431,626 B1 8/2002 Bouligny
6,443,241 B1 9/2002 Juhasz et al.
6,443,247 B1 9/2002 Wardley
6,446,323 B1 9/2002 Metcalfe et al.
6,446,723 B1 9/2002 Ramons et al.
6,457,532 B1 10/2002 Simpson
6,458,471 B2 10/2002 Lovato et al.
6,464,004 B1 10/2002 Crawford et al.
6,464,011 B2 10/2002 Tubel
6,484,818 B2 11/2002 Alft et al.
6,497,280 B2 12/2002 Beck et al.
6,497,289 B1 12/2002 Cook et al.
6,527,047 B1 3/2003 Pietras
6,527,049 B2 3/2003 Metcalfe et al.
6,527,064 B1 3/2003 Hallundbaek
6,527,493 B1 3/2003 Kamphorst et al.
6,536,520 B1 3/2003 Snider et al.
6,536,522 B2 3/2003 Birckhead et al.
6,536,993 B2 3/2003 Strong et al.
6,538,576 B1 3/2003 Schultz et al.
6,540,025 B2 4/2003 Scott et al.
6,543,552 B1 4/2003 Metcalfe et al.
6,547,017 B1 4/2003 Vail, III
6,553,825 B1 4/2003 Boyd
6,554,063 B2 4/2003 Ohmer
6,554,064 B1 4/2003 Restarick et al.
6,571,868 B2 6/2003 Victor
6,578,630 B2 6/2003 Simpson et al.
6,585,040 B2 7/2003 Hanton et al.
6,591,471 B1 7/2003 Hollingsworth et al.
6,591,905 B2 7/2003 Coon
6,595,288 B2 7/2003 Mosing et al.
6,612,383 B2 9/2003 Desai et al.
6,619,402 B1 9/2003 Amory et al.
6,622,796 B1 9/2003 Pietras
6,634,430 B2 10/2003 Dawson et al.
6,637,526 B2 10/2003 Juhasz et al.
6,640,903 B1 11/2003 Cook et al.
6,648,075 B2 11/2003 Badrak et al.
6,651,737 B2 11/2003 Bouligny
6,655,460 B2 12/2003 Bailey et al.
6,666,274 B2 12/2003 Hughes
6,668,684 B2 12/2003 Allen et al.
6,668,937 B1 12/2003 Murray
6,679,333 B2 1/2004 York et al.
6,688,394 B1 2/2004 Ayling
6,688,398 B2 2/2004 Pietras
6,691,801 B2 2/2004 Juhasz et al.
6,698,595 B2 3/2004 Norell et al.
6,702,029 B2 3/2004 Metcalfe et al.
6,702,040 B1 3/2004 Sensenig
6,705,413 B1 3/2004 Tessari
6,708,769 B2 3/2004 Haugen et al.
6,715,430 B2 4/2004 Choi et al.
6,719,071 B1 4/2004 Moyes
6,722,559 B1 4/2004 Millar et al.
6,725,917 B2 4/2004 Metcalfe
6,725,919 B2 4/2004 Cook et al.
6,725,924 B2 4/2004 Davidson et al.
6,725,938 B1 4/2004 Pietras 6,732,822 B2 5/2004 Slack et al.
6,742,584 B1 6/2004 Appleton
6,742,591 B2 6/2004 Metcalfe
6,742,596 B2 6/2004 Haugen
6,742,606 B2 6/2004 Metcalfe et al.
6,745,834 B2 6/2004 Davis et al.
6,749,026 B2 6/2004 Smith et al.
6,752,211 B2 6/2004 Dewey et al.
6,758,278 B2 7/2004 Cook et al.
6,802,374 B2 10/2004 Edgar et al.
6,832,658 B2 12/2004 Keast
6,837,313 B2 1/2005 Hosie et al.
6,840,322 B2 1/2005 Haynes
6,845,820 B1 1/2005 Hebert et al.
6,848,517 B2 2/2005 Wardley
6,854,533 B2 2/2005 Galloway
6,857,486 B2 2/2005 Chitwood et al.
6,857,487 B2 2/2005 Galloway et al.
6,892,819 B2 5/2005 Cook et al.
6,920,932 B2 7/2005 Zimmerman
6,923,255 B2 8/2005 Lee
6,926,126 B2 8/2005 Baumann et al.
6,941,652 B2 9/2005 Echols et al.
6,953,096 B2 10/2005 Gledhill et al.
7,004,264 B2 2/2006 Simpson et al.
7,013,992 B2 3/2006 Tessari et al.
7,013,997 B2 3/2006 Vail, III
7,036,610 B1 5/2006 Vail, III
7,040,420 B2 5/2006 Vail, III
7,044,241 B2 5/2006 Angman
7,048,050 B2 5/2006 Vail, III et al.
7,082,997 B2 8/2006 Slack
7,090,004 B2 8/2006 Warren et al.
7,093,675 B2 8/2006 Pia
7,096,982 B2 8/2006 McKay et al.
7,100,710 B2 9/2006 Vail, III
7,100,713 B2 9/2006 Tulloch
7,108,072 B2 9/2006 Cook et al.
7,108,080 B2 9/2006 Tessari et al.
7,108,083 B2 9/2006 Simonds et al.
7,108,084 B2 9/2006 Vail, III
7,117,957 B2 10/2006 Metcalfe et al.
7,124,825 B2 10/2006 Slack
7,128,154 B2 10/2006 Giroux et al.
7,137,454 B2 11/2006 Pietras
7,140,443 B2 11/2006 Beierbach et al.
7,140,455 B2 11/2006 Walter et al.
7,143,847 B2 12/2006 Pia
7,147,068 B2 12/2006 Vail, III
7,159,668 B2 1/2007 Herrera
7,165,634 B2 1/2007 Vail, III
2001/0000101 A1 4/2001 Lovato et al.
2001/0002626 A1 6/2001 Frank et al.
2001/0013412 A1 8/2001 Tubel
2001/0040054 A1 11/2001 Haugen et al.
2001/0042625 A1 11/2001 Appleton
2001/0045284 A1 11/2001 Simpson et al.
2001/0047883 A1 12/2001 Hanton et al.
2002/0040787 A1* 4/2002 Cook et al. ..... 166/379
2002/0066556 A1 6/2002 Goode et al.
2002/0074127 A1 6/2002 Birckhead et al.
2002/0074132 A1 6/2002 Juhasz et al.
2002/0079102 A1 6/2002 Dewey et al.
2002/0108748 A1 8/2002 Keyes
2002/0134555 A1 9/2002 Allen et al.
2002/0145281 A1 10/2002 Metcalfe et al.
2002/0157829 A1 10/2002 Davis et al.
2002/0162690 A1 11/2002 Hanton et al.
2002/0166668 A1 11/2002 Metcalfe et al.
2002/0170720 A1 11/2002 Haugen
2002/0189806 A1 12/2002 Davidson et al.
2002/0189863 A1 12/2002 Wardley
2003/0029641 A1 2/2003 Meehan
2003/0034177 A1 2/2003 Chitwood et al.
2003/0042022 A1 3/2003 Lauritzen et al.
2003/0056947 A1 3/2003 Cameron
2003/0056991 A1 3/2003 Hahn et al.
2003/0070841 A1 4/2003 Merecka et al.
2003/0070842 A1 4/2003 Bailey et al.
2003/0111267 A1 6/2003 Pia
2003/0141111 A1 7/2003 Pia
2003/0146023 A1 8/2003 Pia
2003/0164250 A1 9/2003 Wardley
2003/0164251 A1 9/2003 Tulloch
2003/0164276 A1 9/2003 Snider et al.
2003/0173073 A1 9/2003 Snider et al.
2003/0173090 A1 9/2003 Cook et al.
2003/0183424 A1 10/2003 Tulloch
2003/0213598 A1 11/2003 Hughes
2003/0217865 A1 11/2003 Simpson et al.
2003/0221519 A1 12/2003 Haugen et al.
2004/0000405 A1 1/2004 Fournier, Jr. et al.
2004/0003490 A1 1/2004 Shahin et al.
2004/0003944 A1 1/2004 Vincent et al.
2004/0011534 A1 1/2004 Soimonds et al.
2004/0011566 A1* 1/2004 Lee ..... 175/317
2004/0016575 A1 1/2004 Shahin et al.
2004/0060697 A1 4/2004 Tilton et al.
2004/0060700 A1 4/2004 Vert et al.
2004/0069500 A1 4/2004 Haugen
2004/0069501 A1 4/2004 Haugen et al.
2004/0079533 A1 4/2004 Buytaert et al.
2004/0108142 A1 6/2004 Vail, III
2004/0112603 A1 6/2004 Galloway et al.
2004/0112646 A1 6/2004 Vail
2004/0112693 A1 6/2004 Baumann et al.
2004/0118613 A1 6/2004 Vail
2004/0118614 A1 6/2004 Galloway et al.
2004/0123984 A1 7/2004 Vail
2004/0124010 A1 7/2004 Galloway et al.
2004/0124011 A1 7/2004 Gledhill et al.
2004/0124015 A1 7/2004 Vail et al.
2004/0129456 A1 7/2004 Vail
2004/0140128 A1 7/2004 Vail
2004/0144547 A1 7/2004 Koithan et al.
2004/0173358 A1 9/2004 Haugen
2004/0182579 A1 9/2004 Steele et al.
2004/0216892 A1 11/2004 Giroux et al.
2004/0216924 A1 11/2004 Pietras et al.
2004/0216925 A1 11/2004 Metcalfe et al.
2004/0221997 A1 11/2004 Giroux et al.
2004/0226751 A1 11/2004 McKay et al.
2004/0238218 A1* 12/2004 Runia et al. ..... 175/57
2004/0244992 A1 12/2004 Carter et al.
2004/0245020 A1 12/2004 Giroux et al.
2004/0251026 A1 12/2004 Giroux et al.
2004/0251050 A1 12/2004 Shahin et al.
2004/0251055 A1 12/2004 Shahin et al.
2004/0262013 A1 12/2004 Tilton et al.
2005/0000691 A1 1/2005 Giroux et al.
2005/0011643 A1 1/2005 Slack et al.
2005/0077048 A1 4/2005 Hall
2005/0096846 A1 5/2005 Koithan et al.
2005/0152749 A1 7/2005 Anres et al.
2005/0183892 A1 8/2005 Oldham et al.

FOREIGN PATENT DOCUMENTS

DE 3 213 464 10/1983
DE 3 523 221 2/1987
DE 3 918 132 12/1989
DE 4 133 802 10/1992
EP 0 087 373 8/1983
EP 0 162 000 11/1985
EP 0 171 144 2/1986
EP 0 235 105 9/1987
EP 0 265 344 4/1988
EP 0 285 386 10/1988
EP 0 397 323 11/1990
EP 0 426 123 5/1991
EP 0 462 618 12/1991
EP 0 474 481 3/1992
EP 0479583 4/1992
EP 0 525 247 2/1993
EP 0 554 568 8/1993
EP 0 589 823 3/1994
EP 0 659 975 6/1995
EP 0 790 386 8/1997
EP 0 881 354 4/1998

| | | |
|---|---|---|
| EP | 0 571 045 | 8/1998 |
| EP | 0 961 007 | 12/1999 |
| EP | 0 962 384 | 12/1999 |
| EP | 1 006 260 | 6/2000 |
| EP | 1 050 661 | 11/2000 |
| EP | 1148206 | 10/2001 |
| EP | 1 256 691 | 11/2002 |
| FR | 2053088 | 7/1970 |
| FR | 2741907 | 6/1997 |
| FR | 2 841 293 | 12/2003 |
| GB | 540 027 | 10/1941 |
| GB | 709 365 | 5/1954 |
| GB | 716 761 | 10/1954 |
| GB | 733596 | 7/1955 |
| GB | 7 928 86 | 4/1958 |
| GB | 8 388 33 | 6/1960 |
| GB | 881 358 | 11/1961 |
| GB | 887150 | 1/1962 |
| GB | 9 977 21 | 7/1965 |
| GB | 1 277 461 | 6/1972 |
| GB | 1 306 568 | 3/1973 |
| GB | 1 448 304 | 9/1976 |
| GB | 1 469 661 | 4/1977 |
| GB | 1 582 392 | 1/1981 |
| GB | 2 053 088 | 2/1981 |
| GB | 2 115 940 | 9/1983 |
| GB | 2 170 528 | 8/1986 |
| GB | 2 201 912 | 9/1988 |
| GB | 2 216 926 | 10/1989 |
| GB | 2 223 253 | 4/1990 |
| GB | 2 221 482 | 7/1990 |
| GB | 2 224 481 | 9/1990 |
| GB | 2 239 918 | 7/1991 |
| GB | 2 240 799 | 8/1991 |
| GB | 2 275 486 | 4/1993 |
| GB | 2 294 715 | 8/1996 |
| GB | 2 313 860 | 2/1997 |
| GB | 2 320 270 | 6/1998 |
| GB | 2 320 734 | 7/1998 |
| GB | 2 324 108 | 10/1998 |
| GB | 2 326 896 | 1/1999 |
| GB | 2 323 542 | 7/1999 |
| GB | 2 335 217 | 9/1999 |
| GB | 2 345 074 | 6/2000 |
| GB | 2 348 223 | 9/2000 |
| GB | 2347445 | 9/2000 |
| GB | 2 349 401 | 11/2000 |
| GB | 2 350 137 | 11/2000 |
| GB | 2 357 101 | 6/2001 |
| GB | 2 357 530 | 6/2001 |
| GB | 2 352 747 | 7/2001 |
| GB | 2 365 463 | 2/2002 |
| GB | 2 372 271 | 8/2002 |
| GB | 2 372 765 | 9/2002 |
| GB | 2 382 361 | 5/2003 |
| GB | 2381809 | 5/2003 |
| GB | 2 386 626 | 9/2003 |
| GB | 2 389 130 | 12/2003 |
| GB | 2396375 | 6/2004 |
| RU | 2 079 633 | 5/1997 |
| RU | 2079633 | 5/1997 |
| SU | 112631 | 1/1956 |
| SU | 659260 | 4/1967 |
| SU | 247162 | 5/1967 |
| SU | 395557 | 12/1971 |
| SU | 415346 | 3/1972 |
| SU | 481689 | 6/1972 |
| SU | 461218 | 4/1973 |
| SU | 501139 | 12/1973 |
| SU | 585266 | 7/1974 |
| SU | 583278 | 8/1974 |
| SU | 601390 | 1/1976 |
| SU | 581238 | 2/1976 |
| SU | 655843 | 3/1977 |
| SU | 781312 | 3/1978 |
| SU | 899820 | 6/1979 |
| SU | 955765 | 2/1981 |
| SU | 1304470 | 8/1984 |
| SU | 1618870 | 1/1991 |
| SU | 1808972 | 5/1991 |
| WO | WO 92/01211 | 4/1982 |
| WO | WO 90/06418 | 6/1990 |
| WO | WO 91/16520 | 10/1991 |
| WO | WO 92/01139 | 1/1992 |
| WO | WO 92/18743 | 10/1992 |
| WO | WO 92/20899 | 11/1992 |
| WO | WO 93/07358 | 4/1993 |
| WO | WO 93/24728 | 12/1993 |
| WO | WO 95/10686 | 4/1995 |
| WO | WO 96/18799 | 6/1996 |
| WO | WO 96/28635 | 9/1996 |
| WO | WO 97/05360 | 2/1997 |
| WO | WO 97/08418 | 3/1997 |
| WO | WO 98/01651 | 1/1998 |
| WO | WO 98/05844 | 2/1998 |
| WO | WO 98/09053 | 3/1998 |
| WO | WO 98/11322 | 3/1998 |
| WO | WO 98/32948 | 7/1998 |
| WO | WO 98/55730 | 12/1998 |
| WO | WO 99/04135 | 1/1999 |
| WO | WO 99/11902 | 3/1999 |
| WO | WO 99/18328 | 4/1999 |
| WO | WO 99/23354 | 5/1999 |
| WO | WO 99/24689 | 5/1999 |
| WO | WO 99/35368 | 7/1999 |
| WO | WO 99/37881 | 7/1999 |
| WO | WO 99/41485 | 8/1999 |
| WO | WO 99/50528 | 10/1999 |
| WO | WO 99/58810 | 11/1999 |
| WO | WO 99/64713 | 12/1999 |
| WO | WO 00/04269 | 1/2000 |
| WO | WO 00/05483 | 2/2000 |
| WO | WO 00/08293 | 2/2000 |
| WO | WO 00/09853 | 2/2000 |
| WO | WO 00/11309 | 3/2000 |
| WO | WO 00/11310 | 3/2000 |
| WO | WO 00/11311 | 3/2000 |
| WO | WO 00/28188 | 5/2000 |
| WO | WO 00/37766 | 6/2000 |
| WO | WO 00/37771 | 6/2000 |
| WO | WO 00/37772 | 6/2000 |
| WO | WO 00/37773 | 6/2000 |
| WO | WO 00/39429 | 7/2000 |
| WO | WO 00/39430 | 7/2000 |
| WO | WO 00/41487 | 7/2000 |
| WO | WO 00/46484 | 8/2000 |
| WO | WO 00/50730 | 8/2000 |
| WO | WO 00/50732 | 8/2000 |
| WO | WO 00/66879 | 11/2000 |
| WO | WO 00/77431 | 12/2000 |
| WO | WO 01/12946 | 2/2001 |
| WO | WO 01/46550 | 6/2001 |
| WO | WO 01/60545 | 8/2001 |
| WO | WO 01/66901 | 9/2001 |
| WO | WO 01/79650 | 10/2001 |
| WO | WO 01/81708 | 11/2001 |
| WO | WO 01/83932 | 11/2001 |
| WO | WO 01/94738 | 12/2001 |
| WO | WO 01/94739 | 12/2001 |
| WO | WO 02/14649 | 2/2002 |
| WO | WO 02/29199 | 4/2002 |
| WO | WO 02/44601 | 6/2002 |
| WO | WO 02/081863 | 10/2002 |
| WO | WO 02/086287 | 10/2002 |
| WO | WO 02/092956 | 11/2002 |
| WO | WO 03/006790 | 1/2003 |
| WO | WO 03/074836 | 9/2003 |
| WO | WO 03/087525 | 10/2003 |
| WO | WO 2004/022903 | 3/2004 |

OTHER PUBLICATIONS

A. S. Jafar, H.H. Al-Attar, and I. S. El-Ageli, Discussion and Comparison of Performance of Horizontal Wells in Bouri Field, SPE 26927, Society of Petroleum Engineers, Inc. 1996.

G. F. Boykin, The Role of A Worldwide Drilling Organization and the Road to the Future, SPE/IADC 37630, 1997.

M. S. Fuller, M. Littler, and I. Pollock, Innovative Way To Cement a Liner Utilizing a New Inner String Liner Cementing Process, 1998.

Helio Santos, Consequences and Relevance of Drillstring Vibration on Wellbore Stability, SPE/IADC 52820, 1999.
Chan L. Daigle, Donald B. Campo, Carey J. Naquin, Rudy Cardenas, Lev M. Ring, Patrick L. York, Expandable Tubulars: Field Examples of Application in Well Construction and Remediation, SPE 62958, Society of Petroleum Engineers Inc., 2000.
C. Lee Lohoefer, Ben Mathis, David Brisco, Kevin Waddell, Lev Ring, and Patrick York, Expandable Liner Hanger Provides Cost-Effective Alternative Solution, IADC/SPE 59151, 2000.
Kenneth K. Dupal, Donald B. Campo, John E. Lofton, Don Weisinger, R. Lance Cook, Michael D. Bullock, Thomas P. Grant, and Patrick L. York, Solid Expandable Tubular Technology—A Year of Case Histories in the Drilling Environment, SPE/IADC 67770, 2001.
Mike Bullock, Tom Grant, Rick Sizemore, Chan Daigle, and Pat York, Using Expandable Solid Tubulars to Solve Well Construction Challenges In Deep Waters And Maturing Properities, IBP 27500, Brazilian Petroleum Institute—IBP, 2000.
Coiled Tubing Handbook, World Oil, Gulf Publishing Company, 1993.
Detlef Hahn, Friedhelm Makohl, and Larry Watkins, Casing-While Drilling System Reduces Hole Collapse Risks, Offshore, pp. 54, 56 and 59, Feb. 1998.
Yakov A. Gelfgat, Mikhail Y. Gelfgat and Yuri S. Lopatin, Retractable Drill Bit Technology—Drilling Without Pulling Out Drillpipe, Advanced Drilling Solutions Lessons From the FSU; Jun. 2003, vol. 2, pp. 351-464.
Tommy Warren, SPE, Bruce Houtchens, SPE, Garret Madell, SPE, Directional Drilling With Casing, SPE/IADC 79914, Tesco Corporation, SPE/IADC Drilling Conference 2003.
LaFleur Petroleum Services, Inc., "Autoseal Circulating Head," Engineering Manufacturing, 1992, 11 Pages.
Valves Wellhead Equipment Safety Systems, W-K-M Division, ACF Industries, Catalog 80, 1980, 5 Pages.
Canrig Top Drive Drilling Systems, Harts Petroleum Engineer International, Feb. 1997, 2 Pages.
The Original Portable Top Drive Drilling System, TESCO Drilling Technology, 1997.
Mike Killalea, Portable Top Drives: What's Driving The Marked?, IADC, Drilling Contractor, Sep. 1994, 4 Pages.
500 or 650 ECIS Top Drive, Advanced Permanent Magnet Motor Technology, TESCO Drilling Technology, Apr. 1998, 2 Pages.
500 or 650 HCIS Top Drive, Powerful Hydraulic Compact Top Drive Drilling System, TESCO Drilling Technology, Apr. 1998, 2 Pages.
Product Information (Sections 1-10) CANRIG Drilling Technology, Ltd., Sep. 18, 1996.
PCT Search Report, International Application No. PCT/US2004/003702, dated Nov. 4, 2004.
Hahn, et al., "Simultaneous Drill and Case Technology—Case Histories, Status and Options for Further Development," Society of Petroleum Engineers, IADC/SPE Drilling Conference, New Olean, LA Feb. 23-25, 2000 pp. 1-9.
M.B. Stone and J. Smith, "Expandable Tubulars and Casing Driling are Options" Drilling Contractor, Jan./Feb. 2002, pp. 52.
M. Gelfgat, "Retractable Bits Development and Application" Transactions of the ASME, vol. 120, Jun. 1998, pp. 124-130.
"First Success with Casing-Drilling" Word Oil, Feb. 1999, pp. 25.
Dean E. Gaddy, Editor, "Russia Shares Technical Know-How with U.S." Oil & Gas Journal, Mar. 1999, pp. 51-52 and 54-56.
U.S. Appl. No. 10/794,800, filed Mar. 5, 2004.
U.S. Appl. No. 10/832,804, filed Apr. 27, 2004.
U.S. Appl. No. 10/795,214, filed Mar. 5, 2004.
U.S. Appl. No. 10/794,795, filed Mar. 5, 2004.
U.S. Appl. No. 10/775,048, filed Feb. 9, 2004.
U.S. Appl. No. 10/772,217, filed Feb. 2, 2004.
U.S. Appl. No. 10/788,976, filed Feb. 27, 2004.
U.S. Appl. No. 10/794,797, filed Mar. 5, 2004.
U.S. Appl. No. 10/767,322, filed Jan. 29, 2004.
U.S. Appl. No. 10/795,129, filed Mar. 5, 2004.
U.S. Appl. No. 10/794,790, filed Mar. 5, 2004.
U.S. Appl. No. 10/162,302, filed Jun. 4, 2004.
Rotary Steerable Technology—Technology Gains Momentum, Oil & Gas Journal, Dec. 28, 1998.
Directional Drilling, M. Mims, World Oil, May 1999, pp. 40-43.
Multilateral Classification System w/Example Applications, Alan MacKenzie & Cliff Hogg, World Oil, Jan. 1999, pp. 55-61.
U.S. Appl. No. 10/618,093.
U.S. Appl. No. 10/189,570.
Tarr, et al., "Casing-while-Drilling: The Next Step Change In Well Construction," World Oil, Oct. 1999, pp. 34-40.
De Leon Mojarro, "Breaking A Paradigm: Drilling With Tubing Gas Wells," SPE Paper 40051, SPE, Annual Technical Conference And Exhibition, Mar. 3-5, 1998, pp. 465-472.
De Leon Mojarro, "Drilling/Completing With Tubing Cuts Well Costs By 30%," World Oil, Jul. 1998, pp. 145-150.
Littleton, "Refined Slimhole Drilling Technology Renews Operator Interest," Petroleum Engineer International, Jun. 1992, pp. 19-26.
Anon, "Slim Holes Fat Savings," Journal of Petroleum Technology, Sep. 1992, pp. 816-819.
Anon, "Slim Holes, Slimmer Prospect," Journal of Petroleum Technology, Nov. 1995, pp. 949-952.
Vogt, et al., "Drilling Liner Technology For Depleted Reservoir," SPE Paper 36827, SPE Annual Technical Conference And Exhibition, Oct. 22-24, pp. 127-132.
Mojarro, et al., "Drilling/Completing With Tubing Cuts Well Costs By 30%," World Oil, Jul. 1998, pp. 145-150.
Sinor, et al., Rotary Liner Drilling For Depleted Reservoirs, IADC/SPE Paper 39399, IADC/SPE Drilling Conference, Mar. 3-6, 1998, pp. 1-13.
Editor, "Innovation Starts At The Top At Tesco," The American Oil & Gas Reporter, Apr. 1998, p. 65.
Tessari, et al., "Casing Drilling—A Revolutionary Approach To Reducing Well Costs," SPE/IADC Paper 52789, SPE/IADC Drilling Conference, Mar. 9-11, 1999, pp. 221-229.
Silverman, "Novel Drilling Method—Casing Drilling Process Eliminates Tripping String," Petroleum Engineer International, Mar. 1999, p. 15.
Silverman, "Drilling Technology—Retractable Bit Eliminates Drill String Trips," Petroleum Engineer International, Apr. 1999, p. 15.
Laurent, et al., "A New Generation Drilling Rig: Hydraulically Powered And Computer Controlled," CADE/CAODC Paper 99-120, CADE/CAODC Spring Drilling Conference, Apr. 7-8, 1999, 14 pages.
Madell, et al., "Casing Drilling An Innovative Approach To Reducing Drilling Costs," CADE/CAODC Paper 99-121, CADE/CAODC Spring Drilling Conference, Apr. 7-8, 1999, pp. 1-12.
Tessari, et al., "Focus: Drilling With Casing Promises Major Benefits," Oil & Gas Journal, May 17, 1999, pp. 58-62.
Laurent, et al., "Hydraulic Rig Supports Casing Drilling, "World Oil, Sep. 1999, pp. 61-68.
Perdue, et al., "Casing Technology Improves,"Hart's E & P, Nov. 1999, pp. 135-136.
Warren, et al., "Casing Drilling Application Design Considerations," IADC/SPE Paper 59179, IADC/SPE Drilling Conference, Feb. 23-25, 2000 pp. 1-11.
Warren, et al., "Drilling Technology: Part I—Casing Drilling With Directional Steering In The U.S. Gulf Of Mexico," Offshore, Jan. 2001, pp. 50-52.
Warren, et al., "Drilling Technology: Part II—Casing Drilling With Directional Steering In The Gulf Of Mexico," Offshore, Feb. 2001, pp. 40-42.
Shepard, et al., "Casing Drilling: An Emerging Technology," IADC/SPE Paper 67731, SPE/IADC Drilling Conference, Feb. 27-Mar. 1, 2001, pp. 1-13.
Editor, "Tesco Finishes Field Trial Program," Drilling Contractor, Mar./Apr. 2001, p. 53.
Warren, et al., "Casing Drilling Technology Moves To More Challenging Application," AADE Paper 01-NC-HO-32, AADE National Drilling Conference, Mar. 27-29, 2001, pp. 1-10.
Shepard, et al., "Casing Drilling: An Emerging Technology" SPE Drilling & Completion, Mar. 2002, pp. 4-14.
Shepard, et al., "Casing Drilling Successfully Applied In Southern Wyoming," World Oil, Jun. 2002, pp. 33-41.
Forest, et al., "Subsea Equipment For Deep Water Drilling Using Dual Gradient Mud System," SPE/IADC Drilling Conference, Amsterdam, The Netherlands, Feb. 27, 2001-Mar. 1, 2001, 8 pages.

World's First Drilling With Casing Operation From A Floating Drilling Unit, Sep. 2003, 1 page.
Filippov. et al., "Expandable Tubular Solutions," SPE paper 56500, SPE Annual Technical Conference And Exhibition, Oct. 3-6, 1999, pp. 1-16.
Coronado, et al., "Development Of A One-Trip ECP Cement Inflation And Stage Cementing System For Open Hole Completions," IADC/SPE Paper 39345, IADC/SPE Drilling Conference, Mar. 3-6, 1998, pp. 473-481.
Coronado, et al., "A One-Trip External-Casing-Packer Cement-Inflation And Stage-Cementing System," Journal Of Petroleum Technology, Aug. 1998, pp. 76-77.
Quigley, "Coiled Tubing And Its Applications," SPE Short Course, Houston, Texas, Oct. 3, 1999, 9 pages.
Bayfiled, et al., "Burst And Collapse Of A Sealed Multilateral Junction: Numerical Simulations," SPE/IADC Paper 52873, SPE/IADC Drilling Conference, Mar. 9-11, 1999, 8 pages.
Marker, et al. "Anaconda: Joint Development Project Leads To Digitally Controlled Composite Coiled Tubing Drilling System," SPE paper 60750, SPE/ICOTA Coiled Tubing Roundtable, Apr. 5-6, 2000, pp. 1-9.
Cales, et al., Subsidence Remediation—Extending Well Life Through The Use Of Solid Expandable Casing Systems, AADE Paper 01-NC-HO-24, American Association Of Drilling Engineers, Mar. 2001 Conference, pp. 1-16.
Coats, et al., "The Hybrid Drilling Unite: Ab Overview Of an Integrated Composite Coiled Tubing And Hydraulic Workover Drilling System," SPE Paper 74349, SPE International Petroleum Conference And Exhibitions, Feb. 10-12, 2002, pp. 1-7.
Sander, et al., "Project Management And Technology Provide Enhanced Performance For Shallow Horizontal Wells," IADC/SPE Paper 74466, IADC/SPE Drilling Conference, Feb. 26-28, 2002, pp. 1-9.
Coats, et al., "The Hybrid Drilling System: Incorporating Composite Coiled Tubing And Hydraulic Workover Technologies Into One Integrated Drilling System," IADC/SPE Paper 74538, IADC/SPE Drilling Conference, Feb. 26-28, 2002, pp. 1-7.
Galloway, "Rotary Drilling With Casing—A Field Proven Method Of Reducing Wellbore Construction Cost," Paper WOCD-0306092, World Oil Casing Drilling Technical Conference, Mar. 6-7, 2003, pp. 1-7.
Fontenot, et al., "New Rig Design Enhances Casing Drilling Operations In Lobo Trend," paper WOCD-0306-04, World Oil Casing Drilling Technical Conference, Mar. 6-7, 2003, pp. 1-13.
McKay, et al., "New Developments In The Technology Of Drilling With Casing: Utilizing A Displaceable DrillShoe Tool," Paper WOCD-0306-05, World Oil Casing Drilling Technical Conference, Mar. 6-7, 2003, pp. 1-11.
Sutriono—Santos, et al., "Drilling With Casing Advances To Floating Drilling Unit With Surface BOP Employed," Paper WOCD-0307-01, World Oil Casing Drilling Technical Conference, Mar. 6-7, 2003 pp. 1-7.
Vincent, et al., "Liner And Casing Drilling—Case Histories And Technology," Paper WOCD-0307-02, World Oil Casing Drilling Technical Conference, Mar. 6-7, 2003, pp. 1-20.
Maute, "Electrical Logging: State-of-the Art," The Log Analyst, May-Jun. 1992, pp. 206-227.
Tessari, et al., "Retrievable Tools Provide Flexibility for Casing Drilling," Paper No. WOCD-0306-01, World Oil Casing Drilling Technical Conference, 2003, pp. 1-11.
Evans, et al., "Development And Testing Of An Economical Casing Connection For Use In Drilling Operations," paper WOCD-0306-03, World Oil Casing Drilling Technical Conference, Mar. 6-7, 2003, pp. 1-10.
Tommy Warren, Bruce Houtchens, and W. R. Portas, Jr., Part II: Casing Drilling With Directional Steering In The U.S. Gulf of Mexico, Offshore, pp. 40-42, Feb. 2001.
Tommy Warren, Bruce Houtchens, and W. R. Portas, Jr., Casing Drilling With Directional Steering In The U.S. Gulf of Mexico, Offshore, pp. 50, 52-53, Jan. 2001.
Brian Tarr and Richard Sukup, Casing-While-Drilling: The Next Step Change In Well Construction, World Oil, pp. 34, 36, 38, 30, 40, Oct. 1999.
Detlef Hahn, Friedhelm Makohl, and Larry Watkins, Casing-While-Drilling System Reduces Hole Collapse Risks, Offshore, pp. 54, 56, 59, Feb. 1998.
PCT Partial International Search Report, International Application No. PCT/US2004/003702, dated Aug. 6, 2004.
GB Examination Report, Application No. 0516281.3, Dated May 2, 2006.
Multilateral Case History, Onshore-Nigeria, Baker Hughes, 2000.
Multilateral Case History, Onshore Norway, Baker Hughes, 1995.
Tommy Warren, Bruce Houtchens, and Garrett Madell, Directional Drilling With Casing, SPE/IADC 79914, SPE/IADC Drilling Conference, Amsterdam, The Netherlands, Feb. 19-21, 2003, pp. 1-10.

* cited by examiner 5
40
100
10
30
12
25
27
200
1A
1A
20
20
74
70
76
93
90
94
80
52
54
50
55
2
60
62

5
40
100
10
30
12
25
2
27
200
20
72
74
70
76
93
90
94
80
54
52
50
55
60

10
310
348
340
13A
13A
337
345
330
335
302
346
320
352
380
370
351

METHODS AND APPARATUS FOR WELLBORE CONSTRUCTION AND COMPLETION

Matter enclosed in heavy brackets [ ] appears in the original patent but forms no part of this reissue specification; matter printed in italics indicates the additions made by reissue.

CROSS-REFERENCE TO RELATED APPLICATIONS

[This application is a continuation-in-part of U.S. patent application Ser. No. 10/269,661 filed on Oct. 11, 2002, now U.S. Pat. No. 6,896,075 which application is herein incorporated by reference in its entirety. This application is also a continuation-in-part of U.S. patent application Ser. No. 10/325,636, filed on Dec. 20, 2002, now U.S. Pat. No. 6,854,533 which application is herein incorporated by reference in its entirety. This application is also a continuation-in-part of U.S. patent application Ser. No. 10/331,964, filed on Dec. 30, 2002, now U.S. Pat. No. 6,857,487 which application is herein incorporated by reference in its entirety.]

This application claims benefit of U.S. Provisional Patent Application Ser. No. 60/446,046, filed on Feb. 7, 2003, [and claims benefit of U.S. Provisional patent application Ser. No. 60/446,375, filed on Feb. 10, 2003, which applications are herein incorporated by reference in their entirety.] *which application is herein incorporated by reference in its entirety.*

[This application is also a continuation-in-part of U.S. patent application Ser. No. 09/914,338, filed Jan. 8, 2002, now U.S. Pat. No. 6,719,071 which was the National Stage of International Application No. PCT/GB00/00642, filed Feb. 25, 2000, and published under PCT Article 21(2) in English, and claims priority of United Kingdom Application No. 9904380.4 filed on Feb. 25, 1999. Each of the aforementioned related patent applications is herein incorporated by reference in its entirety. This application is also a continuation-in-part of U.S. patent application Ser. No. 10/156,722, filed May 28, 2002, now U.S. Pat. No. 6,837,313 and published as U.S. Publication No. 2003/0146001 on Aug. 7, 2003, which application is a continuation-in-part of U.S. patent application Ser. No. 09/914,338, filed Jan. 8, 2002, now U.S. Pat. No. 6,719,071 which applications are herein incorporated by reference in their entirety.]

BACKGROUND OF THE INVENTION

1. Field of the Invention

The present invention relates apparatus and methods for drilling and completing a wellbore. Particularly, the present invention relates to apparatus and methods for forming a wellbore, lining a wellbore, and circulating fluids in the wellbore. The present invention also relates to apparatus and methods for cementing a wellbore.

2. Description of the Related Art

In the drilling of oil and gas wells, a wellbore is formed using a drill bit that is urged downwardly at a lower end of a drill string. After drilling a predetermined depth, the drill string and bit are removed, and the wellbore is lined with a string of casing. An annular area is thus defined between the outside of the casing and the earth formation. This annular area is filled with cement to permanently set the casing in the wellbore and to facilitate the isolation of production zones and fluids at different depths within the wellbore.

It is common to employ more than one string of casing in a wellbore. In this respect, a first string of casing is set in the wellbore when the well is drilled to a first designated depth. The well is then drilled to a second designated depth and thereafter lined with a string of casing with a smaller diameter than the first string of casing. This process is repeated until the desired well depth is obtained, each additional string of casing resulting in a smaller diameter than the one above it. The reduction in the diameter reduces the cross-sectional area in which circulating fluid may travel. Also, the smaller casing at the bottom of the hole may limit the hydrocarbon production rate. Thus, oil companies are trying to maximize the diameter of casing at the desired depth in order to maximize hydrocarbon production. To this end, the clearance between subsequent casing strings having been trending smaller because larger subsequent casings are used to maximize production. When drilling with these small-clearance casings it is difficult, if not impossible, to circulate drilled cuttings in the small annulus formed between the set casing inner diameter and the subsequent casing outer diameter.

Typically, fluid is circulated throughout the wellbore during the drilling operation to cool a rotating bit and remove wellbore cuttings. The fluid is generally pumped from the surface of the wellbore through the drill string to the rotating bit. Thereafter, the fluid is circulated through an annulus formed between the drill string and the string of casing and subsequently returned to the surface to be disposed of or reused. As the fluid travels up the wellbore, the cross-sectional area of the fluid path increases as each larger diameter string of casing is encountered. For example, the fluid initially travels up an annulus formed between the drill string and the newly formed wellbore at a high annular velocity due to smaller annular clearance. However, as the fluid travels the portion of the wellbore that was previously lined with casing, the enlarged cross-sectional area defined by the larger diameter casing results in a larger annular clearance between the drill string and the cased wellbore, thereby reducing the annular velocity of the fluid. This reduction in annular velocity decreases the overall carrying capacity of the fluid, resulting in the drill cuttings dropping out of the fluid flow and settling somewhere in the wellbore. This settling of the drill cuttings and debris can cause a number of difficulties to subsequent downhole operations. For example, it is well known that the setting of tools, such as liner hangers, against a casing wall is hampered by the presence of debris on the wall.

To prevent the settling of the drill cuttings and debris, the flow rate of the circulating fluid may be increased to increase the annular velocity in the larger annular areas. However, the higher annular velocity also increases the equivalent circulating density ("ECD") and increases the potential of wellbore erosion. ECD is a measure of the hydrostatic head and the friction head created by the circulating fluid. The length of wellbore that can be formed before it is lined with casing sometimes depends on the ECD. The pressure created by ECD is sometimes useful while drilling because it can exceed the pore pressure of formations intersected by the wellbore and prevents hydrocarbons from entering the wellbore. However, too high an ECD can be a problem when it exceeds the fracture pressure of the formation, thereby forcing the wellbore fluid into the formations and hampering the flow of hydrocarbons into the wellbore after the well is completed.

Drilling with casing is a method of forming a borehole with a drill bit attached to the same string of tubulars that will line the borehole. In other words, rather than run a drill bit on smaller diameter drill string, the bit is run at the end of larger diameter tubing or casing that will remain in the wellbore and be cemented therein. The advantages of drilling with casing are obvious. Because the same string of tubulars transports the bit and lines the borehole, no separate trip out of or into the wellbore is necessary between the forming of the borehole and the lining of the borehole. Drilling with casing is especially useful in certain situations where an operator wants to drill and line a borehole as quickly as possible to minimize the time the borehole remains unlined and subject to collapse or the effects of pressure anomalies. For example, when forming a sub-sea borehole, the initial length of borehole extending from the sea floor is much more subject to cave in or collapse as the subsequent sections of borehole. Sections of a borehole that intersect areas of high pressure can lead to damage of the borehole between the time the borehole is formed and when it is lined. An area of exceptionally low pressure will drain expensive drilling fluid from the wellbore between the time it is intersected and when the borehole is lined. In each of these instances, the problems can be eliminated or their effects reduced by drilling with casing.

The challenges and problems associated with drilling with casing are as obvious as the advantages. For example, each string of casing must fit within any preexisting casing already in the wellbore. Because the string of casing transporting the drill bit is left to line the borehole, there may be no opportunity to retrieve the bit in the conventional manner. Drill bits made of drillable material, two-piece drill bits, pilot bit and underreamer, and bits integrally formed at the end of casing string have been used to overcome the problems. For example, a two-piece bit has an outer portion with a diameter exceeding the diameter of the casing string. When the borehole is formed, the outer portion is disconnected from an inner portion that can be retrieved to the surface of the well. Typically, a mud motor is used near the end of the liner string to rotate the bit as the connection between the pieces of casing are not designed to withstand the tortuous forces associated with rotary drilling. Mud motors are sometimes operated to turn the bit (and underreamer) at adequate rotation rates to make hole, without having to turn the casing string at high rates, thereby minimizing casing connection fatigue accumulation. In this manner, the casing string can be rotated at a moderate speed at the surface as it is inserted and the bit rotates at a much faster speed due to the fluid-powered mud motor.

Another challenge for a drilling with casing operation is controlling ECD. Drilling with casing requires circulating fluid through the small annular clearance between the casing and the newly formed wellbore. The small annular clearance causes the circulating fluid to travel through the annular area at a high annular velocity. The higher annular velocity increases the ECD and may lead to a higher potential for wellbore erosion in comparison to a conventional drilling operation. Additionally, in small-clearance liner drilling, a smaller annulus is also formed between the set casing inner diameter and the drilling liner outer diameter, which further increases ECD and may prevent large drilled cuttings from being circulated from the well.

A need, therefore, exists for apparatus and methods for circulating fluid during a drilling operation. There is also a need for apparatus and methods for forming a wellbore and lining the wellbore in a single trip. There is a further need for an apparatus and methods for circulating fluid to facilitate the forming and lining of a wellbore in a single trip. They is yet a further need to cement the lined wellbore.

SUMMARY OF THE INVENTION

The present invention relates to time saving methods and apparatus for constructing and completing offshore hydrocarbon wells. In one embodiment, an offshore wellbore is formed when an initial string of conductor is inserted into the earth at the mud line. The conductor includes a smaller string of casing nested coaxially therein and selectively disengageable from the conductor. Also included at a lower end of the casing is a downhole assembly including a drilling device and a cementing device. The assembly including the conductor and the casing is "jetted" into the earth until the upper end of the conductor string is situated proximate the mud line. Thereafter, the casing string is unlatched from the conductor string and another section of wellbore is created by rotating the drilling device as the casing is urged downwards into the earth. Typically, the casing string is lowered to a depth whereby an annular area remains defined between the casing string and the conductor. Thereafter, the casing string is cemented into the conductor.

After the cement job is complete, a second string of smaller casing is run into the well with a drill string and an expandable bit disposed therein. Once the smaller casing is installed at a desired depth, the bit and drill string are removed to the surface and the second casing string is then cemented into place.

In one aspect, the present invention provides a method for lining a wellbore. The method includes providing a drilling assembly comprising an earth removal member and a wellbore lining conduit, wherein the drilling assembly includes a first fluid flow path and a second fluid flow path. The drilling assembly is manipulated to advance into the earth. The method also includes flowing a fluid through the first fluid flow path and returning at least a portion of the fluid through the second fluid flow path and leaving the wellbore lining conduit at a location within the wellbore. In one embodiment, the method also includes providing the drilling assembly with a third fluid flow path and flowing at least a portion of the fluid through the third fluid flow path. After drilling has been completed, the method may further include cementing the wellbore lining conduit.

In another embodiment, the drilling assembly further comprises a tubular assembly, a portion of the tubular assembly being disposed within the wellbore lining conduit. The method may further include relatively moving a portion of the tubular assembly and the wellbore lining conduit. In a further embodiment, the method may further comprise reducing the length of the drilling assembly. In yet another embodiment, the method includes advancing the wellbore lining conduit proximate a bottom of the wellbore.

In another aspect, the present invention provides an apparatus for lining a wellbore. The apparatus includes a drilling assembly having an earth removal member, a wellbore lining conduit, and a first end. The drilling assembly may include a first fluid flow path and a second fluid flow path there through, wherein a fluid is movable from the first end through the first fluid flow path and returnable through the second fluid flow path when the drilling assembly is disposed in the wellbore. In another embodiment, the drilling assembly further comprises a third fluid flow path.

In another aspect, the present invention provides a method for placing tubulars in an earth formation. The method includes advancing concurrently a portion of a first tubular and a portion of a second tubular to a first location in the earth. Thereafter, the second tubular is advanced to a second location in the earth. In one embodiment, the method may include advancing a portion of a third tubular to a third location. Additionally, at least a portion of one of the first and second tubulars may be cemented into place.

In another aspect, a method of drilling a wellbore with casing is provided. The method includes placing a string of casing with a drill bit at the lower end thereof into a previously formed wellbore and urging the string of casing axially downward to form a new section of wellbore. The method further includes pumping fluid through the string of casing into an annulus formed between the string of casing and the new section of wellbore. The method also includes diverting a portion of the fluid into an upper annulus in the previously formed wellbore.

In another aspect, an apparatus for forming a wellbore is provided. The apparatus comprises a casing string with a drill bit disposed at an end thereof and a fluid bypass formed at least partially within the casing string for diverting a portion of fluid from a first to a second location within the casing string as the wellbore is formed.

In another aspect, the present invention provides a method of drilling with liner, comprising forming a wellbore with an assembly including an earth removal member mounted on a work string and a section of liner disposed therearound, the earth removal member extending below a lower end of the liner; lowering the liner to a location in the wellbore adjacent the earth removal member; circulating a fluid through the earth removal member; fixing the liner section in the wellbore; and removing the work string and the earth removal member from the wellbore.

In another aspect, the present invention provides a method of casing a wellbore, comprising providing a drilling assembly including a tubular string having an earth removal member operatively connected to its lower end, and a casing, at least a portion of the tubular string extending below the casing; lowering the drilling assembly into a formation; lowering the casing over the portion of the drilling assembly; and circulating fluid through the casing.

In another aspect, the present invention provides a method of drilling with liner, comprising forming a section of wellbore with an earth removal member operatively connected to a section of liner; lowering the section of liner to a location proximate a lower end of the wellbore; and circulating fluid while lowering, thereby urging debris from the bottom of the wellbore upward utilizing a flow path formed within the liner section.

In another aspect, the present invention provides a method of drilling with liner, comprising forming a section of wellbore with an assembly comprising an earth removal tool on a work string fixed at a predetermined distance below a lower end of a section of liner; fixing an upper end of the liner section to a section of casing lining the wellbore; releasing a latch between the work string and the liner section; reducing the predetermined distance between the lower end of the liner section and the earth removal tool; releasing the assembly from the section of casing; re-fixing the assembly to the section of casing at a second location; and circulating fluid in the wellbore.

In another aspect, the present invention provides a method of casing a wellbore, comprising providing a drilling assembly comprising a casing and a tubular string releasably connected to the casing, the tubular string having an earth removal member operatively attached to its lower end, a portion of the tubular string located below a lower end of the casing; lowering the drilling assembly into a formation to form a wellbore; hanging the casing within the wellbore; moving the portion of the tubular string into the casing; and lowering the casing into the wellbore.

In another aspect, the present invention provides a method of cementing a liner section in a wellbore, comprising removing a drilling assembly from a lower end of the liner section, the drilling assembly including an earth removal tool and a work string; inserting a tubular path for flowing a physically alterable bonding material, the tubular path extending to the lower end of the liner section and including a valve assembly permitting the cement to flow from the lower section in a single direction; flowing the physically alterable bonding material through the tubular path and upwards in an annulus between the liner section and the wellbore therearound; closing the valve; and removing the tubular path, thereby leaving the valve assembly in the wellbore.

In another aspect, the present invention provides a method of drilling with liner, comprising providing a drilling assembly comprising a liner having a tubular member therein, the tubular member operatively connected to an earth removal member and having a fluid path through a wall thereof, the fluid path disposed above a lower portion of the tubular member; lowering the drilling assembly into the earth, thereby forming a wellbore; sealing an annulus between an outer diameter of the tubular member and the wellbore; and sealing a longitudinal bore of the tubular member; flowing a physically alterable bonding material through the fluid path, thereby preventing the physically alterable bonding material from entering the lower portion of the tubular member.

In another aspect, the present invention provides a method for placing tubulars in an earth formation comprising advancing concurrently a portion of a first tubular and a portion of a second tubular to a first location in the earth, and further advancing the second tubular to a second location in the earth.

In another aspect, the present invention provides a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; and directing a physically alterable bonding material into an annulus between the drill string and the borehole through the at least one secondary fluid passage.

In another aspect, the present invention provides an apparatus for selectively directing fluids flowing down a hollow portion of a tubular element to selective passageways leading to a location exterior to the tubular element, comprising a first fluid passageway from the hollow portion of the tubular member to a first location; a second passageway from the hollow portion of the tubular member to a second location; a first valve member configurable to selectively block the first fluid passageway; a second valve member configured to maintain the second fluid passageway in a normally blocked condition; and the first valve member including a valve closure element selectively positionable to close the first valve member and thereby effectuate opening of the second valve member.

In another aspect, the present invention provides a method for lining a wellbore, comprising forming a wellbore with an assembly including an earth removal member mounted on a work string, a liner disposed around at least a portion of the work string, a first sealing member disposed on the work string, and a second sealing member disposed on an outer portion of the liner; lowering the liner to a location in the wellbore adjacent the earth removal member while circulating a fluid through the earth removal member; actuating the first sealing member; fixing the liner section in the wellbore; actuating the second sealing member; and removing the work string and the earth removal member from the wellbore.

At any point in the forgoing process, any of the strings can be expanded in place by well known expansion methods, like rolling or cone expansion. An example of a cone method is taught in U.S. Pat. No. 6,354,373, which is incorporated by reference herein in its entirety. In simple terms, the cone is placed in a wellbore at the lower end of a tubular to be expanded. When the tubular is in place, the cone is urged upwards by fluid pressure, expanding the tubular on the way up. An example of a roller-type expander is taught in U.S. Pat. No. 6,457,532 which is incorporated by reference herein. In simple terms, the roller expander includes radially extendable roller members that are urged outwards due to fluid pressure to expand the walls of a tubular therearound past its elastic limits. Additionally, the apparatus can utilize ECD (Equivalent Circulation Density) reduction devices that can reduce pressure caused by hydrostatic head and the circulation of drilling fluid. Methods and apparatus for reducing ECD are taught in co-pending application Ser. No. 10/269,661. In simple terms, that application describes a device that is installable in a casing string and operates to redirect fluid flow traveling between the inner tubular and the annulus therearound. By adding energy to the fluid moving upwards in the annulus, the ECD is reduced to a safer level, thereby reducing the chance of formation damage and permitting extended lengths of borehole to be formed without stopping to case the wellbore. Energy can be added by a pump or by simply redirecting the fluid from the inside of the tubular to the outside.

Additionally, any of the strings of casing can be urged in a predetermined direction through the use of direction changing devices and methods like rotary steerable systems and bent housing steerable mud motors. Examples of rotary steerable systems usable with casing are shown and taught in U.S. application Ser. No. 09/848,900 which is published as U.S. 2001/0040054 A1 and is incorporated herein by reference. Additionally, any of the strings can include testing apparatus, like leak off testing and any can include sensing means for geophysical parameters like measurement while drilling (MWD) or logging while drilling (LWD). Examples of MWD are taught in U.S. Pat. No. 6,364,037 which is incorporated by reference in its entirety herein.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a view of the drilling system after the housing has been jetted in.

FIG. 50A is a cross sectional view of the liner assembly of FIG. 50 taken at line A-A.

DETAILED DESCRIPTION OF THE PREFERRED EMBODIMENT

Figure 1:
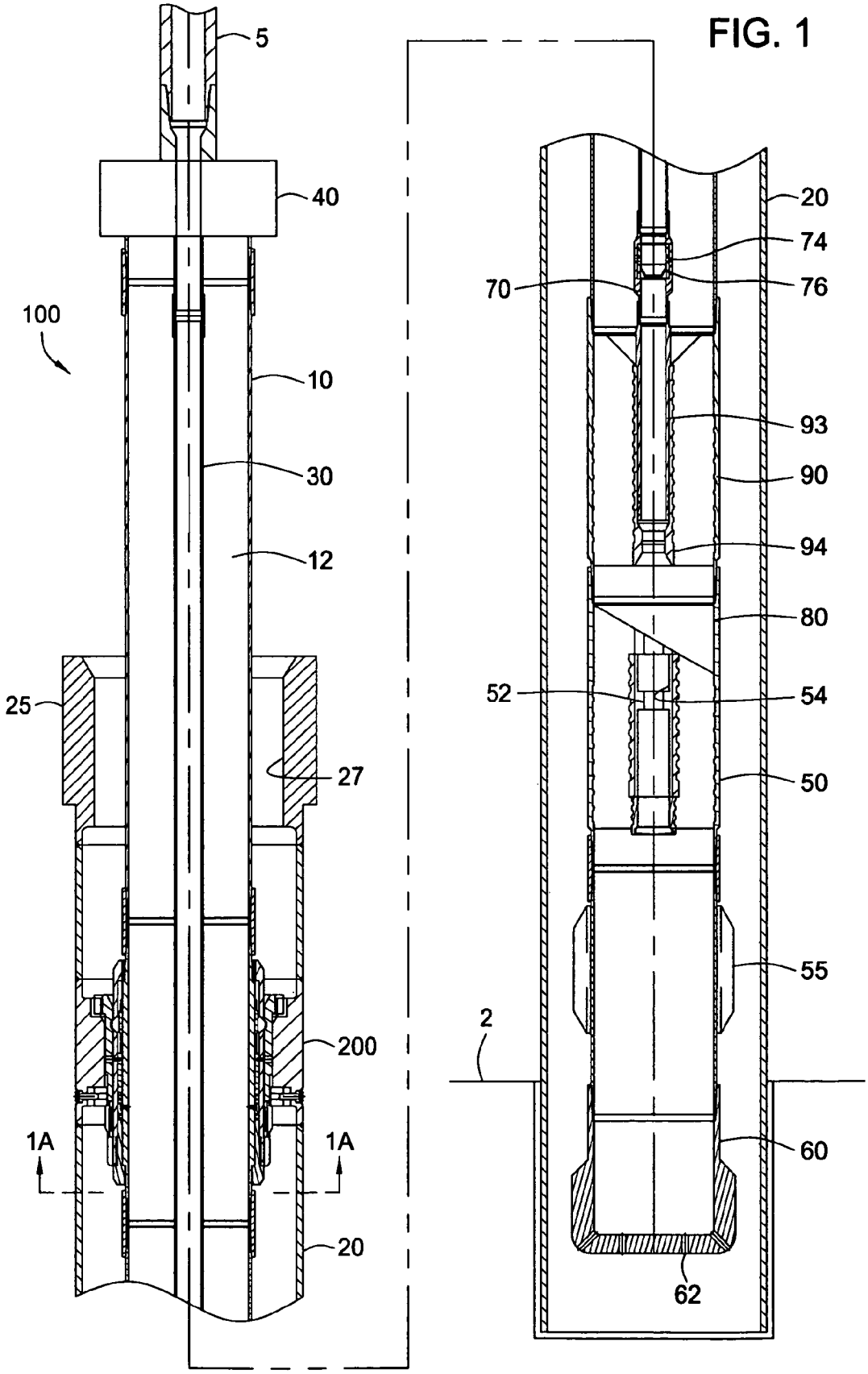
FIG. 1 shows an embodiment of the drilling system according to aspects of the present invention. The drilling system is shown in the run-in position.
Figure 2:
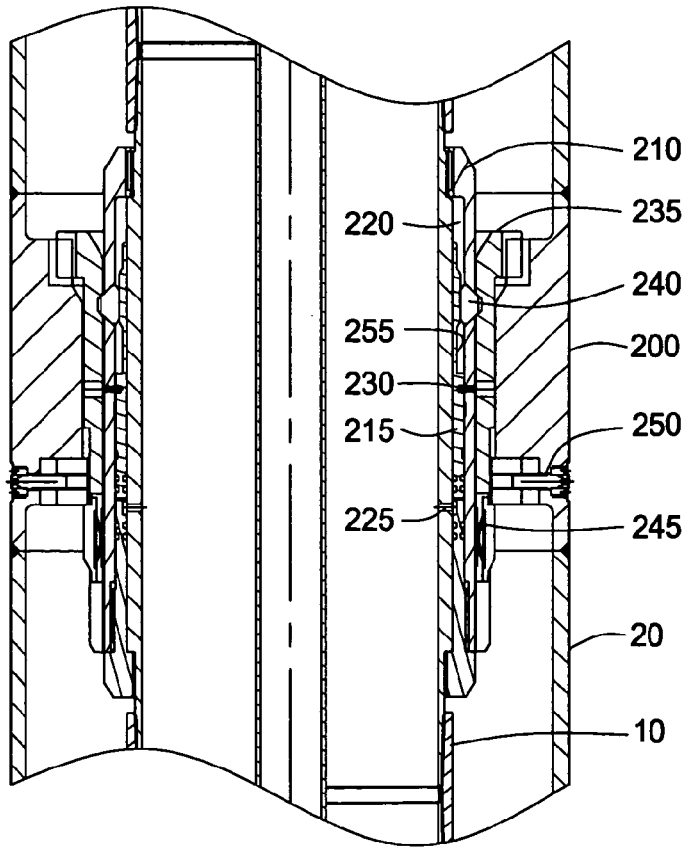
FIG. 2 is an exploded view of the releasable connection for connecting the first casing to the housing of FIG. 1.

FIG. 1 is a cross-sectional view of one embodiment of the drilling system 100 of the present invention in the run-in position. The drilling system 100 includes a first casing string 10 disposed in a housing 20 such as a conductor pipe and selectively connected thereto. The housing 20 defines a tubular having a larger diameter than the first casing string 10. Embodiments of the housing 20 and the first casing string 10 may include a casing, a liner, and other types of tubular disposable downhole. Preferably, the housing 20 and the first casing string 10 are connected using a releasable connection 200 that allows axial and rotational forces to be transmitted from the first casing string 10 to the housing 20. An exemplary releasable connection 200 applicable to the present invention is shown in FIG. 2 and discussed below. The housing 20 may include a mud matt 25 disposed at an upper end of the housing 20. The mud matt 25 has an outer diameter that is larger than the outer diameter of the housing 20 to allow the mud matt 25 to sit atop a surface, such as a mud line on the sea floor 2, in order to support the housing 20.

The drilling system 100 may also include an inner string 30 disposed within the first casing string 10. The inner string 30 may be connected to the first casing string 10 using a releasable latch mechanism 40. During operation, the latch mechanism 40 may seat in a landing seat 27 provided in an upper end of the housing 20. An example of an appropriate latch mechanism usable with the present invention includes a latch mechanism such as ABB VGI Fullbore Wellhead manufactured by ABB Vetco. At one end, the inner string 30 may be connected to a drill string 5 that leads back to the surface. At another end, the inner string 30 may be connected to a stab-in collar 90.

Disposed at a lower end of the first casing string 10 is a drilling member or earth removal member 60 for forming a borehole 7. Preferably, an outer diameter of the drilling member 60 is larger than an outer diameter of the first casing string 10. The drilling member 60 may include fluid channels 62 for circulating fluid. In another embodiment, the fluid channels 62, or nozzles, may be adapted for directional drilling. An exemplary drilling member 60 having such a nozzle is disclosed in co-pending U.S. patent application filed Feb. 2, 2004, which application is herein incorporated by reference in its entirety. A centralizer 55 may be utilized to keep the drilling member 60 centered. The first casing string 10 may also include a float collar 50 having an orienting device 52, such as a mule shoe, and a survey seat 54 for maintaining a survey tool.

The inner string 30 may include a ball seat 70, a ball receiver 80, and a stab-in collar 90 at its lower end. Preferably, the ball seat 70 is an extrudable ball seat 70, wherein a ball 72 disposed may be extruded therethrough. In one example, the ball seat 70 may be made of brass. Aspects of the present invention contemplate other types of extrudable ball seat 70 known to a person of ordinary skill in the art. The ball seat 70 may also include ports 74 for fluid communication between an interior of the inner string 30 and an annular area 12 between the inner string 30 and the first casing string 10. The ports 74 may be opened or closed using a selectively connected sliding sleeve 76 as is known in the art. The ball receiver 80 is disposed below the ball seat 70 in order to receive the ball 72 after it has extruded through the ball seat 70. The ball receiver 80 receives the ball 72 and allows fluid communication in the inner string 30 to be re-established.

Disposed below the ball seat 70 is a stab-in collar 90. Preferably, the stab-in collar 90 includes a stinger 93 selectively connected to a stinger receiver 94. During operation, the stinger 93 may be caused to disconnect from the stinger receiver 94.

Shown in FIG. 2 is an embodiment of the releasable connection 200 capable of selectively connecting the housing 20 to the first casing string 10. The connection 200 includes an inner sleeve 210 disposed around the first casing string 10. A piston 215 is disposed in an annular area 220 between the inner sleeve 210 and the first casing string 10. The piston 215 is temporarily connected to the inner sleeve 210 using a shearable pin 230. A port 225 is formed in the first casing string 10 for fluid communication between the interior of the first casing string 10 and the annular area 220. The inner sleeve 210 is selectively connected to an outer sleeve 235 using a locking dog 240. The outer sleeve 235 is connected to the housing 20 using a biasing member 245 such as a spring loaded dog 245. The outer sleeve 235 may optionally be connected to the housing 20 using an emergency release pin 250. A locking dog profile 255 is formed on the piston 215 for receiving the locking dog 240 during operation. In another embodiment, the releasable connection includes a J-slot release as is known to a person of ordinary skill in the art.

Figure 1A:
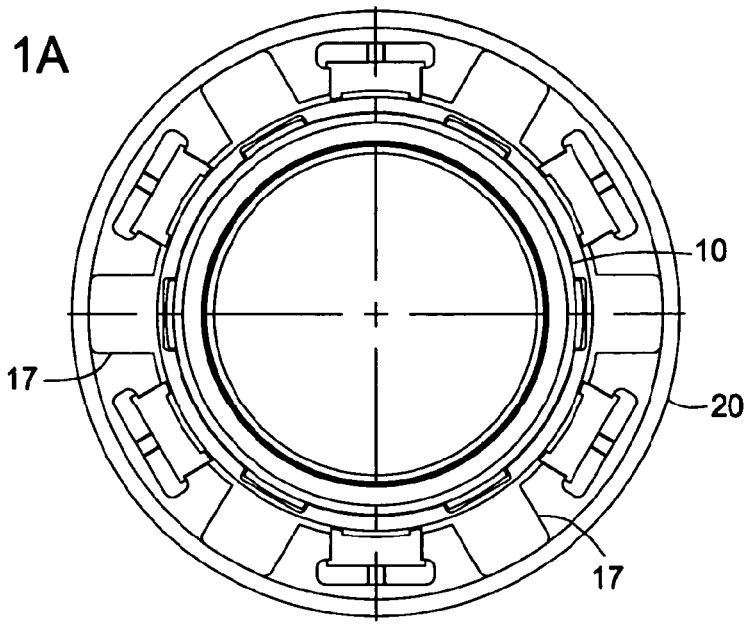
FIG. 1A is a cross-sectional view of FIG. 1 take along line 1A-1A.

FIG. 1A is a cross-sectional view of FIG. 1 taken along line 1A-1A. It can be seen that releasable connection 200 is fluid bypass member 17. The bypass member 17 may comprise one or more radial spokes circumferentially disposed between the first casing string 10 and the housing 20. In this respect, one or more bypass slots are formed between the spokes for fluid flow therethrough. The fluid bypass member 17 allows fluid to circulate during wellbore operations, as described below.

Figure 3:
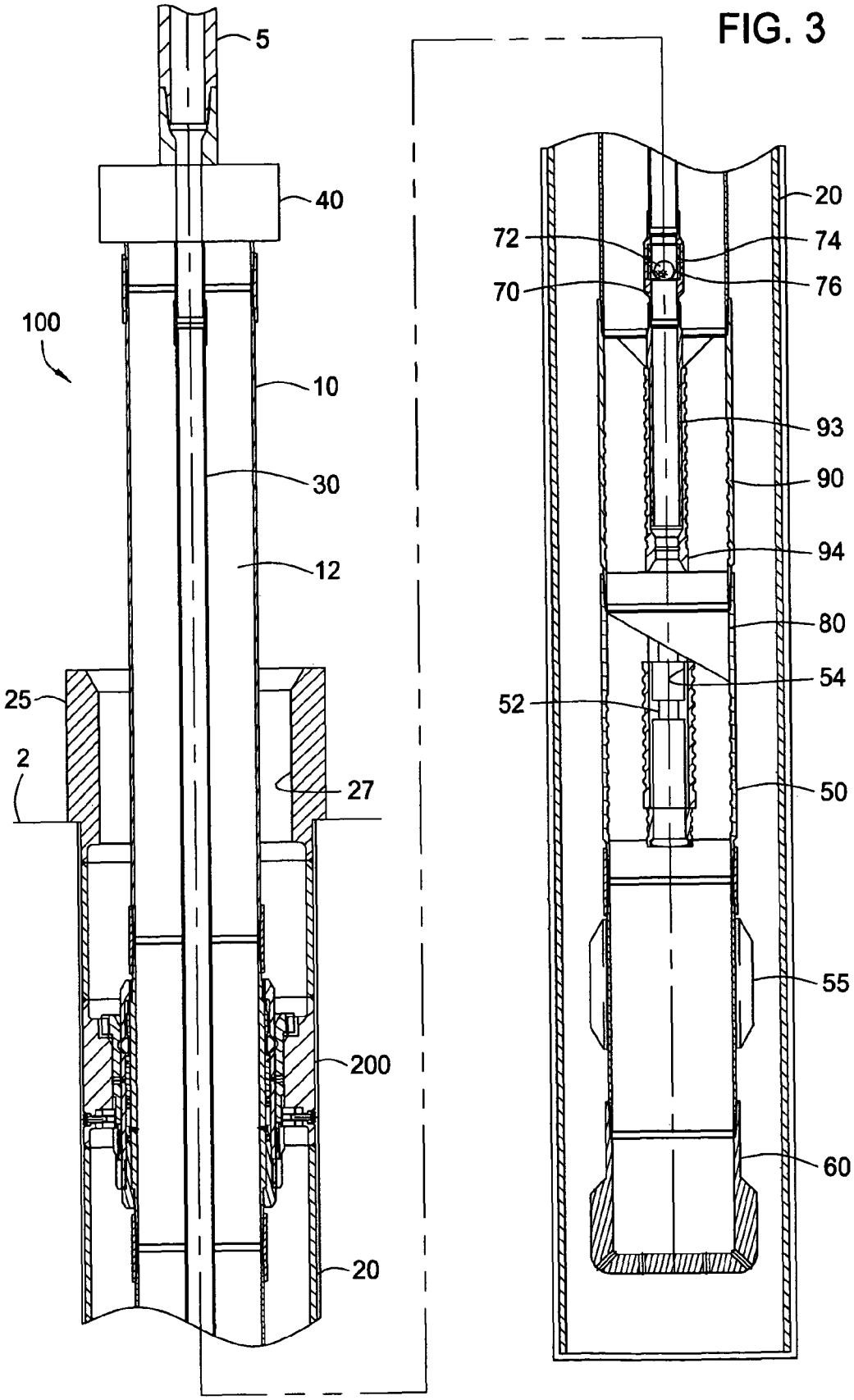

In operation, the drilling system 100 of the present invention is partially lowered into the sea floor 2 as shown in FIG. 1. The drilling system 100 is initially inserted into the sea floor 2 using a jetting action. Particularly, fluid is pumped through the inner string 30 and exits the flow channels 62 of the drilling member 60. The fluid may create a hole in the sea floor 2 to facilitate the advancement of the drilling system 100. At the same time, the drilling system 100 is reciprocated axially to cause the housing 20 to be inserted into the sea floor 2. The drilling system 100 is inserted into the sea floor 2 until the mud matt 25 at the upper end of the housing 20 is situated proximate the mud line of the sea floor 2 as shown in FIG. 3.

The first casing string 10 is now ready for release from the housing 20. At this point, a ball 72 is dropped into the inner string 30 and lands in the ball seat 70. After seating, the ball 72 blocks fluid communication from above the ball 72 to below the ball 72 in the inner string 30. As a result, fluid in the inner string 30 above the ball 72 is diverted out of the ports 74 in the ball seat 70. This allows pressure to build up in the annular area 12 between the inner string 30 and the first casing string 10.

The fluid in the annular area 12 may be used to actuate the releasable connection 200. Specifically, fluid in the annular area 12 flows through the port 225 in the first casing string 10 and into the annular area 220 between inner sleeve 210 and the first casing string 10. The pressure increase causes the shearable pin 230 to fail, thereby allowing the piston 215 to move axially. As the piston 215 moves, the locking dog profile 255 slides under the locking dog 240, thereby allowing the locking dog 240 to move away from the outer sleeve 235 and seat in the locking dog profile 255. In this respect, the inner sleeve 210 is freed to move independently of the outer sleeve 235. In this manner, the first casing string 10 is released from the housing 20.

Figure 4:
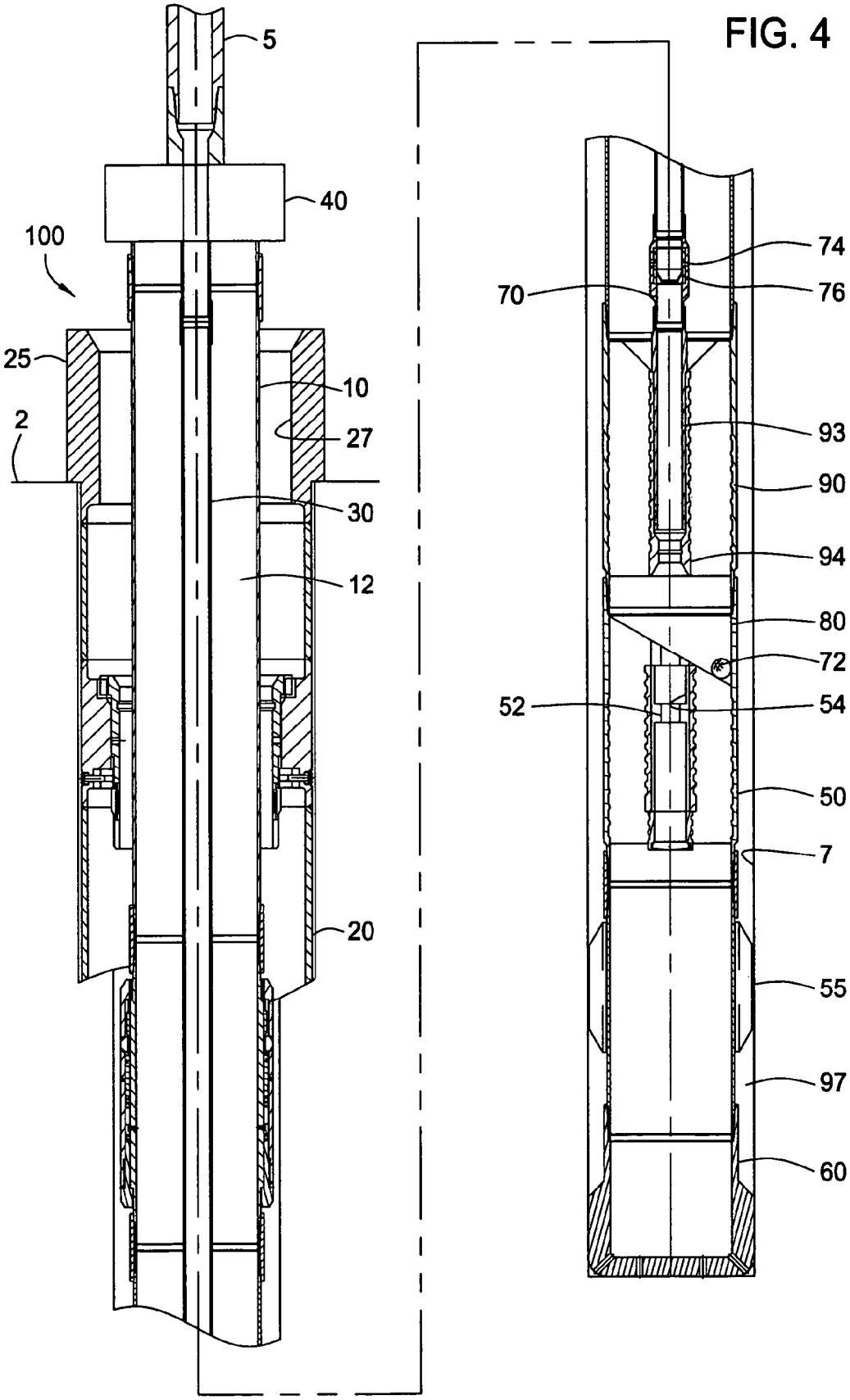
FIG. 4 is a view of the drilling system after the first casing has been lowered relative to the housing.

Thereafter, the pressure is increased above the ball 72 to extrude the ball 72 from the ball seat 70. The ball 72 falls through the ball seat 70, through the stab-in collar 90, and lands the ball receiver 80, as shown in FIG. 4. This, in turn, re-opens fluid communication from the inner string 30 to the drilling member 60. In addition, the increase in pressure causes the sliding sleeve 76 of the ball seat 70 to close the ports 74 of the ball seat 70.

Figure 5:
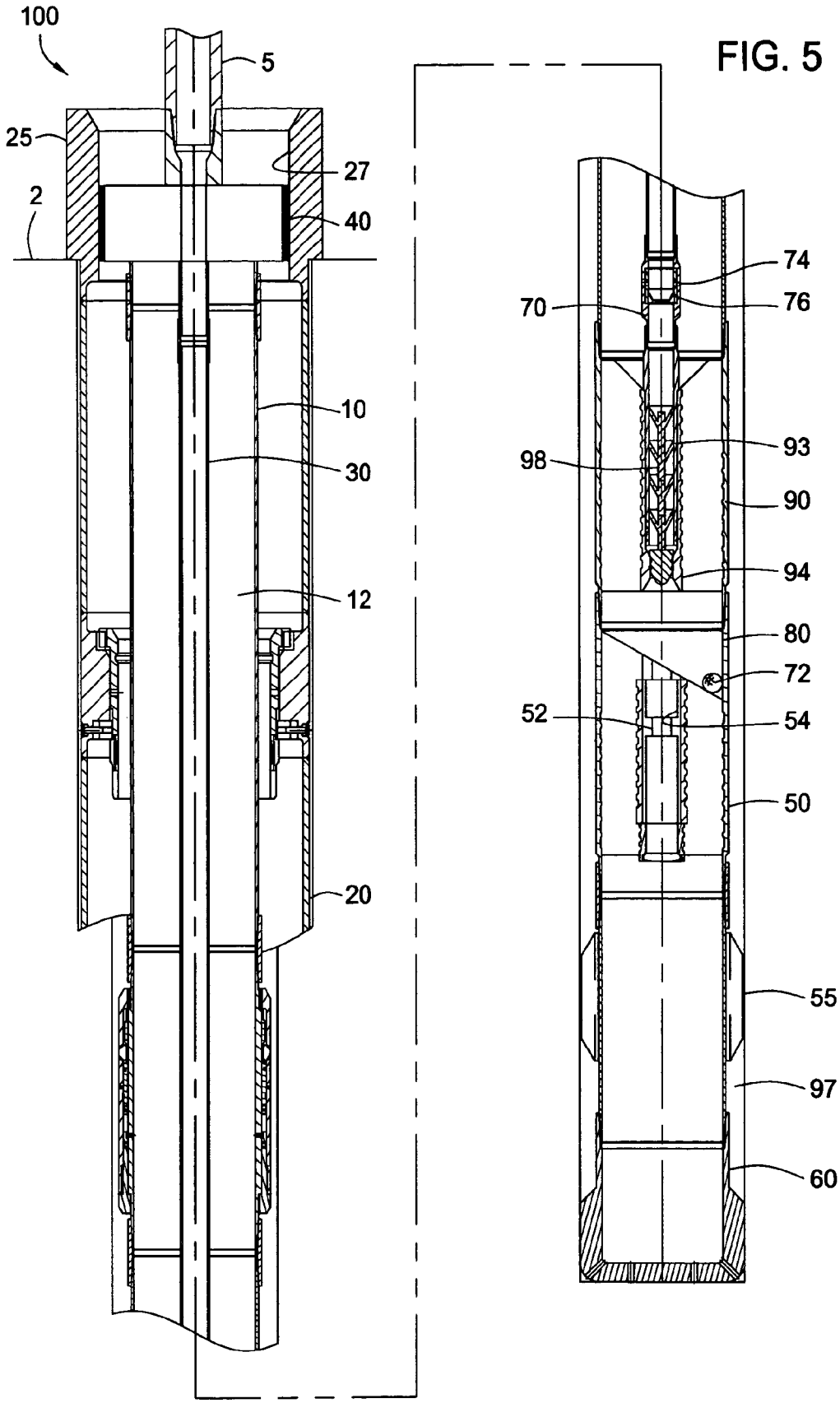
FIG. 5 is a view of the drilling system after the cementing operation is completed.

The drilling member 60 is now actuated to drill a borehole 7 below the housing 20. The outer diameter of the drilling member 60 is such that an annular area 97 is formed between the borehole 7 and the first casing string 10. Fluid is circulated through the inner string 30, the drilling member 60, the annular area 97, the housing 20, and the bypass members 17. The depth of the borehole 7 is determined by the length of the first casing string 10. The drilling continues until the latch mechanism 40 on the first casing string 10 lands in the landing seat 27 disposed at the upper end of the housing 20 as shown in FIG. 5.

Thereafter, a physically alterable bonding material such as cement is pumped down the inner string 30 to set the first casing string 10 in the wellbore. The cement flows out of the drilling member 60 and up the annular area 97 between the borehole 7 and the first casing string 10. The cement continues up the annular area 97 and fills the annular area between the housing 20 and the first casing string 10. When the appropriate amount of cement has been supplied, a dart 98 is pumped in behind the cement, as shown in FIG. 5. The dart 98 ultimately positions itself in the stinger 93. Thereafter, the latch 40 is release from the housing 20 and the first casing string 10. Then the drill string 5 and the inner string 30 are removed from the first casing string 10. The inner string 30 is separated from the stab-in collar 90 by removing the stinger 93 from the stinger receiver 94. The stinger 93 is removed with the inner string 30 along with the ball seat 70.

Figure 6:
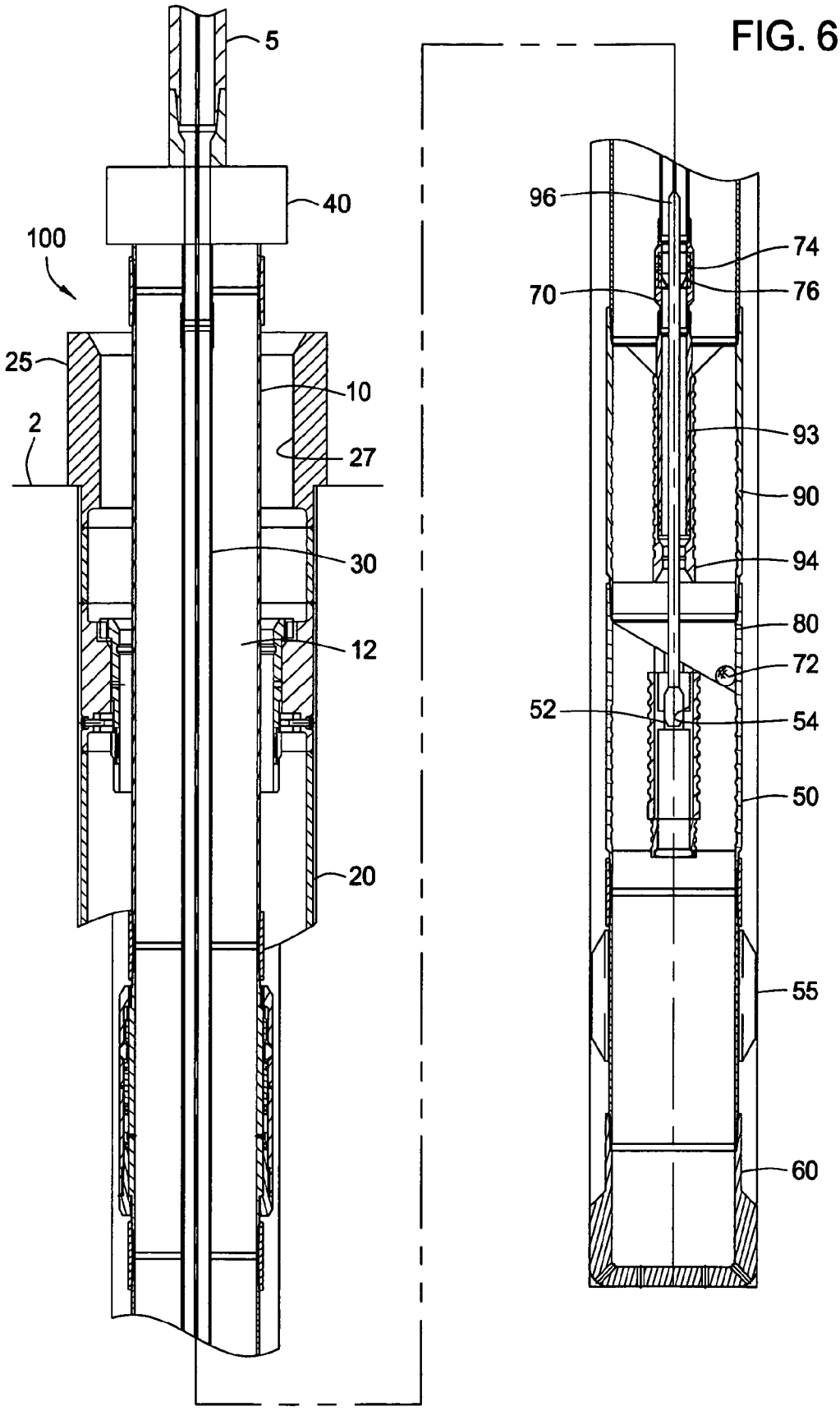
FIG. 6 is a view of the drilling system with a survey tool disposed therein.

In another aspect, a wellbore survey tool 96 landed on orientation seat 52 may optionally be used to determine characteristics of the borehole before the cementing operation as illustrated in FIG. 6. The survey tool 96 may contain one or more geophysical sensors for determining characteristics of the borehole. The survey tool 96 may transmit any collected information to surface using wireline telemetry, mud pulse technology, or any other manner known to a person of ordinary skill in the art.

Figure 7:
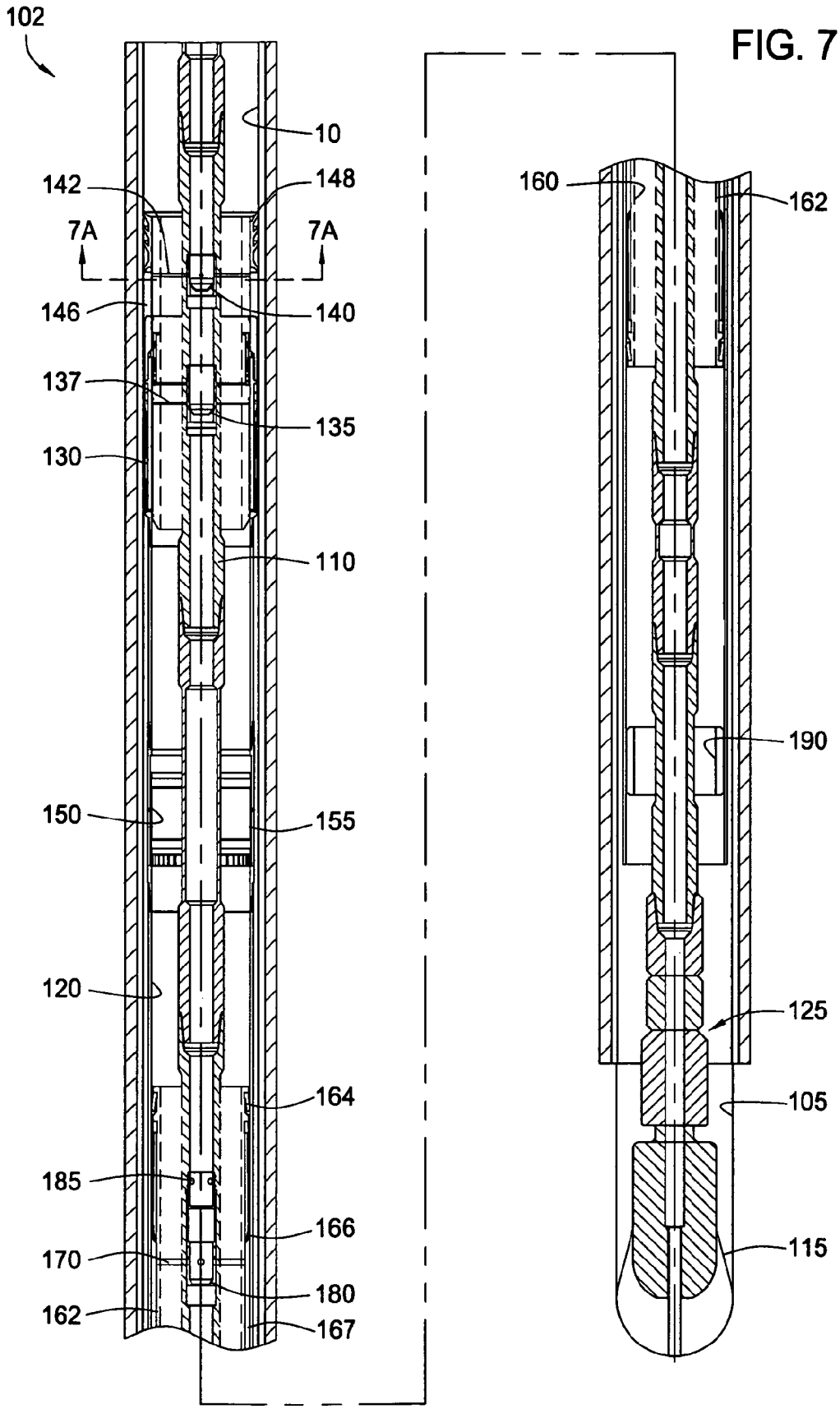
FIG. 7 is a view of a second drilling system according to aspects of the present invention.

In another aspect, the present invention provides methods and apparatus for hanging a second casing string 120 from the first casing string 10. Shown in FIG. 7 is a second drilling system 102 at least partially disposed within the first casing string 10. In addition to the second casing string 120, the second drilling system 102 includes a drill string 110 and a bottom hole assembly 125 disposed at a lower end thereof. The bottom hole assembly 125 may include components such as a mud motor; logging while drilling system; measure while drilling systems; gyro landing sub; any geophysical measurement sensors; various stabilizers such as eccentric or adjustable stabilizers; and steerable systems, which may include bent motor housings or 3D rotary steerable systems. The bottom hole assembly 125 also has a earth removal member or drilling member 115 such as a pilot bit and underreamer combination, a bi-center bit with or without an underreamer, an expandable bit, or any other drilling member that may be used to drill a hole having a larger inner diameter than the outer diameter of any component disposed on the drill string 110 or the first casing string 10, as is known in the art. The drilling member 115 may include nozzles or jetting orifices for directional drilling. As shown, the drilling member 115 is an expandable drill bit 115.

Figure 7A:
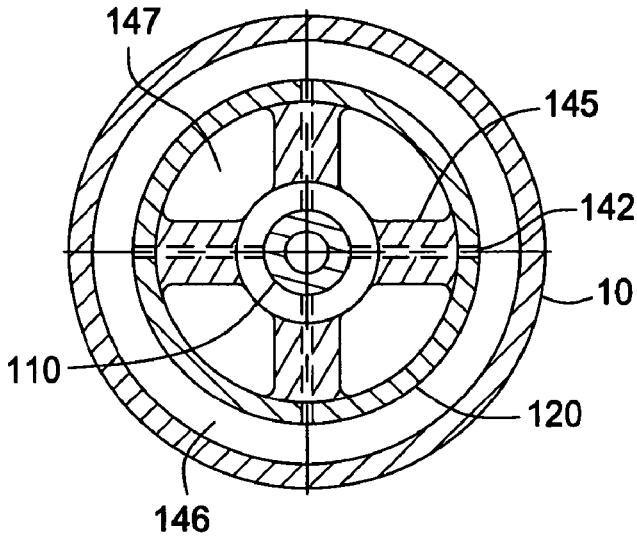
FIG. 7A is a cross sectional view of the drilling assembly.

The drill string 110 may also include a first ball seat 140 having bypass ports 142 for fluid communication between an interior of the drill string 110 and an exterior of the second casing string 120. As shown in FIG. 7A, the first ball seat 140 comprises a fluid bypass member 145. Preferably, the bypass ports 142 are disposed within the spokes of the bypass member 145. The spokes extend radially from the drill string 110 to the annular area 146 between the first casing string 10 and the second casing string 120. The spokes are adapted to form one or more bypass slots 147 for fluid communication along the interior of the second casing string 120. Specifically, bypass member 145 is shown with four spokes are shown in FIG. 7A. A sealing member 148 may be disposed in the annular area 146 at an upper portion of the second casing string 120 to block fluid communication between the annular area 146 and the interior of the first casing string 10 above the second casing string 120. In one embodiment, the first ball seat 140 may be an extrudable ball seat.

The drill string 110 further includes a liner hanger assembly 130 disposed at an upper end thereof. The liner hanger 130 temporarily connects the drill string 110 to the second casing string 120 by way of a running tool and may be used to hang the second casing string 120 off of the first casing string 10. The liner hanger 130 includes a sealing element and one or more gripping members. An example of suitable sealing element is a packer, and an example of a suitable gripping member is a radially extendable slip mechanism. Other types of suitable sealing elements and gripping members known to a person of ordinary skill in the art are also contemplated.

The liner hanger 130 is placed in fluid communication with a second ball seat 135 disposed on the drill string 110. The second ball seat 135 comprises a fluid bypass member. Fluid may be supplied through ports 137 to actuate the slips of the liner hanger 130. The packing element may be set when the slips are set or mechanically set when the drill string 110 is retrieved. Preferably, the packing element is set hydraulically when the slips are set. In one embodiment, the second ball seat 135 is an extrudable ball seat similar to the ones described above.

The second drilling system 102 may also include a full opening tool 150 disposed on the second casing string 120 for cementing operations. The full opening tool 150 is actuated by an actuating tool 160 disposed on the drill string 110. The actuating tool 160 may also comprise a fluid bypass member 145. The spokes of the actuating tool 160 may also contain cementing ports 170. The bypass slots 147 disposed between the spokes allow continuous fluid communication axially along the interior of the second casing string 120. It must be noted that the spokes of the bypass members 145 discussed herein may comprise other types of support member of design capable of allowing fluid flow in an annular area as is known to a person of ordinary skill in the art. The actuating tool 160 includes a sleeve 162 having sealing cups 164 dispose at each end. The sealing cups 164 enclose an annular area 167 between the sleeve 162 and the second casing string 120. Disposed between the sealing cups are upper and lower collets 166 for opening and closing the ports 155 of the full opening tool 150, respectively.

Figure 12A:
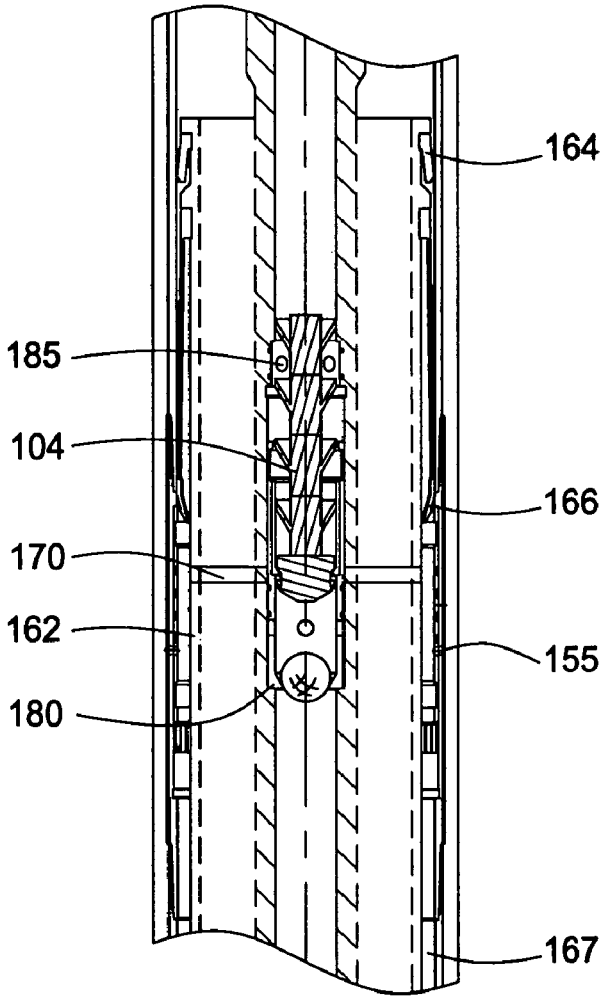
FIG. 12A is an exploded view of the full opening tool in the actuated position.

A third ball seat 180 is disposed on the drill string 110 and in fluid communication with the annular area 167 between the sealing cups 164. The ball seat 180 is a fluid bypass member 175 having one or more bypass ports 170 for fluid communication between the interior of the drill string 110 and the enclosed annular area 167. The drill string 110 may further include circulating ports 185 disposed above the third ball seat 180. FIG. 12A in an exploded view of full opening tool 150 actuated by the actuating tool 160.

The drill string 110 may further include a centralizer 190 or a stabilizer. The centralizer 190 may also comprise a fluid bypass member. Preferably, the spokes of the centralizer 190 do not have bypass ports. The bypass slots disposed between the spokes allow continuous fluid communication axially along the interior of the second casing string 120. It must be noted that the spokes of the bypass members discussed herein may comprise other types of support member or design capable of allowing fluid flow in an annular area as is known to a person of ordinary skill in the art. In one embodiment, the centralizer 190 may comprise a bladed stabilizer.

Figure 8:
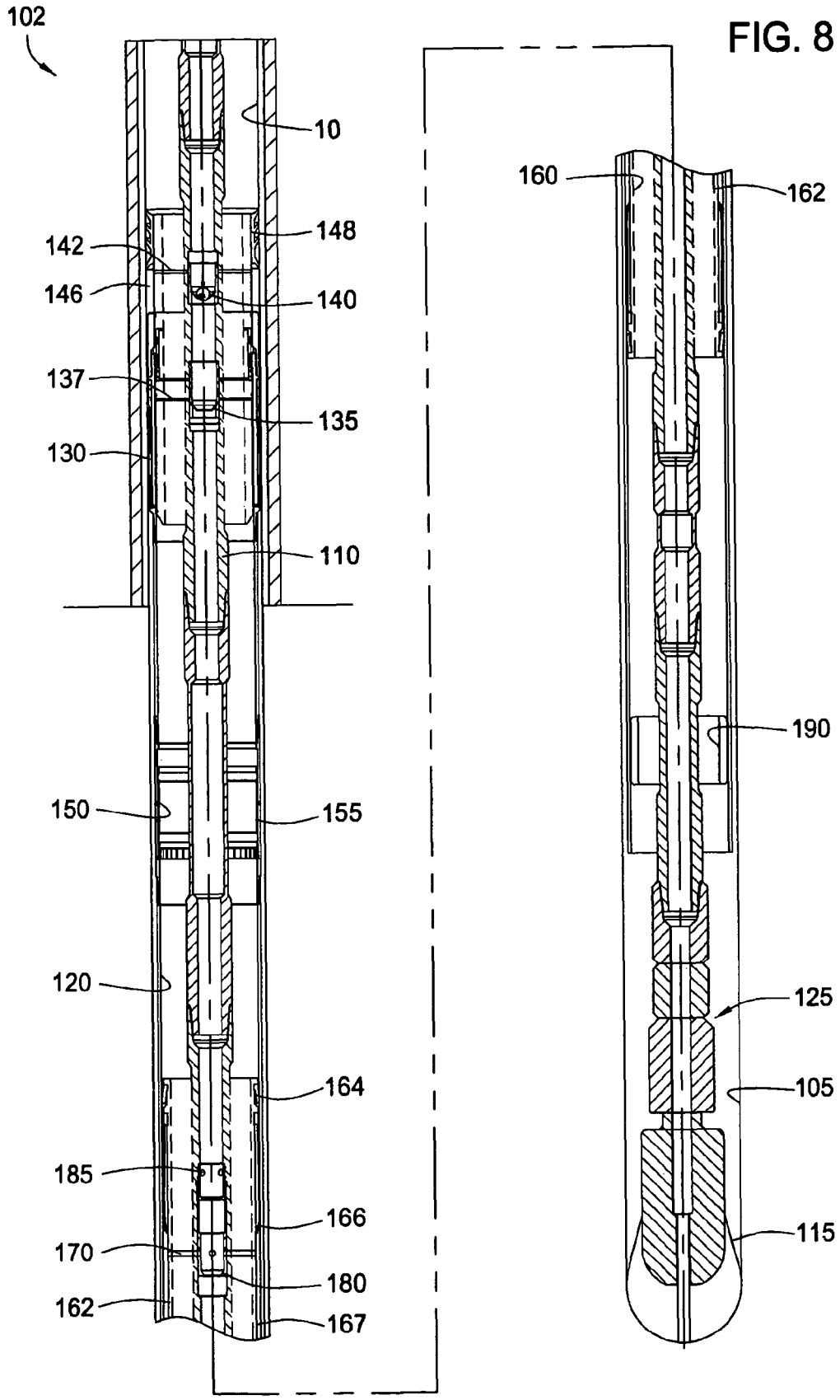
FIG. 8 is a view of the second drilling system after drilling is completed.

In operation, the second drilling system 102 is lowered into the first casing string 10 as illustrated in FIG. 7. In this embodiment, the second drilling system 102 is actuated to drill through the drilling member 60 of the first drilling system 100. The expandable bit 115 may be expanded to form a borehole 105 larger than an outer diameter of the second casing string 120. The bit 115 continues to drill until it reaches a desired depth in the wellbore to hang the second casing string 120 as shown in FIG. 8. During drilling, some of the fluid is allowed to flow out of the ports 142 in the first ball seat 140 and into the annular area 146 between the first and second casing string 10, 120. The position of the sealing member 148 forces the diverted fluid in the annular area 146 to flow downward in the wellbore. The advantages of the diverted fluid include lubricating the casing string 120 and helps remove cuttings from the borehole 105. Fluid in the lower portion of the wellbore is circulated up the wellbore inside the second casing string 120. The bypass members 145, 175 disposed along the second casing string 120 allow the circulated fluid, which may contain drill cuttings, to travel axially inside the second casing string 120. In this respect, fluid may be circulated inside the second casing string 120 instead of the small annular area between the second casing string 120 and the newly formed wellbore. In this manner, fluid circulation problems associated with drilling and lining the wellbore in one trip may be alleviated.

When the drilling stops, a ball is dropped into the first ball seat 140 as shown in FIG. 8. Pressure is increased to extrude the ball through the first ball seat 140 and close off the ports 142 of the first ball seat 140. The ball is allowed to land in a ball catcher (not shown) in the drill string 110. Alternatively, the ball may land in the second ball seat 135.

Figure 9:
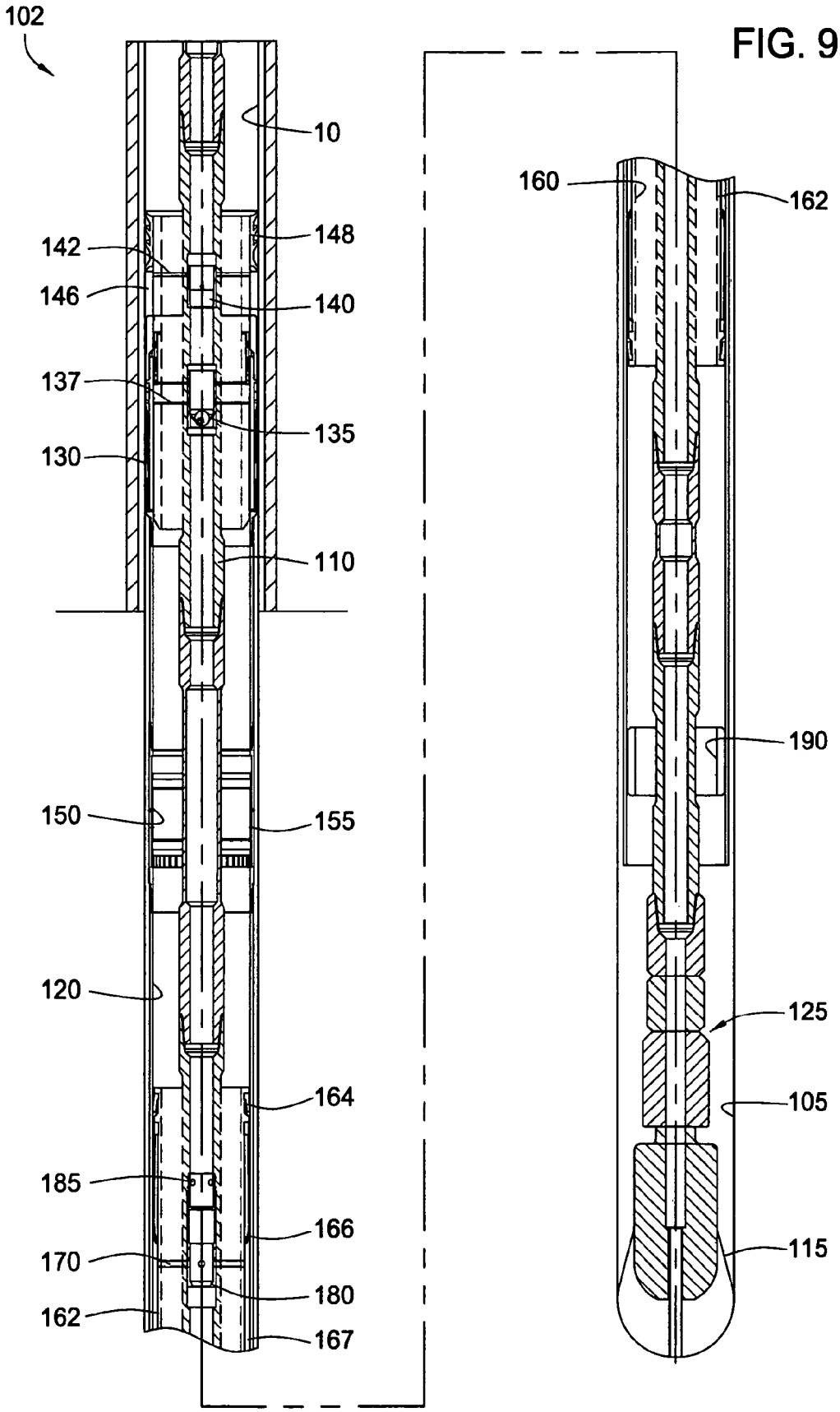
FIG. 9 is a view of the second drilling system showing the liner hanger at the beginning of the setting sequence.
Figure 10:
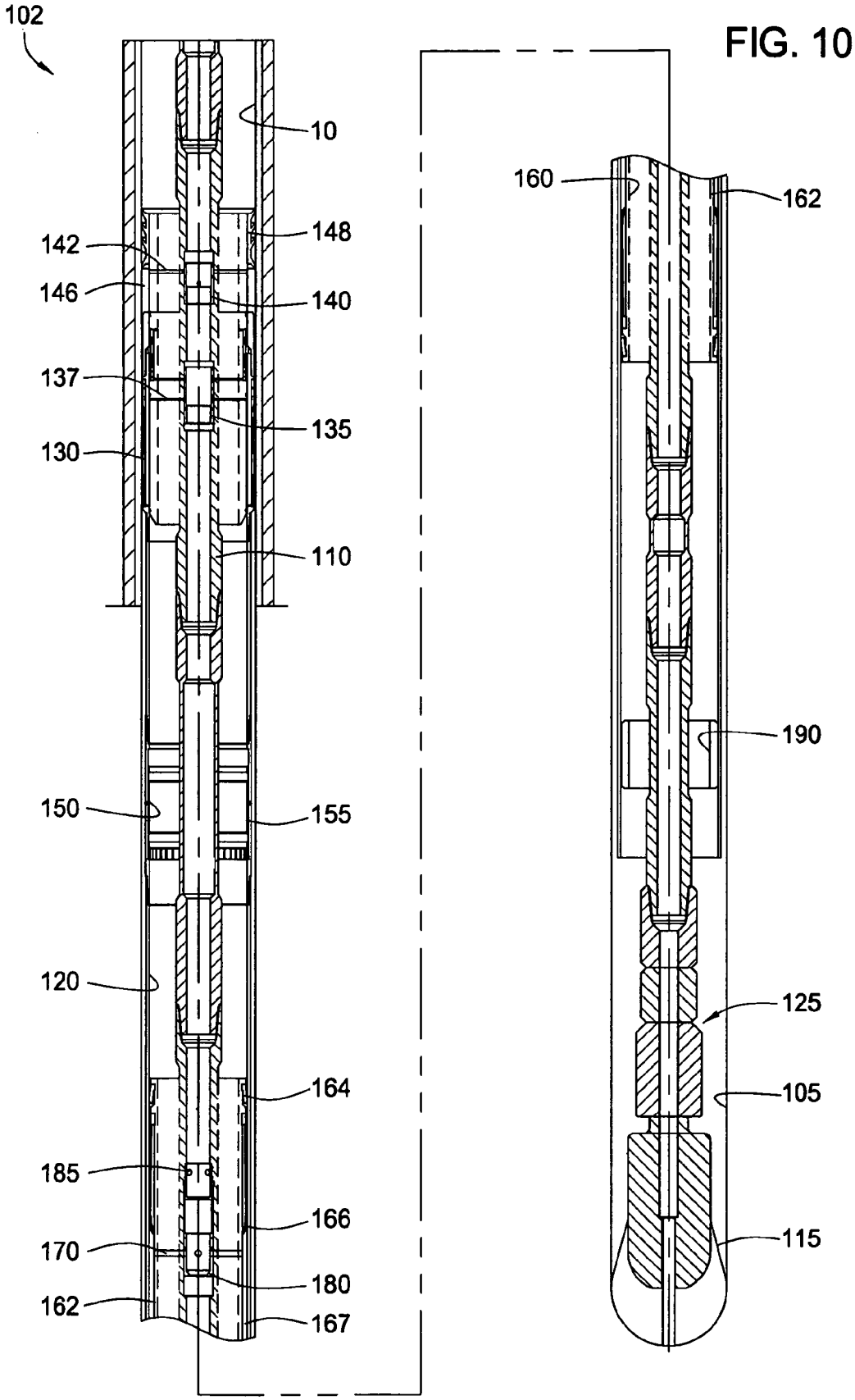
FIG. 10 show a view of the second drilling after the liner has been set.

If the ball does not land in the second ball seat 135, a second ball may be dropped into the second ball seat 135 of the liner hanger assembly 130 as shown in FIG. 9. Preferably, the second ball is larger in size than the first ball. After the ball seats, pressure is supplied to the liner hanger 130 through the ball seat ports 137 to actuate the liner hanger 130. Initially, the packer is set and the slip mechanism is actuated to support the weight of the second casing string 120. Thereafter, the pressure is increased to disengage the drill string 10 from the second casing string 120, thereby freeing the drill string 110 to move independently of the second casing string 120 as shown in FIG. 10. The ball is allowed to extrude the second ball seat 135 and land in the ball catcher in the drill string 110.

Figure 11:
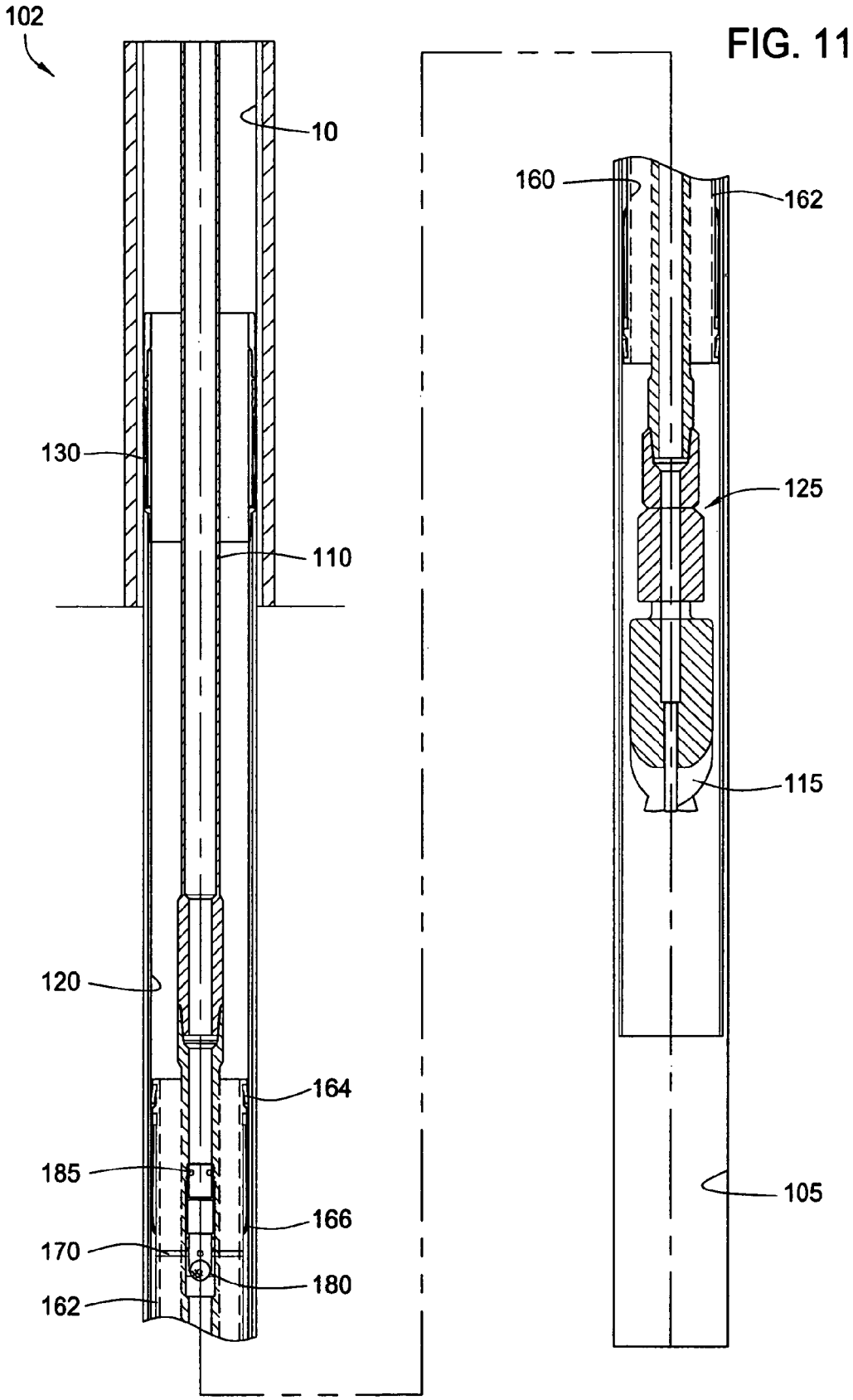
FIG. 11 is a view of the second drilling system showing the full opening tool in the open position.

Thereafter, the drill string 110 is axially traversed to move the actuating tool 160 relative to the full opening tool 150. As the actuating tool 160 is pulled up, the upper collets 166 of the actuating tool 160 grab a sleeve in the full opening tool 150 to open the ports 155 of the opening tool 150 for cementing operation as shown in FIG. 11. Preferably, the drill string 110 is pulled up sufficiently so that the bottom hole assembly 125 with bit 115 is above the final height of the cement.

A third ball, or a second ball if the first ball was used to activate both the first and second ball seats 135, 140, is now dropped into the third ball seat 180 to close off communication below the drill string 110. Fluid may now be pumped down the drill string 110 and directed through ports 170. Initially, a counterbalance fluid is pumped in ahead of the cement in order to control the height of the cement. Thereafter, cement supplied to the drill string 110 flows through ports 170 and 155 of the full opening tool 150 and exits into the annular area between the borehole 105 and the second casing string 120. The sealing cups 164 ensure the cement between the upper and lower collets 166 exit through the port 155. The cement travels down the exterior of the second casing string 120 and comes back up through the interior of the second casing string 120. The fluid bypass capability of the actuating tool 160 and the centralizer 190 facilitate the movement of fluids in the second casing string 120. Preferably, the height of the cement in the second casing string 120 is maintained below the drill bit 115 by the counterbalance fluid. In this respect, the bottom hole assembly 125, which may include the drilling member 115, the motor, LWD tool, and MWD tool may be preserved and retrieved for later use.

Figure 12:
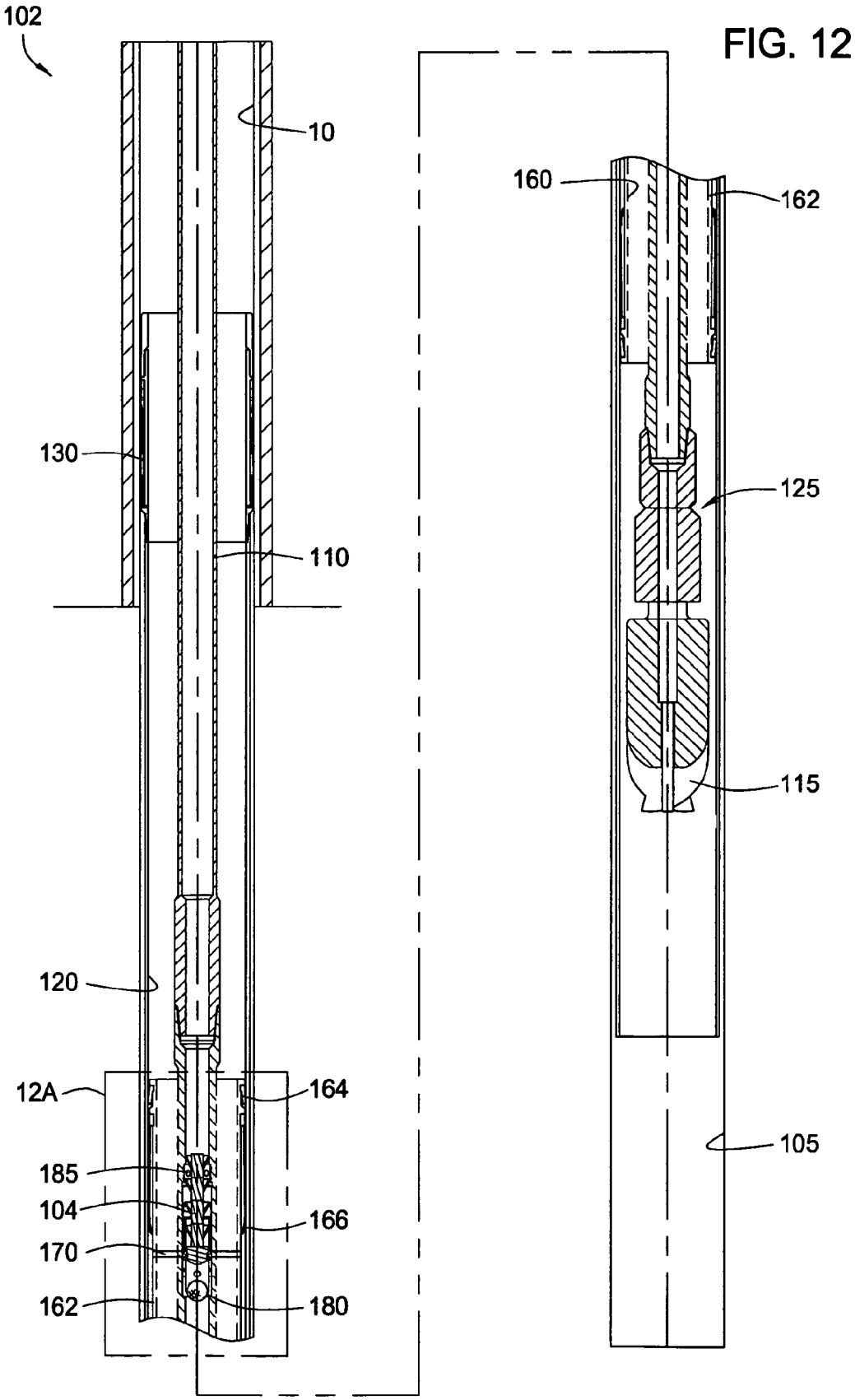
FIG. 12 is a view of the second drilling system after the cementing operation has completed.

After a sufficient amount of cement has been supplied, a dart 104 is pumped in behind the cement as shown in FIG. 12. The dart 104 lands above the ball in the third ball seat 180, thereby closing off fluid communication to the full open tool 150. Additionally, the landing of the dart 104 opens the circulating ports 185 of the drill string 110. Once opened, fluid may optionally be circulated in reverse, i.e., down the exterior of the drill string 110 and up the interior of the drill string 110, to clean the interior of drill string 110 and remove the cement. Thereafter, the drill string 110, including the bottom hole assembly 125, may be removed from the second casing string 120. In this manner, a wellbore may be drilled, lined, and cemented in one trip.

Figure 13:
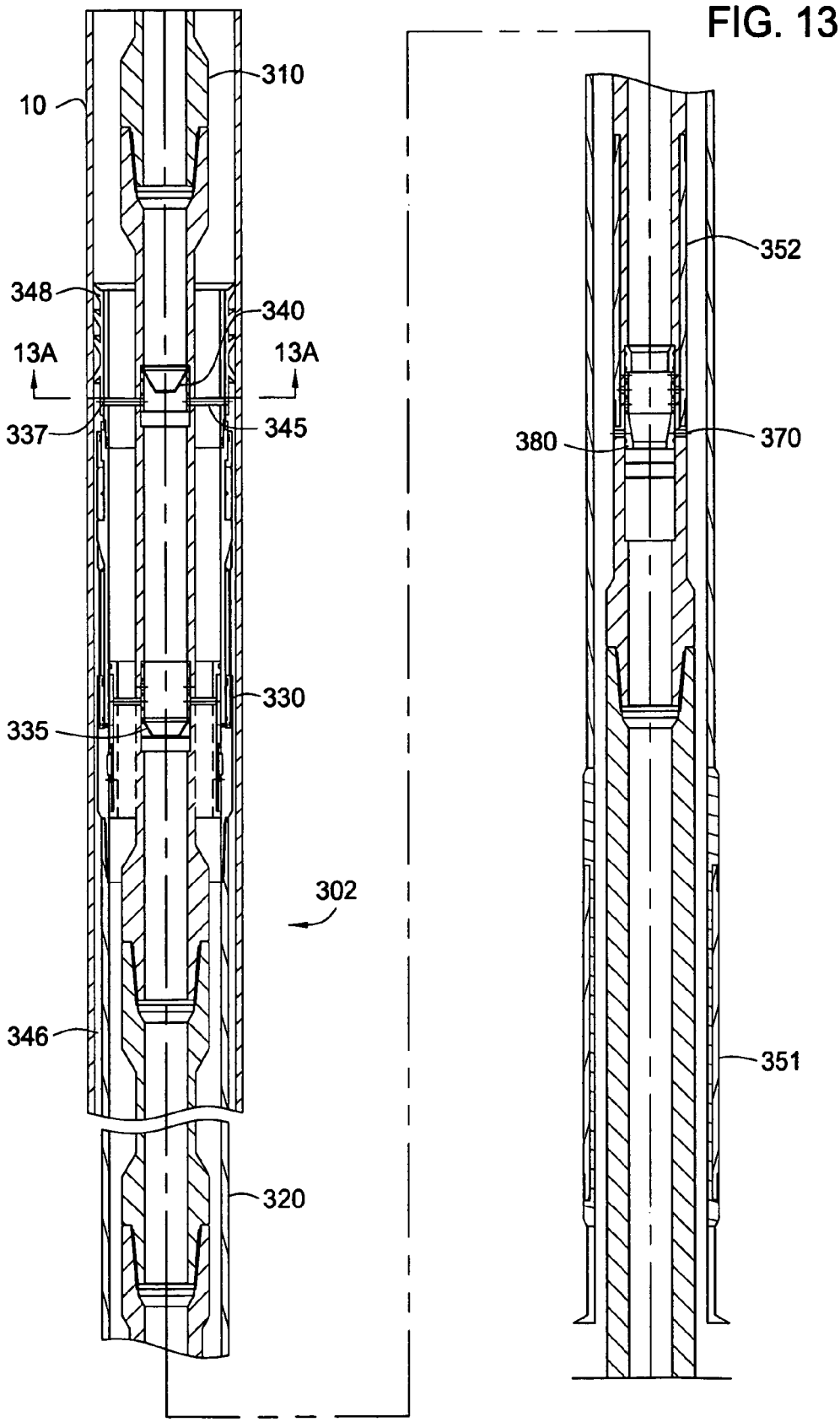
FIG. 13 shows another embodiment of the second drilling system according to aspects of the present invention.
Figure 13A:
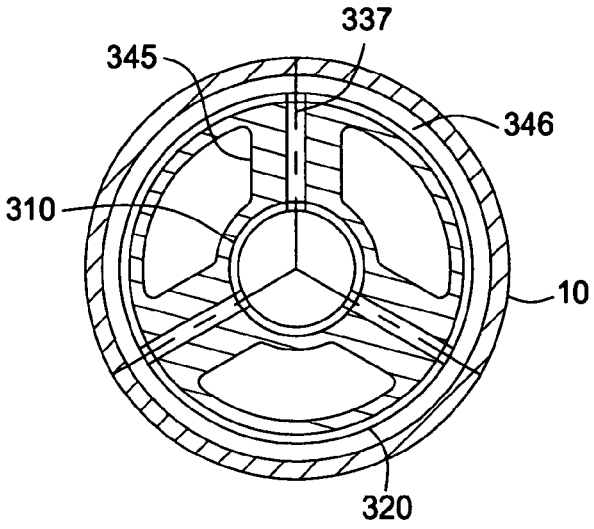
FIG. 13A shows the bypass member of the second drilling system of FIG. 13.

FIG. 13-19 show another embodiment of the second drilling system according to aspects of the present invention. The second drilling system 302 includes a second casing string 320, a drill string 310, and a bottom hole assembly 325. Similar to the embodiment shown in FIG. 7, the drill string 310 is equipped with a second ball seat 335 and a hydraulically actuatable liner hanger assembly 330. The liner hanger 330 includes a liner hanger packing element and slip mechanisms as is known to a person of ordinary skill in the art. The drill string 310 also includes a first ball seat 340 coupled to a bypass member 345 having bypass ports 337 in fluid communication with the drill string 310 and the annulus 346 between the second casing string 320 and the first casing string 10. Preferably, the spokes of the bypass member 345 are arranged are shown in FIG. 13A. A sealing member 348 is used to block fluid communication between the annulus 346 and the interior of the first casing string 10 above the second casing string 320. Because many of the components in FIG. 13 are substantially the same as the components shown and described in FIG. 7, the above description and operation of the similar components with respect to FIG. 7 apply equally to the components of FIG. 13.

The second drilling system 302 utilizes one or more packers to facilitate the cementing operation. In one embodiment, the second drilling system 302 includes an external casing packer 351 located near the bottom of the outer surface of the second casing string 320. Preferably, the external packer 351 comprises a metal bladder inflatable packer. The external packer 351 may be inflated using gases generated by mixing one or more chemicals. In one embodiment, the chemicals are mixed together by an internal packer system that is activated by mud pulse signals sent from the surface.

The second drilling system 302 also includes an internal packer 352 disposed on the drill string 310 adapted to close off fluid communication in the annulus between the drill string 310 and the second casing string. 320. Preferably, the internal packer 352 comprises an inflatable packer and is disposed above one or more cementing ports 370. The inflation port of the internal packer 352 may be regulated by a selectively actuatable sleeve. In one embodiment, one or both of the packers 351, 352 may be constructed of an elastomeric material. It is contemplated that other types of selectively actuatable packers or sealing members may be used without deviating from aspects of the present invention.

In operation, the drill string 310 is operated to advance the second casing string 320 as shown in FIG. 13. During drilling, return fluid is circulated up to the surface through the interior of the second casing string 320. The return fluid may include the diverted fluid in the annulus 346 between the first casing string 10 and the second casing string 320.

Figure 14:
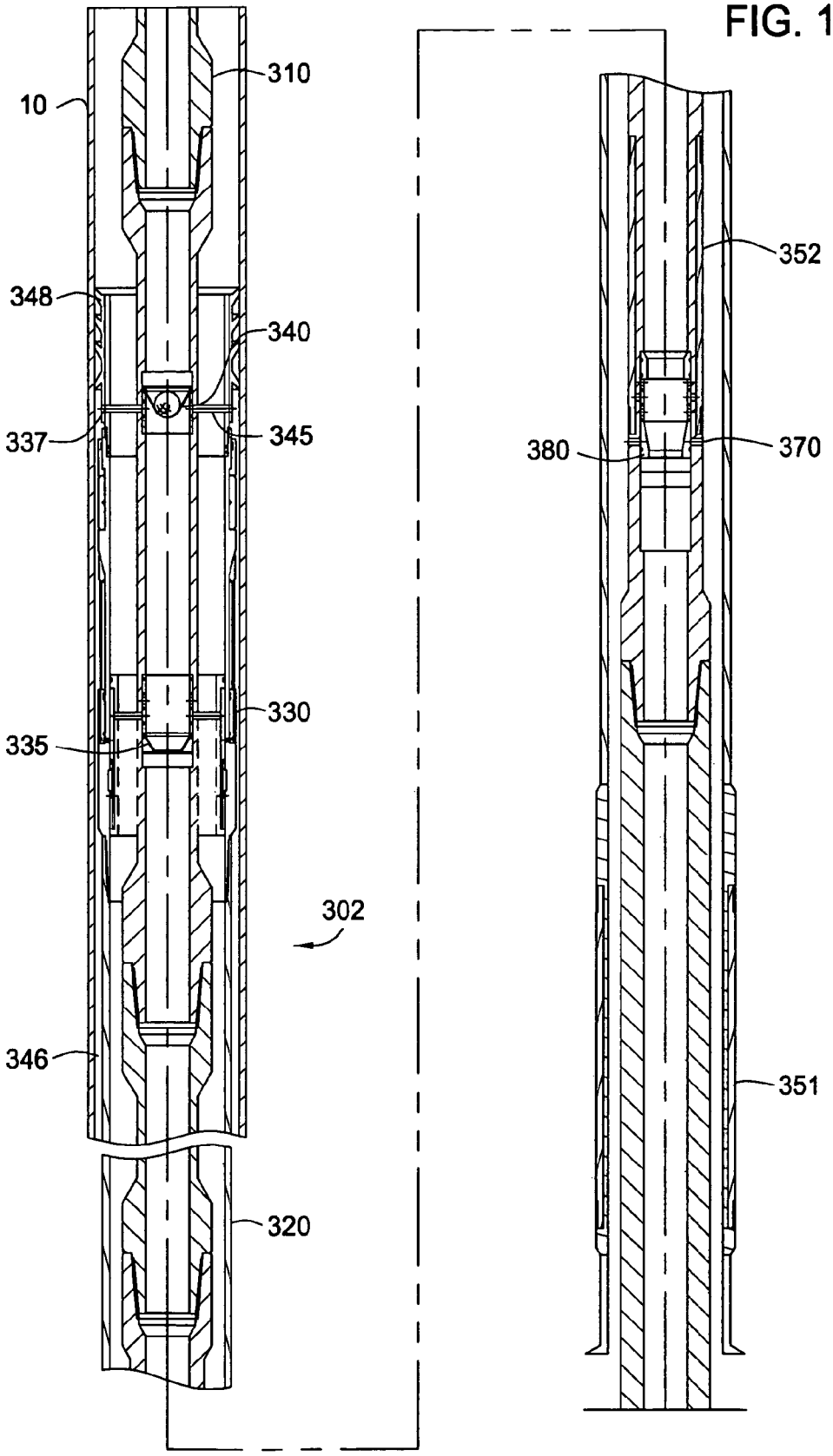
FIG. 14 shows the second drilling system of FIG. 13 after the bypass ports have been closed.
Figure 15:
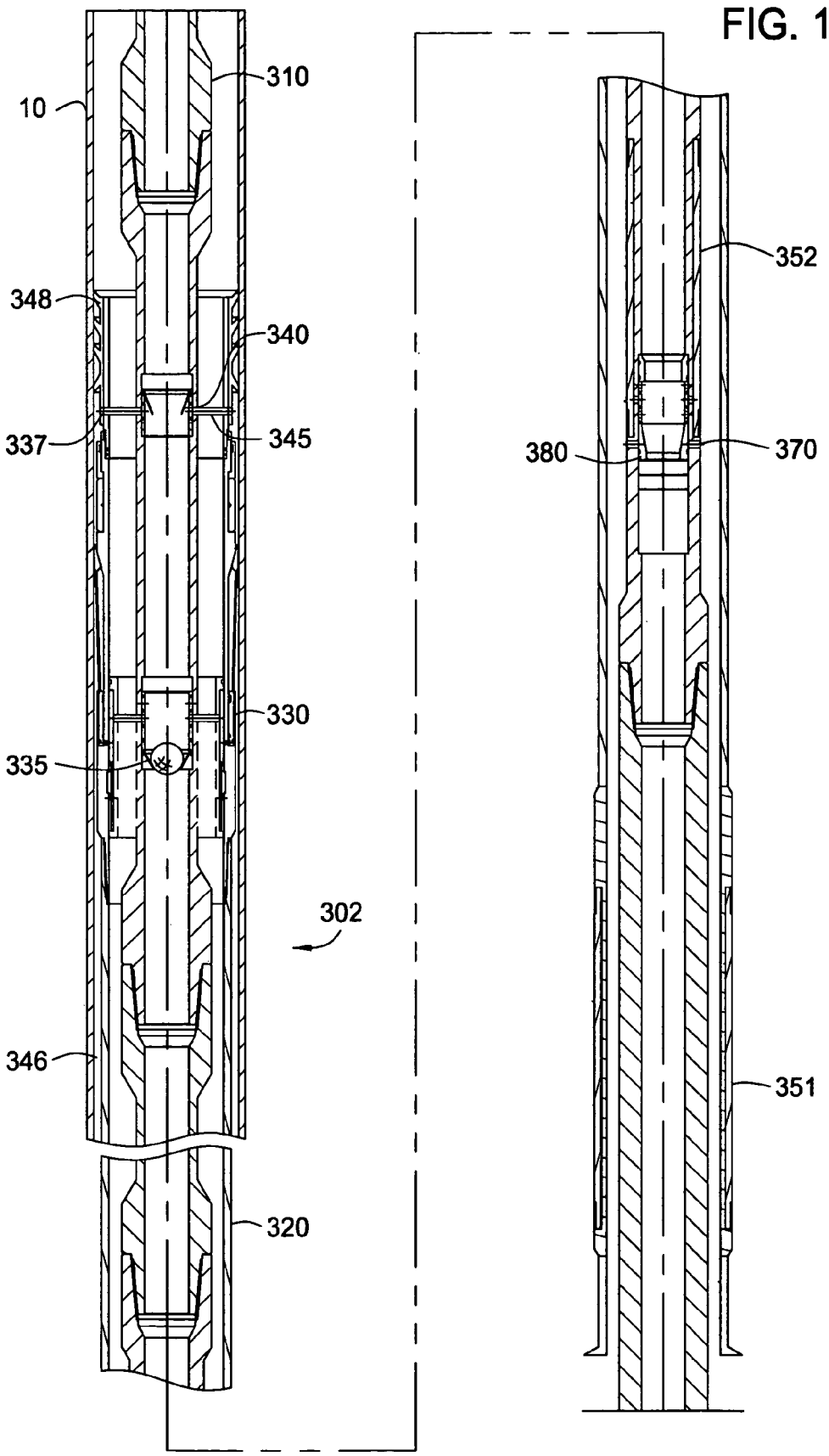
FIG. 15 shows the second drilling system of FIG. 13 after the liner hanger has been set.
Figure 16:
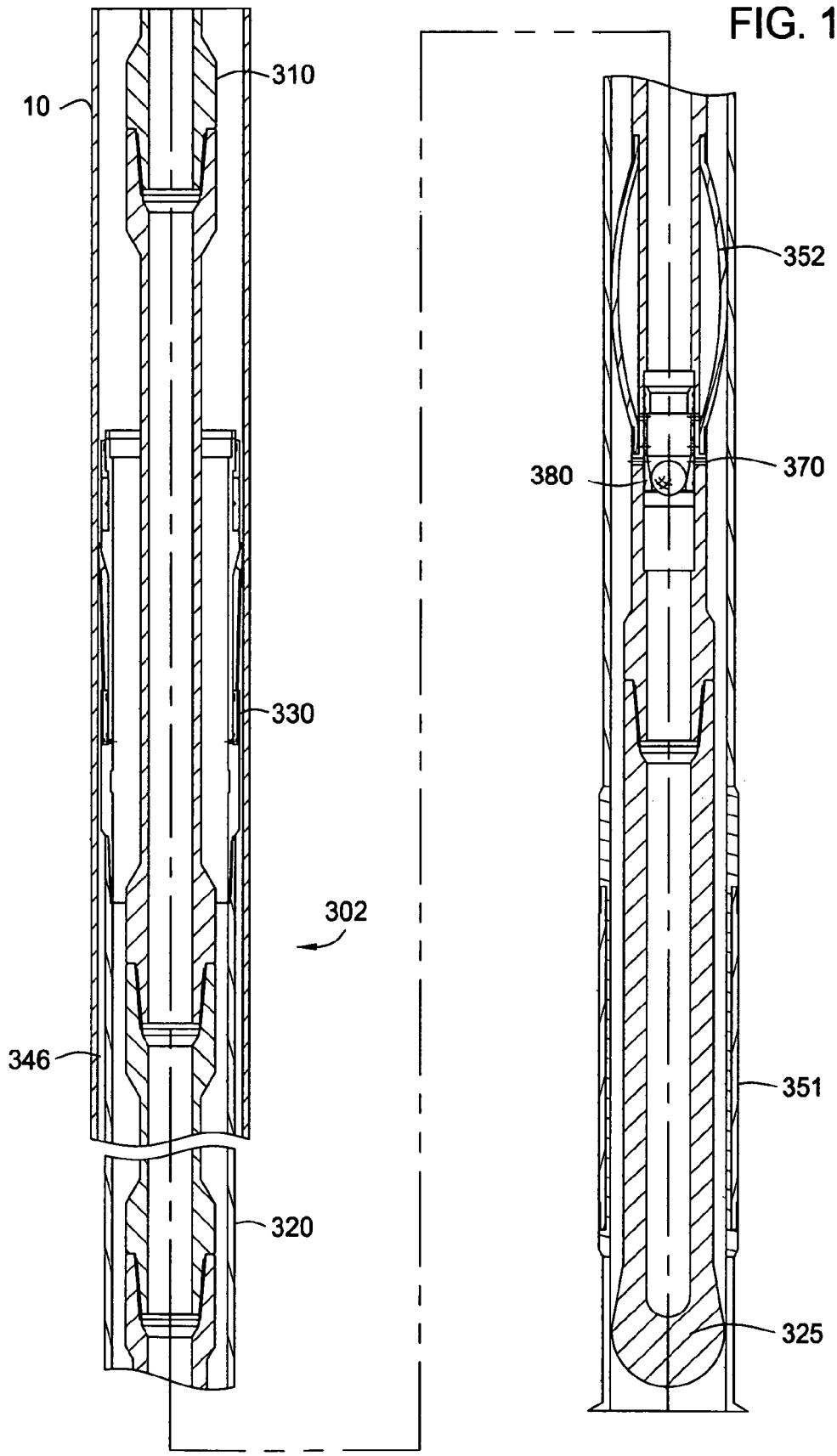
FIG. 16 shows the second drilling system of FIG. 13 after the BHA has been pulled up and the internal packer has been inflated.

After a desired interval has been drilled, a ball is dropped to close off the bypass ports 337 of the bypass member 345, as illustrated in FIG. 14. Thereafter, the ball may extrude through the first ball seat 340 to land in the second ball seat 335, as shown in FIG. 15. Alternatively, a second ball may be dropped to land in the second ball seat 335. Pressure is supplied to set the liner hanger 330 to hang the second casing string 320 off of the first casing string 10. However, the liner hanger packing element is not set. Then, the running tool is released from the liner hanger 330, as shown in FIG. 15. The ball in the second ball seat 335 may be forced through to land in a ball catcher (not shown). Thereafter, the drill string 310 is pulled up until the BHA 325 is inside the second casing string 320, as shown in FIG. 16.

The cementing operation is initiated when another ball dropped in the drill string 310 lands in the third ball seat 380. The ball shifts the sleeve to expose the inflation port of the internal casing packer 352. Then, the internal packer 352 is inflated to block fluid communication in the annulus between the drill string 310 and the second casing string 320. After inflation, pressure is increased to shift the sleeve down to open the cementing port. In this respect, fluid is circulated down the drill string 310, out the port(s) 370, down the annulus between the second casing string 320 and the bottom hole assembly 325 to the bottom of the second casing string 320, and up the annulus between the second casing string 320 and the borehole.

Figure 17:
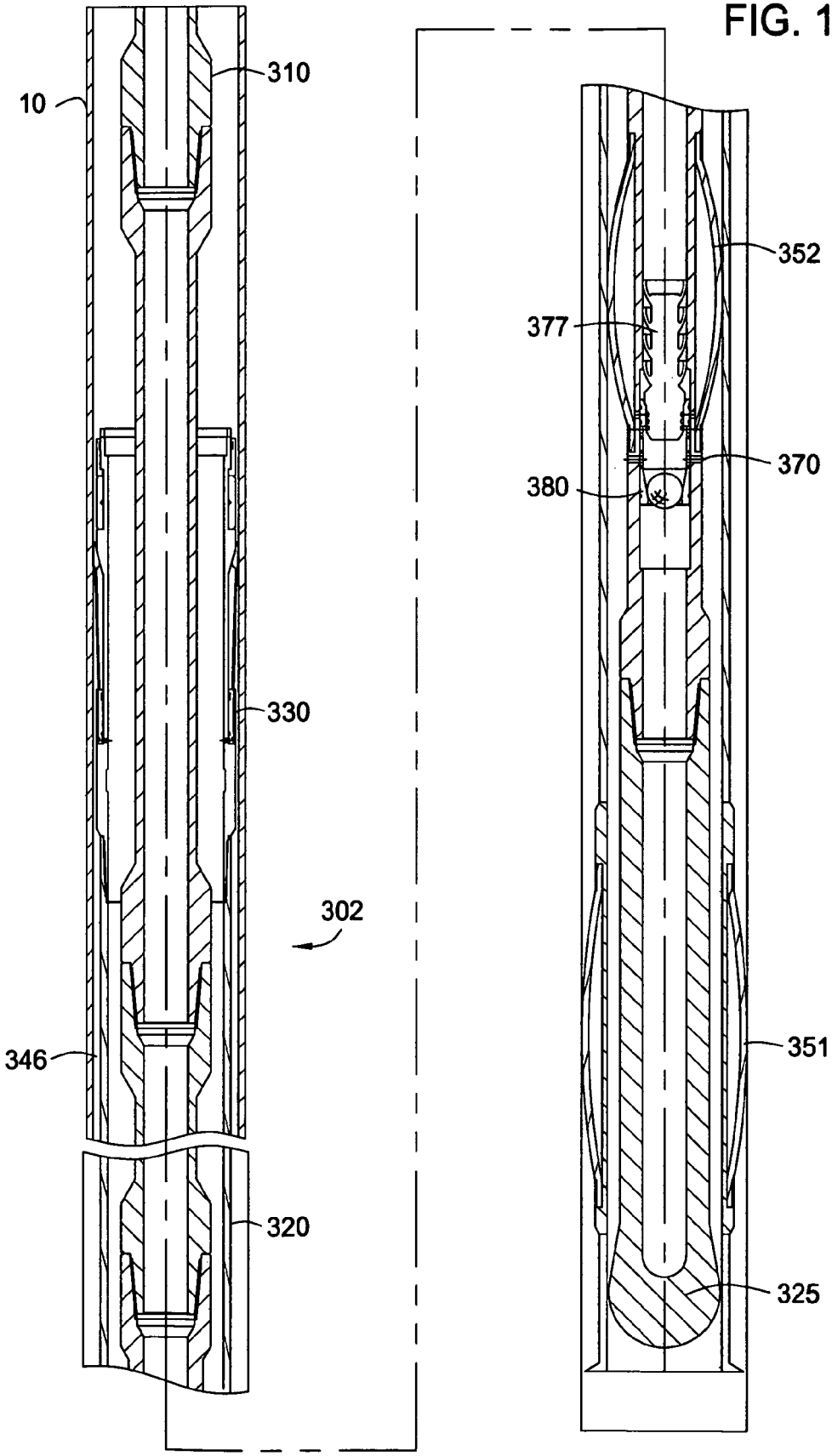
FIG. 17 shows the second drilling system of FIG. 13 after the dart has closed the cementing ports and the external casing packer has been inflated.

In FIG. 17, cement is pumped down the drill string 310 followed by a latch in dart 377. After the dart 377 latches in to signal cement placement, mud pulse is sent from the surface to cause the external casing packer 351 to inflate. Once inflated, the external casing packer 351 holds the cement between the second casing string 320 and the borehole in place.

Figure 18:
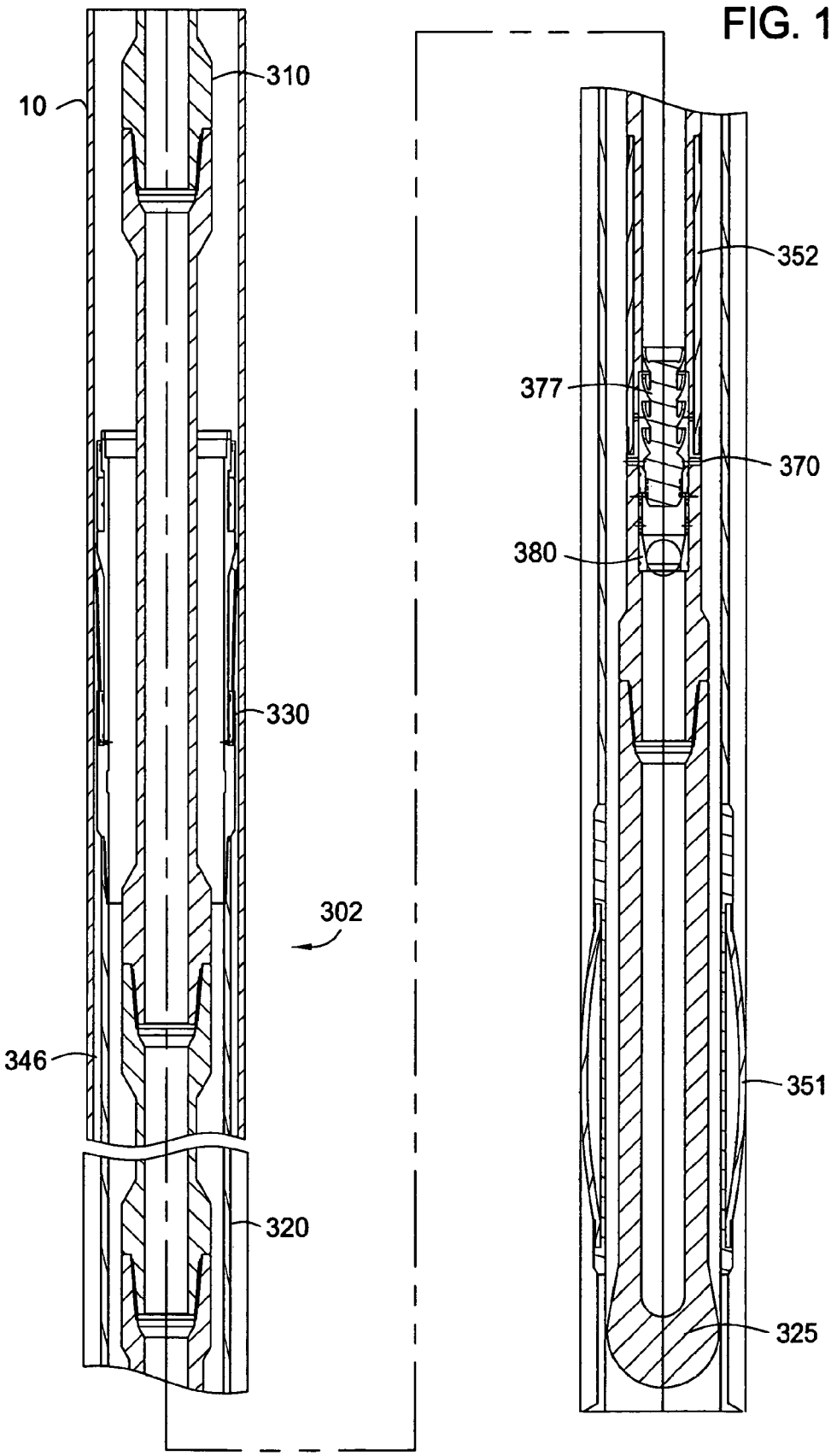
FIG. 18 shows the second drilling system of FIG. 13 after internal packer has bee deflated.

Pressure is applied on the dart 377 to cause the sleeve to shift further, which, in turn, causes the internal packer 352 to deflate, as shown in FIG. 18. Additionally, shifting the sleeve opens the circulation port for reverse circulation. Fluid is then reverse circulated to remove excess cement from the interior of the drill string 310.

Figure 19:
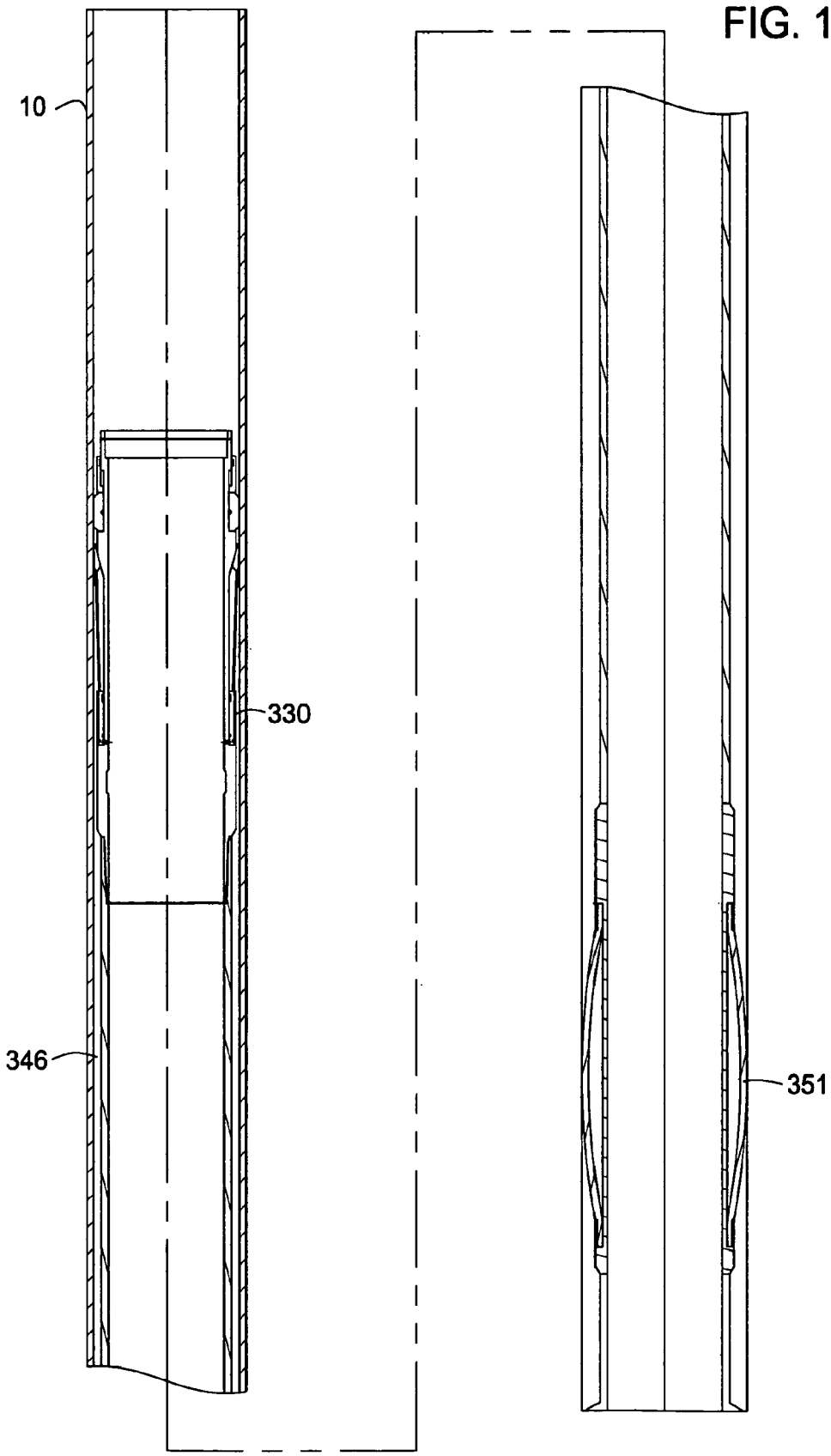
FIG. 19 shows the second drilling system of FIG. 13 after the BHA has been retrieved and the liner hanger packer has been set.

Upon completion, the drill string 310 is pulled out of the second casing string 320 to retrieve the BHA 325, as shown in FIG. 19. The liner hanger packer is set as the drill string 310 is retrieved.

Figure 20A:
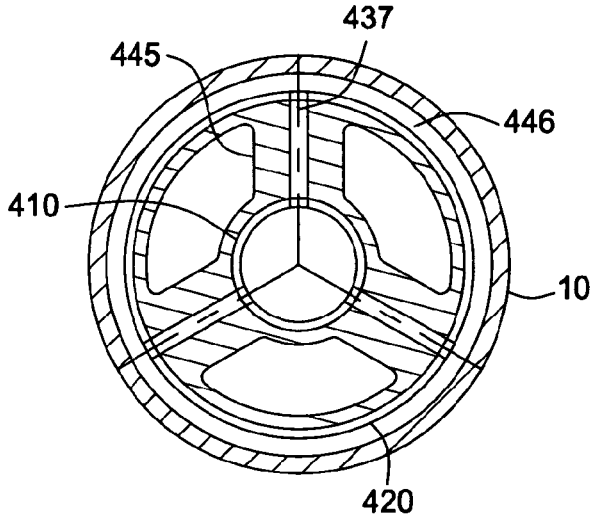
FIG. 20A is perspective view of the bypass member of the second drilling system of FIG. 20.
Figure 20:
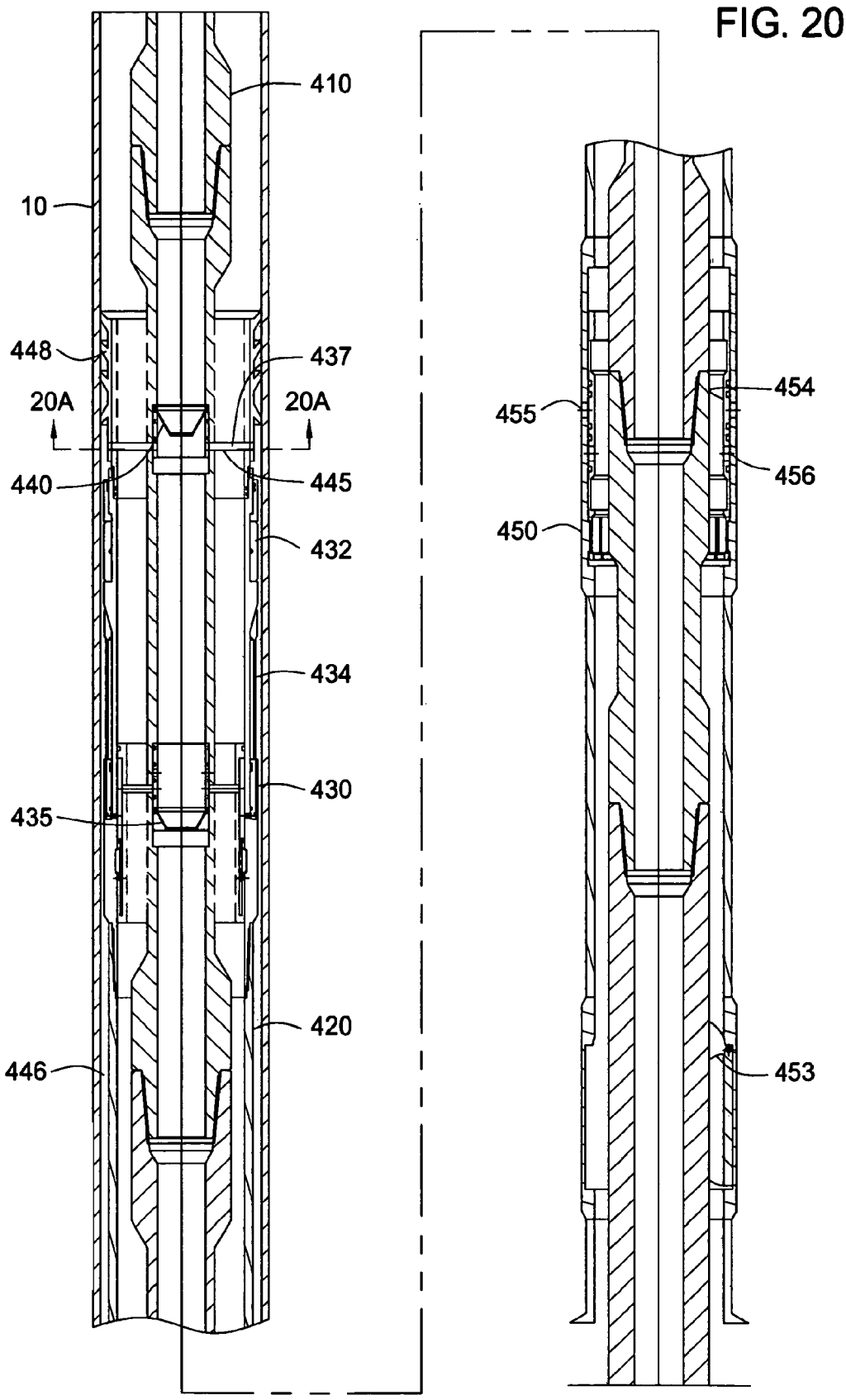
FIG. 20 shows another embodiment of the second drilling system according to aspects of the present invention.
Figure 23:
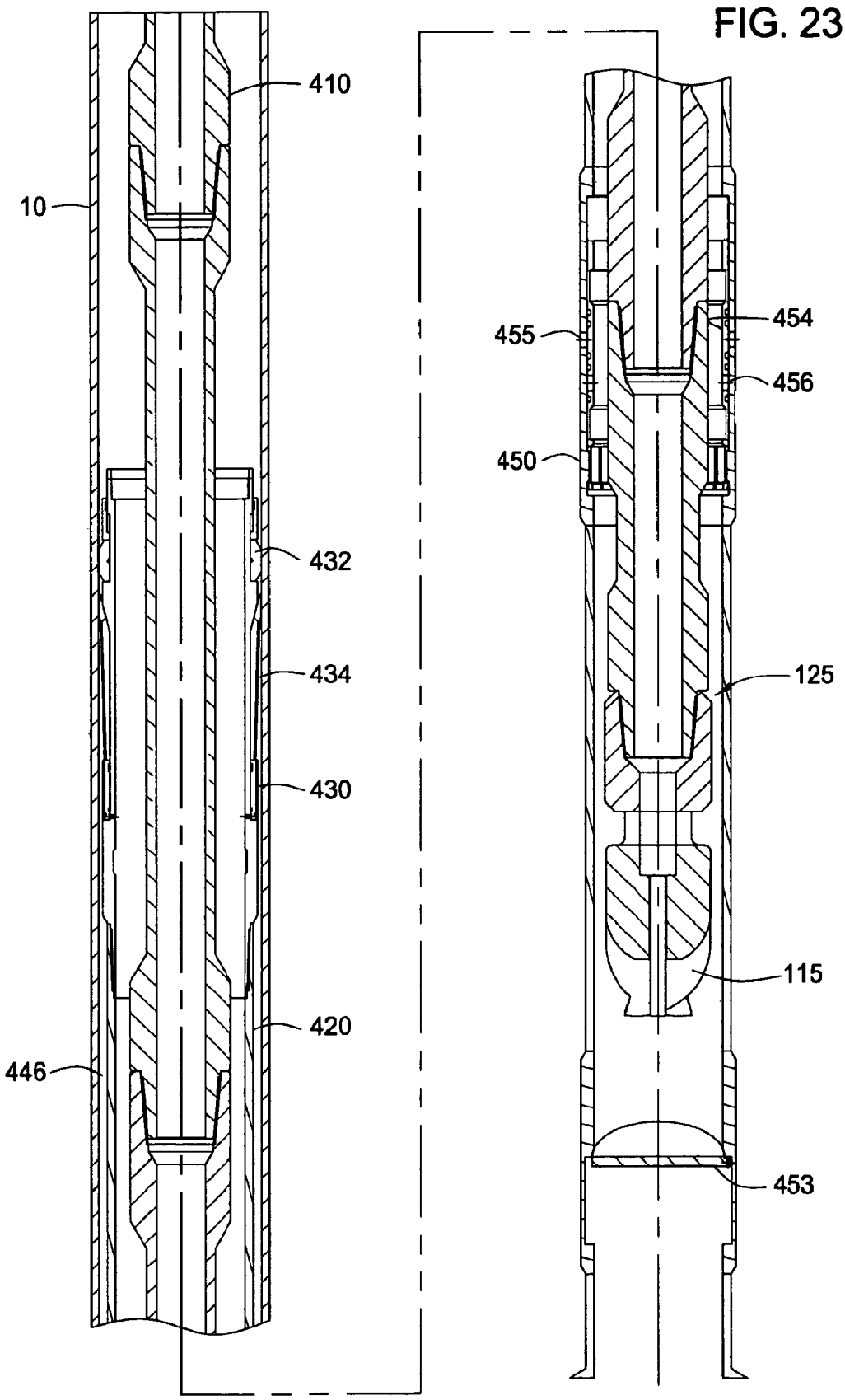
FIG. 23 shows the second drilling system of FIG. 20 after BHA has been retrieved and the deployment valve has closed.

FIG. 20 shows another embodiment of the second drilling system according to aspects of the present invention. The second drilling system 402 includes a second casing string 420, a drill string 410, and a bottom hole assembly 425, which is shown in FIG. 23. Similar to the embodiment shown in FIG. 7, the drill string 410 is equipped with a second ball seat 435 and a hydraulically actuatable liner hanger assembly 430. The liner hanger 430 includes a liner hanger packing element 432 and slip mechanisms 434 as is known to a person of ordinary skill in the art. The drill string 410 also includes a first ball seat 440 coupled to a bypass member 445 having bypass ports 437 in fluid communication with the drill string 410 and the annulus 446 between the second casing string 420 and the first casing string 10. Preferably, the spokes of the bypass member 445 are arranged as shown in FIG. 20A. A sealing member 448 is used to block fluid communication between the annulus 446 and the interior of the first casing string 10 above the second casing string 420. Because many of the components in FIG. 20, e.g., the first and second ball seats 435, 440, are substantially the same as the components shown and described in FIG. 7, the above description and operation of the similar components with respect to FIG. 7 apply equally to the components of FIG. 20.

The second drilling system 402 features a deployment valve 453 disposed at a lower end of the second casing string 420. In one embodiment, the deployment valve 453 is adapted to allow fluid flow in one direction and is an integral part of the second casing string 420. Preferably, the deployment valve 453 is actuated using mud pulse technology.

The second drilling system 402 may also include a full opening tool 450 disposed on the second casing string 420. The full opening tool 450 comprises a casing port 455 disposed in the second casing string 420 and an alignment port 456 disposed on a flow control sleeve 454. The flow control sleeve 454 is disposed interior to the second casing string 420. The flow control sleeve 454 may be actuated to align (misalign) the alignment port 456 with the casing port 455 to establish (close) fluid communication.

In operation, the drill string 410 is operated to advance the second casing string 420 as shown in FIG. 20. The deployment valve 453 is run-in in the open position. During drilling, return fluid is circulated up to the surface through the interior of the second casing string 420. The return fluid may include the diverted fluid in the annulus 446 between the first casing string 10 and the second casing string 420.

Figure 21:
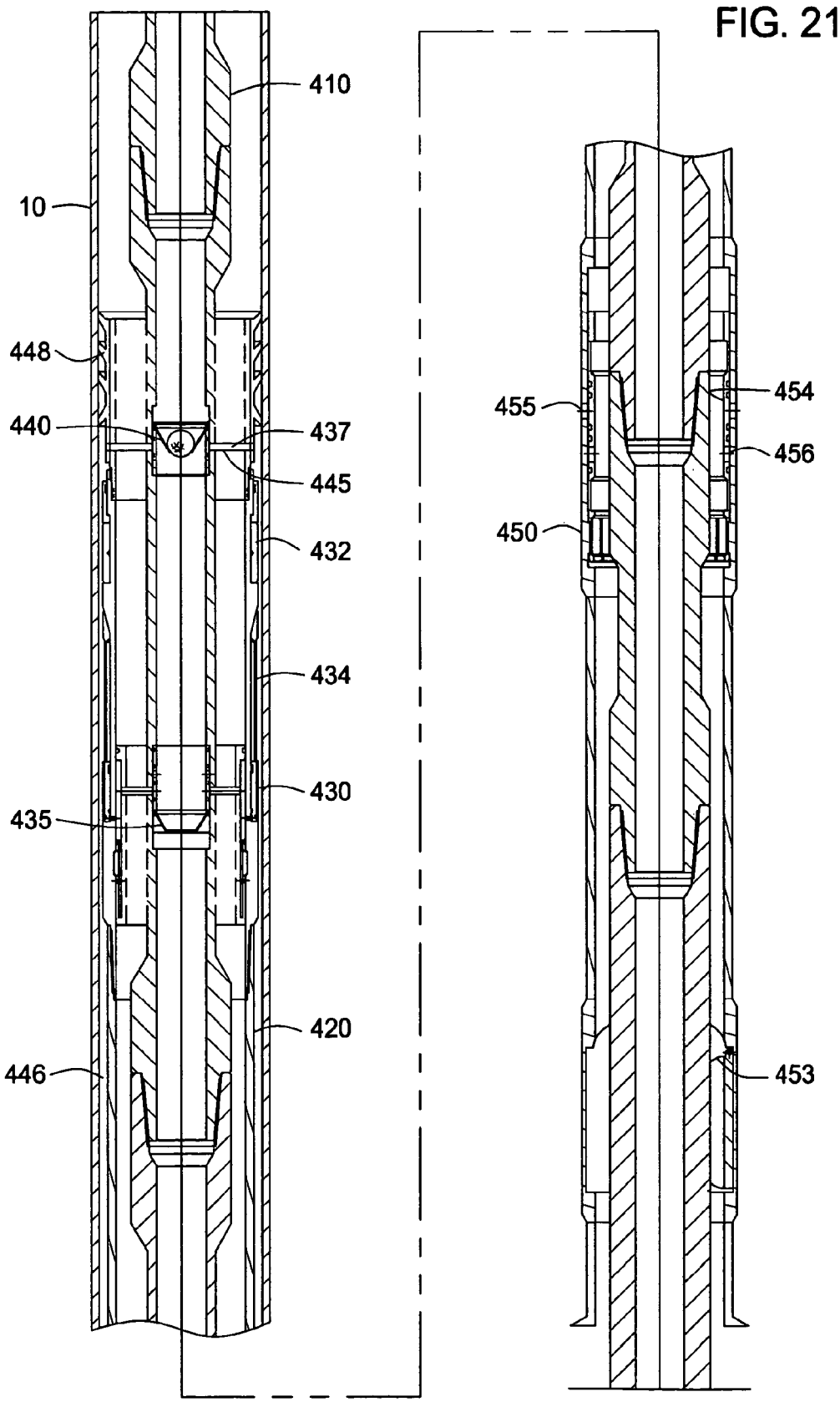
FIG. 21 shows the second drilling system of FIG. 20 after the bypass ports have been closed.
Figure 22:
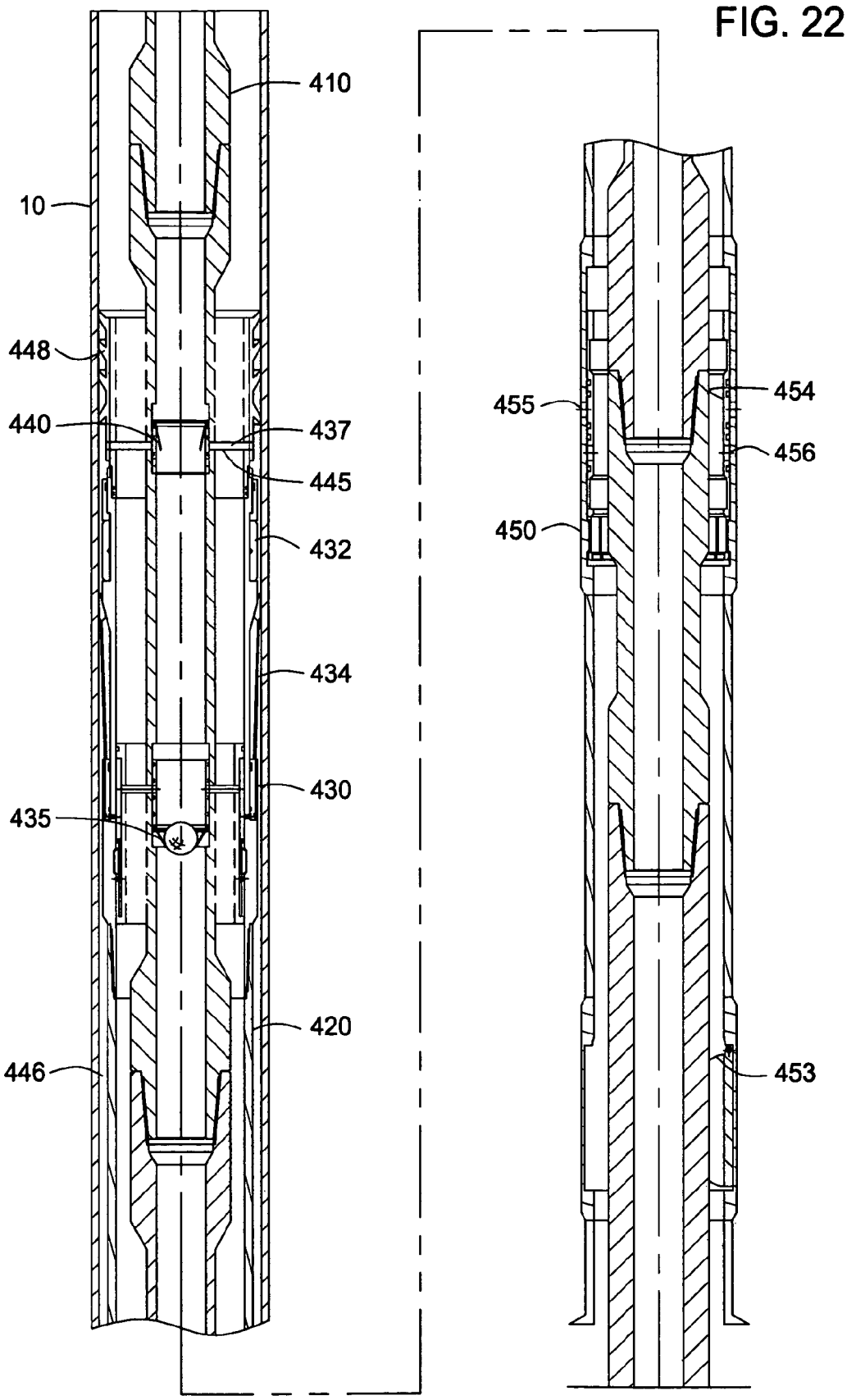
FIG. 22 shows the second drilling system of FIG. 20 after liner hanger has been set.

After a desired interval has been drilled, a ball is dropped to close off the bypass ports 437 of the bypass member 445, as illustrated in FIG. 21. Thereafter, additional pressure is applied to extrude the ball through the first ball seat 440 to land in the second ball seat 435, as shown in FIG. 22. More pressure is then applied to set the liner hanger 430 to hang the second casing string 420 off the first casing string 10. As shown, the slips 434 have been expanded to engage the first casing string 10. However, the liner hanger packing element 432 has not been set. After the second casing string 420 is supported by the first casing string 10, the running tool is released from the liner hanger 430 and the drill string 410 is retrieved.

As shown in FIG. 23, when the BHA 425 is retrieved past the deployment valve 453, a mud pulse may be transmitted to close the deployment valve 453. In this respect, risk of damage to the BHA 425 during the cementing operation is prevented. The liner hanger packing element 432 may also be mechanically set as the drill string 410 is being pulled out of the wellbore.

Figure 24:
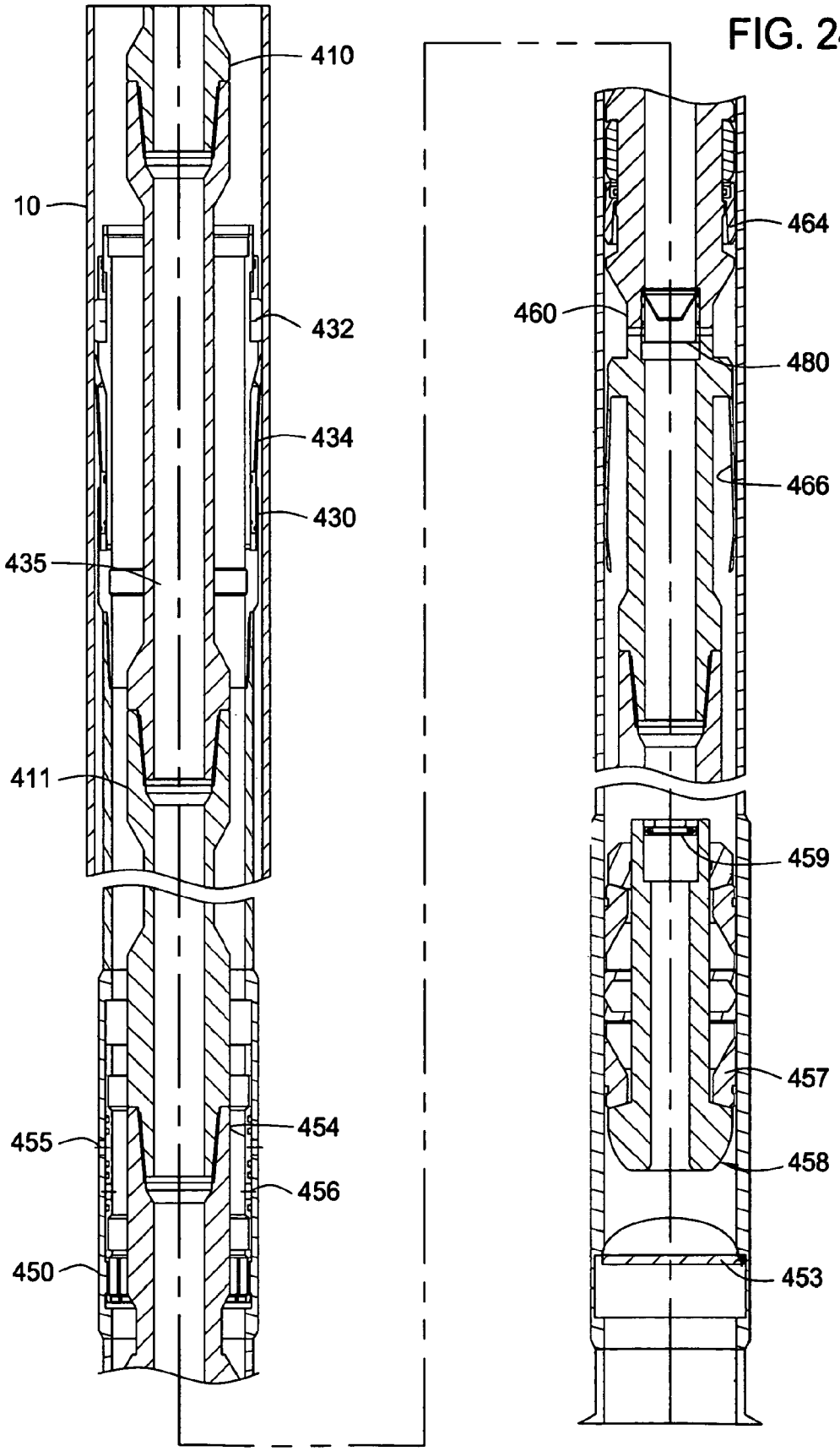
FIG. 24 shows the second drilling system of FIG. 20 after a cement retainer has been inserted above the deployment valve.

Thereafter, a cement retainer 458 and an actuating tool 460 for operating the full opening tool 450 is tripped into the wellbore, as shown in FIG. 24. The tools 458, 460 may be located above the deployment valve 453 using conveying member 411, such as a work string as is known to a person of ordinary skill in the art. In one embodiment, the cement retainer 458 includes a packer 457 and a flapper valve 459. The actuating tool 460 may include one or more collets 466 for engaging the flow control sleeve 454. Additionally, one or more sealing cups 464 are disposed above the collets 466 so as to enclose an area between the sealing cups 464 and the cement retainer 458. The conveying member 411 also includes a cementing port tool 480 disposed between the sealing cups and the cement retainer 458. The cementing port tool 480 may be actuated to allow fluid communication between the conveying member 411 and the annulus between the conveying member 411 and the second casing string 420.

The cement retainer is set in the interior of the second casing string 420 above the deployment valve 453. Cement is then supplied through the drill string 410 and pumped through cement retainer 458 and the deployment valve 453, and exits the bottom of the second casing string 420. A sufficient amount of cement is supplied to squeeze off the bottom of the second casing string 420. Thereafter, a setting tool (not shown) is removed from the cement retainer 458, and the drill string 410 is pulled up hole. The deployment valve 453 and the cement retainer 458 are allowed to close and contain the cement below the cement retainer 458 and the deployment valve 453.

As the drill string 410 is pulled up, the collets 466 of the actuating tool 460 engage the flow control sleeve 454. The flow control sleeve 454 is shifted to align the alignment port 456 with the casing port 455, thereby opening the casing port 455 for fluid communication. Then, a ball is dropped into the cementing port tool 480 to block fluid communication with the lower portion of the drill string 410 and the cement retainer setting tool (not shown). Pressure is supplied to open the cementing port tool 480 to squeeze cement into an upper portion of the annulus between the second casing string 420 and the wellbore. Specifically, cement is allowed to flow out of the conveying member 411 and through the casing port 455. Once the upper portion of the annulus is squeezed off, the cementing retainer setting tool (not shown) and the actuating tool 460 may be retrieved.

Figure 25A:
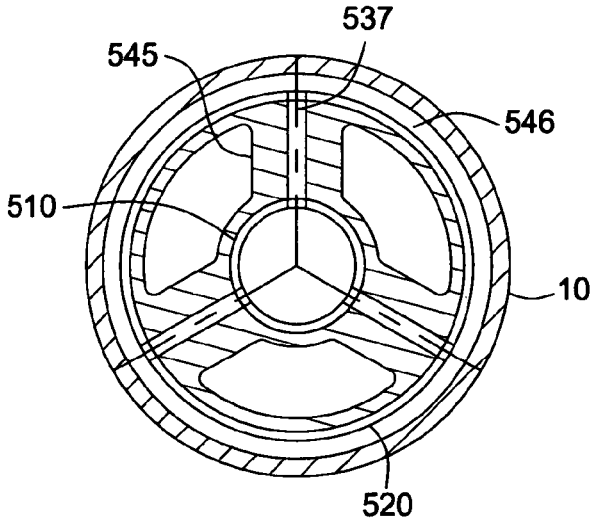
FIG. 25A is a perspective view of the bypass member of the second drilling system of FIG. 25.
Figure 25:
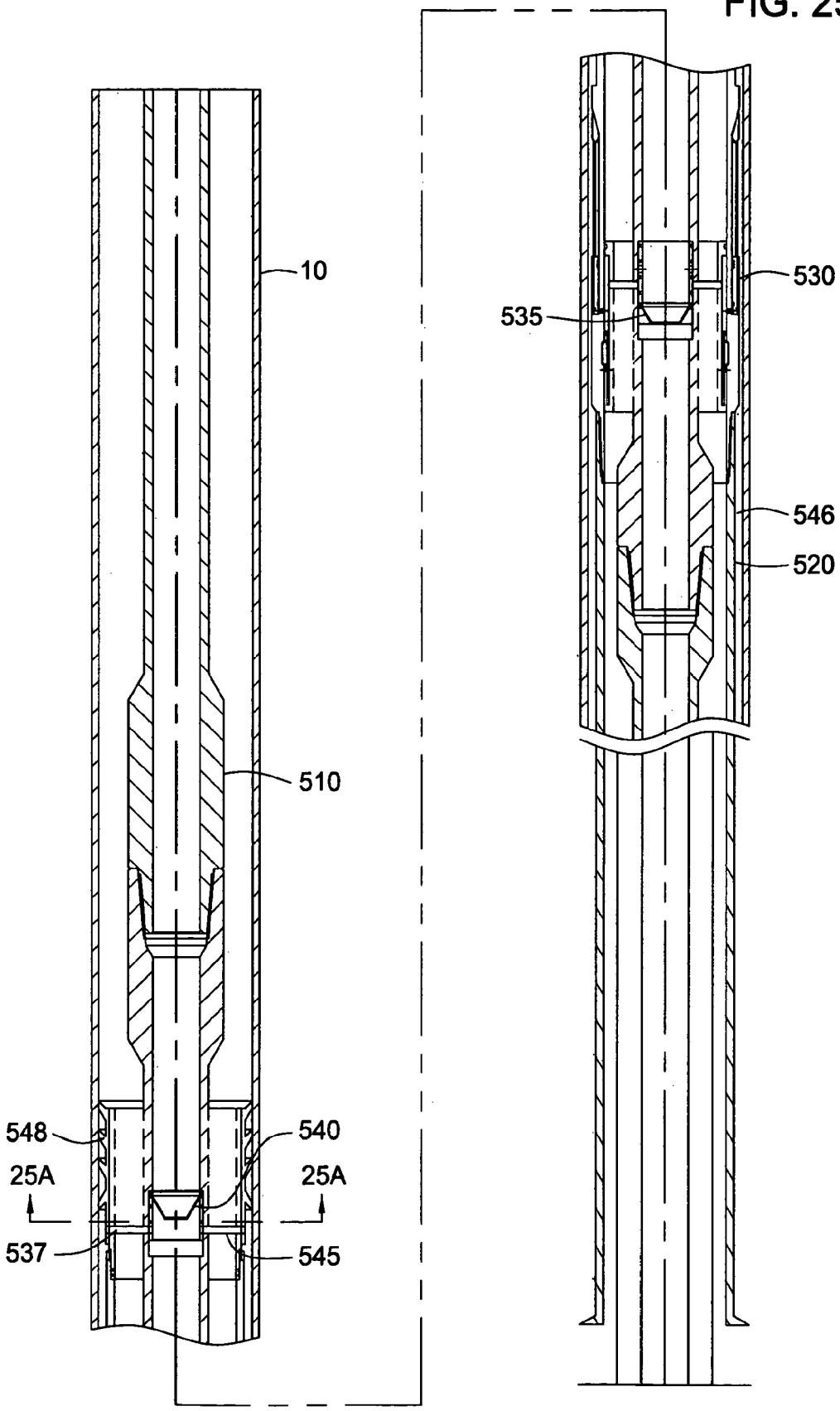
FIG. 25 shows another embodiment of the second drilling system according to aspects of the present invention.

FIG. 25 shows another embodiment of the second drilling system according to aspects of the present invention. The second drilling system 502 includes a second casing string 520, a drill string 510, and a bottom hole assembly (not shown). Similar to the embodiment shown in FIG. 7, the drill string 510 is equipped with a second ball seat 535 and a hydraulically actuatable liner hanger assembly 530 having one or more slip mechanisms 534. The drill string 510 also includes a first ball seat 540 coupled to a bypass member 545 having bypass ports 537 in fluid communication with the drill string 510 and the annulus 546 between the second casing string 520 and the first casing string 10. Preferably, the spokes of the bypass member 545 are arranged as shown in FIG. 25A. A sealing member 548 is used to block fluid communication between the annulus 546 and the interior of the first casing string 10 above the second casing string 520. Because many of the components in FIG. 25, e.g., first and second ball seats 535, 540, are substantially the same as the components shown and described in FIG. 7, the above description and operation of the similar components with respect to FIG. 7 apply equally to the components of FIG. 25.

In operation, the drill string 510 is operated to advance the second casing string 520 as shown in FIG. 25. During drilling, return fluid is circulated up to the surface through the interior of the second casing string 520. The return fluid may include the diverted fluid in the annulus 546 between the first casing string 10 and the second casing string 520.

Figure 26:
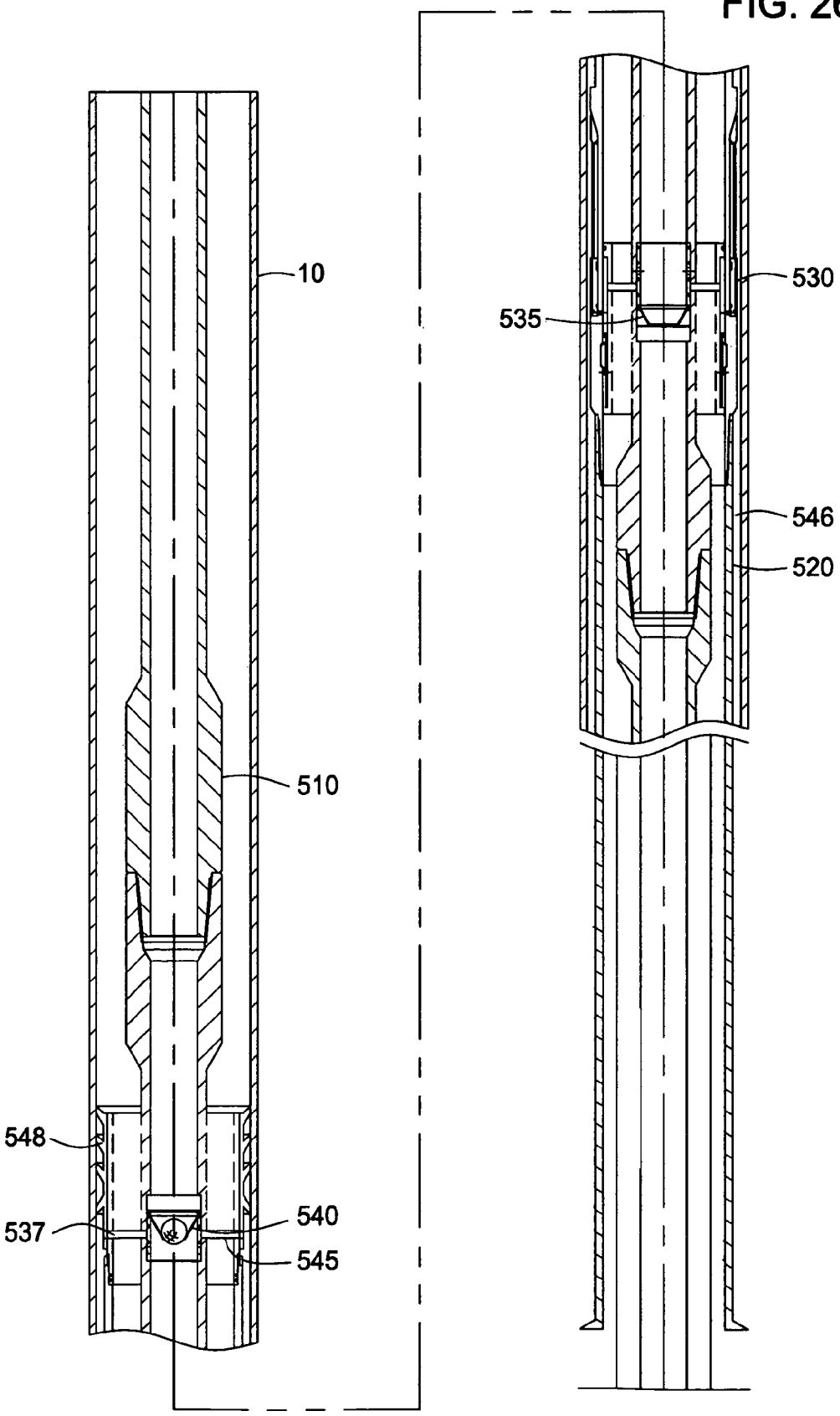
FIG. 26 shows the second drilling system of FIG. 25 after bypass ports have been closed.
Figure 27:
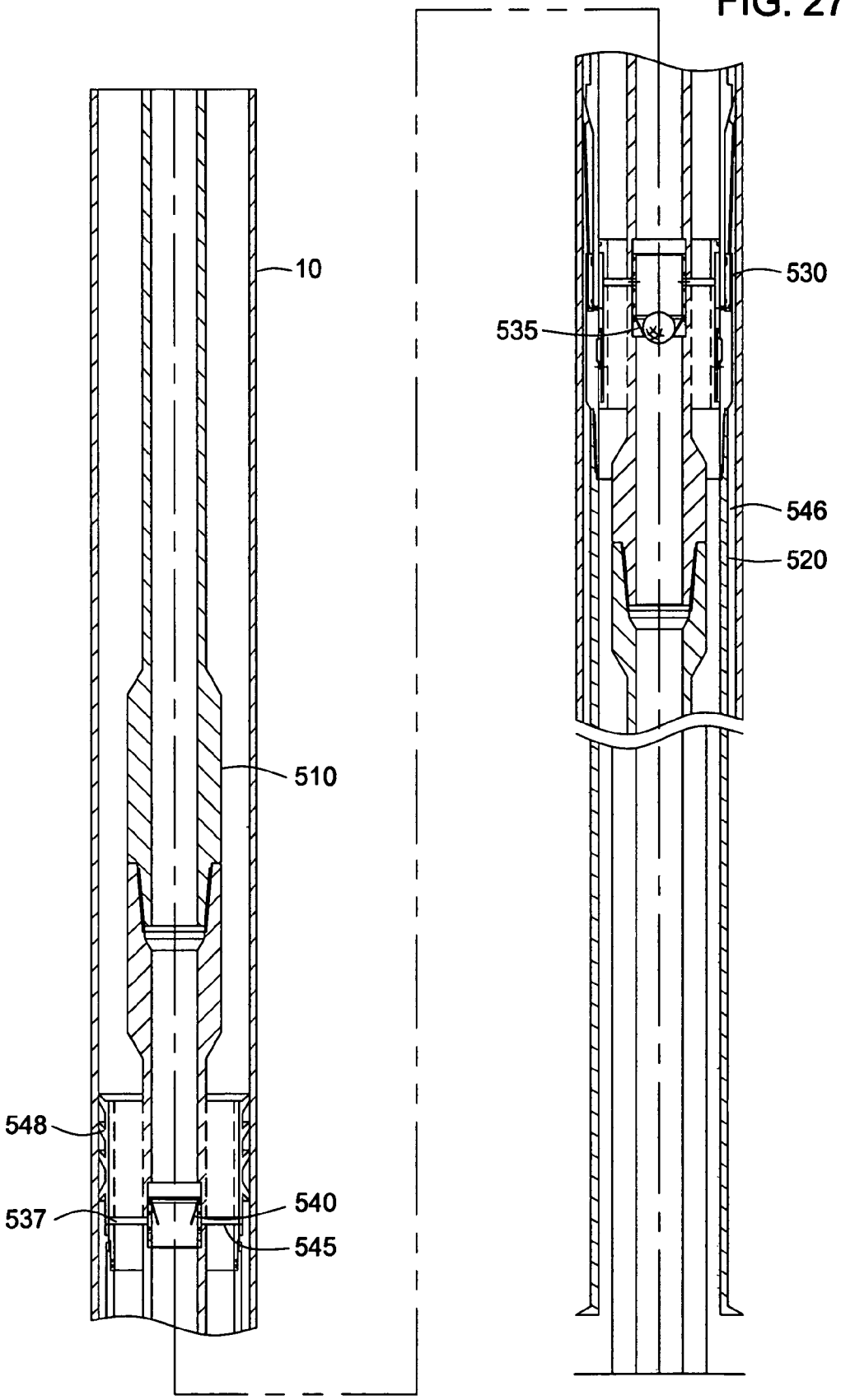
FIG. 27 shows the second drilling system of FIG. 25 after the liner hanger has been set.

After a desired interval has been drilled, a ball is dropped to close off the bypass ports 537 of the bypass member 545, as illustrated in FIG. 26. Thereafter, a second ball is dropped to land in the second ball seat 535, as shown in FIG. 27. Alternatively, additional pressure is applied to extrude the first ball through the first ball seat 540 to land in the second ball seat 535. More pressure is then applied to set the liner hanger 530 to hang the second casing string 520 off the first casing string 10. As shown, the slips 534 have been expanded to engage the first casing string 10. It can be seen that, in this embodiment, the liner hanger assembly 530 does not have a packing element to seal the annulus 546 between the first casing string 10 and the second casing string 520. Additional pressure is then applied to the ball to extrude it through the second ball seat 535 so that it can travel to a ball catcher (not shown) in drill string 510. After the second casing string 520 is supported by the first casing string 10, the running tool is released from the liner hanger 530, and the drill string 510 and the BHA 525 are retrieved.

Figure 28:
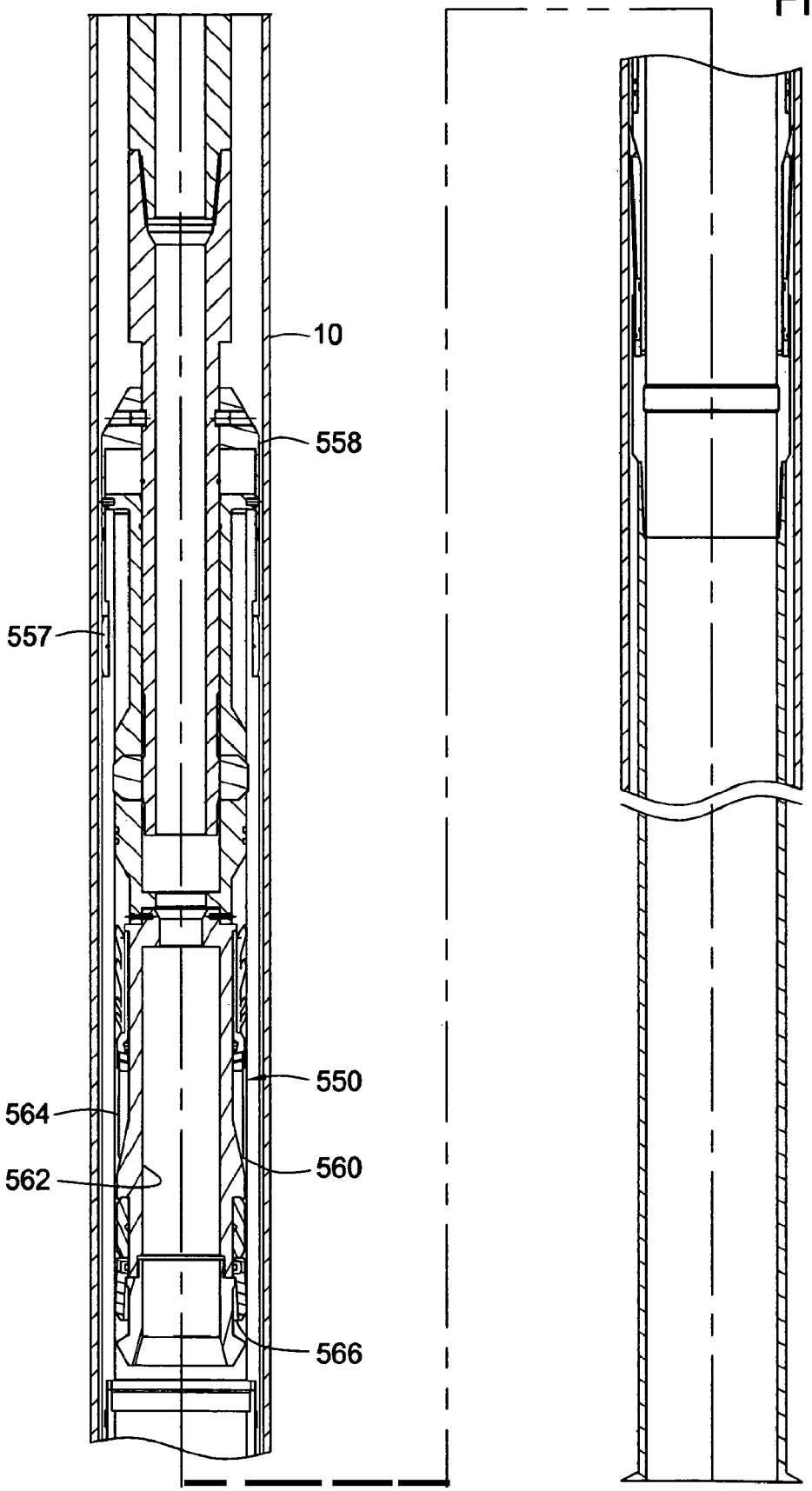
FIG. 28 shows the second drilling system of FIG. 25 after a packer assembly has latched into the second casing string.

To cement the second casing string 520, a packer assembly 550 is tripped into the wellbore using the drill string 510. The packer assembly 550 may latch into the top of the liner hanger 530 as shown in FIG. 28. To this end, the interior of the second casing string 520 is placed in fluid communication with the packer assembly 550.

In one embodiment, the packer assembly 550 includes a single direction plug 560, a packer 557 for the top of the liner hanger 530, and a plug running packer setting tool 558 for setting the packer 557. Preferably, the single direction plug is adapted for subsurface release. An exemplary single direction plug is disclosed in a co-pending U.S. patent application filed on Jan. 29, 2004, which application is herein incorporated by reference in its entirety. For example, the single direction plug 560 may include a body 562 and gripping members 564 for preventing movement of the body 562 in a first axial direction relative to tubular. The plug 560 further comprises a sealing member 566 for sealing a fluid path between the body 562 and the tubular. Preferably, the gripping members 564 are actuated by a pressure differential such that the plug 560 is movable in a second axial direction with fluid pressure but is not movable in the first direction due to fluid pressure.

Cement is pumped down the drill string 510 and the second casing string 520 followed by a dart 504. The dart 504 travels behind the cement until it lands in the single direction plug 560. The increase in pressure behind the dart 504 causes the single direction plug 560 to release downhole. The plug 560 is pumped downhole until it reaches a position proximate the bottom of the second casing string 520. A pressure differential is created to set the single direction plug 560. In this respect, the single direction plug 560 will prevent the cement from flowing back into the second casing string 520.

Figure 29:
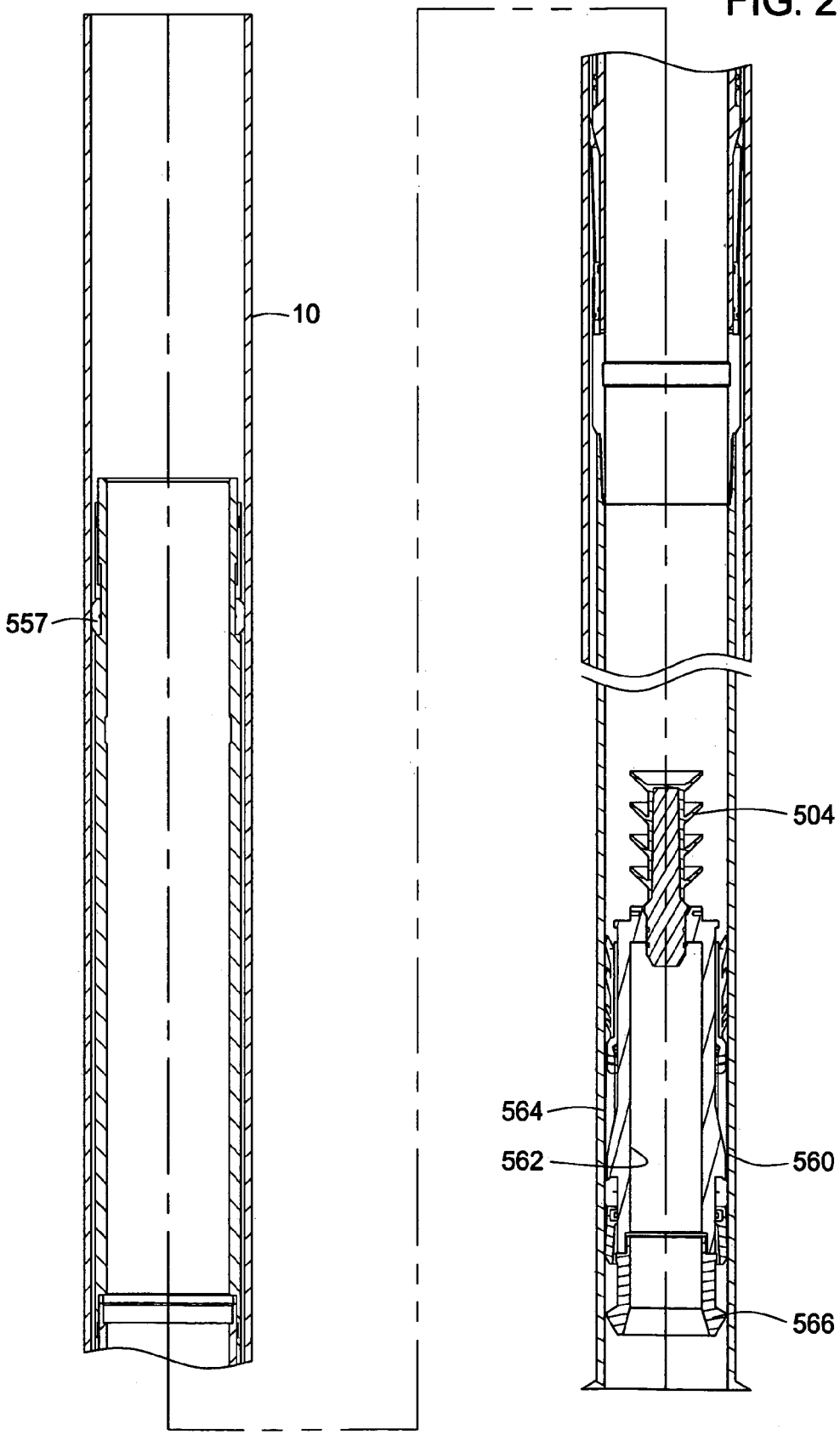
FIG. 29 shows the second drilling system of FIG. 25 after single direction plug has been set.

Thereafter, a force is applied to the plug running packer setting tool 558 to set the packer 557 to seal off the annulus 546 between the second casing string 520 and the first casing string 10. The drill string 510 is then released from the liner hanger 530. Reverse circulation may optionally be performed to remove excess cement from the drill string 510 before retrieval. FIG. 29 shows the second casing string 520 after it has been cemented into place.

Alternate embodiments of the present invention provide methods and apparatus for subsequently casing a section of a wellbore which was previously spanned by a portion of a bottom hole assembly ("BHA") extending below a lower end of a liner or casing during a drilling with the casing operation. Embodiments of the present invention advantageously allow for circulation of drilling fluid while drilling with the casing and while casing the section of the wellbore previously spanned by the portion of the BHA extending below the lower end of the liner.

Figure 30:
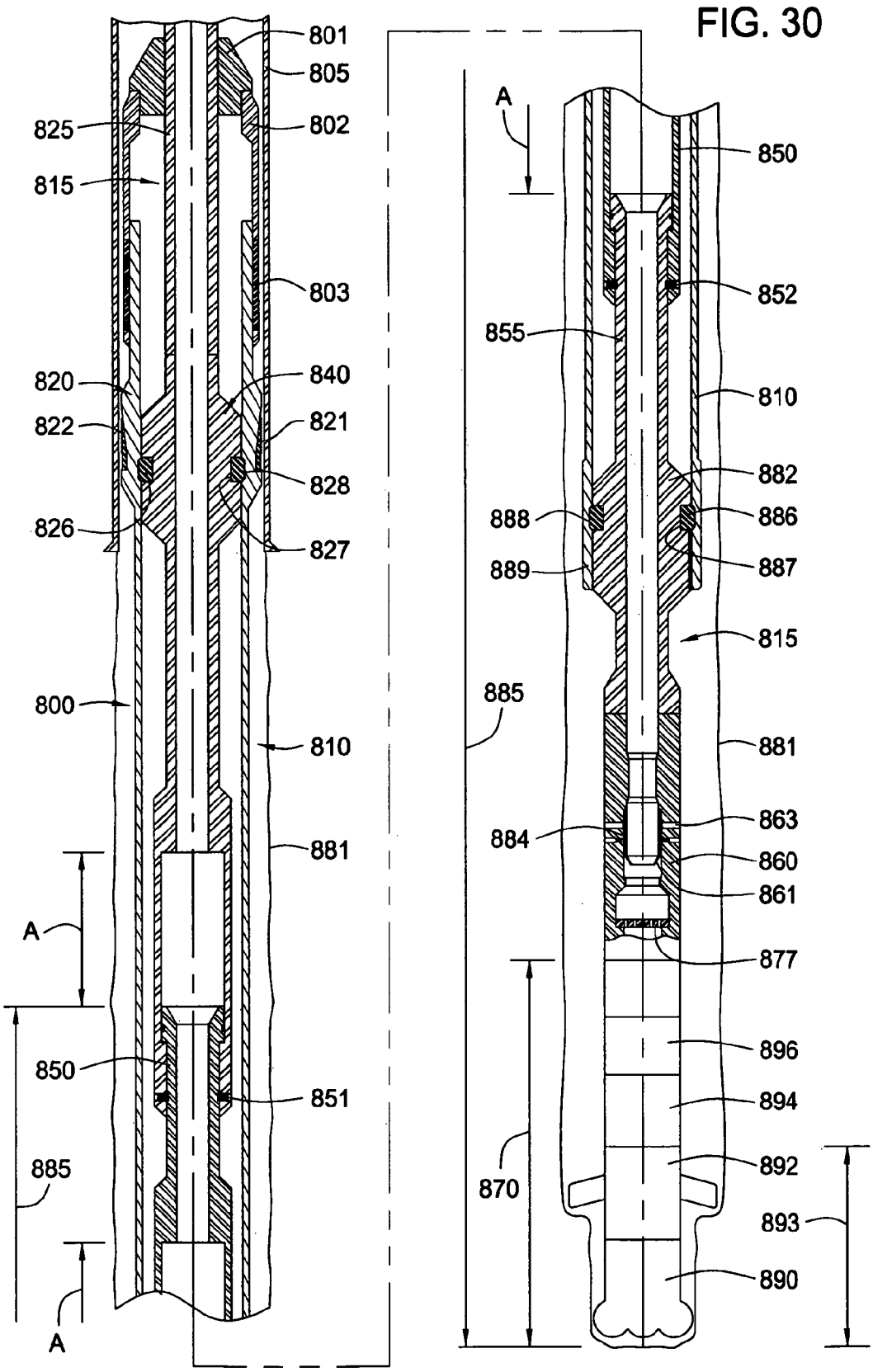
FIG. 30 shows an embodiment of a liner assembly according to aspects of the present invention.

FIG. 30 shows a first casing 805 which was previously lowered into a wellbore 881 and set therein, preferably by a physically alterable bonding material such as cement. In the alternative, the casing 805 may be set within the wellbore 881 using any type of hanging tool. Preferably, the first casing 805 is drilled into an earth formation by jetting and/or rotating the first casing 805 to form the wellbore 881.

Disposed within the first casing 805 is a second casing or liner 810. Connected to an outer surface of an upper end of the liner 810 is a setting sleeve 802 having one or more sealing members 803 disposed directly below the setting sleeve 802, the sealing members 803 preferably including one or more sealing elements such as packers. The sealing members 803 could also be an expandable packer, with an elastomeric material creating the seal between the liner 810 and the first casing 805. A setting sleeve guard 801 disposed on a drill string 815 (see below) has an inner diameter adjacent to an outer diameter of a running tool 825, and a recess in the setting sleeve guard 801 houses a shoulder of the setting sleeve 802 therein. A shoulder on the drill string 815 prevents the setting sleeve guard 801 from stroking the setting sleeve 802 downwards while working the drill string 815 up and down in the wellbore 881 during the drilling process (see below). The setting sleeve guard 801 prevents the setting sleeve 802 from being actuated prior to the cementation process (shown and described below in relation to FIGS. 45-49).

The liner 810 includes a liner hanger 820 on a portion of its outer diameter; the liner hanger 820 having one or more gripping members 821, preferably slips, on its outer diameter. The liner hanger 820 is disposed directly below the sealing member 803. The liner hanger 820 further includes a sloped surface 822 on the outer diameter of the liner 810 along which the gripping members 821 translate radially outward to hang the liner 810 off the inner diameter of the casing 805. At a lower end of the liner 810, a liner shoe 889 may exist.

The liner 810 has a drill string 815, which may also be termed a circulating string, disposed substantially coaxially therein and releasably connected thereto. The drill string 815 is a generally tubular-shaped body having a longitudinal bore therethrough. The drill string 815 and the liner 810 form a liner assembly 800. FIG. 30 shows the liner assembly 800 drilled to the liner 810 setting depth within the formation.

The drill string 815 includes a running tool 825 at its upper end and a BHA 885 telescopically connected to a lower end of the running tool 825. Specifically, the running tool 825 includes a latch 840. An outer surface of the running tool 825 has a recess 827 therein for receiving a radially extendable latching member 826. The latching member 826 is radially extendable into a recess 828 in an inner surface of the liner 810 to releasably engage the liner 810. When the latching member 826 is extended into the recess 828 of the liner 810, the liner 810 and the drill string 815 are latched together.

The BHA 885 includes a first telescoping joint 850 at its upper end which is disposed concentrically within the lower end of the running tool 825 so that the first telescoping joint 850 and the running tool 825 are moveable longitudinally relative to one another. The lower end of the first telescoping joint 850 is then disposed concentrically around an upper end of a second telescoping joint 855. The first and second telescoping joints 850 and 855 are also moveable longitudinally relative to one another.

It is contemplated that a plurality of telescoping joints 850, 855 may be utilized rather than merely the two telescoping joints 850, 855 shown, depending at least partially upon the length of the BHA 885 that is exposed below the lower end of the liner 810. This portion of the BHA 885 must be swallowed by collapsing the telescoping joints 850, 855, thus lowering the liner 810 to case substantially the depth of the wellbore 881 drilled (see description of operation below). Preferably, the telescoping joints 850, 855 are pressure and volume balanced and positioned toward a lower end of the drill string 815 because of their reduced cross-section caused by an effort to minimize their hydraulic area. When the telescoping joints 850 and 855 are extended to telescope outward, the telescoping joints 850, 855 are preferably splined, or selectively splined, to permit torque transmission through the telescoping joints 850, 855 as required (specifically during run-in and/or drilling of the liner drilling assembly 800, as described below). In addition to a spline coupling, it must be noted that the telescoping joints may be coupled using any other manner that is capable of transmitting torque while allowing relative axial movement between the telescoping joints.

The second telescoping joint 855 includes a latch 882 with one or more recesses 887 in its outer surface. The one or more recesses 887 house one or more latching members 886 therein. The one or more latching members 886 are also disposed within one or more recesses 888 in an inner surface of the liner shoe 889 (or the liner 810). To act as a releasable latch selectively holding the drill string 815 and the liner 810 together, the latching member 886 is radially slidable relative within the recess 887 of the second telescoping joint 855 to either engage or disengage the liner shoe 889 by its recess 888.

The two attachment locations of the liner 810 to the drill string 815, namely the latches 840 and 882, are disposed proximate to the upper and lower portions of the liner 810, respectively. Both attachment locations are capable of handling tension and compression, as well as torque.

Connected to a lower end of the second telescoping joint 855 is a circulating sub 860. Within an inner, longitudinal bore of the circulating sub 860 is a ball seat 861. A wall of the circulating sub 860 includes one or more ports 863 therethrough. The ball seat 861 is slidably disposed and moveable within a recess 884 in an inner surface of the wall of the circulating sub 860 to selectively open and close the port 863. A baffle 877, which acts as a holding chamber for a ball 876 (see FIG. 31) after the ball 876 flows through the ball seat 861, is disposed below the ball seat 861 to prevent the ball 876 from plugging off the flow path by entering a lower portion 870 of the BHA 885.

The lower portion 870 of the BHA 885 performs various functions during the drilling of the liner assembly 800. Specifically, the lower portion 870 includes a measuring-while-drilling ("MWD") sub 896 capable of locating one or more measuring tools therein for measuring formation parameters. Also, a resistivity sub (not shown) may be located within the lower portion 870 of the BHA 885 for locating one or more resistivity tools for measuring additional formation parameters.

A motor 894, preferably a mud motor, is also disposed within the lower portion 870 of the BHA 885 above an earth removal member 893, which is preferably a cutting apparatus. As shown in FIGS. 30-44, the earth removal member 893, 993 includes an underreamer 892, 992 located above a drill bit 890, 990. In the alternative, the earth removal member 893, 993 may be a reamer shoe, bi-center bit, or expandable drill bit. For an example of an expandable bit suitable for use in the present invention, refer to U.S. patent application Publication No. 2003/111267 or U.S. patent application Publication No. 2003/183424, each which is incorporated by reference herein in its entirety. The motor 894 is utilized to provide rotational force to the earth removal member 893 relative to the remainder of the drill string 815 to drill the liner assembly 800 into the formation to form the wellbore 881. In one embodiment, the BHA 885 may also include an apparatus to facilitate directional drilling, such as a bent motor housing, an adjustable housing motor, or a rotary steerable system. Moreover, the earth removal member may also include one or more fluid deflectors or nozzles for selectively introducing fluid into the formation to deflect the trajectory of the wellbore. In another embodiment, a 3D rotary steerable system may be used. As such, it may be desirable to place the LWD tool above the underreamer.

In addition to the components shown in FIG. 30 and described above, the lower portion 870 of the BHA 885 may further include one or more stabilizers and/or a logging-while-drilling ("LWD") sub capable of receiving one or more LWD tools for measuring parameters while drilling. At least the lower portion 870 of the BHA 885 may extend below the lower end of the liner 810 while drilling the liner assembly 800 into the formation.

Figure 30A:
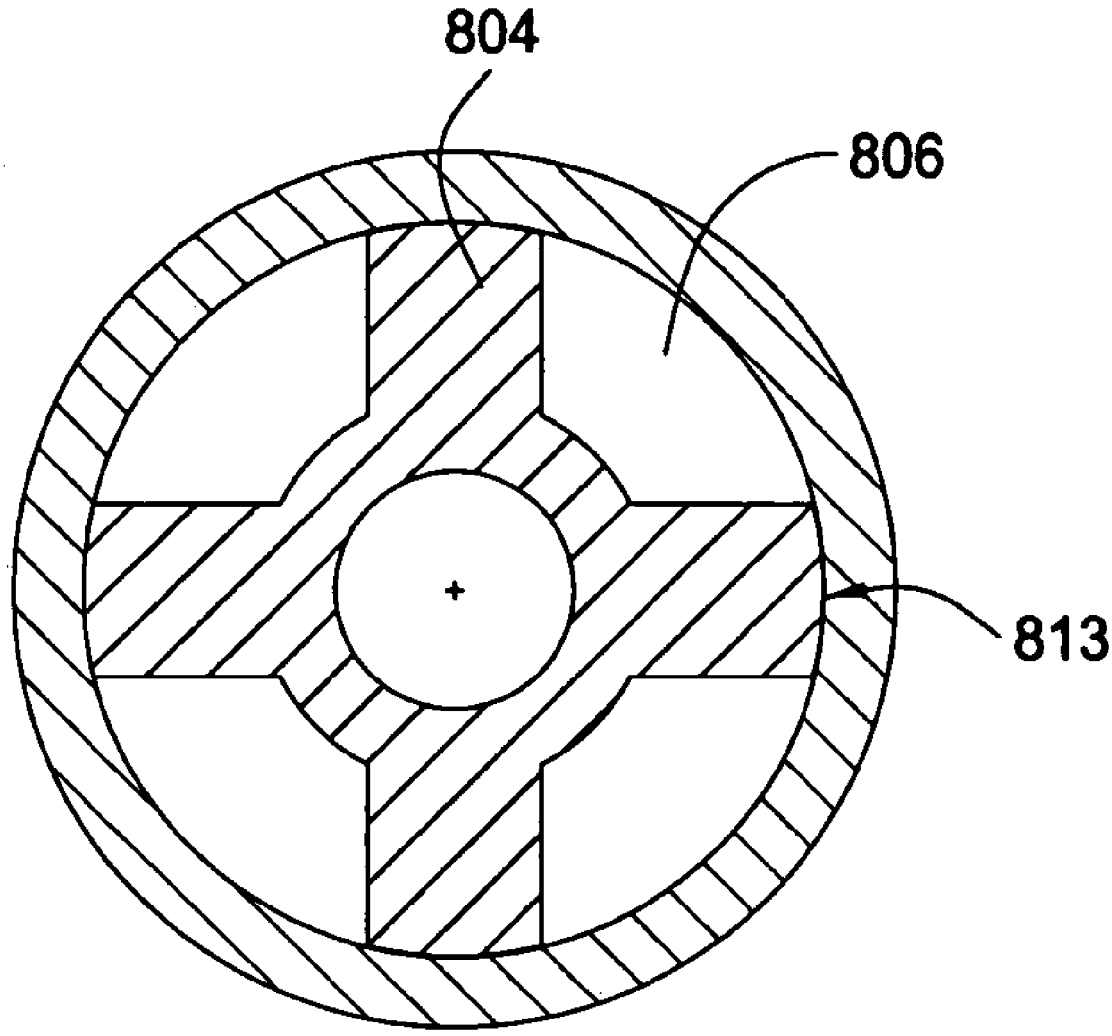
FIG. 30A shows a fluid bypass assembly suitable for use with the liner assembly of FIG. 30.

In the embodiment of FIGS. 30-35, the setting sleeve guard 801, the latch 840 of the running tool 825, and the latch 882 of the second telescoping joint 855 are each fluid bypass assemblies 813. FIG. 30A shows a fluid bypass assembly 813 capable of use as the setting sleeve guard 801, latch 840, and/or latch 882. Each bypass assembly 813 may comprise one or more spokes 804 having one or more annuluses 806 therebetween for flowing fluid therethrough. The one or more bypass assemblies 813 allow drilling fluid to circulate during wellbore operations, as described below.

In operation, the liner drilling assembly 800 is lowered into the formation to form a wellbore 881. Additionally, while being lowered, one or more portions of the liner drilling assembly 800 may be rotated to facilitate lowering into the formation. The rotated portion of the drilling assembly 800 is preferably the earth removal member 893. The motor 894 in the BHA 885 preferably provides the rotational force to rotate the earth removal member 893.

FIG. 30 shows the liner drilling assembly 800 in the run-in position. Usually the lower portion 870 of the BHA 885 extends below the liner 810 upon run-in. The underreamer 892, in the embodiment shown, includes one or more cutting blades that extend past the outer diameter of the liner 810 to form a wellbore 881 having a sufficient diameter for running the liner 810, which follows the underreamer 892 into the formation, therein. In alternative embodiments which employ an expandable bit to drill ahead of the liner 810, the expandable bit cutting blades extend past the outer diameter of the liner 810 to drill a wellbore 881 of sufficient diameter.

Upon run-in of the liner assembly 800, the latching member 826 of the latch 840 is radially extended to releasably engage the recess 828 in the liner 810. Moreover, the latching member 886 is radially extended to engage the recess 888 in the inner diameter of the liner 810 (or the liner shoe 889). In this way, the drill string 815 and the liner 810 are releasably connected during drilling. The latches 840, 882 are capable of transmitting axial as well as rotational force, forcing the liner 810 and the drill string 815 to translate together while connected. Preferably, torque is transmitted sequentially from the drill string 815 to latch 840, to liner 810, back to latch 882, and then to the BHA 870.

During run-in of the liner assembly 810, the telescopic joints 850, 855 are preferably extended at least partially to a length A. Because of the splined profiles of the telescopic joints 850, 855, extension of the telescoping joints 850, 855 may allow transmission of torque to the earth removal member 893 while drilling. Preferably, the extension joints 850 and 855 do not transmit torque during drilling operations. To hold the telescopic joints 850, 855 in an extended position during installation of the latch 882, at least one releasable connection between the first telescoping joint 850 and the running tool 825 exists, as well as at least one releasable connection between the first telescoping joint 850 and the second telescoping joint 855. Preferably, at least one first shearable member 851 and at least one second shearable member 852 perform the functions of releasably connecting the first telescoping joint 850 to the running tool 825 and releasably connecting the second telescoping joint 855 to the first telescoping joint 850, respectively. It is contemplated that the releasable connections could also take the form of hydraulically releasable dogs, as is known by those skilled in the art, rather than shearable connections.

While drilling into the formation with the liner drilling assembly 800, drilling fluid is preferably circulated. The port 863 in the circulating sub 860 is initially closed off by the ball seat 861 within the recess 884 in the inner wall of the circulating sub 860. Drilling fluid is introduced into the inner longitudinal bore of the drill string 815 from the surface, and then flows through the drill string 815 into and through one or more nozzles (not shown) formed through the drill bit 890. The fluid then flows upward around the lower portion 870 of the BHA 885, then the one or more bypass assemblies 813 of the latches 840, 882 and the setting sleeve guard 801 allow fluid to flow up through the inner diameter of the liner 810 between the inner diameter of the liner 810 and the outer diameter of the drill string 815. Additionally, some fluid may flow around the outer diameter of the liner 810 between the outer diameter of the liner 810 and the wellbore 881. Thus, the volume of fluid which may be circulated while drilling is increased due to the multiple fluid paths (one fluid path between the wellbore 881 and the outer diameter of the liner 810, the other fluid path between the inner diameter of the liner 810 and the outer diameter of the drill string 815) created by the embodiment shown in FIG. 30 of the liner drilling assembly 800. In another embodiment, this system is not limited to this one particular annular flow regime between the outer diameter of the liner 810 and the wellbore 881, but the system may employ the same equipment to achieve downward annular flow, as described above. Specifically, this system may involve use of the sealing member 448 and the bypass member 445.

Figure 31:
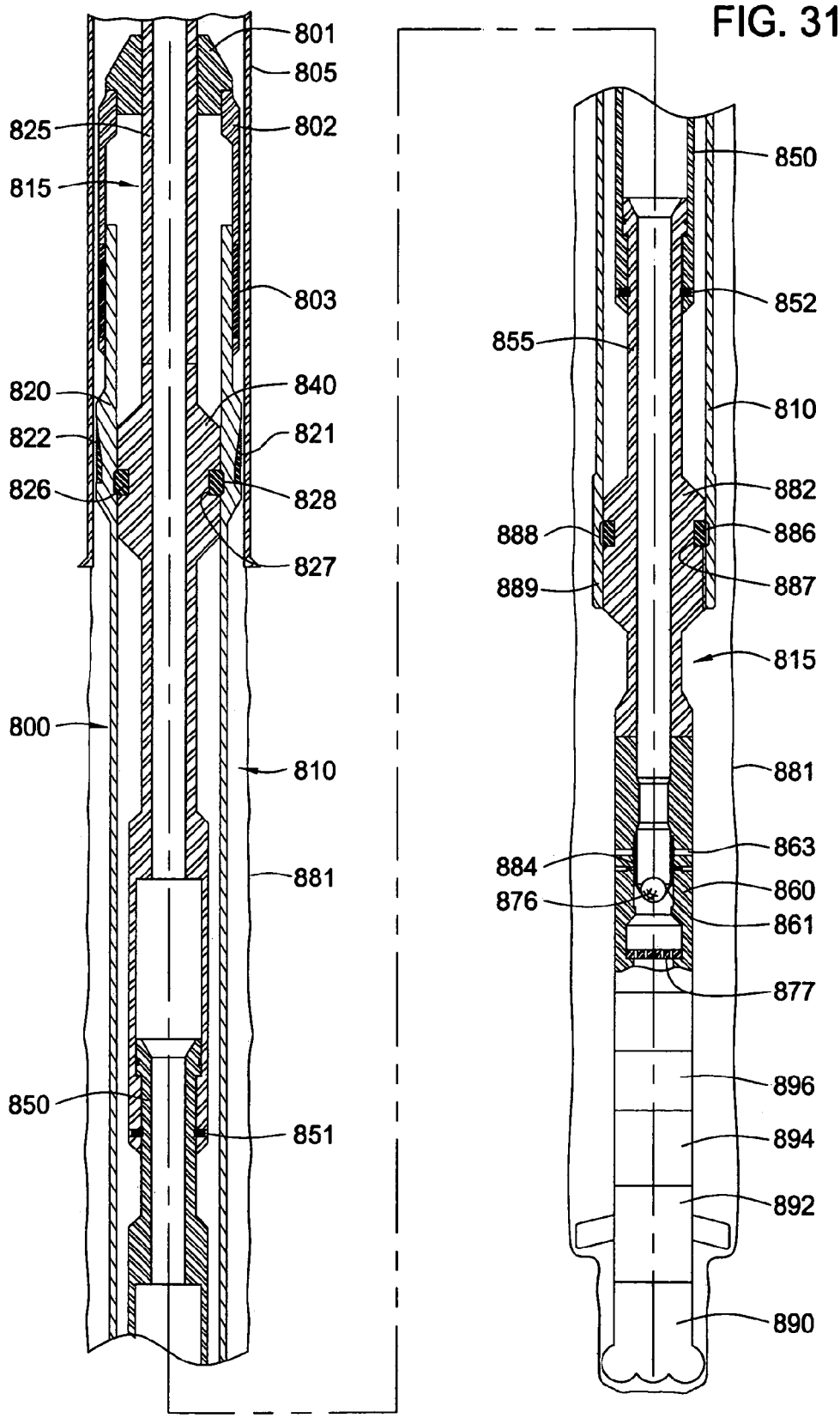
FIG. 31 shows the liner assembly of FIG. 30 after latch has been released.

Now referring to FIG. 31, when the underreamer 892 (or other earth removal member 893) has reached the desired depth at which it is desired to ultimately place the liner 810 in the wellbore 881 to case the wellbore to a depth (preferably, at the desired depth, a lower portion of the first casing 805 overlaps an upper portion of the liner 810), a sealing device for sealing the bore of the circulating sub 860, preferably a ball 876 or a dart (not shown), is introduced into the bore of the drill string 815 from the surface and circulated down the drill string 815 into the ball seat 861 (the ball seat 861 is preferably located above the lower portion 870 of the BHA 885). Fluid is then introduced above the ball 876 to increase pressure within the bore to an amount capable of releasing the latching member 886 from the recess 888 in the liner 810, thus releasing the releasable connection between the drill string 815 and the liner 810. The latching member 886 is shown released from the liner shoe 889 in FIG. 31.

Figure 32:
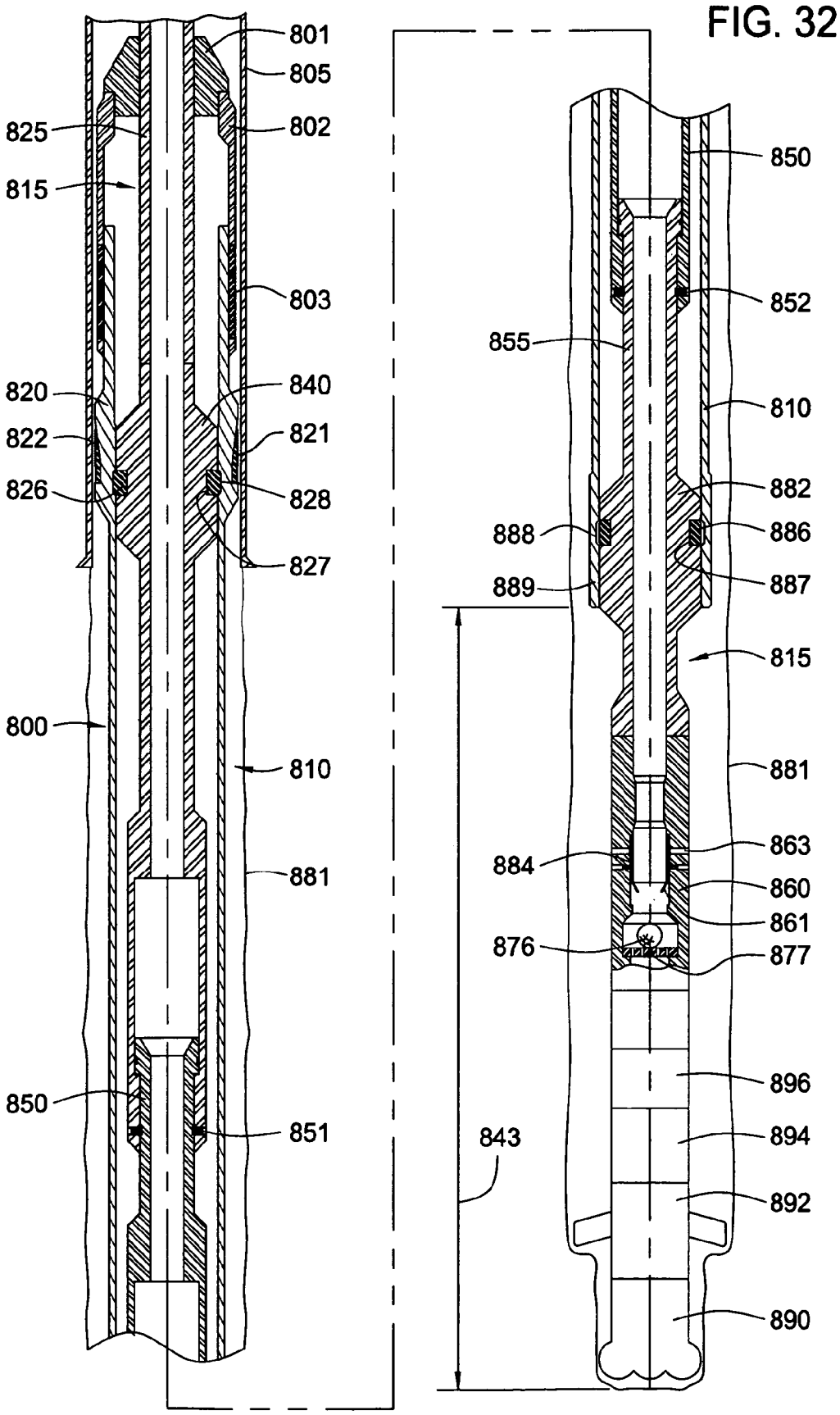
FIG. 32 shows the liner assembly of FIG. 30 after the ball has been pumped into the baffle.

Next, pressure is further increased above the ball 876 within the bore of the drill string 815 to force the ball 876 through the ball seat 861, as illustrated in FIG. 32. The ball 876 is caught in the baffle 877 above the lower portion 870 of the BHA 885. Blowing the ball 876 through the ball seat 861 allows circulation through the bore of the circulating sub 860 again, as during run-in of the liner drilling assembly 800.

Figure 33:
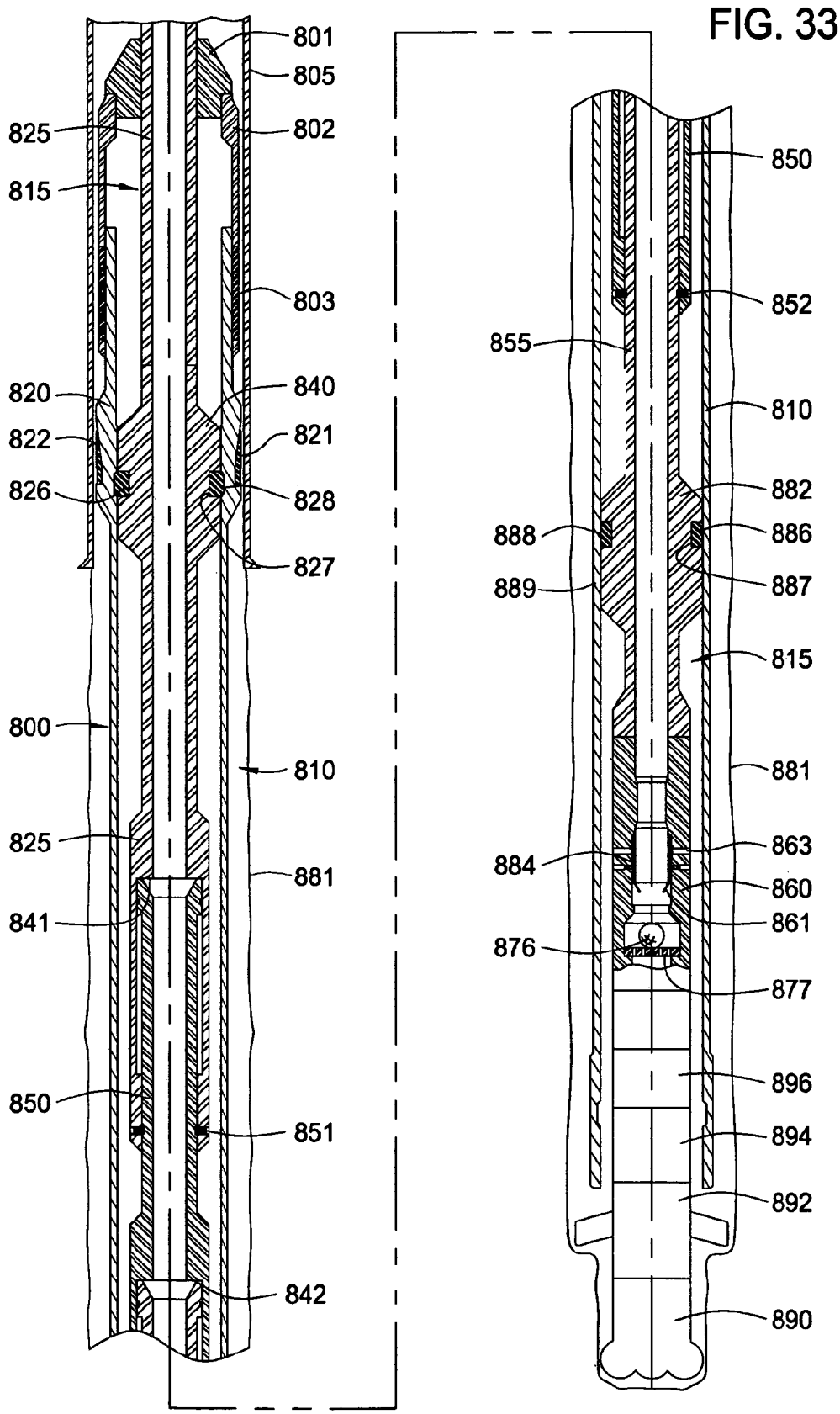
FIG. 33 shows the liner assembly of FIG. 30 after the liner has been reamed down over the BHA.

A downward load is then applied to the drill string 815 from the surface of the wellbore 881 to shear the shearable members 851 and 852 so that the first telescoping joint 850 slides within the running tool 825 until it reaches a shoulder 841 of the running tool 825 and the second telescoping joint 855 slides within the first telescoping joint 850 until it reaches a shoulder 842 of the first telescoping joint 850, as shown in FIG. 33. This telescoping of joints will continue until the liner 810 has been advanced to the bottom of the wellbore 881. Collapsing the joints 825, 850 and 850, 855 in length telescopically decreases the length of the drill string 815 within the liner 810, thus moving the liner downward 810 within the wellbore 881 in relation to the lowermost end of the drill string 815 (to just above the blades on the underreamer 892). The distances between the shoulders 841, 842 and the initial locations of the telescoping members 825, 850 and 850, 855 are predetermined prior to locating the liner drilling assembly 800 within the formation so that the telescoping of the telescoping members 825, 850 and 850, 855 allows the liner 810 to move downward to a location proximate the bottom of the wellbore 881, as shown in FIG. 33. Ultimately, the liner 810 is reamed over the previously exposed portion of the BHA 885; therefore, the previously open hole section 843 (see FIG. 32) is cased by the liner 810 as shown in FIG. 33, thereby casing a portion of the wellbore 881 which would otherwise remain uncased upon removal of the BHA 885 from the wellbore 881. Because of the bypass assemblies 813 which exist in the latches 840 and 882 as well as the setting sleeve guard 801, fluid may be circulated within one or more annuluses 806 between one or more spokes 804 of the bypass assemblies 813 while the liner 810 is lowered into the wellbore 881 over the BHA 870. Thus, fluid may be circulated within the liner 810 as well as outside the liner 810 to circulate any residual cuttings or other material remaining at the bottom of the wellbore 881 after drilling.

Figure 34:
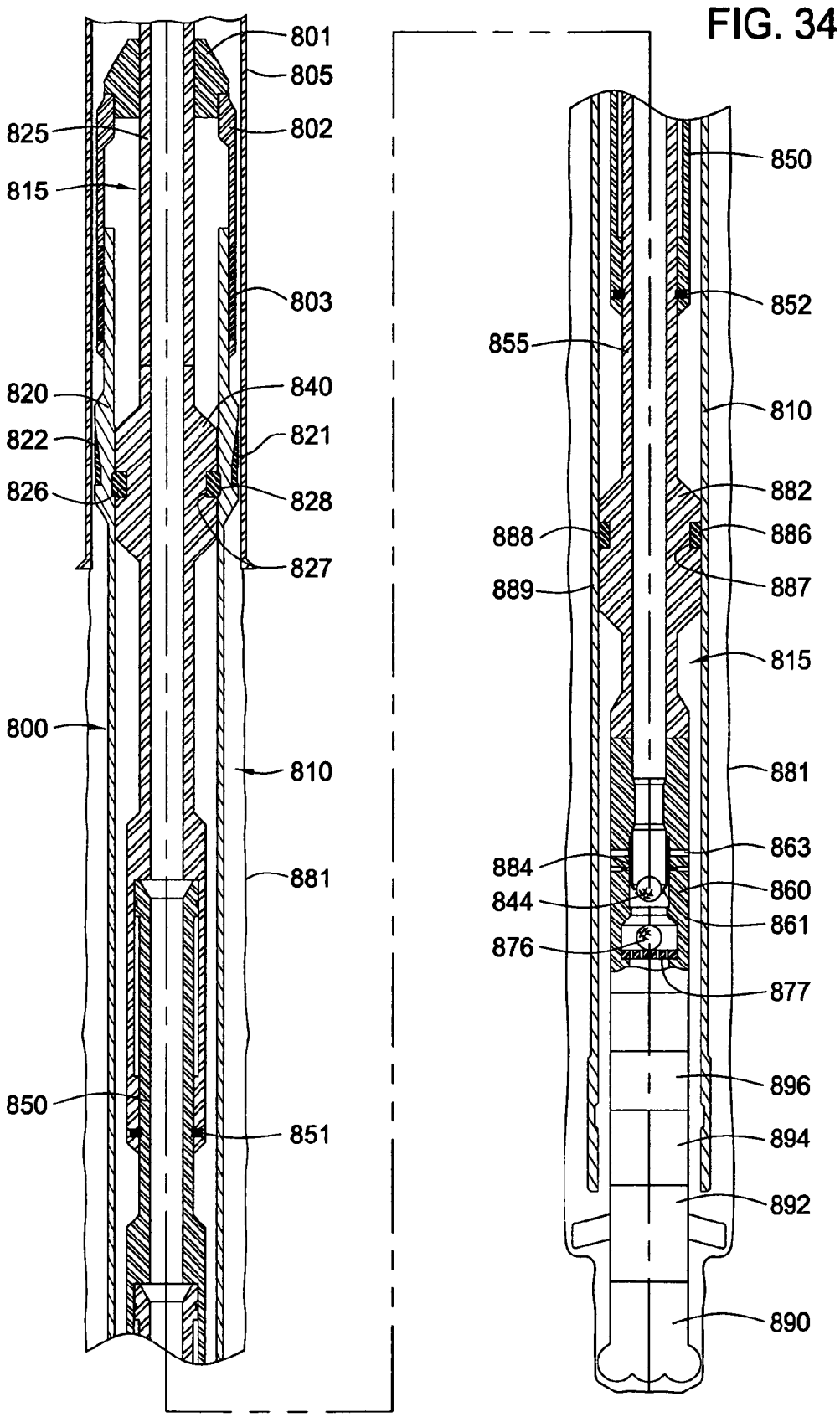
FIG. 34 shows the liner assembly of FIG. 30 after the hanger has been actuated.

FIG. 34 shows the next step in the operation. A second ball 844 (or dart) is introduced into the drill string 815 from the surface to rest in the ball seat 861. Fluid is then flowed into the bore of the drill string 815 to provide sufficient pressure within the drill string 815 to set the liner hanger 820, thereby hanging the liner 810 on the first casing 805. Specifically, increased fluid pressure within the bore forces the gripping members 821 to move upward along the sloped surface 822 of the liner hanger 820. Because the surface 822 is sloped, the gripping members 821 extend radially outward to grippingly engage the inner surface of the first casing 805 (see FIG. 35). In an alternate embodiment, the liner hanger 820 may be expandable.

Once the liner 810 is hung off the first casing 805, pressure is further increased above the second ball 844 to retract the latching member 826 from engagement with the inner surface of the liner 810, thus disengaging the liner 810 from the drill string 815. The drill string 815 is now moveable relative to the liner 810 to allow retrieval thereof.

Figure 35:
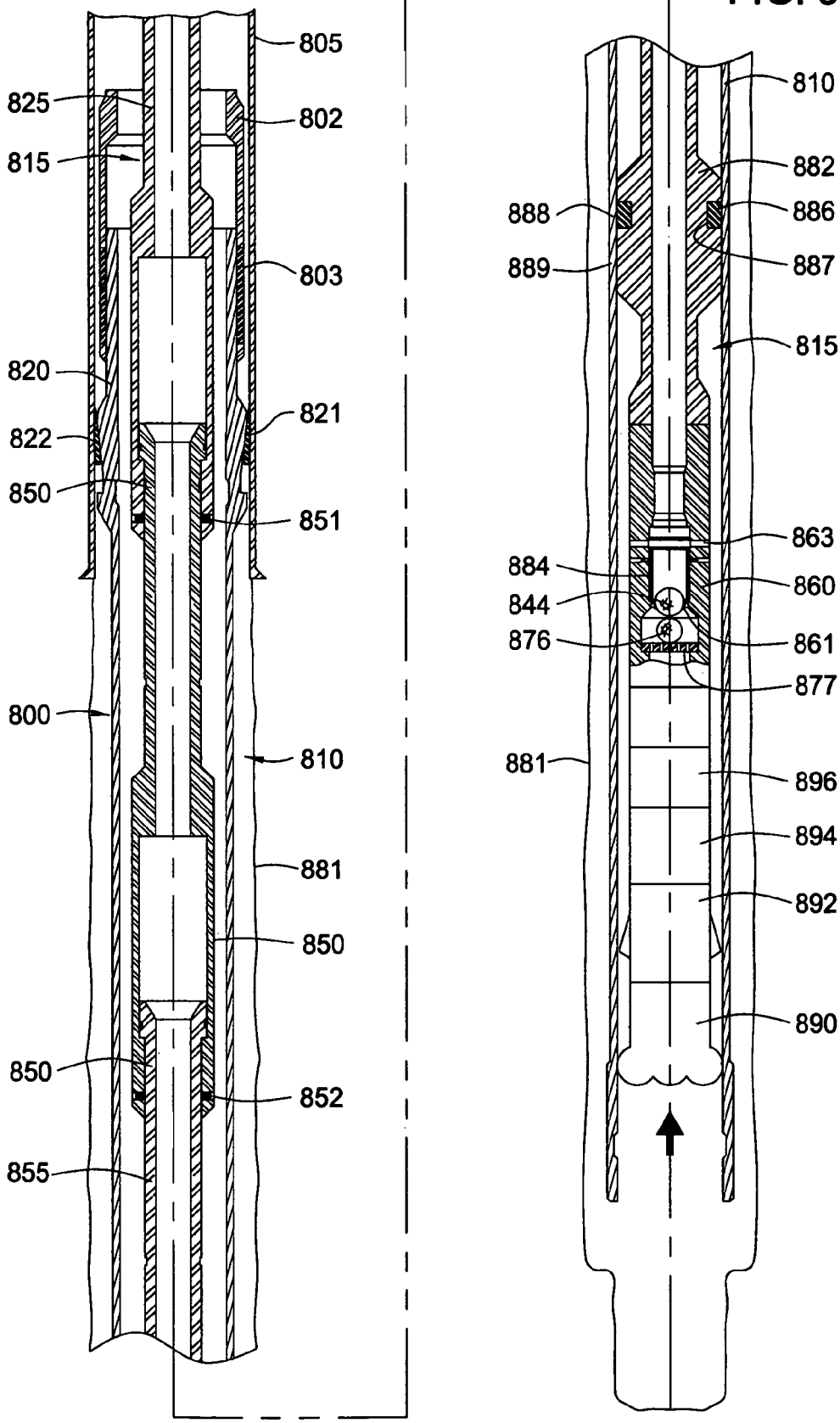
FIG. 35 shows the liner assembly of FIG. 30 after the running assembly is partially retrieved.

As depicted in FIG. 35, pressure is then increased yet further within the bore of the drill string 815 so that the second ball 844 within the ball seat 861 forces the ball seat 861 to shift downward within the recess 884, thereby opening the port 863 to fluid flow and allowing fluid circulation through the port 863. Fluid flow is now possible through the bore of the drill string 815, out through the port 863, then up and/or down within the annulus between the outer diameter of the drill string 815 and the inner diameter of the liner 810. FIG. 35 shows the drill string 815 being retrieved to the surface. Fluid may be circulated through the liner 810 while the drill string 815 is retrieved from the cased wellbore 881.

An alternate embodiment of the present invention which allows for subsequently casing a portion of the open hole wellbore which was previously spanned by at least a portion of the BHA previously extending below a lower end of the liner during the drilling with casing operation is shown in FIGS. 36-44. The embodiment shown in FIG. 36-44, like the embodiment of FIGS. 30-35, also involves drilling a wellbore with a liner having an inner circulating string, wherein the liner is attachable to the drill string. However, the embodiment of FIGS. 36-44 does not employ collapsible telescoping joints to case the open hole section of the wellbore occupied by the BHA.

The embodiment shown in FIGS. 36-44 is substantially the same in components and operation as the embodiment shown in FIGS. 30-35; therefore, components of FIGS. 36-44 which are substantially the same as components of FIGS. 30-35 labeled in the "800" series are labeled with like numbers in the "900" series. Namely, the liner assembly 900; wellbore 981; first casing 905; setting sleeve guard 901 and setting sleeve 902; sealing member 903; liner 910 and its recess 928 therein, one or more gripping members 921, liner hanger 920 and its sloped surface 922, and liner shoe 989; drill string 915 including running tool 925, latch 940, recess 927, latching member 926, circulating sub 960, one or more ports 963, recess 984, ball seat 961, baffle 977, BHA 985, MWD sub 996, motor 994, underreamer 992, drill bit 990, earth removal member 993, and lower portion 970 (of BHA 985); and balls 976 and 944 are substantially the same as the liner assembly 800, wellbore 881, first casing 805, setting sleeve guard 801, setting sleeve 802, sealing member 803, liner 810, recess 828, gripping members 821, liner hanger 820, sloped surface 822, liner shoe 889, drill string 815, running tool 825, latch 840, recess 827, latching member 826, circulating sub 860, ports 863, recess 884, ball seat 861, baffle 877, BHA 885, MWD sub 896, motor 894, underreamer 892, drill bit 890, earth removal member 893, lower portion 870, and balls 876 and 844 shown and described in relation to FIGS. 30-35.

The latch 982 and its related components including the latching member 986, recess 987 in the latch 982, and recess 988 in the liner 910, and the operation of the latch 982, are also similar to the latch 882, recesses 887 and 888, and latching member 886 shown and described in relation to FIGS. 30-35; however, the latch 982 of FIGS. 36-44 and its components may be located at a higher location along the drill string 915 relative to the lower end of the liner 910, as no telescoping joints 850, 855 exist in the embodiment of FIGS. 36-44. The latch 982 is a secondary latch.

In addition to the absence of the telescoping joints 850, 855 in the embodiment of FIGS. 36-44, the embodiment shown in FIGS. 36-44 differs from the embodiment shown in FIGS. 30-35 because one or more centralizing members 999 may be located on the drill string 915 near the lower portion of the liner 910, near the liner shoe 989, or at other locations throughout the length of the liner 910. The centralizing member 999 centralizes and stabilizes the drill string 915 relative to the liner 910. Similar to the embodiment of FIGS. 30-35, the setting sleeve guard 901, latch 940, latch 982, and centralizer 999 are preferably each bypass assemblies 813, as shown and described in relation to FIG. 30A.

Figure 36:
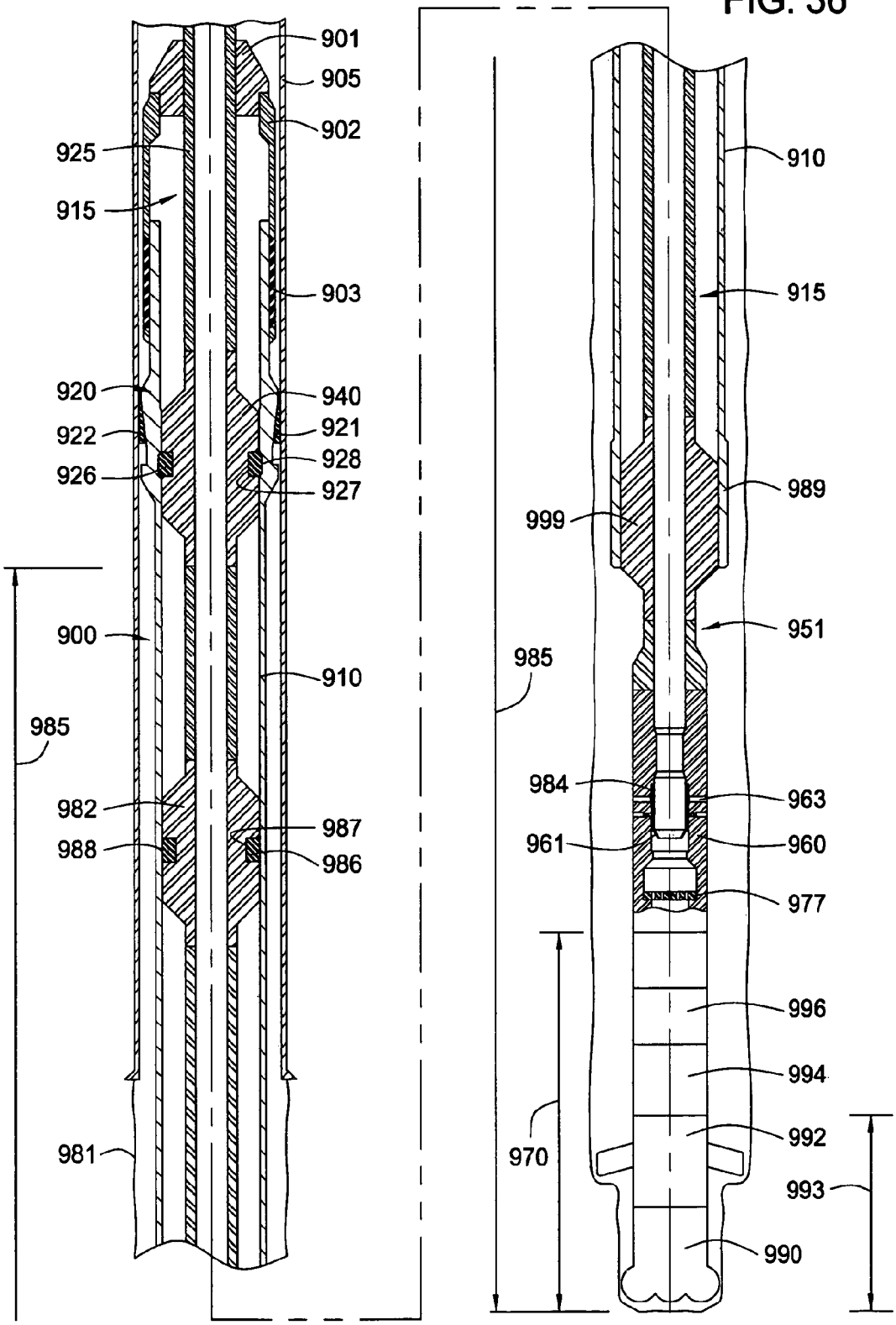
FIG. 36 shows another embodiment of a liner assembly according to aspects of the present invention.

In operation, the liner assembly 900 is drilled to a depth within the formation so that the wellbore 981 is at the depth at which it is desired to ultimately set the liner 910, with only one of the latches (e.g., latch 940) engaging the inner diameter of the liner 910. The liner assembly 900 is drilled to the desired depth within the formation, preferably to a depth where at least a portion of the liner 910 is overlapping at least a portion of the first casing, is shown in FIG. 36. While drilling, drilling fluid may be circulated up within the liner through the latch 940, latch 982, centralizer 999, and setting sleeve guard 901 due to their bypass assemblies 813. This system is not limited to one particular annular flow regime between the outer diameter of the liner 910 and the wellbore 981, but may also employ the same equipment as described above to achieve an additional downward annular flow path. Specifically, this system may involve the use of the sealing member 448 and the bypass member 445.

Figure 37:
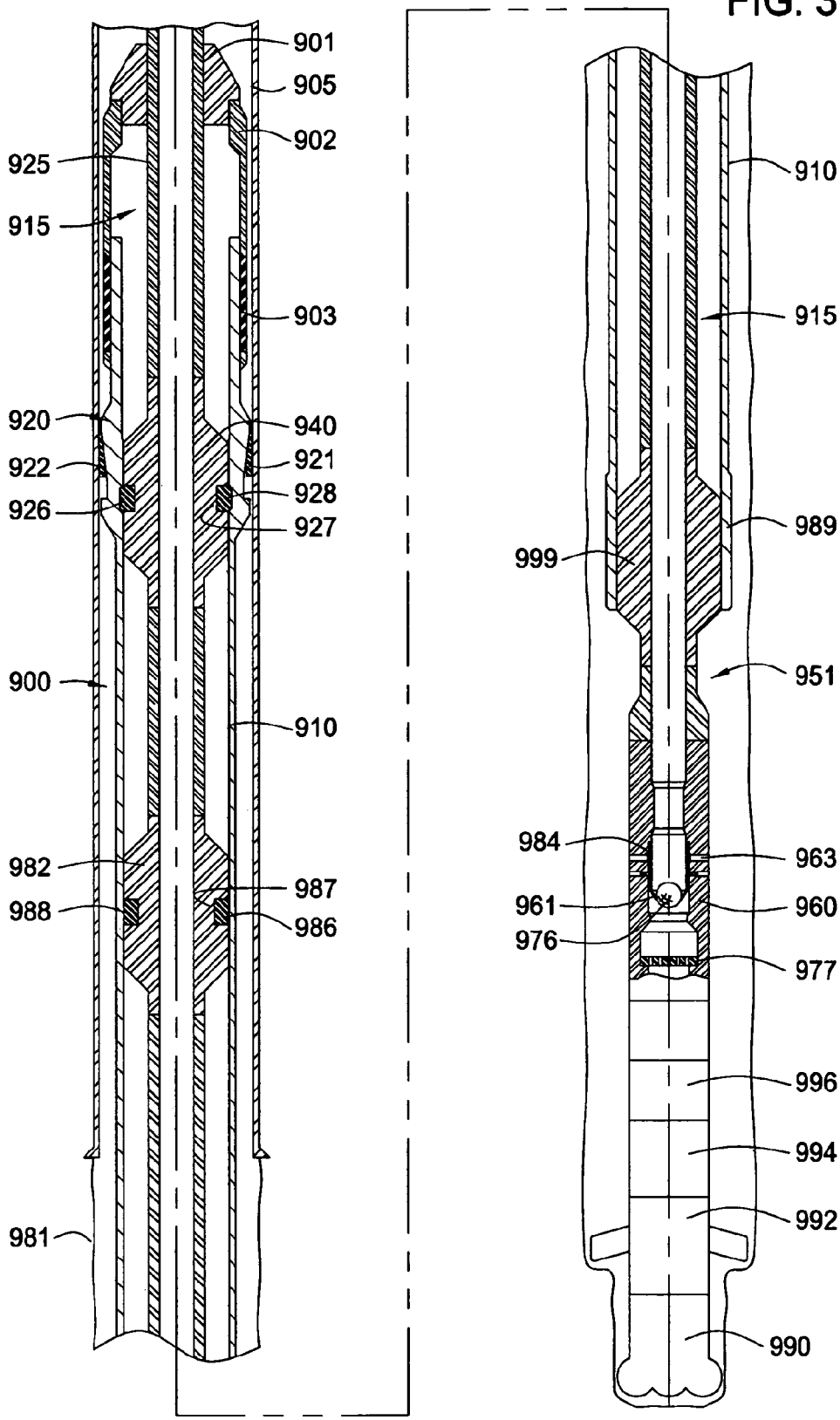
FIG. 37 shows the liner assembly of FIG. 36 after the hanger has been set.
Figure 38:
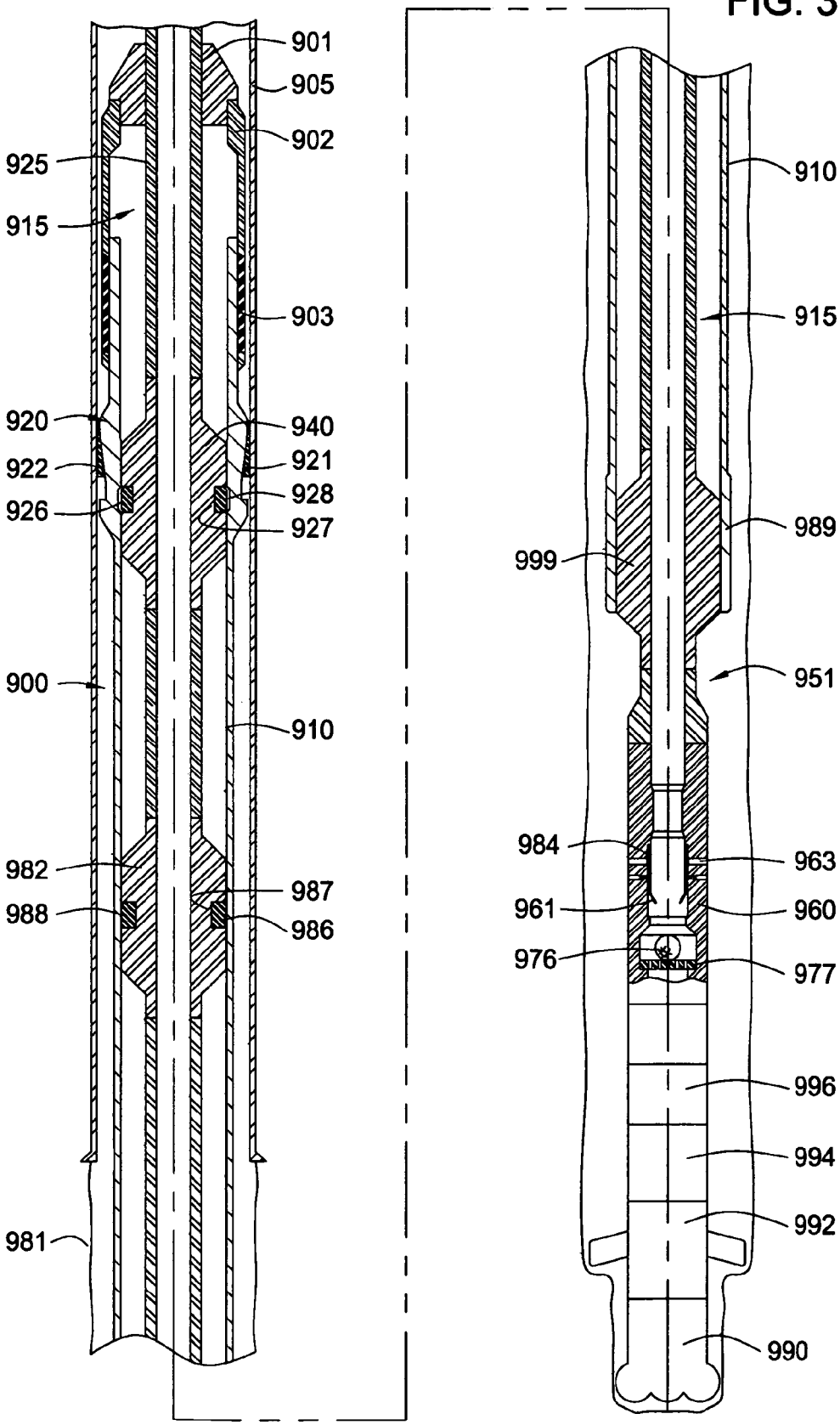
FIG. 38 shows the liner assembly of FIG. 30 after running tool has been released.

Next, as shown in FIG. 37, the first ball 976 is placed in the ball seat 961, fluid pressure is increased, and the liner hanger 920 is actuated to hang the liner 910 on the first casing 905, as shown and described in relation to FIGS. 30-35 Fluid pressure is increased further within the bore of the drill string 915 so that the latching member 926 is released from the recess 928 in the liner 910. At this point in the operation, the drill string 915 is moveable relative to the liner 910 and the first casing 905. Then, just as shown and described in relation to FIGS. 30-35, fluid pressure is increased yet further within the bore of the drill string 915 to force the ball 976 into the baffle 977, as shown in FIG. 38, so that fluid may flow through the lower end 970 of the BHA 985 again.

Figure 39:
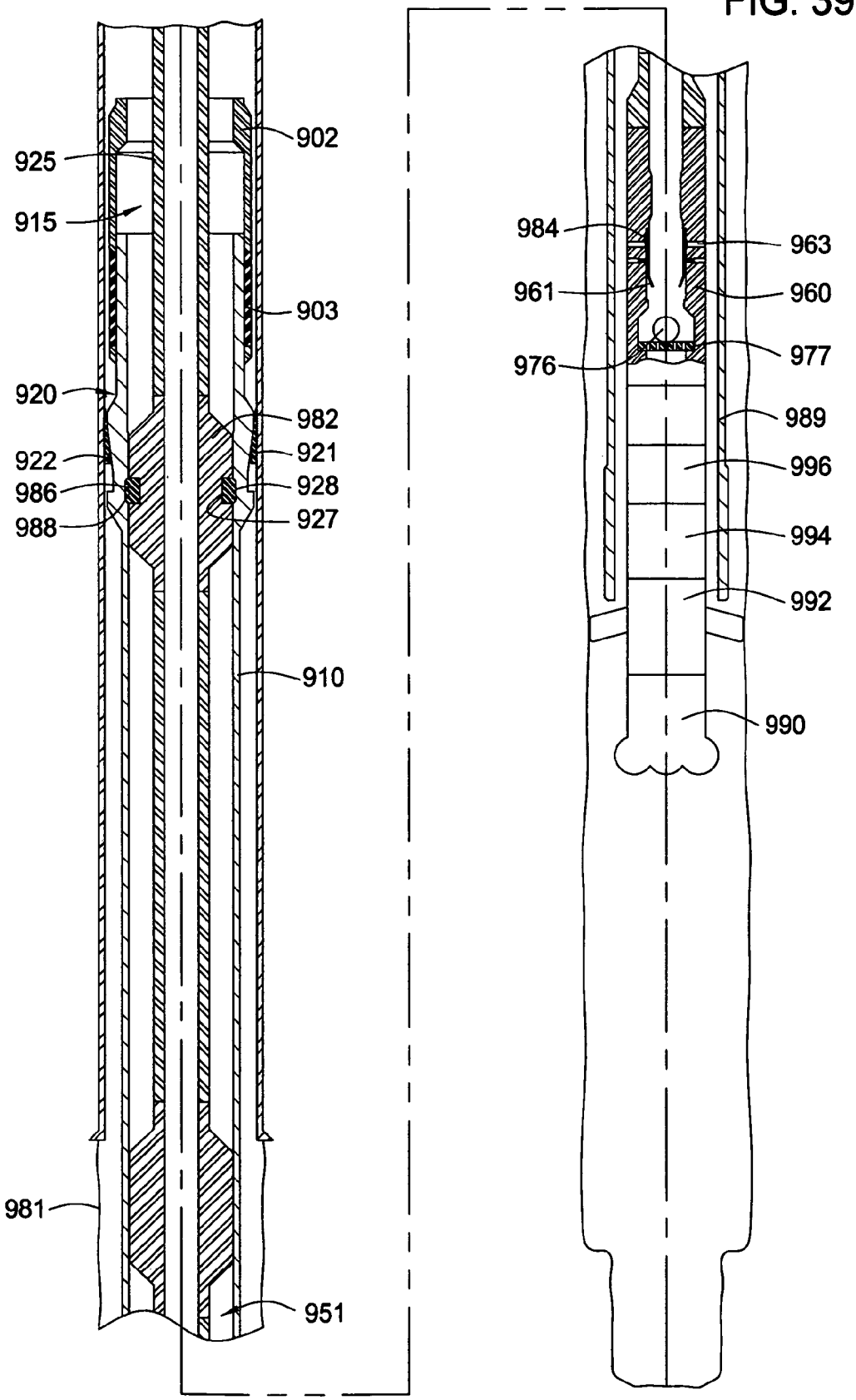
FIG. 39 shows the liner assembly of FIG. 30 after the BHA has been retracted.

The drill string 915 is then translated upward relative to the liner 910 until the secondary latching member 988 engages the recess 928 in the liner 910 previously occupied by the latching member 926. The distance between the recesses 928 and 986, as well as between latching members 926 and 988, is predetermined so that when the latching member 988 engages the recess 928, the majority of the BHA 985 is surrounded by the liner 910. Preferably, as shown in FIG. 39, the lower end of the liner 910 is disposed proximate to the earth removal member 993, so that the liner 910 may be lowered into a location near the bottom of the wellbore 981. In this manner, substantially all of the open hole wellbore may be cased by the liner 910.

Figure 40:
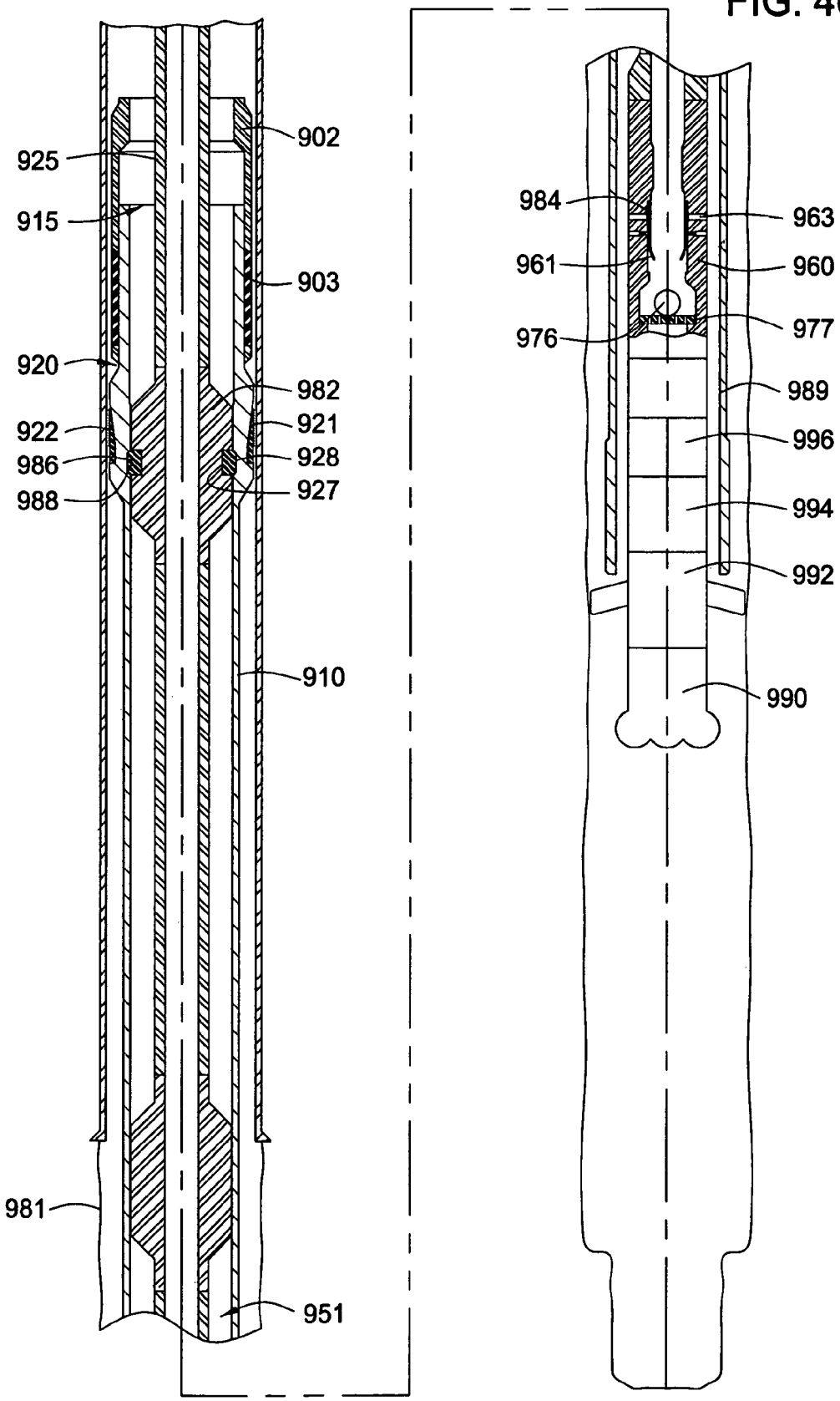
FIG. 40 shows the liner assembly of FIG. 30 after the hanger has been released.

Once the latching member 988 engages the recess 928, the gripping members 921 of the liner hanger 920 are released from their gripping engagement with the first casing 905, as shown in FIG. 40. The liner drilling assembly 900 is now translatable relative to the first casing 905.

Figure 41:
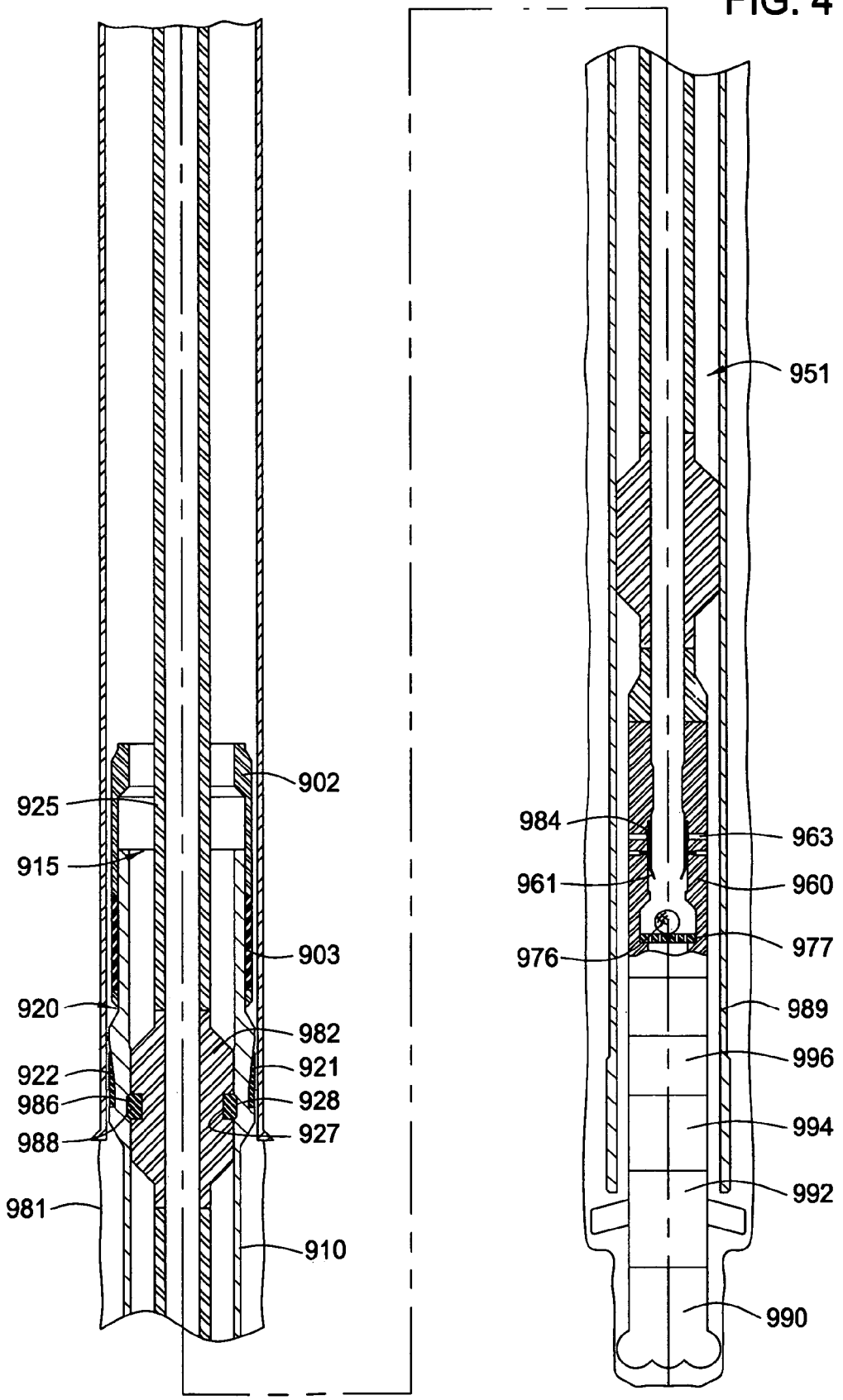
FIG. 41 shows the liner assembly of FIG. 30 after liner is drilled down to bottom.
Figure 42:
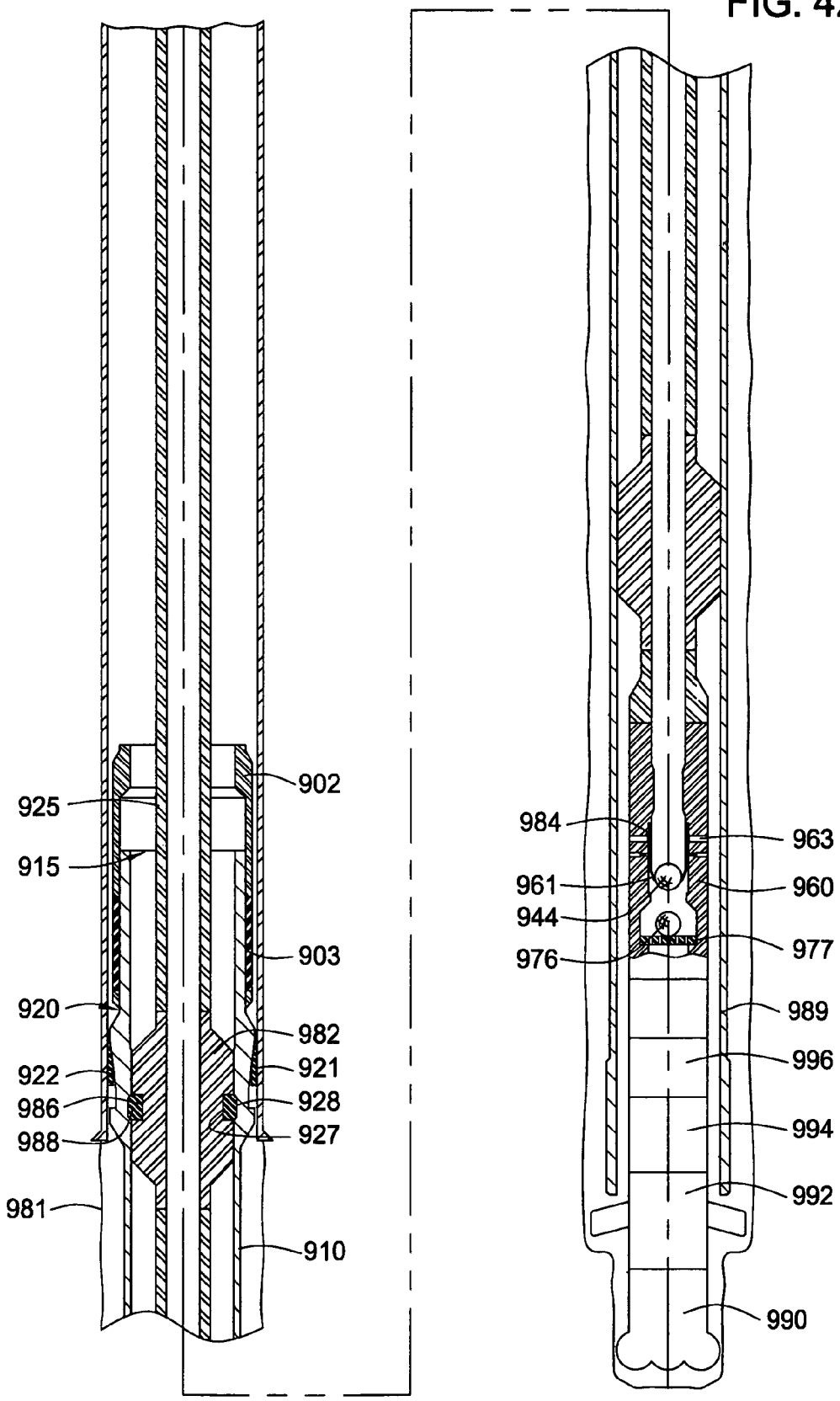
FIG. 42 shows the liner assembly of FIG. 30 after the hanger has been reset.

As shown in FIG. 41, the liner assembly 900 is then lowered to the bottom of the open hole wellbore 981. Referring now to FIG. 42, a second ball 944 is next introduced into the bore of the drill string 915 and stops in the ball seat 961, thus preventing fluid flow therethrough. Increased fluid pressure above the second ball 944 sets the liner hanger 920 at a new location on the first casing 905, as shown and described in relation to FIGS. 30-35. The liner 910 is now hung on the first casing 905 at its desired position for lining the open hole wellbore.

Figure 43:
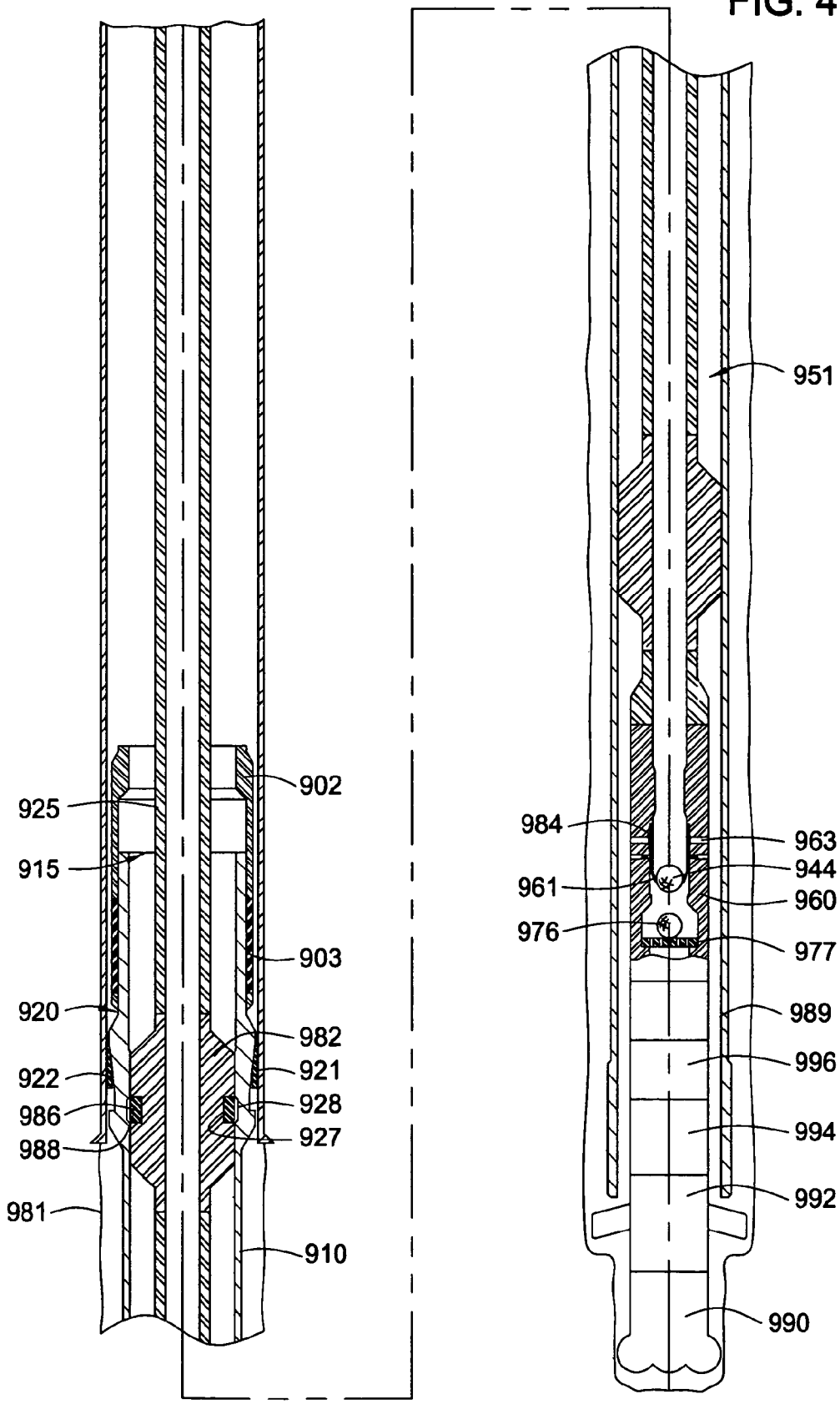
FIG. 43 shows the liner assembly of FIG. 30 after the secondary latch has been released.
Figure 44:
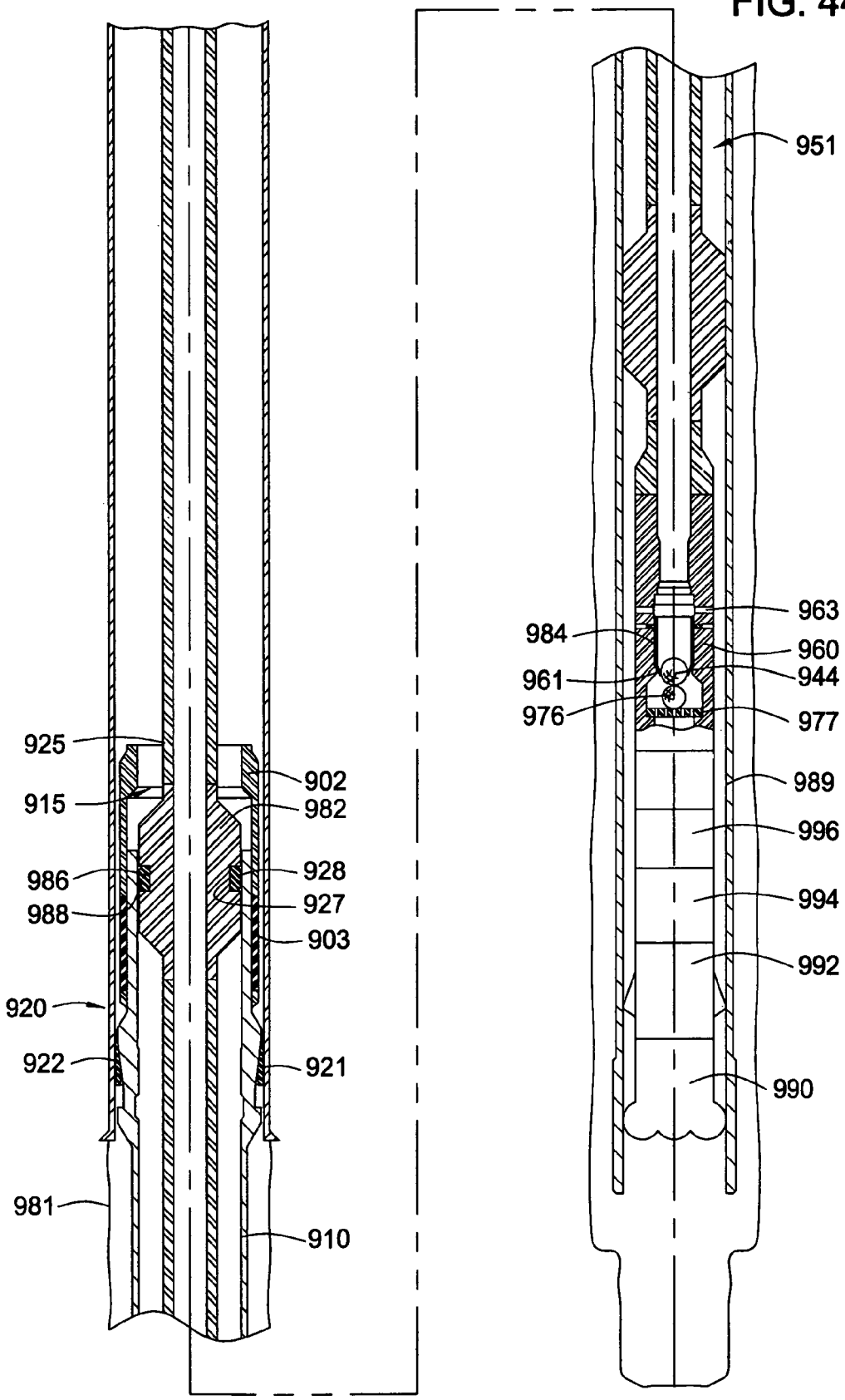
FIG. 44 shows the liner assembly of FIG. 30 after it is partially retrieved.

FIG. 43 shows the next step in the operation. After hanging the liner 910 on the first casing 905, the secondary latching member 988 is released (e.g., by increased fluid pressure within the bore of the drill string 915 above the ball 944) from the recess 928 in the liner 910 so that the drill string 915 may be retrieved from within the liner 910. Fluid pressure is then further increased within the bore to shift the ball seat 961, thereby uncovering the fluid port 963. Fluid circulation from the bore of the drill string 915, then up and/or down through the inner diameter of the liner 910 outside the drill string 915 is then possible while retrieving the drill string 915 to the surface. FIG. 44 shows the fluid port 963 uncovered.

The drill string 915 is then pulled up to the surface, while the liner 910 remains hung on the first casing 905. When the underreamer 992 reaches the liner 910 upon pulling the drill string 915 up through the liner 910, the underreamer 992 decreases in outer diameter.

FIGS. 45-49 show a cementation process for setting the liner 810, 910 of either of the embodiments shown in FIGS. 30-35 or in FIGS. 36-44 within the wellbore 881, 981. The cementation process is a two-trip system for drilling casing into the wellbore and cementing the casing into the wellbore which avoids pumping of cement through the BHA 885, 985, which could damage or ruin expensive equipment disposed within the BHA 885, 985 such as a MWD tool or mud motor.

The embodiment of the cementation process depicted in FIGS. 45-49 includes first casing 905, setting sleeve 902, sealing member 903, liner hanger 920, sloped surface of liner hanger 922, gripping member 921, recess in liner 928, and liner 910 of FIGS. 36-44, all of which are left in the wellbore 981 after the drill string 915 is removed from the wellbore 981. The cementation process which is below described in relation to the components of FIGS. 36-44 is equally applicable to the cementation of the liner 810 of FIGS. 30-35, where the first casing 805, setting sleeve 802, sealing member 803, liner hanger 820, sloped surface 822, gripping member 821, recess 828, and liner 810 remain in the wellbore 881 subsequent to removal of the drill string 815 from the liner 810.

Figure 45:
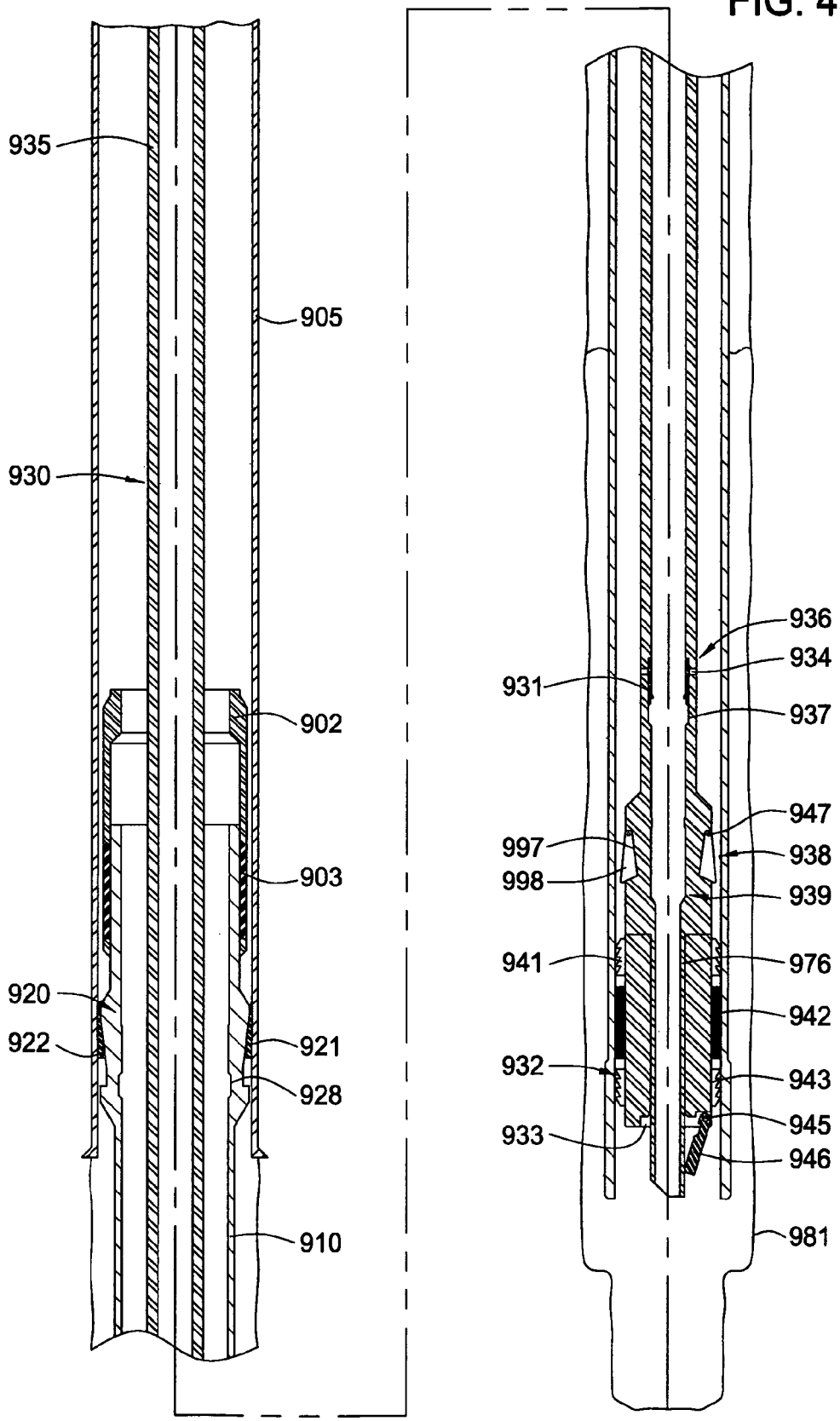
FIG. 45 shows cementing assembly according to aspects of the present invention. The cementing assembly is suitable to perform a cementing operation after wellbore has been lined using the methods disclosed in FIGS. 30-35 or FIGS. 36-44.

Referring to FIG. 45, a cementing assembly 930 which is run into the casing 905, 805, setting sleeve 902, 802, and liner 910, 810 includes a tubing string 935 attached to a float valve sub 932. The tubing string 935 is preferably connected to an upper end of the float valve sub 932. At least a portion of the tubing string 935 includes a circulating sub 936 having one or more ports 934 within a wall of the circulating sub 936 for communicating fluid from the inner bore of the tubing string 935 to the annulus between the outer diameter of the tubing string 935 and the inner diameter of the liner 910, 810. Disposed within a recess 937 of the circulating sub 936 is a hydraulic isolation sleeve 931 to selectively isolate the inner diameter of the bore from fluid flow in the annulus. The hydraulic isolation sleeve 931 is selectively moveable over and away from the port 934 to open or close a fluid path through the port 934.

A further portion of the tubing string 935, which is preferably located below the circulating sub 936 in the tubing string 935, is a sealing member setting tool 938 and sealing member stinger assembly 939. At least a portion of the sealing member stinger assembly 939 is disposed within the bore of the float valve sub 932 to keep the bore of the float valve sub 932 open. The sealing member setting tool 938 is utilized to activate the sealing member 903, 803. The sealing member setting tool 938 includes one or more setting members 998 on one or more hinges 991 biased radially outward to a predetermined radial extension wingspan of the setting members 998. The setting members 998 are disposable within a recess 997 in the setting tool 939 when inactivated, as shown in FIG. 45.

At the lower end of the tubing string 935 is the float valve sub 932 for preventing backflow of cement upon removal of the tubing string 935 (see below). The float valve sub 932 includes a longitudinal bore therethrough and a one-way valve 946, examples of which include but are not limited to flapper valves or check valves. When the one-way valve 946 is activated, the one-way valve 946 permits cement to flow downward through the bore of the float valve sub 932 and into the wellbore 981, 881, yet prevents fluid from flowing into the bore of the float valve sub 932 from the wellbore 981, 881 ("u-tubing"). The one-way valve 946 may be biased upward around a hinge 945, and the arm of the valve 946 may be disposable within a recess 933 in a lower end of the float valve sub 932 when closed.

Disposed around the outer diameter of the float valve sub 932 are one or more gripping members 941, 943, which are preferably slips, for grippingly engaging the inner surface of the liner 910, 810. One or more sealing members 942, which are preferably elastomeric compression-set packers, are also disposed around the outer diameter of the float valve sub 932 for sealingly engaging the inner surface of the liner 910, 810. The one or more sealing members 942 are preferably drillable. Preferably, as is shown in FIG. 45, the sealing members 942 are disposable between gripping members 941, 943.

In operation, the cementing assembly 930 is lowered into the inner diameter of the first casing 905, 805, setting sleeve 902, 802, and liner 910, 810 to the depth at which it is desired to place the float valve sub 932 to prevent backflow of cement during the cementation process. Upon run-in, the one-way valve 946 is propped open by the stinger 976, which forces the one-way valve 946 to remain open despite its bias closed. During run-in, fluid may be circulated through the inner bore of the tubing string 935, then up the inner diameter and/or outer diameter of the liner 910, 810. After the one or more sealing members 942 are located near a lower end of the liner 910, 810, the sealing members 942 are set, preferably by compressing the one or more sealing members 942 out against the inner diameter of the liner 910, 810. FIG. 45 shows the cementing assembly 930 lowered to the desired depth within the liner 910, 810 and the sealing member 942 contacting the inner surface of the liner 910, 810 to substantially seal the annulus between the outer diameter of the float valve sub 932 and the inner diameter of the liner 910, 810. Because the annulus between the liner 910, 810 and the tubing string 935 is now substantially sealed from fluid flow, fluid flow through the tubing string 935 bore must travel up the annulus between the outer diameter of the liner 910, 810 and the wellbore 981, 881.

Figure 46:
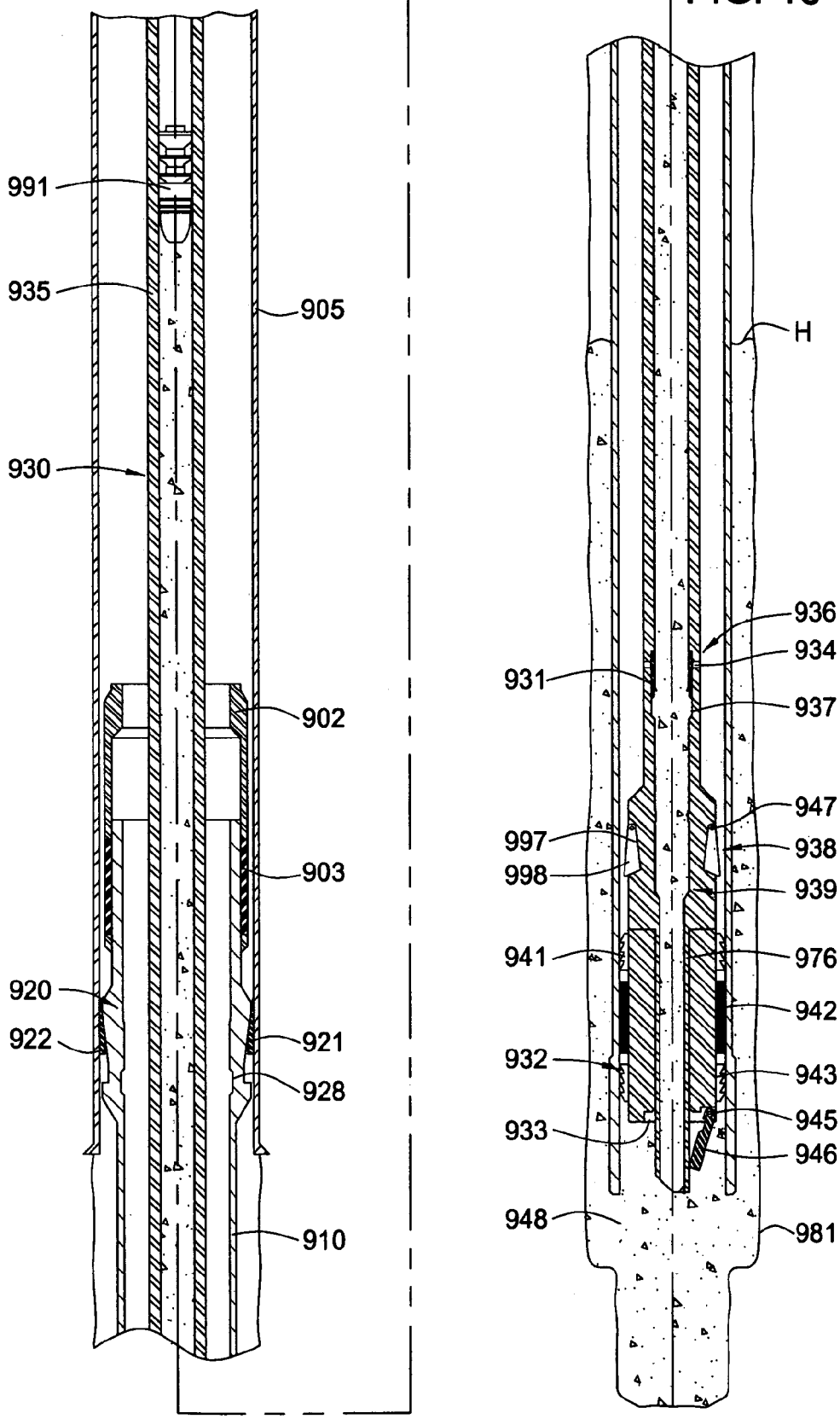
FIG. 46 shows the cementing assembly of FIG. 45 as the cement is chased by a dart.

Optionally, testing of the fluid flow path through the tubing string 935 and up around the liner 910, 810 may be conducted prior to cementing. Referring to FIG. 46, a setting operation is then performed, as a physically alterable bonding material, preferably cement 948, is introduced into the bore of the tubing string 935. The cement 948 is introduced into the tubing string 935, then the cement flows up through the annulus between the liner 910, 810 and the wellbore 981, 881 to the desired height H along the liner 910, 810. Upon the cement 948 achieving the desired height H, a wiper dart 991 is lowered into the bore of the tubing string 935 behind the cement 948. It another embodiment, a ball may be used in place of a dart for the cementing operation.

Figure 47:
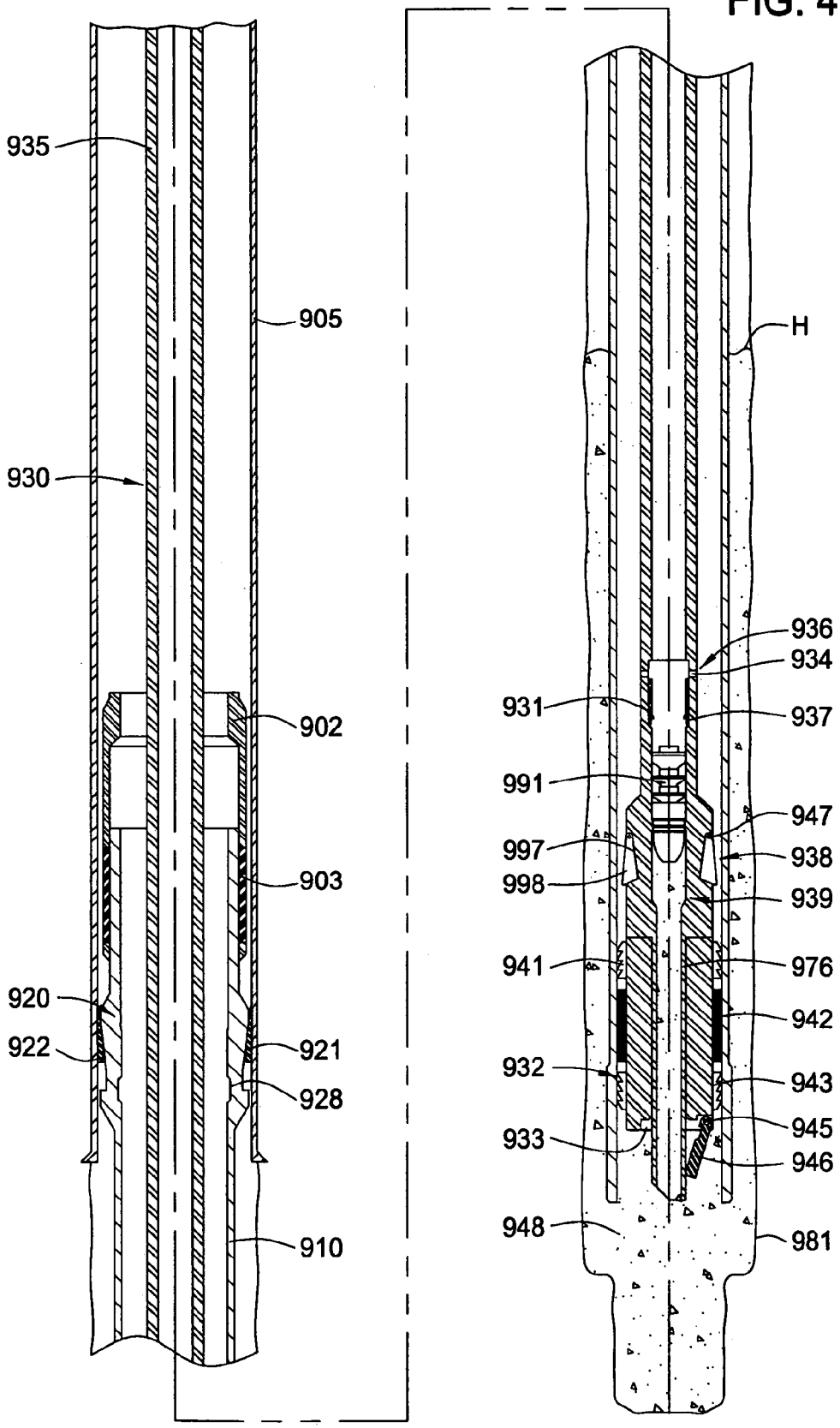
FIG. 47 shows the cementing assembly of FIG. 45 after the circulating ports have been opened.

FIG. 47 depicts the next step in the operation of the cementing process. The wiper dart 991, upon reaching the hydraulic isolation sleeve 931, catches on the sleeve 931 and seals the inner bore of the tubing string 935. Fluid pressure on the wiper dart 991 causes a shear mechanism of the sleeve 931 to fail and moves the sleeve 931 down within the recess 937, thereby exposing the port 934 to fluid flow therethrough between the bore of the tubing string 935 and the annulus between the inner diameter of the liner 910, 810 and the outer diameter of the tubing string 935. The wiper dart 991 travels further below the sleeve 931 within the bore.

Figure 48:
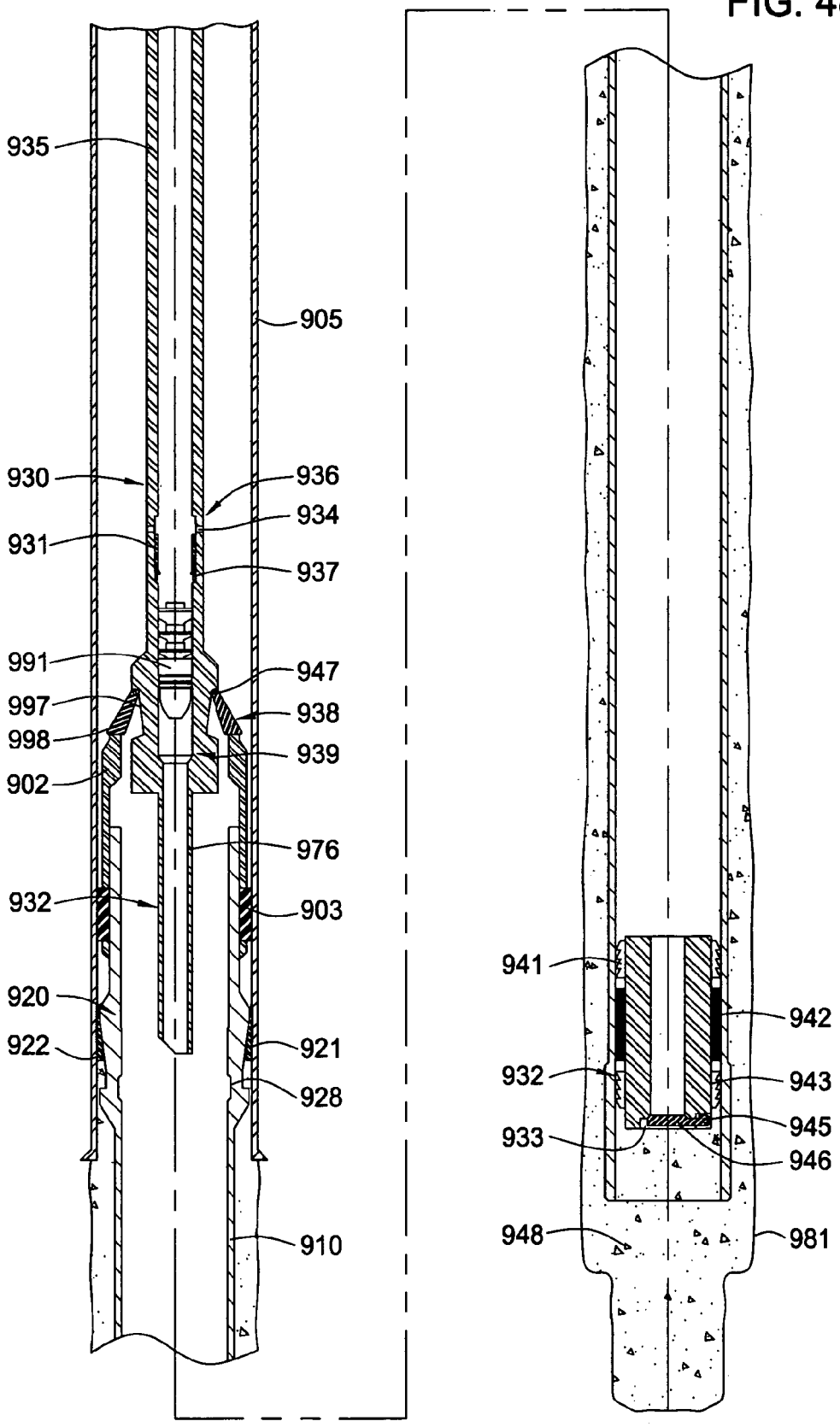
FIG. 48 shows the cementing assembly of FIG. 45 after weight is stacked on top of the liner.

Opening the ports 934 to allow circulating of fluid therethrough permits the tubing string 935 to be removed from the liner 910, 810. Upward force is applied to the tubing string 935 to pull the tubing string 935 to the surface, as shown in FIG. 48. As the stinger 976 is removed from the inner bore of the float valve sub 932, the one-way valve 946 is released so that the biasing force causes the one-way valve 946 to pivot upward around its hinge 945 into the recess 933. At this point, the one-way valve 946 prevents fluid such as cement from flowing upward into the bore of the liner 910, 810.

Also shown in FIG. 48, upon exiting the setting sleeve 902, 802, the setting members 998 are allowed to extend to their full radial extension due to the biasing force. To radially extend the sealing member 903, 803 around an upper portion of the liner 910, 810 into sealing engagement with the inner diameter of the first casing 905, 805, the tubing string 935 is lowered onto the setting sleeve 902, 802 after exiting the setting sleeve 902, 802 so that the setting members 998 set the sealing member 903, 803, preferably by compression of the elastomeric seal on the compression-set sealing member 803, 903. In alternate embodiments of the present invention, a seal may be created by a different approach. For example, the seal could be created through expansion of a metal tube against the casing 905, 805, employing either a metal-to-metal seal or using an expandable tube clad with an elastomeric seal on its outer surface.

Figure 49:
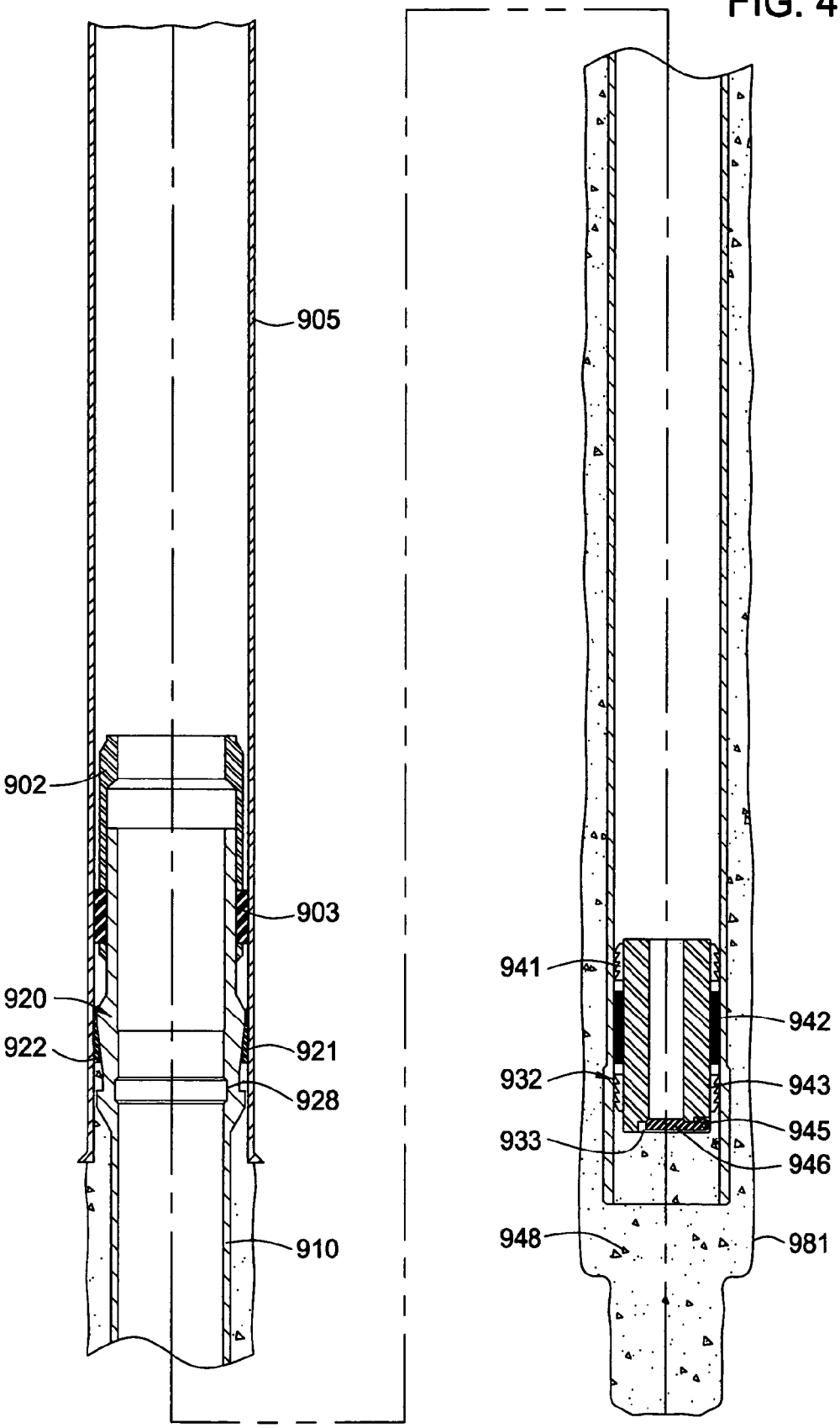
FIG. 49 shows the cementing assembly of FIG. 45 after the packer has been set and the work string of the cementing assembly has been retrieved.

The tubing string 935 is then removed from the wellbore 981, 881 to leave the liner 910, 810 set and sealed within the formation, as shown in FIG. 49. The components within the float valve sub 932 are preferably drillable (including the sealing member 942) so that a subsequent earth removal member (not shown) may drill through the float valve sub 932 and possibly further into the formation to form a wellbore of a further depth. The subsequent earth removal member may be attached to a liner or casing to case the further depth of the formation. Also, the subsequent earth removal member may be attached to an additional liner which is part of an additional drilling assembly (which may optionally include the same drill string 915, 815 which was removed from the wellbore) similar to the drilling assembly 900, 800 shown and described in relation to FIGS. 30-44, the liner drilling assembly capable of casing a further depth of a wellbore in the formation. An additional cementing operation may be performed on the additional liner left within the wellbore. The process may be repeated as desired any number of times to complete the wellbore to total depth within the formation.

Figure 50:
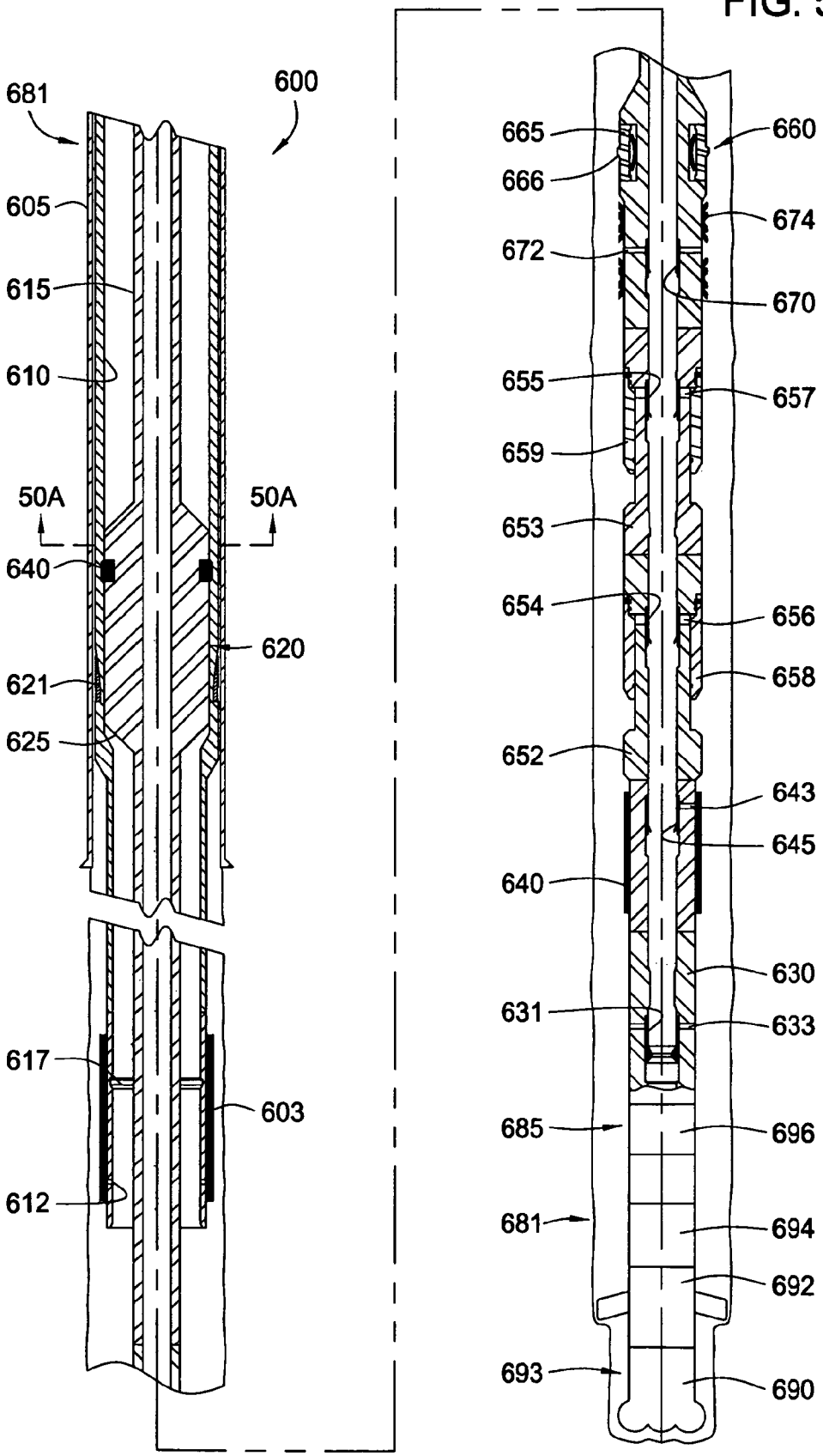
FIG. 50 shows an embodiment of a liner assembly for lining and cementing the liner in one trip.

Aspects of the present invention also provide methods and apparatus for casing a section of the wellbore in one trip. FIG. 50 shows a first casing 605 which was previously lowered into a wellbore 681 and set therein, preferably by a physically alterable bonding material such as cement. In the alternative, the casing 605 may be set within the wellbore 681 using any type of hanging tool. Preferably, the first casing 605 is drilled into an earth formation by jetting and/or rotating the first casing 605 to form the wellbore 681.

Disposed within the first casing 605 is a second casing or liner 610. The liner 610 includes a hanger 620 on a portion of its outer diameter, the hanger 620 having one or more gripping members 621, preferably slips. The hanger 620 further includes a sloped surface on the outer diameter of the liner 610 along which the gripping members 621 translate radially outward to hang the liner 610 off the inner diameter of the casing 605.

Connected to an outer surface of a lower end of the liner 610 is one or more sealing members 603 on its outer diameter. The sealing members 603 preferably being one or more packers and even more preferably being one or more inflatable packers constructed of an elastomeric material. The sealing members 603 include one or more inflation ports 612 in selectively fluid communication with the interior of the liner 610. The sealing member 603 may be actuated to seal off an annulus between the liner 610 and the wellbore 681.

The liner 610 has a drill string 615, which may also be termed a circulating string, disposed substantially coaxially therein and releasably connected thereto. The drill string 615 is a generally tubular-shaped body having a longitudinal bore therethrough. The drill string 615 and the liner 610 form a liner assembly 600. FIG. 50 shows the liner assembly 600 drilled to the liner 610 setting depth within the formation.

The drill string 615 includes a running tool 625 at its upper end and a BHA 685 at its lower end. Specifically, the running tool 625 includes a latch 640. An outer surface of the running tool 625 has a recess therein for receiving the latch 640. The latch 640 is radially extendable into a recess in an inner surface of the liner 610 to selectively engage the liner 610. When the latch 640 is extended into the recess of the liner 610, the liner 610 and the drill string 615 are latched together. The latch 640 is capable of transmitting axial as well as rotational force, forcing the liner 610 and the drill string 615 to translate together while connected.

Preferably, the running tool comprises a fluid bypass assembly 613. FIG. 50A shows a fluid bypass assembly 613 capable of use with the running tool. Each bypass assembly 613 may comprise one or more spokes 607 having one or more annuluses 608 therebetween for flowing fluid therethrough. The one or more bypass assemblies 613 allow drilling fluid to circulate through the annulus between the liner and the drill string during the wellbore operations, as described below. It should also be noted that aspects of the drilling systems discussed herein are applicable to the present embodiment and other embodiments. For example, the drilling system shown in FIG. 50 may further include a fluid bypass assembly having one or more bypass ports. In this respect, fluid from the drill string 615 may be diverted into the annular space between the liner 610 and the wellbore 681. Additionally, the drilling system may employ a sealing member 448 to seal off an annular area between the existing casing and the liner.

The BHA 685 is adapted to perform several functions during the drilling of the liner assembly 600. Specifically, the BHA 685 includes a measuring-while-drilling ("MWD") sub 696 capable of locating one or more measuring tools therein for measuring formation parameters. A motor 694, preferably a mud motor, is also disposed within the BHA 685 above an earth removal member 693, which is preferably a cutting apparatus. As shown in FIGS. 50-59, the earth removal member 693 includes an underreamer 692 located above a drill bit 690. Because many of the components in FIG. 50 are substantially the same as the components shown and described in FIG. 30, the above description and operation of the similar components with respect to FIG. 30 apply equally to the components of FIG. 50.

The BHA 685 further includes a first circulating sub 630. Within an inner, longitudinal bore of the first circulating sub 630 is a ball seat 631. A wall of the circulating sub 630 includes one or more ports 633 therethrough. The ball seat 631 is slidably disposed and moveable relative to the ports 633 to selectively open and close the ports 633.

A second sealing member 640 is disposed adjacent the first circulating sub 630. Preferably, the second sealing member 640 comprises an inflatable packer. Within the inner bore of the drill string 615 is a ball seat 645 to selectively open the inflation ports 643 of the second sealing member 640.

The BHA further includes a second circulating sub 652 and a third circulating sub 653 disposed above the second sealing member 640. Each of the circulating subs 652, 653 has a ball seat 654, 655 disposed therein and one or more ports 656, 657 formed through a wall of the circulating sub 652, 653. The ball seat 654, 655 is slidably disposed and moveable relative to the ports 656, 657 to selectively open and close the ports 656, 657. A port sleeve 658, 659 enclosing the ports 656, 657 is movably disposed on the outer surface of the circulating sub 652, 653. The port sleeve 658, 659 may be actuated by fluid flow through the port 656, 657. In another embodiment, one or more rupture disks may be used to enclose ports 656, 657. The rupture disks may be adapted to fail at a predetermined pressure.

The BHA also includes a packoff sub 660. The packoff sub 660 comprises a locator member 665 for engaging the liner 610 to indicate position. Preferably, the locator member 665 comprises one or more latch dogs 666 adapted to engage a profile 617 on the inner surface of the liner 610. The packoff sub 660 also includes ball seat 670 movably disposed within the inner bore of the drill string 615. The ball seat 670 may be actuated to open the one or more setting ports 672 disposed through a wall of the packoff sub 660. One or more seals 674 are disposed on either side of the setting ports 672. When the latch dogs 666 engage the profile 617, the setting ports 672 are placed in alignment with the inflation port 612 of the casing sealing member 603. Additionally, the seals 674 on either of the setting ports 672 form an enclosed area for fluid communication between the setting ports 672 and the inflation ports 612. Preferably, the packoff sub 660 of the BHA 685 is disposed the lower end of the liner 610 while drilling the liner assembly 600 into the formation. To this end, the packoff sub 660 will not obstruct the annular space between the inner diameter of the liner 610 and the outer diameter of the drill string 615, thereby allowing for cuttings from the drilling process to be circulated up through the inside of the liner 610 and the past the running tool 625.

In operation, the liner drilling assembly 600 is lowered into the formation to form a wellbore 681. During run-in of the liner assembly 600, the latch 640 is radially extended to selectively engage the recess in the liner 610. In this way, the drill string 615 and the liner 610 are releasably connected during drilling. The motor 694 may be operated to rotate the earth removal member 693 to facilitate the advancement to the liner drilling assembly 600. FIG. 50 shows the liner drilling assembly 600 after reaching the desired depth.

While drilling into the formation with the liner assembly 610, drilling fluid is preferably circulated. The ports 633, 643, 656, 657, 672 in the BHA 685 are initially closed off by their respective ball seats 631, 645, 654, 655, 670. The drilling fluid introduced into the inner longitudinal bore of the drill string 615 from the surface flows through the drill string 615 into and through one or more nozzles (not shown) of the drill bit 690. The fluid then flows upward around the lower portion of the BHA 685 carrying cuttings generated by the drilling process. The fluid then flow through the annulus between the drill string and the liner and between the spokes of the fluid bypass assembly 613. Additionally, a small amount of fluid may flow between the liner 610 and the wellbore 681. Thus, the volume of fluid which may be circulated while drilling is increased due to the multiple fluid paths (one fluid path between the wellbore 681 and the outer diameter of the liner 610, the other fluid path between the inner diameter of the liner 610 and the outer diameter of the drill string 615) created by the embodiment shown in FIG. 50 of the liner drilling assembly 600. It must be noted that aspects of the present invention are equally applicable to annular circulation systems, as is known to a person of ordinary skill in the art. It should also be noted that aspects of the drilling systems discussed herein are applicable to the present embodiment and other embodiments. For example, the drilling system shown in FIG. 50 may further include a fluid bypass assembly having one or more bypass ports. In this respect, fluid from the drill string 615 may be diverted into the annular space between the liner 610 and the wellbore 681. Additionally, the drilling system may employ a sealing member 448 to seal off an annular area between the existing casing and the liner.

Figure 51:
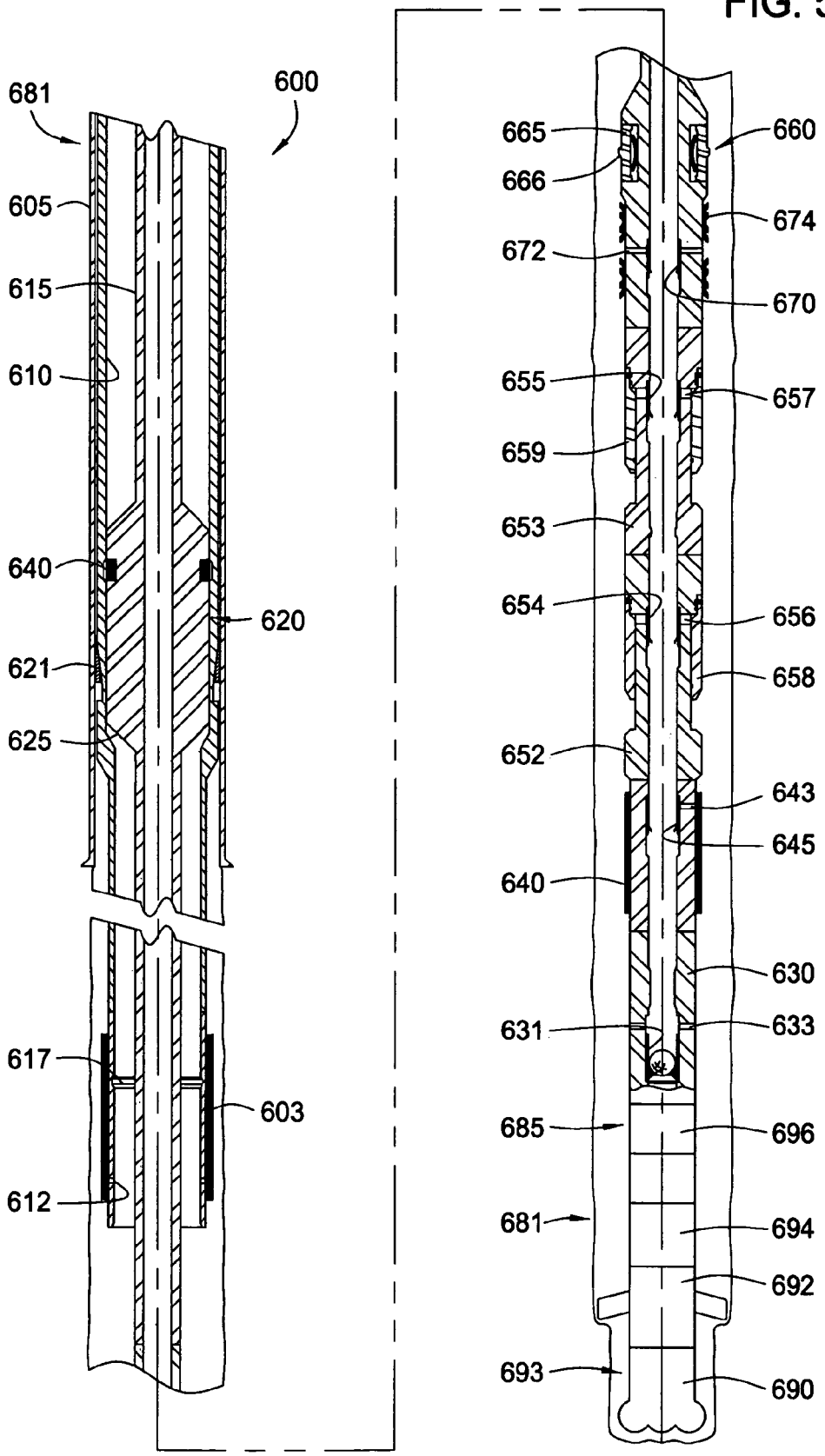
FIG. 51 shows the liner assembly of FIG. 50 after the hanger has been set.

Initially, a ball is released in the drill string 615 and lands in the ball seat 631 of the first circulation sub 630, as shown FIG. 51. Pressure is applied to the drill string 615 to set the liner hanger 620 by extending the slips 621 outward to engage the first casing 605. Additionally, the pressure increase also releases the latch 640, thereby freeing running tool 625 from the liner 610.

Figure 52:
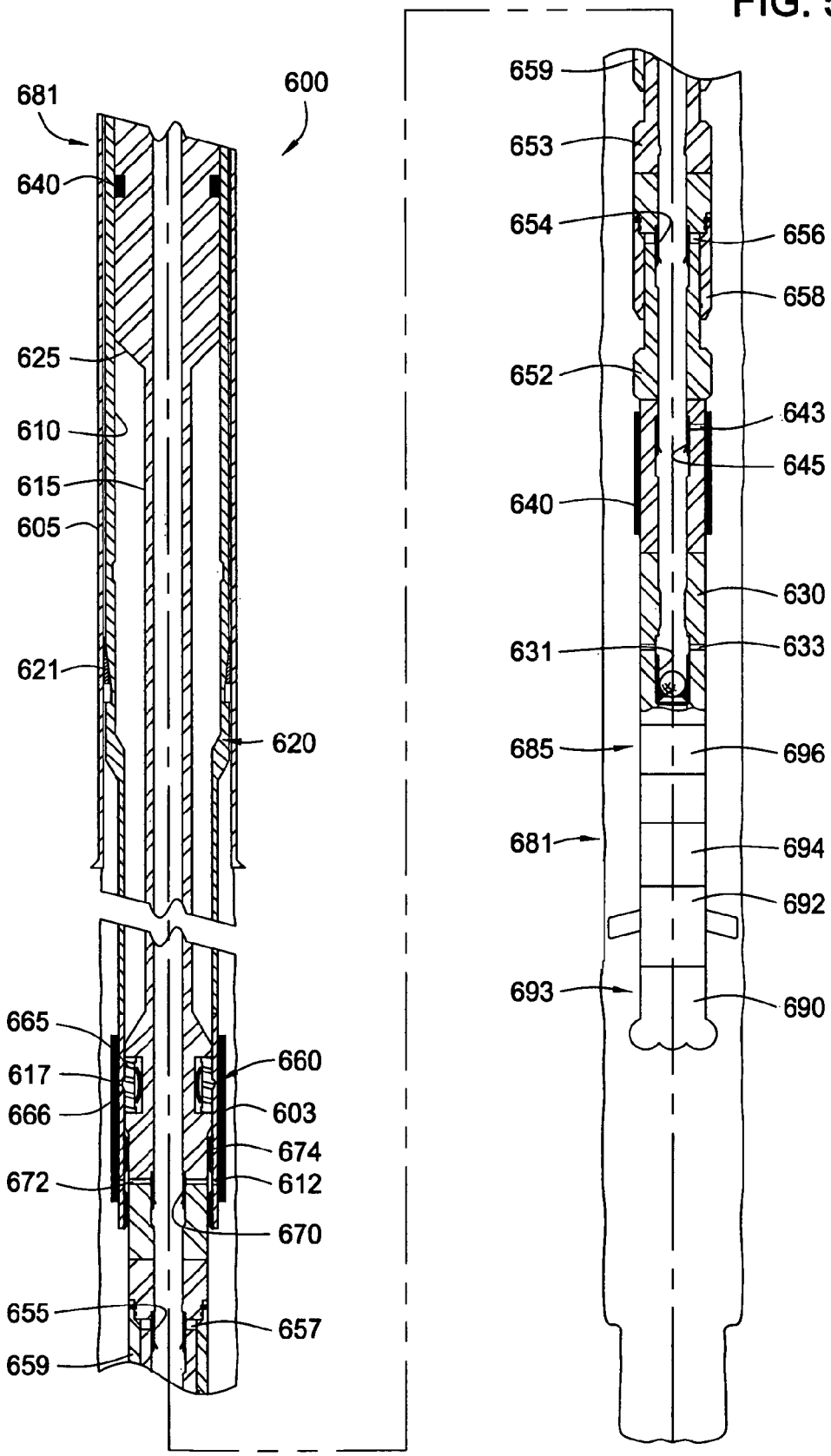
FIG. 52 shows the liner assembly of FIG. 50 after the BHA is coupled to the casing sealing member.

Thereafter, more pressure is applied to shift the ball seat 631 of the first circulation sub 630, as illustrated in FIG. 52. In one embodiment, the pressure increase causes a shear mechanism retaining the ball seat 631 to fail.

After the running tool is released, the drill string 615 is raised until the latch dogs 666 of the locating member 665 engage the profile 617 on the liner 610. The locator member 665 ensures that the setting port 672 is aligned with the inflation port 612 of the casing sealing member 603, and that the seals 674 are located on both sides of the ports 672, 612.

Figure 53:
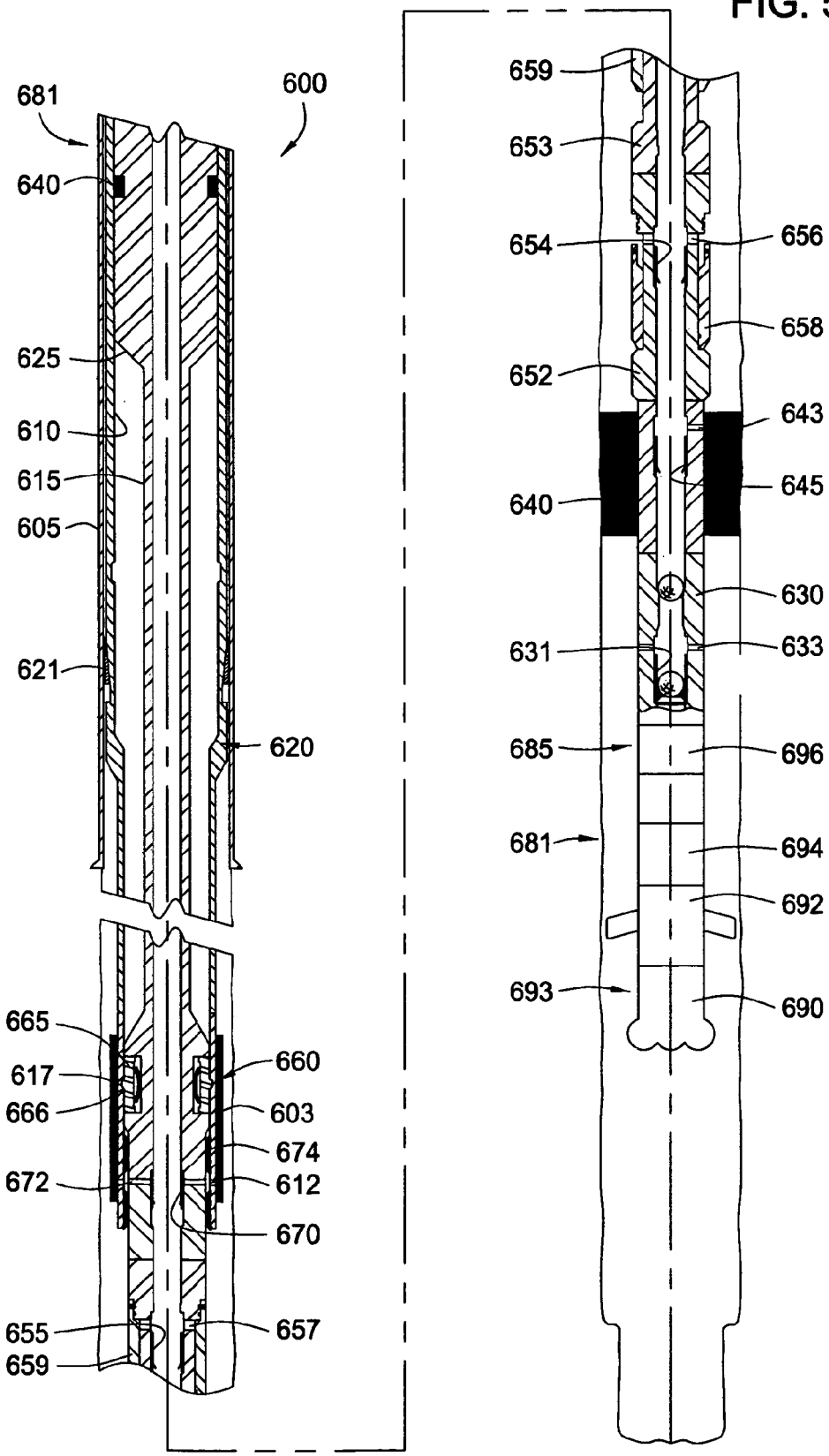
FIG. 53 shows the liner assembly of FIG. 50 after second sealing member has been inflated.

In FIG. 53, a second ball has been released in the drill string 615. The second ball is circulated down to the bottom of the drill string 615. As the second passes the second and third circulation subs 652, 653 and the second sealing member 640, it trips the isolation sleeves of these components. As a result, the components 652, 653, 640 are ready to sense any applied pressure differential across their respective activation devices. In the embodiment shown, the ball seats 645, 654, 655 have been shifted down as the second ball is circulated down. In turn, the port sleeves 658, 659 are exposed to the pressure in the drill string 615 through the respective ports 656, 657.

Thereafter, pressure is increased to inflate the second sealing member 640. The inflated sealing member 640 blocks fluid communication in the annulus between the drill string 615 and the wellbore 681. Then, pressure is increased further to shift the port sleeve 658 of the second circulating sub 652 to the open position. Because of the inflated second sealing member 640, fluid exiting the open port 656 is circulated up the annulus.

In another aspect, the second sealing member 640 may be used as a blow out preventor during run in of the drill string assembly into the hole on an offshore drilling vessel or platform. If the well should kick, which is an influx of fluid, such as gas, coming into the well bore in an uncontrolled fashion, during the running in of the drilling assembly through the blow-out preventor and the liner is physically located in the preventor and the inner diameter of the liner annulus between the drill string is open to flow, then the blow-out preventor can not shut off the kick which can flow up the open annular area. To this end, the second sealing member 640 may be inflated with a special rupture dart (not shown) that will set the second sealing member 640 but not the liner hanger. In this respect, the second sealing member 640 may seal off the annulus between the drill string and the liner. After the second sealing member 640 is set, the rupture dart will rupture and allow fluid to by-pass to the bottom of the drill string. This will allow the pumping of kill fluid, to kill the kick and regain control of the well. By rotation of the drilling assembly after the well is under control the second sealing member 640 can be deflated and the drilling assembly pulled out of the hole to redress the second sealing member 640 for use in the cementing operation.

Figure 54:
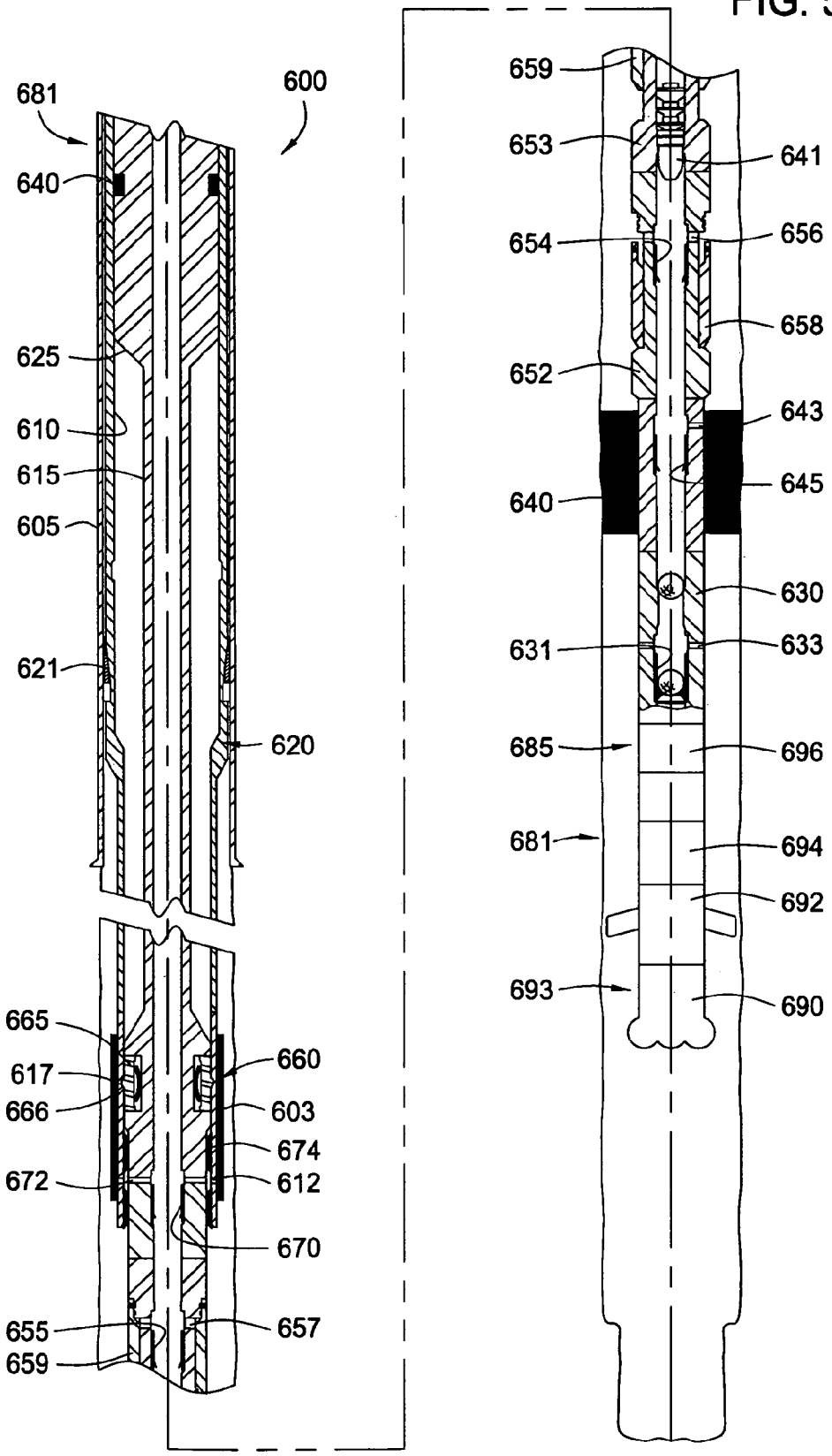
FIG. 54 shows the liner assembly of FIG. 50 after the first dart has landed.

A first dart 641 is released from surface, as shown in FIG. 54. Preferably, the first dart 641 is adapted to wipe the inner surface of the drill string 615 as it travels down the drill string 615. In one embodiment, the first dart 641 is trailed by a small polymer slug, a scavenger slurry, the cement, and another small polymer slug. The dart 641 is displaced until it lands in a receiving profile below the port 657 of the third circulating sub 653, thereby sealing off the drill string 610 at the profile.

Figure 55:
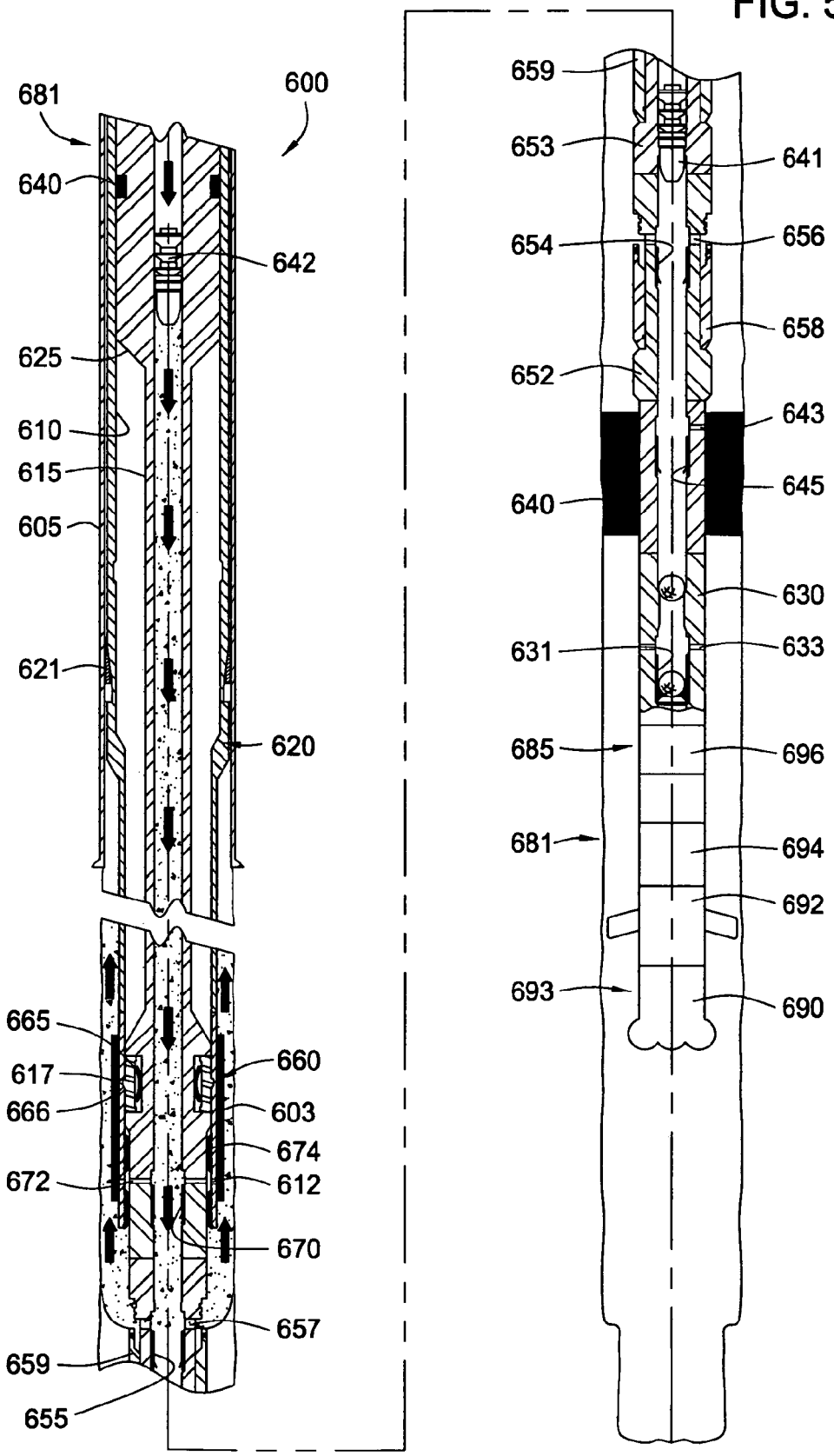
FIG. 55 shows the liner assembly of FIG. 50 after circulation sub has been opened for cementing.

In FIG. 55, pressure is increased to shift port sleeve 659 of the third circulating sub 653 to the open position. Fluid behind the first dart 641 is displaced through the opened port 657 and up the annulus between the liner 615 and the wellbore 681.

Figure 56:
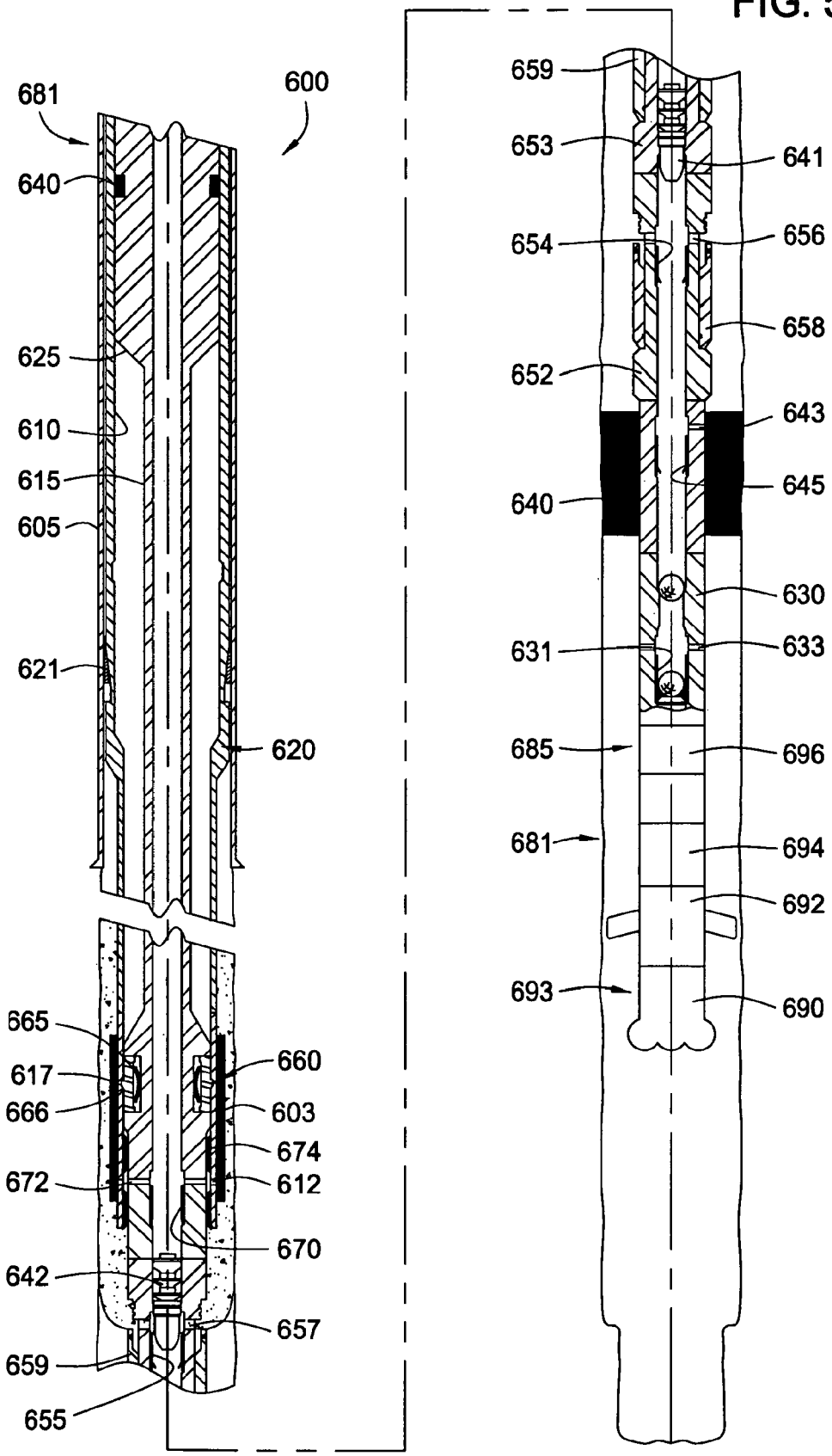
FIG. 56 shows the liner assembly of FIG. 50 after second dart has landed.

In FIG. 56, a second dart 642 is shown chasing the slurry to bottom. As the second dart passes the ball seat 670 of the packoff sub 660, it shifts the ball seat 670 to expose the inflation port 612 of the casing sealing member 603 to the pressure in the drill string 615. The second dart 642 will eventually land in a profile above the ports 657 of the third circulating sub 653.

Figure 57:
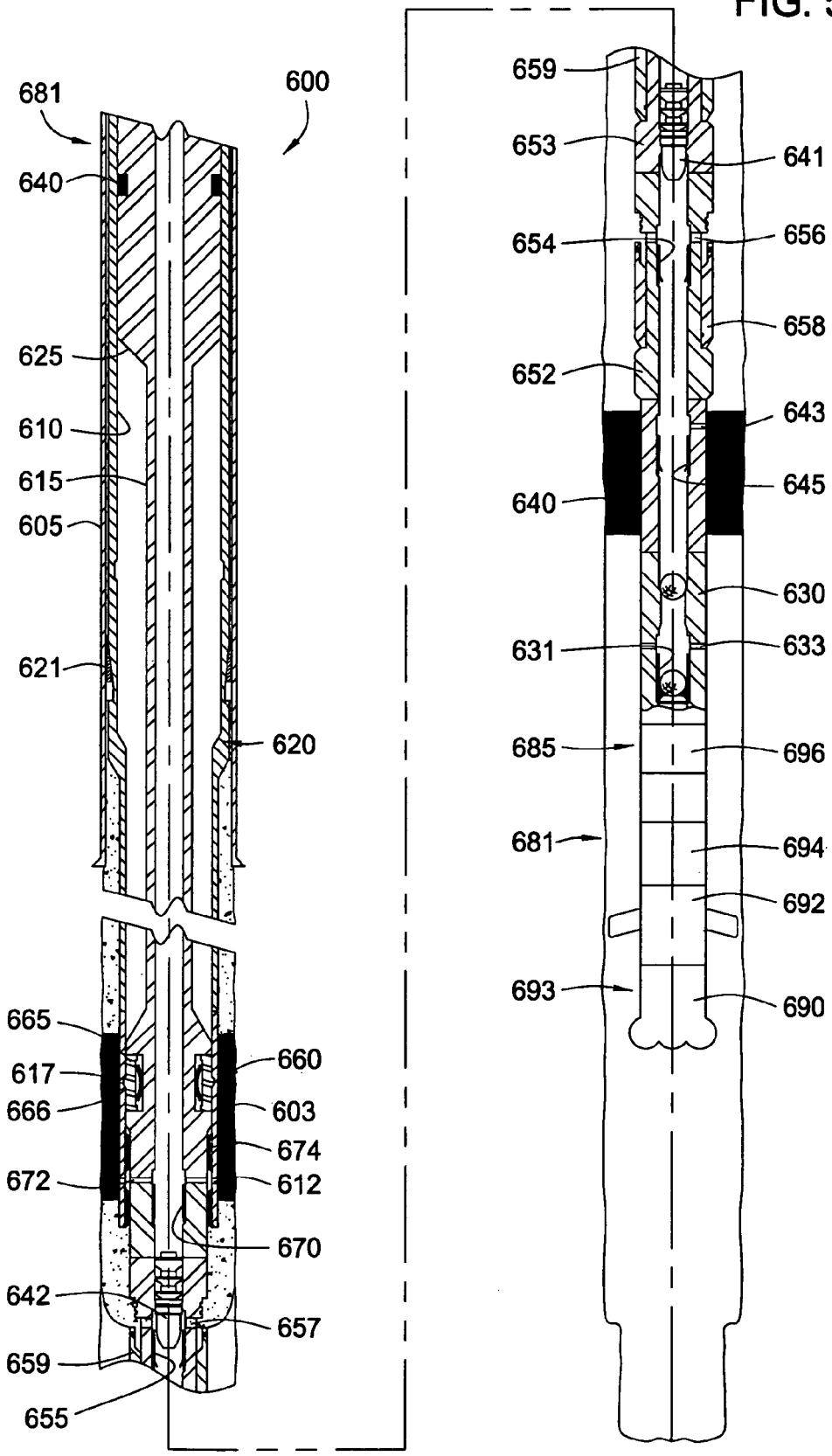
FIG. 57 shows the liner assembly of FIG. 50 after the casing sealing member has been inflated.

After the second dart 642 lands in the profile, pressure is increased to inflate the casing sealing member 603. As shown in FIG. 57, the inflated casing sealing member 603 seals off the annulus between the liner 610 and the wellbore 681. In this respect, the cement is held in place by the casing sealing member 603 and cannot u-tube back into the liner 610.

Figure 58:
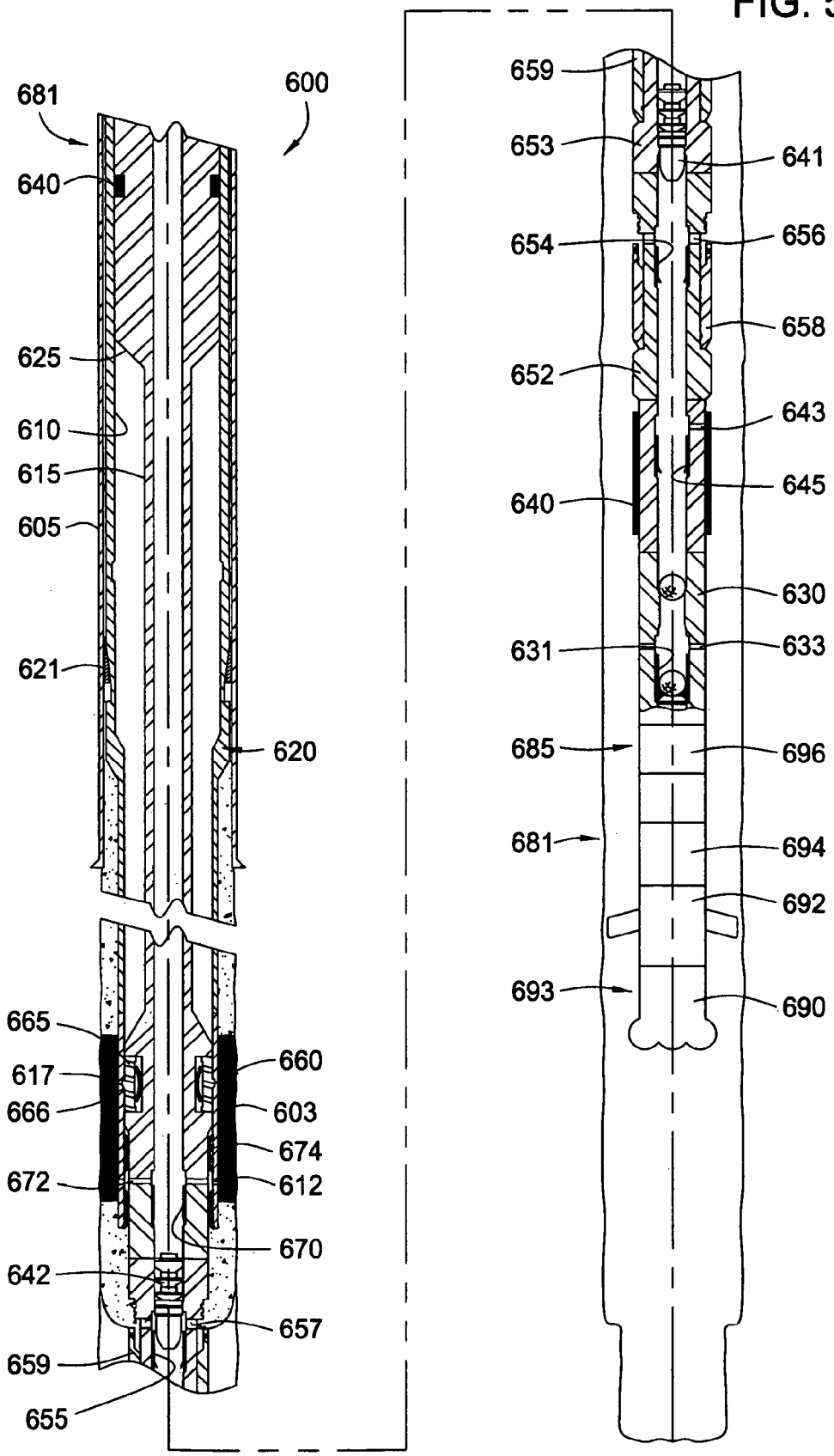
FIG. 58 shows the liner assembly of FIG. 50 after the second sealing member has been deactuated.
Figure 59:
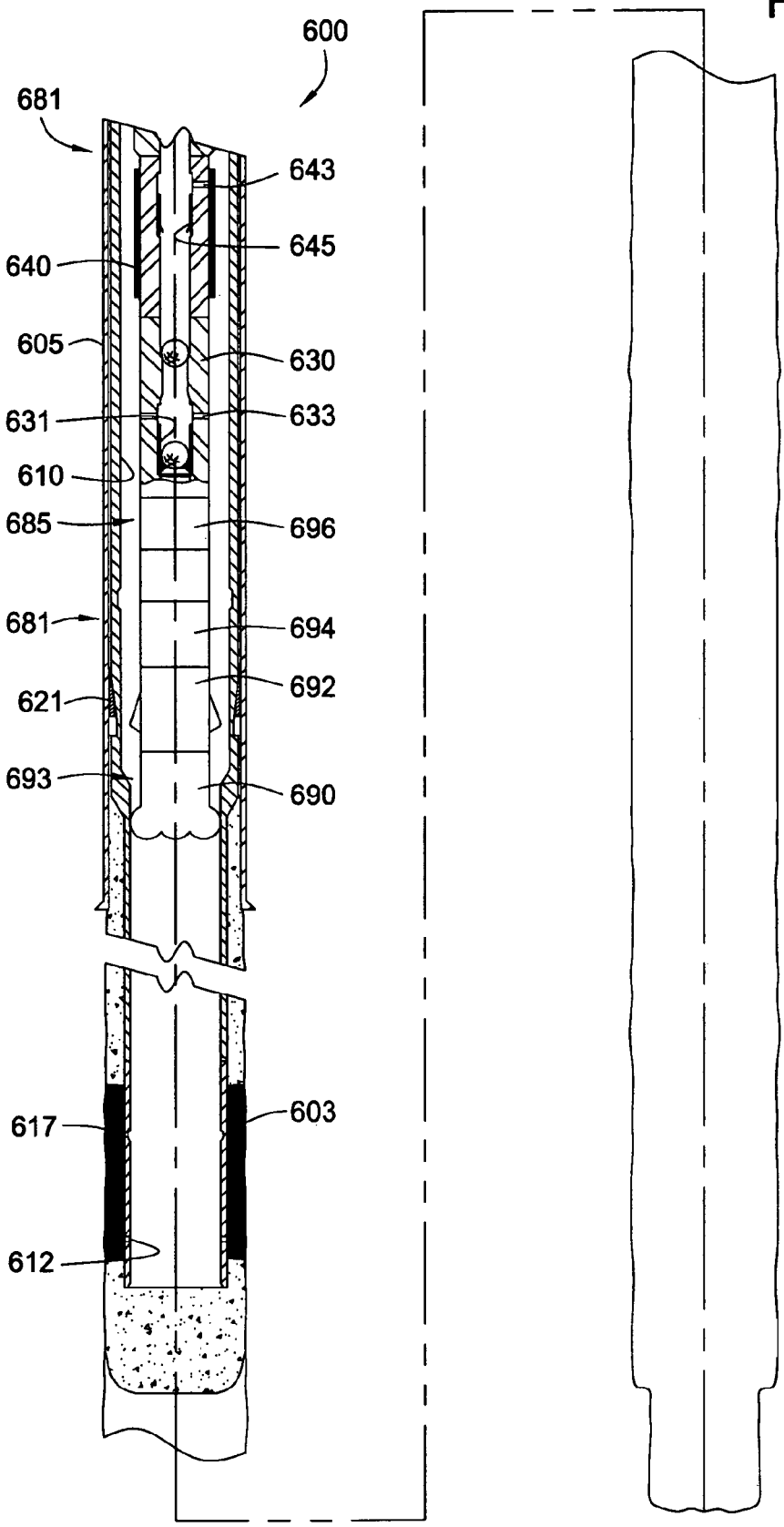
FIG. 59 shows the liner assembly of FIG. 50 liner assembly during retrieval.

Thereafter, drill string 615 is rotated to deflate and release the second sealing member 640, as shown in FIG. 58. Thereafter, drill string 615 is pulled out of the hole, as shown in FIG. 59. When the setting ports 672 of the packoff sub 660 clears the liner top, fluid can equalize through the setting ports 672 from the drill string 615 to the first casing 605, so a wet drill string 615 is not pulled. This feature could also be achieved by a burst disk in dart 642, which would allow for fluid equalization through circulating sub 653.

Aspects of the present invention also provide apparatus and methods for effectively increasing the carrying capacity of the circulating fluid.

Figure 60:
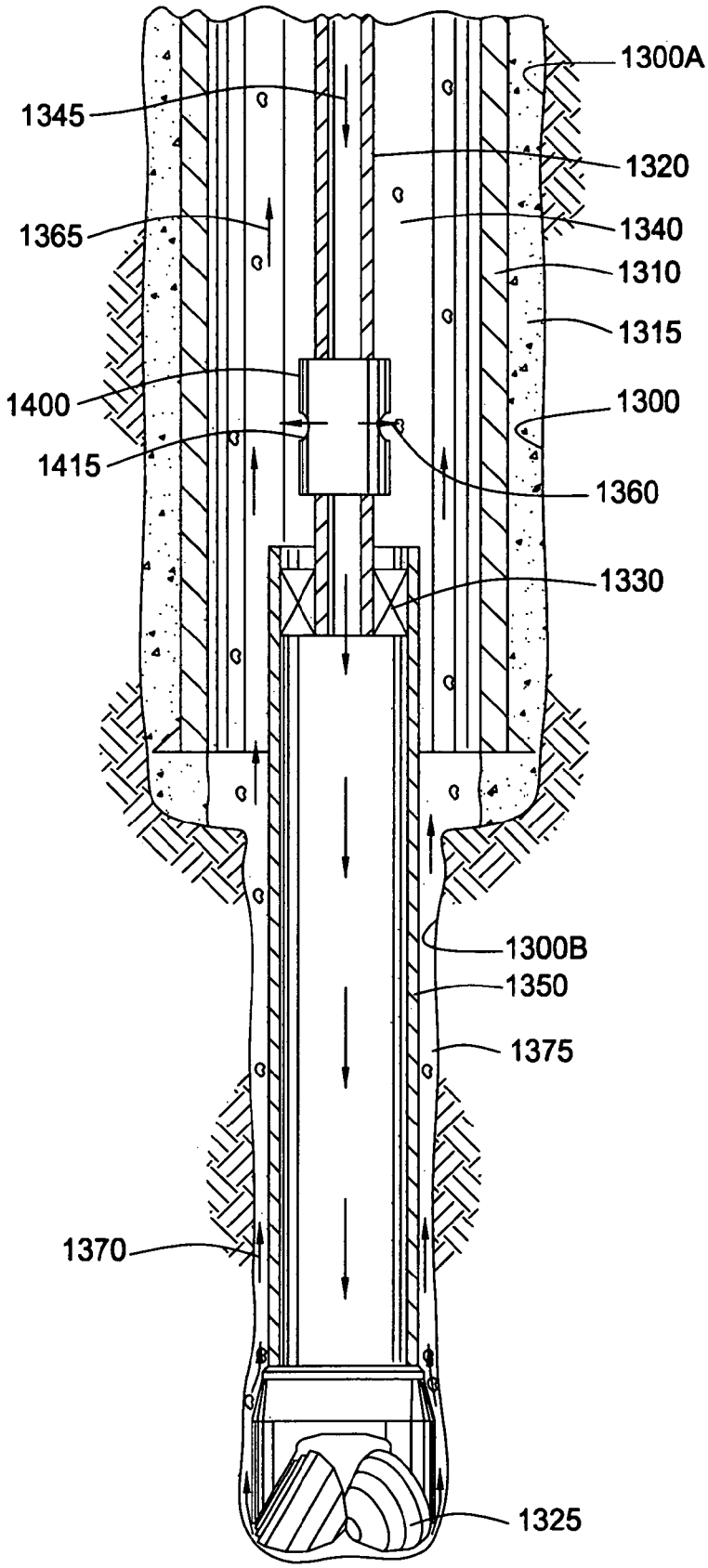
FIG. 60 is a cross-sectional view of a drilling assembly having a flow apparatus disposed at the lower end of the work string.

FIG. 60 is a section view of a wellbore 1300. For clarity, the wellbore 1300 is divided into an upper wellbore 1300A and a lower wellbore 1300B. The upper wellbore 1300A is lined with casing 1310, and an annular area between the casing 1310 and the upper wellbore 1300A is filled with cement 1315 to strengthen and isolate the upper wellbore 1300A from the surrounding earth. The lower wellbore 1300B comprises the newly formed section as the drilling operation progresses.

Coaxially disposed in the wellbore 1300 is a drilling assembly. The drilling assembly may include a work string 1320, a running tool 1330, and a casing string 1350. The running tool 1330 may be used to couple the work string 1320 to the casing string 1350. Preferably, the running tool 1330 may be actuated to release the casing string 1350 after the lower wellbore 1300B is formed and the casing string 1350 is secured.

As illustrated, a drill bit 1325 is disposed at the lower end of the casing string 1350. Generally, the lower wellbore 1300B is formed as the drill bit 1325 is rotated and urged axially downward. The drill bit 1325 may be rotated by a mud motor (not shown) located in the casing string 1350 proximate the drill bit 1325. Alternatively, the drill bit 1325 may be rotating by rotating the casing string 1350. In either case, the drill bit 1325 is attached to the casing string 1350 that will subsequently remain downhole to line the lower wellbore 1300B. As such, there is no opportunity to retrieve the drill bit 1325 in the conventional manner. In this respect, drill bits made of drillable material, two-piece drill bits or bits integrally formed at the end of casing string are typically used.

Circulating fluid or "mud" is circulated down the work string 1320, as illustrated with arrow 1345, through the casing string 1350, and exits the drill bit 1325. The fluid typically provides lubrication for the drill bit 1325 as the lower wellbore 1300B is formed. Thereafter, the fluid combines with other wellbore fluid to transport cuttings and other wellbore debris out of the wellbore 1300. As illustrated with arrow 1370, the fluid initially travels upward through a smaller annular area 1375 formed between the outer diameter of the casing string 1350 and the lower wellbore 1300B. Because of the smaller annular area 1375, the fluid travels at a high annular velocity.

Subsequently, the fluid travels up a larger annular area 1340 formed between the work string 1320 and the inside diameter of the casing 1310 as illustrated by arrow 1365. As the fluid transitions from the smaller annular area 1375 to the larger annular area 1340, the annular velocity of the fluid decreases. Because the annular velocity decreases, the carrying capacity of the fluid also decreases, thereby increasing the potential for drill cuttings and wellbore debris to settle on or around the upper end of the casing string 1350.

To increase the annular velocity, a flow apparatus 1400 is used to inject fluid into the larger annular area 1340. In FIG. 60, the flow apparatus 1400 is shown disposed on the work string 1320. Although FIG. 60 shows one flow apparatus 1400 attached to the work string 1320, any number of flow apparatus may be coupled to the work string 1320 or the casing string 1350. The flow apparatus 1400 may divert a portion of the circulating fluid into the larger annular area 1340 to increase the annular velocity of the fluid traveling up the wellbore 1300. It is to be understood, however, that the flow apparatus 1400 may be disposed on the work string 1320 at any location, such as adjacent the casing string 1350 as shown on FIG. 60 or further up the work string 1320. Furthermore, the flow apparatus 1400 may be disposed in the casing string 1350 or below the casing string 1350, so long as the lower wellbore 1300B will not be eroded or over pressurized by the circulating fluid.

In another aspect, the flow apparatus may comprise a flow operated external pump to increase the annular velocity. The flow operated pump would take energy off the flow stream being pumped down the tubular assembly instead of diverting fluid off the flow stream e.g., the fluid pressure in the flow stream above the drive mechanism of the external pump would be higher than the fluid pressure in the flow stream below the drive mechanism. The external pump would reduce the equivalent circulating density of the fluid in the annulus 1340 helping to lift the fluid and cuttings to the surface. The external pump can be selectively operated from being shut off to maximum flow. Also the external pump can be supplied with energy from the surface other than the flow stream, e. g., electrical energy, hydraulic energy, pneumatic, etc. Also the external pump may have it's own energy supply such as compressed gas. Further, the control of the external pump from the surface may be by fiber optics, mud pulse, hard wring, hydraulic line, or any manner known to a person of ordinary skill in the art. In a further aspect, the drill string may be equipped with one or more of a fluid diverting flow apparatus, a flow operated external pump, or combinations thereof.

One or more ports 1415 in the flow apparatus 1400 may be modified to control the percentage of flow that passes to drill bit 1325 and the percentage of flow that is diverted to the larger annular area 1340. The ports 1415 may also be oriented in an upward direction to direct the fluid flow up the larger annular area 1340, thereby encouraging the drill cuttings and debris out of the wellbore 1300. Furthermore, the ports 1415 may be systematically opened and closed as required to modify the circulation system or to allow operation of a pressure controlled downhole device.

The flow apparatus 1400 is arranged to divert a predetermined amount of circulating fluid from the flow path down the work string 1320. The diverted flow, as illustrated by arrow 1360, is subsequently combined with the fluid traveling upward through the larger annular area 1340. In this manner, the annular velocity of fluid in the larger annular area 1340 is increased which directly increases the carrying capacity of the fluid, thereby allowing the cuttings and debris to be effectively removed from the wellbore 1300. At the same time, the annular velocity of the fluid traveling up the smaller annular area 1375 is lowered as the amount of fluid exiting the drill bit 1325 is reduced. In this respect, damage or erosion to the lower wellbore 1300B by the fluid traveling up the annular area 1375 is minimized.

Figure 61:
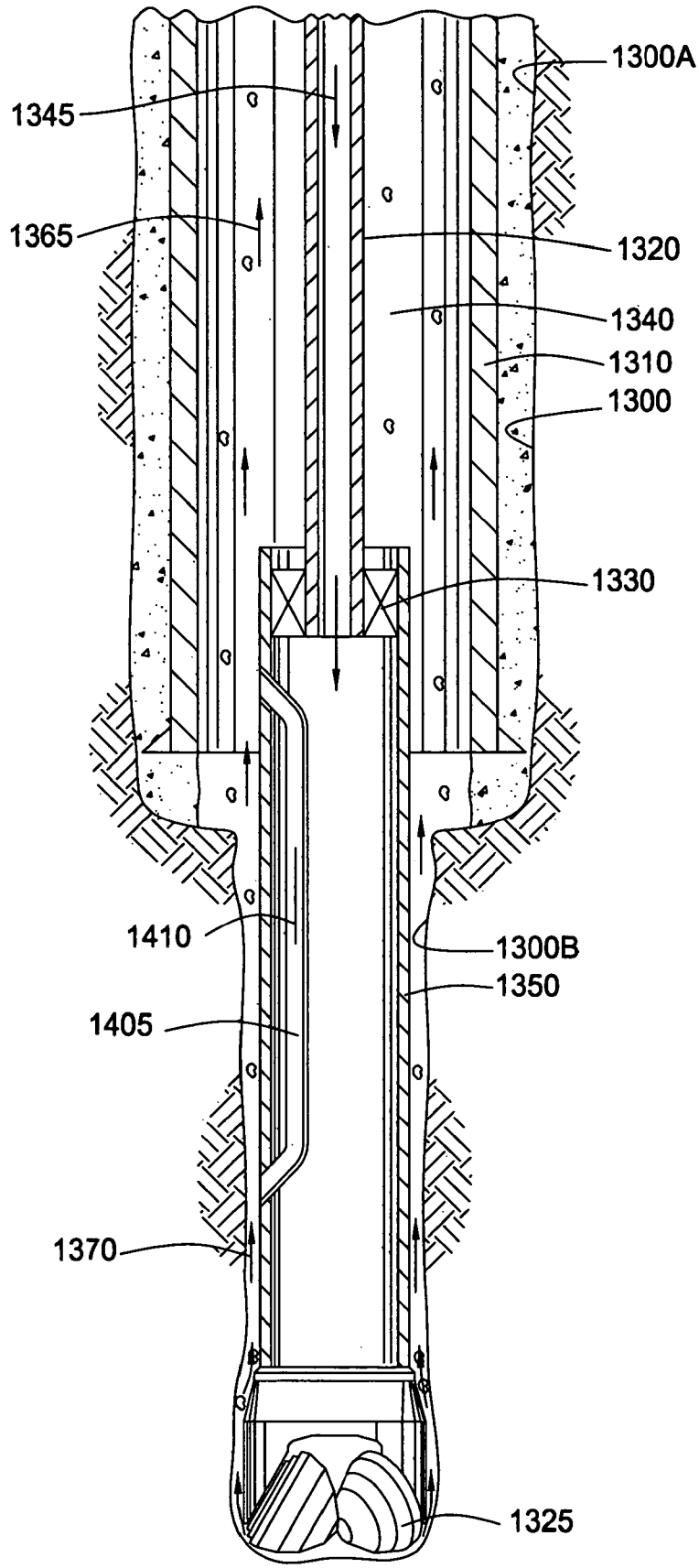
FIG. 61 is a cross-sectional view of a drilling assembly having an auxiliary flow tube partially formed in a casing string.

FIG. 61 is a cross-sectional view illustrating another embodiment of a drilling assembly having an auxiliary flow tube 1405 partially formed in the casing string 1350. As illustrated with arrow 1345, circulating fluid is circulated down the work string 1320, through the casing string 1350, and exits the drill bit 1325 to provide lubrication for the drill bit 1325 as the lower wellbore 1300B is formed. Thereafter, the fluid combines with other wellbore fluid to transport cuttings and other wellbore debris out of the wellbore 1300.

As illustrated with arrow 1370, the fluid initially travels at a high annular velocity upward through a portion of the smaller annular area 1375 formed between the outer diameter of the casing string 1350 and the lower wellbore 1300B. However, at a predetermined distance, a portion of the fluid in the smaller annular area 1375, as illustrated by arrow 1410, is redirected through the auxiliary flow tube 1405. In one embodiment, the auxiliary flow tube 1405 may be systematically opened and closed as desired, to modify the circulation system or to allow operation of a pressure controlled downhole device. Preferably, the auxiliary flow tube 1405 is constructed and arranged to remove and redirect a portion of the high annular velocity fluid traveling up the smaller annular area 1375. By diverting a portion of high annular velocity fluid in the smaller annular area 1375 to the larger annular area 1340, the auxiliary flow tube 1405 increases the annular velocity of the fluid traveling up the larger annular area 1340. In this manner, the carrying capacity of the fluid is increases. In addition, the annular velocity of the fluid traveling up the smaller annular area 1375 is reduced, thereby minimizing erosion or pressure damage in the lower wellbore 1300B by the fluid traveling up the annular area 1375. Although FIG. 61 shows one auxiliary flow tube 1405 attached to the casing string 1350, any number of auxiliary flow tubes may be attached to the casing string 1350 in accordance with the present invention. Additionally, the auxiliary flow tube 1405 may be disposed on the casing string 1350 at any location, such as adjacent the drill bit 1325 as shown on FIG. 61 or further up the casing string 1350, so long as the high annular velocity fluid in the smaller annular area 1375 is transported to the larger annular area 1340.

Figure 62:
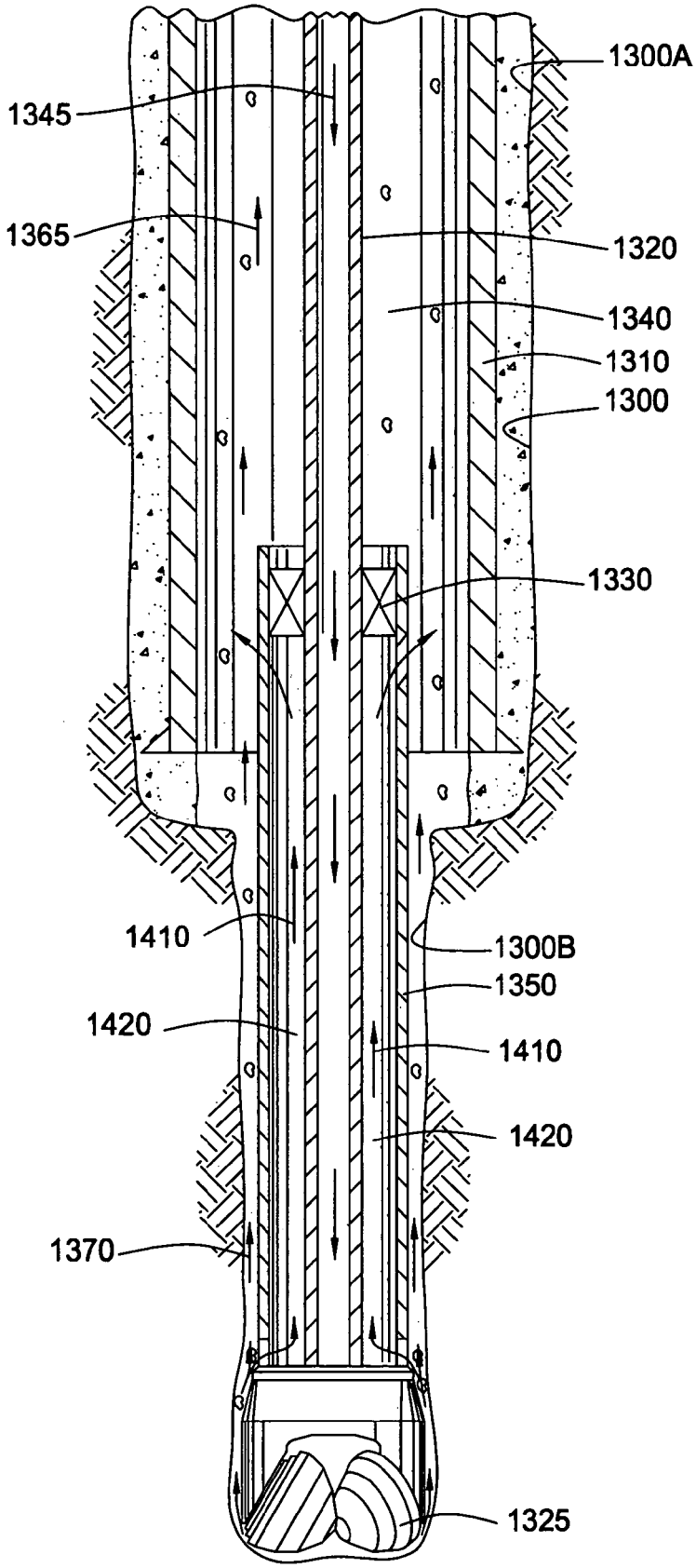
FIG. 62 is a cross-sectional view of a drilling assembly having a main flow tube formed in the casing string.

FIG. 62 is a cross-sectional view illustrating another embodiment of a drilling assembly having a main flow tube 1420 formed in the casing string 1350. In this embodiment, the work string 1320 extends down to the drill bit 1325. As illustrated with arrow 1345, circulating fluid is circulated down the work string 1320 and exits the drill bit 1325 to provide lubrication to the drill bit 1325. Thereafter, the fluid exiting the drill bit 1325 combines with other wellbore fluids to transport cuttings and wellbore debris out of the wellbore 1300. As the fluid travels up the smaller annular area 1375, a portion of the fluid is diverted through one or more openings in the main flow tube 1420, where it eventually exits into the larger annular area 1340. For the same reasons discussed with respect to FIG. 61, the annular velocity of fluid in the larger annular area 1340 is increased, thereby increasing the carrying capacity of the fluid. Additionally, the annular velocity of the fluid in the smaller annular area 1375 is reduced, thereby minimizing erosion or pressure damage in the lower wellbore 1300B by the fluid traveling up the annular area 1375.

Figure 63:
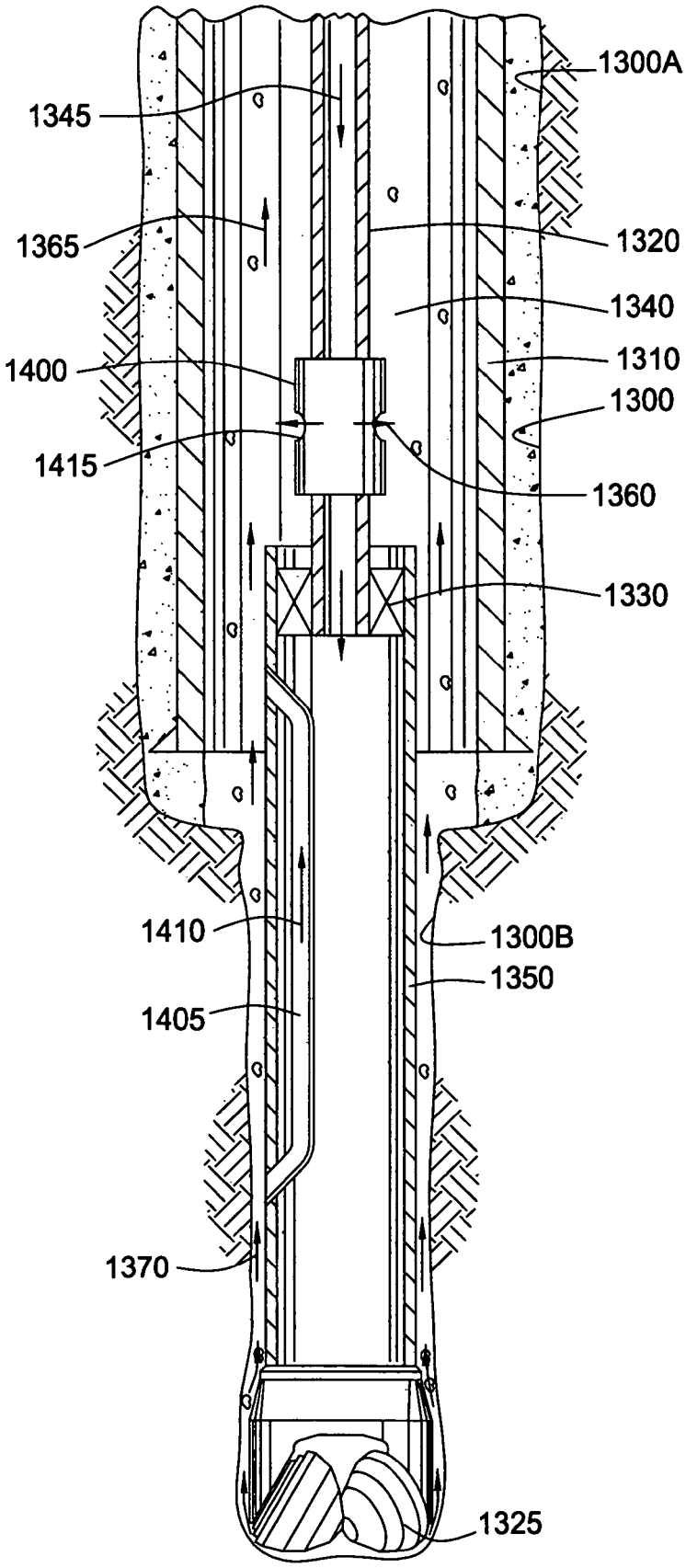
FIG. 63 is a cross-sectional view of a drilling assembly having a flow apparatus and an auxiliary flow tube combination in accordance with the present invention.

FIG. 63 is a cross-sectional view illustrating a drilling system having a flow apparatus 1400 and an auxiliary flow tube 1405. In the embodiment shown, the flow apparatus 1400 is disposed on the work string 1320 and the auxiliary flow tube 1405 is disposed on the casing string 1350. It is to be understood, however, that the flow apparatus 1400 may be disposed at any location on the work string 1320 as well as on the casing string 1350. Similarly, the auxiliary flow tube 1405 may be positioned at any location on the casing string 1350. Additionally, it is within the scope of this invention to employ a number of flow apparatus or auxiliary flow tubes. In this embodiment, a portion of the fluid pumped through the work string 1320 may be diverted through the flow apparatus 1400 into the larger annular area 1340. Additionally, a portion of the high velocity fluid traveling up the smaller annular area 1375 may be communicated through the auxiliary flow tube 1405 into the larger annular area 1340.

Figure 64:
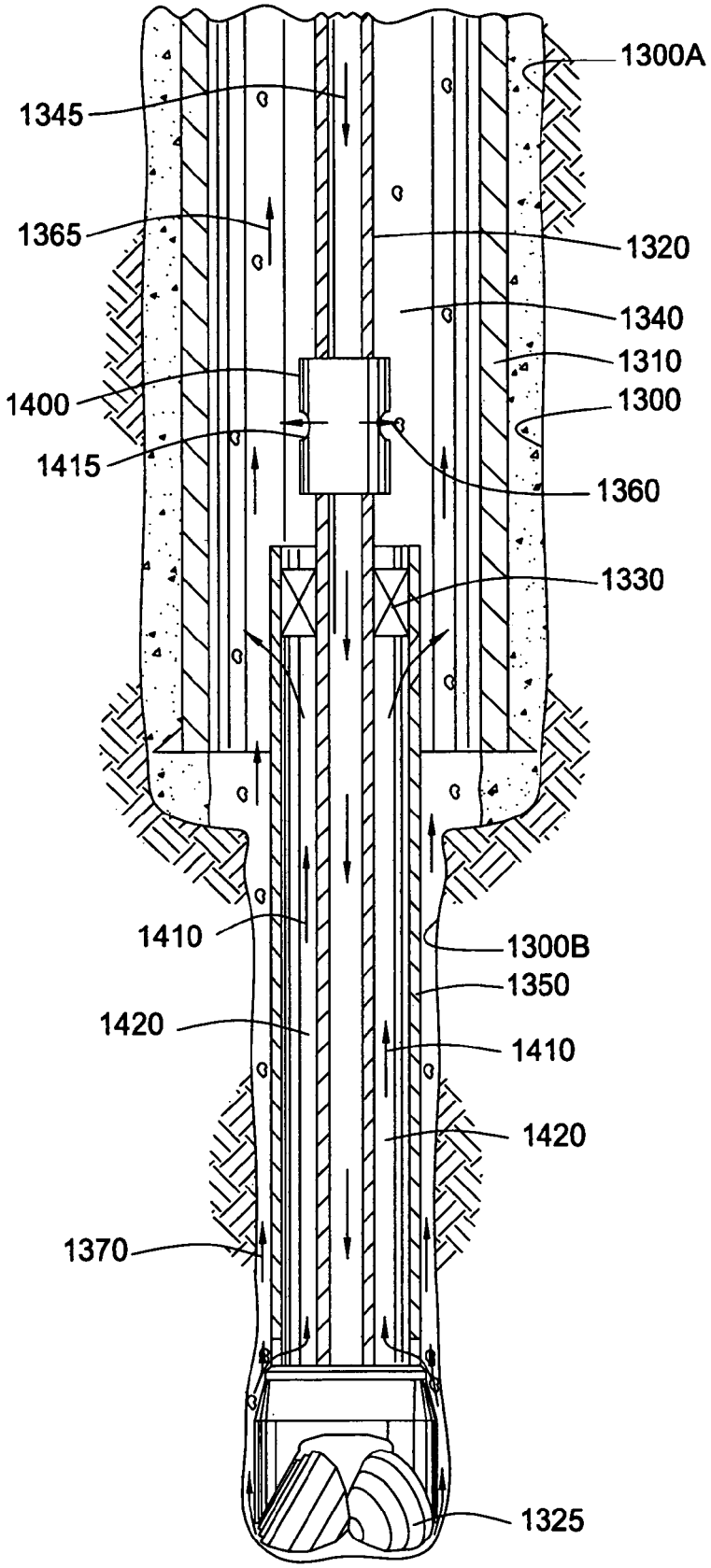
FIG. 64 is a cross-sectional view of a drilling assembly having a flow apparatus and a main flow tube combination in accordance with the present invention.

FIG. 64 is a cross-sectional view illustrating a drilling system having a flow apparatus 1400 and a main flow tube 1420. The work string 1320 extends to the drill bit 1325. In the embodiment shown, the flow apparatus 1400 is disposed on the work string 1320, and the main flow tube 1420 is formed between the casing string 1350 and the work string 1320. It is to be understood, however, that the flow apparatus 1400 may be disposed at any location on the work string 1320 as well as on the casing string 1350. Additionally, it is within the scope of this invention to employ a number of flow apparatus. In this embodiment, a portion of the fluid pumped through the work string 1320 may be diverted through the flow apparatus 1400 into the larger annular area 1340. Additionally, a portion of the high velocity fluid traveling up the smaller annular area 1375 may be communicated through the main flow tube 1420 into the larger annular area 1340.

The operator may selectively open and close the flow apparatus 1400 or the main flow tube 1420, individually or collectively, to modify the circulation system. For example, an operator may completely open the flow apparatus 1400 and partially close the main flow tube 1420, thereby injecting circulating fluid in an upper portion of the larger annular area 1340 while maintaining a high annular velocity fluid traveling up the smaller annular area 1375. In the same fashion, the operator may partially close the flow apparatus 1400 and completely open the main flow tube 1420, thereby injecting high velocity fluid to a lower portion of the larger annular area 1340 while allowing minimal circulating fluid into the upper portion of the larger annular area 1340. It is contemplated that various combinations of selectively opening and closing the flow apparatus 1400 or the main flow tube 1420 may be selected to achieve the desired modification to the circulation system. Additionally, the flow apparatus 1400 and the main flow tube 1420 may be hydraulically opened or closed by control lines (not shown) or by other methods well known in the art.

In operation, the drilling assembly having a work string 1320, a running tool 1330, and a casing string 1350 with a drill bit 1325 disposed at a lower end thereof is inserted into an upper wellbore 1300A. Subsequently, the casing string 1350 and the drill bit 1325 are rotated and urged axially downward to form the lower wellbore 1300B. At the same time, circulating fluid or "mud" is circulated to facilitate the drilling process. The fluid provides lubrication for the rotating drill bit 1325 and carries the cuttings up to surface.

During circulation, a portion of the fluid pumped through the work string 1320 may be diverted through the flow apparatus 1400 into the larger annular area 1340. Additionally, a portion of the high velocity fluid traveling up the smaller annular area 1375 may be communicated through the main flow tube 1420 into the larger annular area 1340. In this respect, diverted fluid from the flow apparatus 1400 and the main flow tube 1420 increases the annular velocity of the larger annular area 1340. Additionally, annular velocity of the fluid in the smaller annular area 1375 is reduced. In this manner, the carrying capacity of the circulating fluid is increased, and the equivalent circulating density at the bottom of the wellbore 1300B is reduced.

The methods and apparatus of the present invention are usable with expandable technology to increase an inside and outside diameter of the casing in the wellbore. For example, when drilling a section of wellbore with casing having a drilling device at a lower end, the drilling device is typically a bit portion that has a greater outside diameter than the casing string portion there above. The enlarged portion can be used to house an expansion tool, like a cone. When the string has been drilled into place, the cone can then be urged upwards mechanically, by fluid pressure, or a combination thereof to enlarge the entire casing string to an internal diameter at least as large as the cone. In a more specific example, casing is drilled into the earth using a bit disposed at a lower end thereof. The bit includes fluid pathways that permit drilling fluid to be circulated as the wellbore is formed. After completion of the wellbore, the fluid passageways are selectively closed. Thereafter, fluid is pressurized against the bottom of the string in order to provide an upward force to an expander cone that is housed in an enlarged portion of the casing adjacent the bit. In this manner, the casing is expanded and its diameter enlarged in a bottom up fashion.

Figure 65:
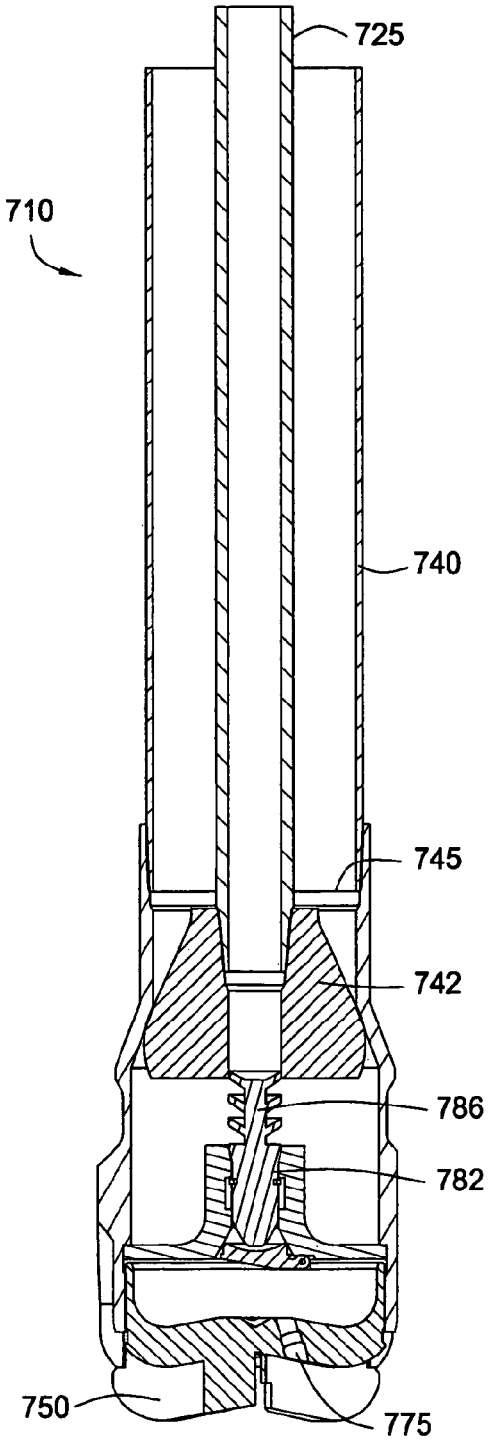
FIG. 65 is a cross-sectional view of a diverting apparatus used for expanding a casing.
Figure 66:
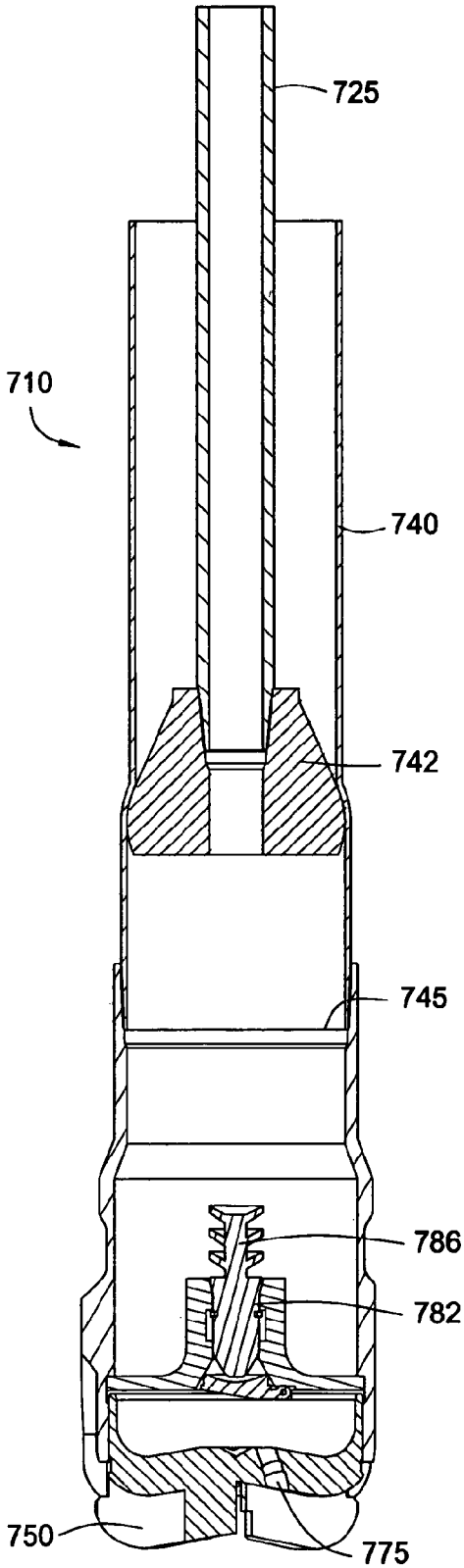
FIG. 66 is a cross-sectional view of the diverting apparatus of FIG. 65 in the process of expanding the casing.

A further alternate embodiment of the present invention involves accomplishing a nudging operation to directionally drill a casing 740 into the formation and expanding the casing 740 in a single run of the casing 740 into the formation, as shown in FIGS. 65 and 66. Additionally, cementing of the casing 740 into the formation may optionally be performed in the same run of the casing 740 into the formation. FIGS. 65 show a diverting apparatus 710, including casing 740, an earth removal member or cutting apparatus 750, one or more fluid deflectors 775, and a landing seat 745.

Additional components of the embodiment of FIGS. 65 and 66 include an expansion tool 742 capable of radially expanding the casing 740, preferably an expansion cone; a latching dart 786; and a dart seat 782. The expansion cone 742 may have a smaller outer diameter at its upper end than at its lower end, and preferably slopes radially outward from the upper end to the lower end. The expansion cone 742 may be mechanically and/or hydraulically actuated. The latching dart 786 and dart seat 782 are used in a cementing operation.

In operation, the diverting apparatus 710 is lowered into the wellbore with the expansion cone 742 located therein by alternately jetting and/or rotating the casing 740. The diverting apparatus 710 is preferably lowered into the wellbore by nudging the casing 740. Specifically, to form a deviated wellbore, the rotation of the casing 740 is halted, and a surveying operation is performed using the survey tool (not shown) to determine the location of the one or more fluid deflectors 775 within the wellbore. Stoking may also be utilized to keep track of the location of the fluid deflector(s) 775.

Once the location of the fluid deflector(s) 775 within the wellbore is determined, the casing 740 is rotated if necessary to aim the fluid deflector(s) 775 in the desired direction in which to deflect the casing 740. Fluid is then flowed through the casing 740 and the fluid deflector(s) 775 to form a profile (also termed a "cavity") in the formation. Then, the casing 740 may continue to be jetted into the formation. When desired, the casing 740 is rotated, forcing the casing 740 to follow the cavity in the formation. The locating and aiming of the fluid deflector(s) 775, flowing of fluid through the fluid deflector(s) 775, and further jetting and/or rotating the casing 740 into the formation may be repeated as desired to cause the casing 740 to deflect the wellbore in the desired direction within the formation.

Next, a running tool 725 is introduced into the casing 740. A physically alterable bonding material, preferably cement, is pumped through the running tool 725, preferably an inner string. Cement is flowed from the surface into the casing 740, out the fluid deflector(s) 775, and up through the annulus between the casing 740 and the wellbore. When the desired amount of cement has been pumped, the dart 786 is introduced into the inner string 725. The dart 786 lands and seals on the dart seat 782. The dart 786 stops flow from exiting past the dart seat, thus forming a fluid-tight seal. Pressure applied through the inner string 725 may help urge the expansion cone 742 up to expand the casing 740. In addition to or in lieu of the pressure through the inner string 725, mechanical pulling on the inner string 725 helps urge the expansion cone 742 up.

Rather than using the latching dart 786, a float valve may be utilized to prevent back flow of cement. The latching dart 786 is ultimately secured onto the dart seat 782, preferably by a latching mechanism.

The running tool 725 may be any type of retrieval tool. Preferably, the retrieval of the expansion cone 742 involves threadedly or latch engaging a longitudinal bore through the expansion cone 742 with a lower end of the running tool 725. The running tool 725 is then mechanically pulled up to the surface through the casing 740, taking the attached expansion cone 742 with it. Alternately, the expansion cone 742 may be moved upward due to pumping fluid, down through the casing 740 to push the expansion cone 742 upward due to hydraulic pressure, or by a combination of mechanical and fluid actuation of the expansion cone 742. As the expansion cone 742 moves upward relative to the casing 740, the expansion cone 742 pushes against the interior surface of the casing 740, thereby radially expanding the casing 740 as the expansion cone 742 travels upwardly toward the surface. Thus, the casing 740 is expanded to a larger internal diameter along its length as the expansion cone 742 is retrieved to the surface.

Preferably, expansion of the casing 740 is performed prior to the cement curing to set the casing 740 within the wellbore, so that expansion of the casing 740 squeezes the cement into remaining voids in the surrounding formation, possibly resulting in a better seal and stronger cementing of the casing 740 in the formation. Although the above operation was described in relation to cementing the casing 740 within the wellbore, expansion of the casing 740 by the expansion cone 742 in the method described may also be performed when the casing 740 is set within the wellbore in a manner other than by cement.

The cutting apparatus 750 may be drilled through by a subsequent cutting structure (possibly attached to a subsequent casing) or may be retrieved from the wellbore, depending on the type of cutting structure 750 utilized (e.g., expandable, drillable, or bi-center bit). Regardless of whether the cutting structure 750 is retrievable or drillable, the subsequent casing may be lowered through the casing 740 and drilled to a further depth within the formation. The subsequent casing may optionally be cemented within the wellbore. The process may be repeated with additional casing strings.

The present invention provides methods and apparatus whereby drill string may be used as casing, and the drill string may be cemented in place without using the drill bit mud passages to flow the cement to the annulus between the drill string and the borehole. Selectively openable passages are located in the drill string to allow cement to flow therethrough to cement the drill string in place in the borehole after the well has been completed.

Figure 67:
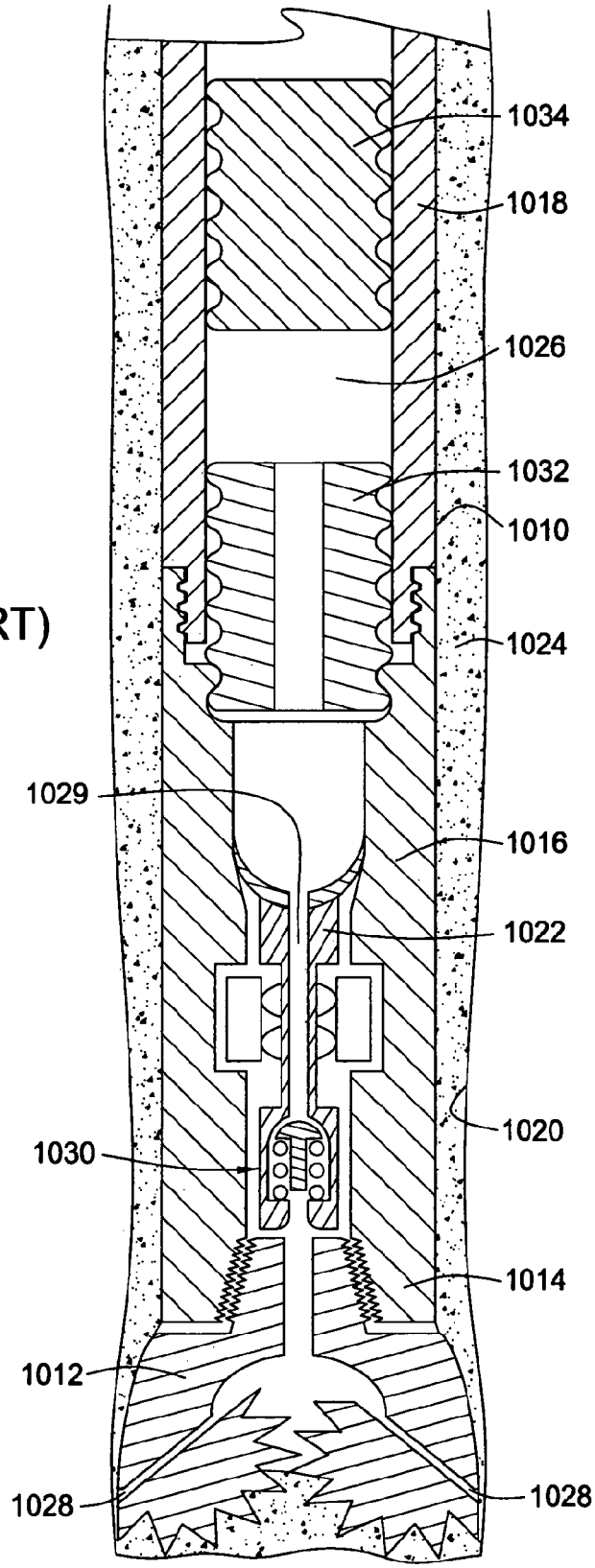
FIG. 67 (PRIOR ART)
FIG. 67 is a schematic view of a wellbore, showing a prior art drill string in a downhole location suspended from a drilling platform.

Referring initially to FIG. 67, there is shown at the bottom of a borehole 1020 the terminal end portion of a prior art drill string 1010, having a float sub 1016 connected to the distal end of a length of drill pipe 1018, and having an earth removal member, preferably a drill bit 1012, positioned on the terminal end 1014 of the float sub 1016. Float sub 1016 is threaded over terminus of drill pipe 1018, it being understood that drill pipe 1018 is typically configured in sections of a finite length, and a plurality of such sections are threadingly interconnected so as to connect drill bit 1012 to a drilling platform (not shown) at the earth surface or, where drilling is performed over water, at a position above such water. Also shown within drill string 1010 is a float collar 1022, which is fixed in position within float sub 1016, and which is used to prevent backflow of cementing solution injected into the annulus 1024 between the drill string 1010 and the borehole 1020 back up the hollow region 1026 in the drill string 1010. It is to be understood that the float collar 1022 is shown in FIG. 67 for ease of illustration, and it is not positioned within float sub during drilling operations, and thus mud is free to flow through the float sub 1016 and thence onward to the drill bit 1012, when float collar 1022 is not located therein.

Drill bit 1012 is turned, about the axis of drill string 1010 by the rotation of the drill string 1010 at the upper end thereof (not shown), to further drill the borehole 1020 into the earth. As drilling is ongoing, drilling "mud" is flowed from the surface location, down the hollow region 1026 of the drill string 1010, through float sub 1016 and thence out through passage(s) 1028 in the drill bit 1012, whence it flows upwardly through the annulus 1024 between the drill string 1010 and the wall of the borehole 1020 to the surface location. When the drilling operation is completed, water may be flowed down the hollow region 1026 to flush out remaining mud and thence returned to the surface through annulus 1024, and a physically alterable bonding material such as cement is then flowed down through the hollow region 1026 and thus into the annulus 1024 to form a seal and support for the drill string 1010 in the borehole 1020. After, or as, the cementing operation is completed, float collar 1022 is pushed or lowered down the interior, hollow, portion of the drill string 1010 and latched into float sub 1016, which thus provides a sealing mechanism to prevent uncured cement in annulus 1024 from flowing back through drill bit 1012 and thus into hollow region 1026 of drill string 1010. Float collar 1022 may also include central passage 1029 therethrough, the opening of which is controlled by a valve 1030, such that cement may still be injected into the annulus 1024 after float collar 1022 is in place, but the valve 1030 will close if cement attempts to pass from the annulus 1024 and back into the drill string 1010. After sufficient cement is flowed down the drill string 1010, valve 1030 prevents cement from flowing back up the bore of the drill string 1010 while the cement cures. In the event cement leaks past valve 1030, wiper plugs 1034, 1032 are also positioned in the hollow region 1026 of the drill string to physically block fluids passing upwardly in drill string 1010.

Figure 68:
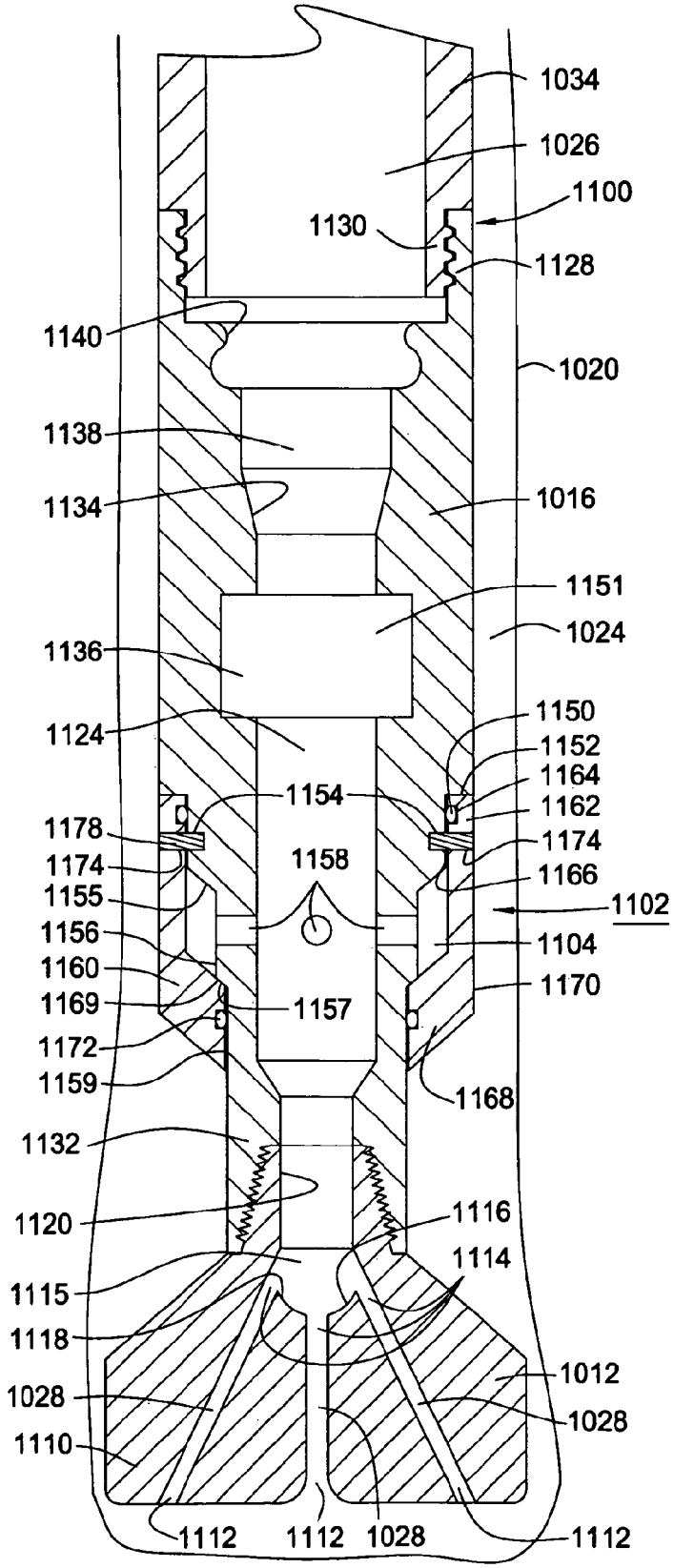
FIG. 68 is a sectional view of the drill string, showing a first embodiment of the present invention.
Figure 69:
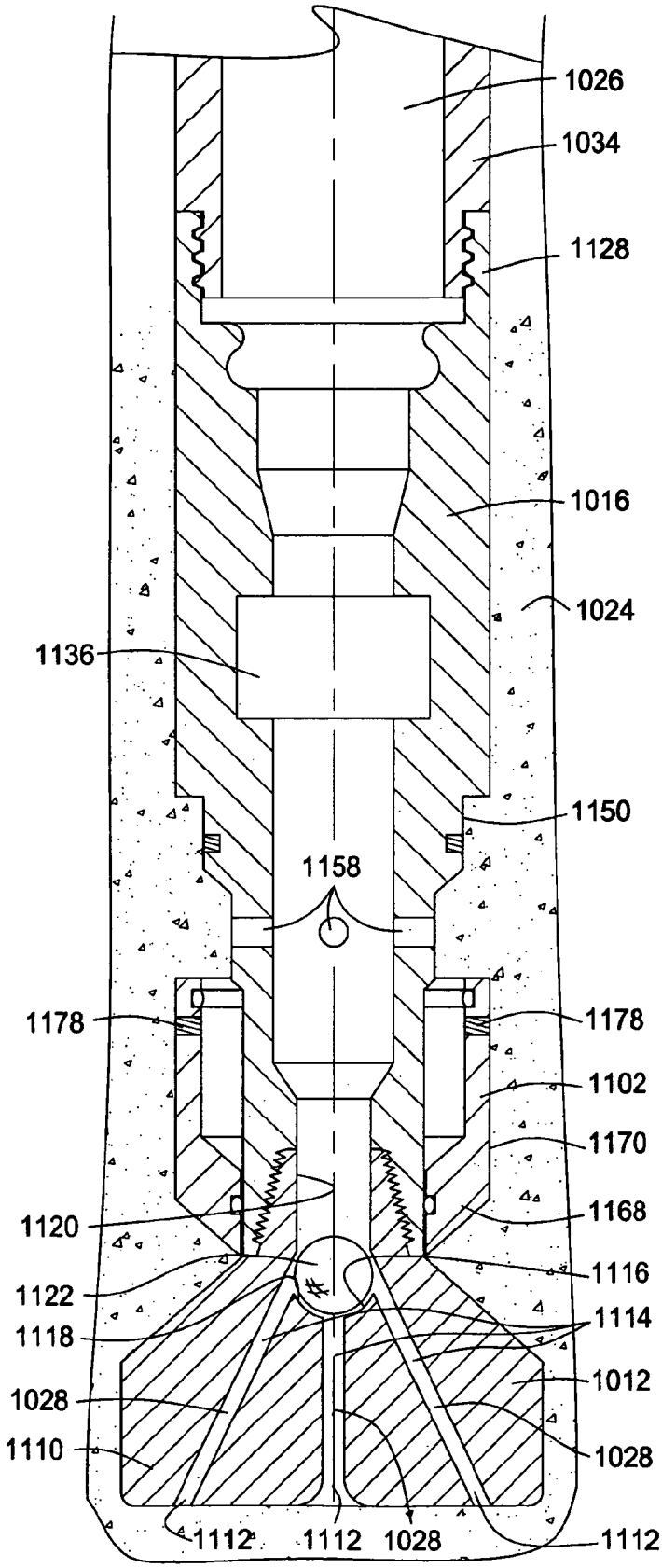
FIG. 69 is a further view of the drill string as shown in FIG. 68, showing the drill string positioned for cementing operations.

Referring to FIGS. 68 and 69, there is shown a first embodiment of an improved drill string 1100 for use as casing of the present invention. In this embodiment, the earth removal member, preferably a drill bit 1012, and float sub 1016 are configured to provide a port collar 1102 therebetween, which is configured to selectively provide an alternative fluid passage between hollow region 1026 and annulus 1024, after the mud passages 1028 of the drill bit 1012 are selectively closed-off from communication with hollow region 1026, thereby ensuring that cement may be redirected from the drill bit passages 1028 on its way to annulus 1024.

Referring still to FIGS. 68 and 69, drill bit 1012 includes cutter portion 1110, through which a plurality of passages 1028 are disposed to enable transmission of drilling mud through the bit 1012. Each of the passages 1028 includes a bore end 1112 and an interior end 1114, the interior ends 1114 thereof joining in communication with a central aperture 1115 preferably configured to include a generally spherical manifold 1116 having a generally spherical seat surface 1118 through which each of the passages 1028 intersect and communicate with the hollow region 1026 through which mud is flowed from the surface. Extending from the manifold 1116 in the direction of the hollow passage 1026 in drill string 1010 is a reduced cross section, as compared to the width of hollow region 1026, throat region 1120, through which a ball 1122 (FIG. 69 only) can be selectively provided. Ball 1122 is sized such that its spherical diameter is the same as, or substantially the same as, that of the spherical seat 1118, such that when ball 1122 is urged into contact with spherical seat 1118, the interior ends of the passages 1028 will be sealed such that fluids in the hollow region cannot pass through the drill bit 1012 to enter annulus 1024. Ball 1122 is preferably manufactured of an elastomeric or other conformable, and easily milled or drilled, material, such that it can deform slightly to ensure coverage over all drill bit passages 1028 when located in manifold 1116.

Figure 70:
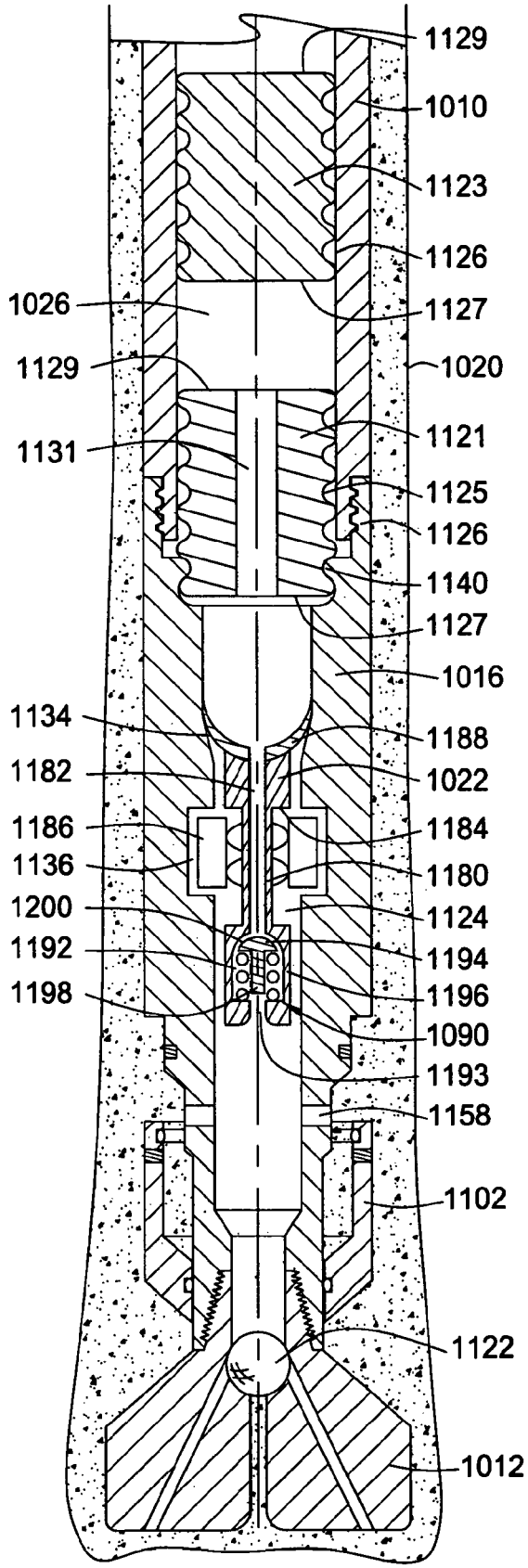
FIG. 70 is a further view of the drill string as shown in FIG. 69, showing the drill string after cementing thereof has occurred.

Drill bit 1012 is connected to the drill string 1100 through a threaded, or other such connection, to the end of the float sub 1016. Float sub 1016 is configured to have an internal float shoe 1151 received in the inner bore thereof, such that a float collar 1022 as shown in FIGS. 67 and 70, is selectively engageable therewith as, or after, the cementing of the drill string 1100 within the borehole 1020 is completed. Thus, float sub 1016 generally comprises a tubular element having a central bore 1124, a threaded first end 1128 which is threaded over the threaded end 1130 of the lowermost piece of pipe 1034 in the drill string 1100 and a lower terminal end 1132 to which drill bit 1012 is fixed. Within central bore 1124 is provided a float shoe locking region, to enable a downhole tool, such as a float collar 1022 (see FIG. 67) to be selectively secured thereto, which in this embodiment is provided by including within the central bore 1124 a second, larger right cylindrical latching bore 1136. Central bore 1124 communicates, at the lower terminal end 1132 of float sub 1016, with a manifold 1116, and, further includes a tapered guiding region 1134 opening into a receiving bore 1138 terminating in a latching lip 1140 extending as a hump, semicircular in cross section extending inwardly into receiving central bore 1138 about its circumference. The float shoe 1151 portion of float sub 1016 may be provided by molding or machining a plastic, cement, or otherwise easily machined material, and press-fitting, molding in place, or otherwise securing this form into the tubular body of the float sub 1016.

The lower end of float sub 1016 is specifically configured to enable redirect of fluids passing down the drill string 1100 from the passages 1028 in the drill bit 1012 into alternative cement passages 1158 specifically configured for passage of cement therethrough to enable cementing of the drill string 1010 in place in the borehole 1020. The alternative cement passages 1158 are selectively blocked by a port collar 1102, which is a sleeve configured to sealingly cover the cement passages 1158 during drilling operations, and then move to enable communication of the passages 1158 with the annulus 1024. In this embodiment, the port collar 1102 is configured to include an integral piston therewith, and the remainder of the port collar 1102, in conjunction with the body of the float sub 1016, forms a cavity 1104 which may be pressurized to cause the piston portion of the port collar 1102 to slide from a position blocking the cement passages 1158 to a position in which the cement passages 1158 form a fluid passageway from the hollow region 1026 of drill string 1010 to annulus 1024. To enable this structure, the lower end of float sub 1016 includes a first, generally right cylindrical recessed (with respect to the main body portion of the float sub 1016) face 1150, which terminates at an upper ledge 1152 which extends from face 1150 to the full outer diameter of the float sub 1016, and further includes a plurality of pin receiving apertures 1154 extending therein. Face 1150 extends, from ledge 1152, to a tapered wall 1155 which ends at a second recessed, again generally right circular, face 1156, through which a plurality of cement passage bores 1158 extend into communication with hollow region 1026. Second recessed face 1156 ends at an additional tapered wall 1169, which terminates at a generally right, circular cylindrical port collar face 1159.

Disposed over this plurality of faces 1150, 1156,1169 and tapered walls 1155, 1159 is the port collar 1102. Port collar 1102 is generally configured as a doglegged sleeve, and thus includes a tubular body 1160 having a first end 1162 including a first seal annulus 1164 in the inner face 1166 thereof adjacent the first end 1162, and an inwardly projecting dogleg portion 1168 forming in the second end 1170 thereof, and likewise including an annular seal annulus 1172 in the inner face thereof. Each of seal annuli 1164, 1172 have a seal, such as an o-ring seal, located therein, such that the inner face of such seal sealingly engages with the corresponding surface of the lower end of float sub 1016, i.e., seal 1164 contacts against face 1150, and seal 1172 contacts port collar face 1159, and the inner surface sealingly engages the respective annuli 1164, 1172 base or sides, such that a sealed piston cavity 1104 is formed of the portion of the float collar 1016 covered by the port collar 1102. Preferably, seal 1164 is larger than seal 1172 to form a differential area for pressure to act on. Additionally, a plurality of pin holes 1174 are provided through the tubular body 1160 of the port collar 1102 adjacent first end 1162 thereof, such that pins 1178 sealingly extend therethrough and then into pin apertures 1154 in float sub 1016. Thus, the port collar 1102 both forms a seal between the bores 1158 and the annulus 1024 and is secured against undesired movement on the float sub 1016 by pins 1178. Additionally, the dogleg portion 1168 forms an annular piston such that, upon pressurization of the piston cavity 1104, it will cause port collar 1102 to slide along the outer surface of float sub 1016 and thereby open communication of passages 1158 with annulus 1024.

Referring to FIGS. 68 and 69, the operation of port collar 1102 is demonstrated as between the closed position of FIG. 68 and the open position of FIG. 69. In the position of the port collar 1102 shown in FIG. 68, drilling mud flowing down the hollow portion 1026 of the drill string passes through the bore 1124 of float sub 1016, thence into manifold 1116 of drill bit 1012 whence it passes through passages 1028 therein and into annulus 1024 where it is returned to the surface. Thus, the port collar 1102 position of FIG. 68 enables traditional flow of fluids through the passages 1028 in the drill bit 1012, such as during drilling operations. To initiate cementing operations, water may be flowed down the hollow portion 1026 of drill string, and thence through float sub 1016 and drill bit 1012, to flush remaining loose mud from the drill string components and the annulus 1024. Then, cement will be flowed down the hollow portion 1026 to be flowed into, and cement the drill string 1010 within, the annulus 1024. To enable diversion of the cement to cement passages 1158, and thus prevent cement flow through the drill bit passages 1028, ball 1122 is inserted into the hollow portion (not shown) of drill string 1010 at the surface location, just before or just as cement is being flowed down the hollow region 1026, it being understood that cement in a liquid or slurry form is flowed down the hollow portion 1026 immediately over another fluid, such as water or mud, already therein and in the annulus 1024. Ball 1122 is thus carried down the hollow portion 1026, through the bore 1124 of float sub 1016, and thence into manifold 1116 of drill bit 1012 where it covers, and thus seals off, the openings at the interior ends 1114 of mud passages 1028 of drill bit 1012 from the flow of fluids down the hollow portion 1026 of the drill string 1010.

Although the flow of fluids through the mud passages 1028 of the drill bit 1012 is prevented by positioning of the ball 1122 in manifold 1116, fluid is still being pumped into the hollow region 1026 from a surface location, and this fluid creates a large pressure in the piston cavity 1104. When this pressure is sufficiently greater than the pressure in the annulus 1024, such that the force bearing against the outer surface of dogleg portion 1168 (exposed to fluid in the annulus 1024), in combination with the shear strength of the pins 1178 holding the port collar 1102 to the float sub 1016 is less than the force bearing against the inner portion or surface of dogleg portion 1168 (exposed to the fluid in piston cavity 1104), port collar 1102 will slide downwardly about port collar face 1159, to the position shown in FIG. 69, thereby opening communication of the cement passages 1158 with the annulus 1024 and enabling cement flowed down the hollow portion 1026 to pass through the cement passages 1158 to flow into annulus 1024.

Referring now to FIG. 70, float collar 1022, which is selectively positionable within float sub 1016, is shown received within float sub 1016. Float collar 1022 is essentially a one-way valve having the capability to be remotely positioned in a remote borehole 1020 location as or after fluid which it is intended to control the flow of has entered the borehole 1020. It will typically be positioned in the float sub 1016 after, or just as, cementing is completed through cement passages

1158, to provide a blocking mechanism and thereby prevent fluid flow of cement back into hollow portion 1026 of drill string 1010.

Float collar 1022 includes a main body portion 1180, having a generally cylindrical, rod like appearance, provided with a central aperture 1182 therethrough, configured to enable selected communication of fluids from hollow portion 1026 therethrough to cement passages 1158. The outer cylindrical surface thereof includes a latch recess 1184, within which are positioned a plurality of spring loaded dogs 1186. When float collar 1022 is positioned within float shoe 1151, dogs 1186 are urged outwardly from collar 1022 by springs positioned between the dogs 1186 and the body of float collar 1022, and thereby engage within the latching bore 1136 of float shoe 1151 to retain float collar 1022 therein. The float collar 1022 further includes, at the end thereof furthest from the drill bit 1012 location, a wiper seal 1188, in the form of an annular ring, and at the end thereof closest to the drill bit 1022, a check valve 1190 in fluid communication with central aperture 1182 of float collar 1022. Check valve 1190 comprises a valve cavity 1192 integral of float collar body, having a lower, inwardly protruding spring ledge 1193, an upper, semi-spherical valve seat 1194, and a spring 1196 loaded valve 1198 having a semi-spherical sealing surface 1200. Spring 1196 is carried on spring ledge 1193, and it extends therefrom to the rear side of sealing surface 1200. Valve seat 1194 is positioned such that aperture 1182 intersects valve seat 1194, and when spring 1196 urges valve 1198 thereagainst, sealing surface 1200 blocks aperture 1182, thereby preventing fluid flow therethrough in a direction where such fluid would otherwise enter hollow portion 1026. Thus, if the pressure in central aperture 1182, formed by the fluids flowing down hollow portion 1026, is greater than the pressure in the region of cement passages 1158 plus the force of spring 1196 tending to urge the valve 1190 to a closed position, the valve sealing surface 1200 will back off seat 1194, allowing flow therethrough in the direction of cement passages 1158. However, if the pressure in the central aperture 1182 drops below that in the cementing passages 1158 plus the force associated with the spring 1196, the valve 1190 will close positioning the sealing surface 1200 against the seat 1194, preventing flow in the direction from cement passages 1158 to hollow portion 1026 of drill string 1010.

To position the float collar 1022 in the float sub 1016, the float collar 1022 is lowered down the hollow portion 1026 of the drill string 1010, such as on a wire or cable, or, if necessary, on a more rigid mechanism, such that the valve 1190 end of the float collar 1022 enters through bore 1124 of the float sub 1016. As the float collar 1022 is lowered, cement is flowing down the hollow portion 1026, so that upon insertion of the valve 1190 end of the float collar 1022 into the bore 1124 of float sub 1016, the float collar 1022 substantially blocks the bore 1124 and the weight of the cement in the hollow portion 1026 (including other fluids which may be located above the cement in the hollow portion 1026), bears upon the float collar 1022 and tends to force it into the float sub 1016. Dogs 1186 may be in a retracted position, such that a trigger mechanism (not shown) is provided which causes therein expansion from the recess 1184 and into latching bore 1136, or the dogs 1186 may enter into the drill string 1010 in the extended position shown in FIG. 70, such that the tapered portion 1134 of bore 1124 will cause the dogs 1186 to recess into latching bore 1136 and the dogs 1186 will re-extend upon reaching latching bore 1136. Alternatively, the float collar 1022 may be pumped down with plug 1121 ahead of the cement.

Referring still to FIG. 70, a plurality of wiper plugs 1121, 1123 may also be provided downhole during cementing operations. The first, or bottom wiper plug 1121 is a generally cylindrical member having an outer contoured surface 1125 forming a plurality of ridges 1126 of a sinusoidal cross-section, terminating in opposed flat ends 1127, 1129, and further including a central bore 1131 therethrough. The lowermost of the ridges 1126 is positionable over latching lip 1140 on float shoe 1151 to lock first wiper plug 1121 in position in the borehole 1020. Second wiper plug 1123 likewise includes opposed flat ends 1127, 1129 and ridges 1126, but no through-bore. Ridges 1126 on both wiper plugs 1121, 1123 are sized to contact, in compression, the interior of the drill string 1010 and thereby form a barrier or seal between the areas on either side thereof. Wiper plugs 1121, 1123 provide additional security against the backing out of the float collar 1022 from float sub 1016, and against leakage of cement from the annulus 1024 and back up the hollow portion 1026 of the drill string 1010.

Once the cement has hardened in the annulus 1024, float collar 1022 may be removed from the float sub 1016. Typically, float collar 1022 includes a mechanism for retracting the dogs 1186, such as by twisting the float collar 1022 or otherwise, thereby retracting dogs 1186 and allowing float collar 1022 to be pulled from the well, after first pulling wiper plugs 1121, 1123. Alternatively, float collar 1022, wiper plugs 1121, 1123 and drill bit 1012, along with float sub 1016, may be ground up at the base of the well by a grinding or milling tool (not shown) sent down the drill string 1010 for that purpose. Alternatively, wiper plugs 1121, 1123, float collar 1022, ball 1122, and drill bit 1012 may be drilled up with a subsequent drill string so that the well may be drilled deeper. Alternatively still, float collar 1022, float shoe 1151, drill bit 1012, and wiper plugs 1121, 1123 may be left in place at the base of the borehole 1020, and a production zone can be established above the upper wiper plug 1123, by perforating the drill string 1010 at that location.

In another embodiment, the float collar may comprise a flapper valve. In this respect, the flapper valve may be run in place. Thereafter, a ball may be pumped through the flapper valve, thereby eliminating the need to lower or pump the float collar into the float sub.

Figure 71:
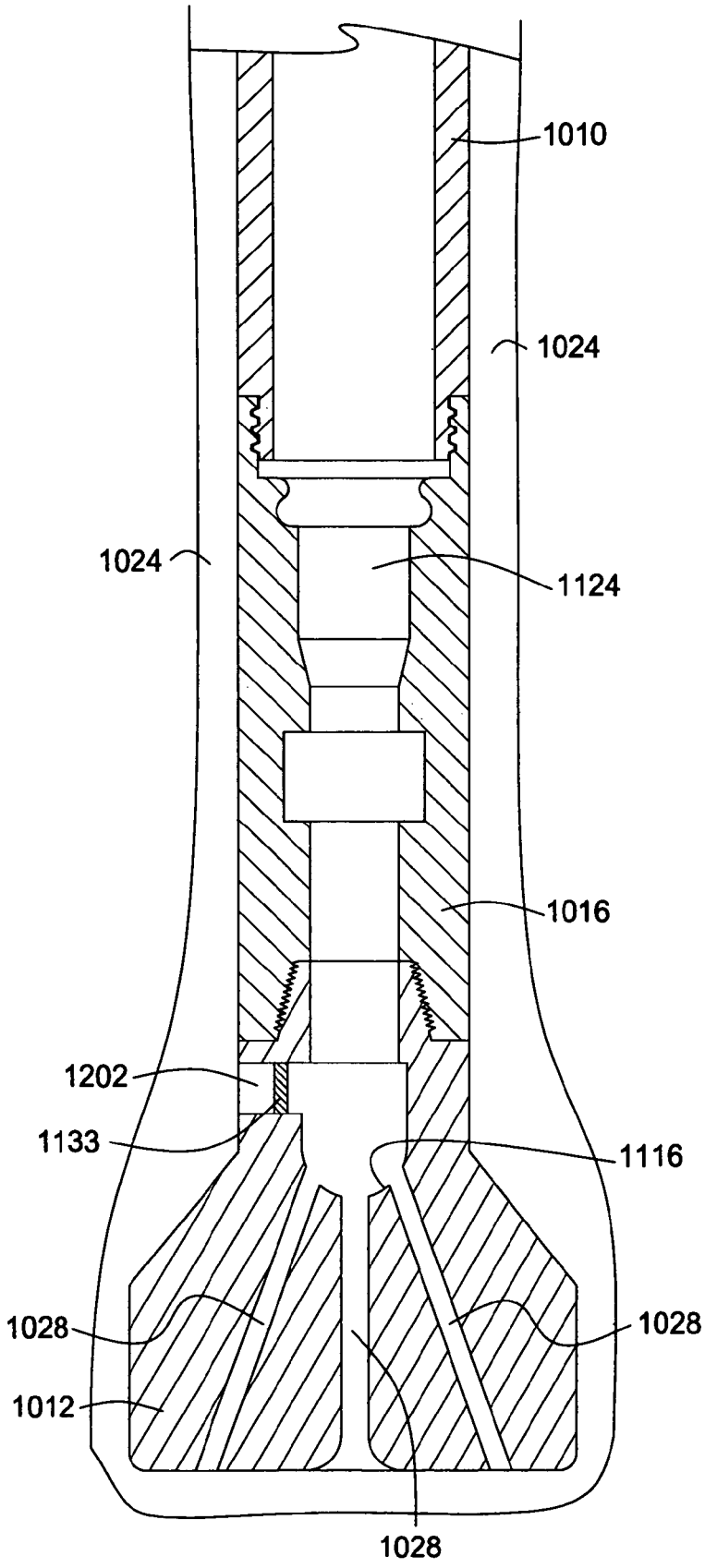
FIG. 71 is a sectional view of the drill string, showing an additional embodiment of the present invention.
Figure 72:
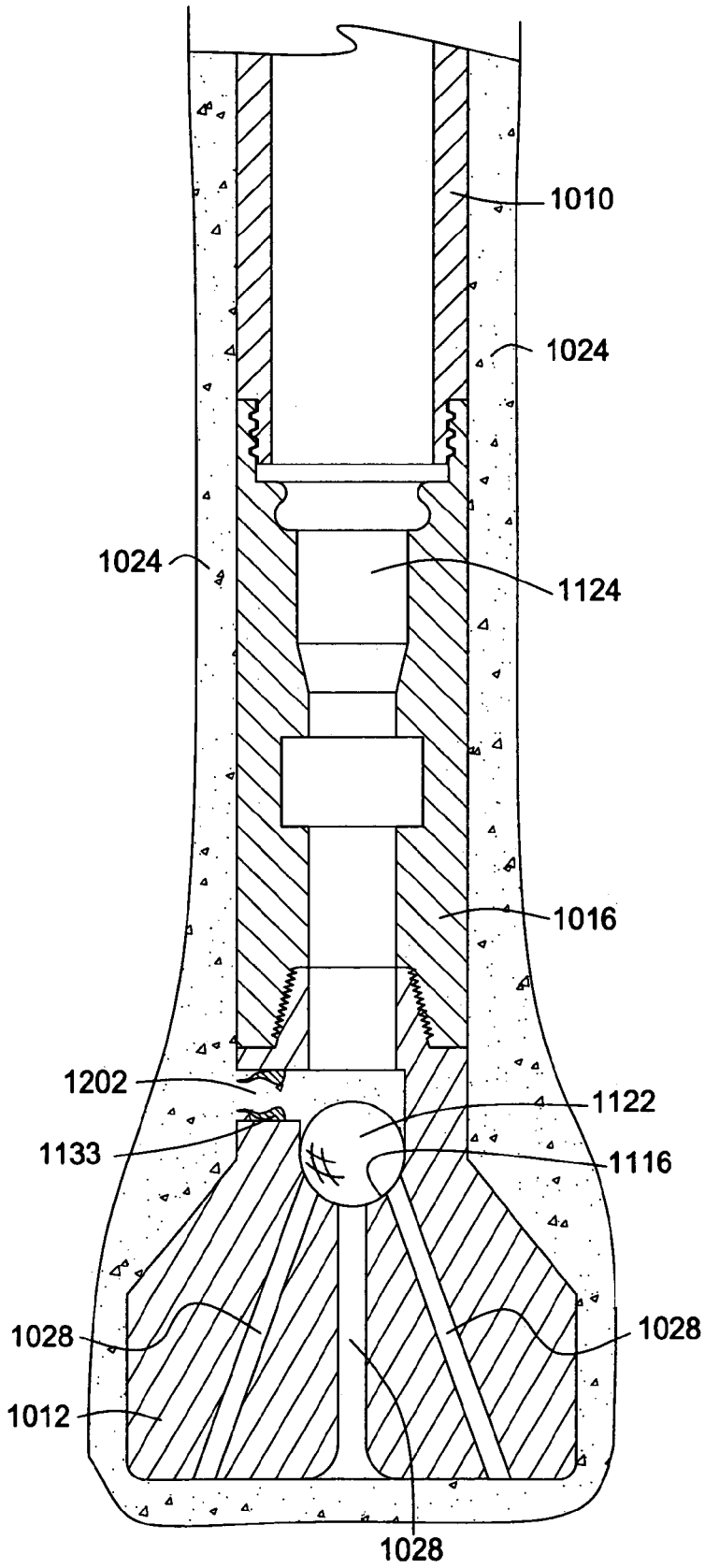
FIG. 72 is a further view of the drill string of FIG. 71, showing the drill string after cementing has occurred.

Referring now to FIGS. 71 and 72, there is shown an alternative embodiment of the present invention, wherein the port collar 1102 of FIGS. 68-70 is replaced with a membrane 1133. In this embodiment, all other features of the invention and application of the invention to a cementing operation remain the same as in the embodiment described with respect to FIGS. 68-70, except that the port collar 1102 and the modifications to the float sub 1016 needed to use the port collar 1102 are not necessary. In their place is provided a cement aperture 1202, configured to be in communication with spherical manifold 1116. The membrane 1133, configured of a material capable of withstanding the pressure of the drilling mud circulating through the drill string 1010 and annulus 1024 while drilling is occurring, covers the cement aperture 1202 so as to seal it off from communication between the annulus 1024 and manifold 1116.

To enable cementing in this embodiment, ball 1122 is placed into the drill string 1010 as before, as shown in FIG. 72, where the ball 1122 passes through bore 1124 of float sub 1016 and thence makes its way to spherical manifold 1116 of drill bit 1012 to be received against, and deform against, spherical seat 1116 where it blocks passage of drilling mud through drill bit passages 1028. Thus, the hydrostatic head of the drilling mud, or, if desired at this point, water or cement, bears upon membrane 1133, causing it to rupture, thereby causing the fluid to pass though cement aperture 1202 and thence up into annulus 1024 to cement the drill string 1010 in place in the borehole 1020. As in the first embodiment, the float collar 1022 and wiper plugs 1121, 1123 (as shown in FIG. 70) are used to ensure that cement does not flow back out the annulus 1024 and up the drill string 1010, and, the wiper plugs may be either removed, ground or drilled through, or left in place, as discussed with respect to the first embodiment.

Although the port collar 1102, or cement aperture 1202, is described herein as being positioned in the drill string 1010 with respect to a float sub 1016 located immediately adjacent to the drill bit 1012, it should be understood that such features may be provided in any location intermediate the drill bit 1012 and the surface location. Cementing operations for deep wells may require cement introduction at several depth locations along the casing 1010 to create proper cementing conditions. Therefore, it is specifically contemplated that the drill string 1010 can include a plurality of fluid diversion members along its length. For example, once the cementing operation is completed at the bottom of the well, the cement may only extend up the annulus 1024 between the drill string 1010 and borehole 1020 a fraction of the length of the borehole 1020. As such level of cement may be predicted and/or controlled, the fluid diversion apparatus such as the port collar 1102 or the membrane 1133 of the present invention can be placed at predictable locations for its use. To enable a cementing operation, the selected diverting apparatus is provided in the drill string 1010 in a known location or locations, and a plug may be placed at a location in the drill string 1010 below the diverting apparatus, to seal off the drill string 1010 below that location, Then a float sub such as float sub 1016, may be positioned above the diverting apparatus, and the cement flowed to cause the diverting apparatus to open and thus direct cement into the annulus 1024 at that location The various collars and other peripheral devices placed downhole during cementing may be drilled out with a bit or mill placed down the drill string 1010 after each sequential cementing operation, or, alternatively, after all cementing has been completed.

In one embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore. In one aspect, the drilling assembly further includes a third fluid flow path and the method further comprises flowing at least a portion of the fluid through the third fluid flow path. In another embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the first and second fluid flow paths are in opposite directions.

In another embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the drilling assembly comprises a tubular assembly, at least a portion of the tubular assembly being disposed within the wellbore lining conduit. In one aspect, the first fluid flow path is within the tubular assembly.

One embodiment of the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the drilling assembly comprises a tubular assembly, at least a portion of the tubular assembly being disposed within the wellbore lining conduit, wherein the second fluid flow path is within the tubular assembly.

Yet another embodiment of the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the drilling assembly comprises a tubular assembly, at least a portion of the tubular assembly being disposed within the wellbore lining conduit; and providing a first sealing member on an outer portion of the wellbore lining conduit. In one aspect, the method further comprises supplying a physically alterable bonding material through the drilling assembly to an annular area defined by an inner surface of the wellbore and an outer surface of the wellbore lining conduit. In another aspect of the present invention, supplying the physically alterable bonding material through the drilling assembly to the annular area comprises flowing the physically alterable bonding material into a second annular area between the tubular assembly and the wellbore lining conduit at a location below the second sealing member.

In another embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit; providing a first sealing member on an outer portion of the wellbore lining conduit; supplying a physically alterable bonding material through the drilling assembly to an annular area defined by an inner surface of the wellbore and an outer surface of the wellbore lining conduit; and actuating the first sealing member to retain the physically alterable bonding material in the annular area.

In one embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit; providing a first sealing member on an outer portion of the wellbore lining conduit; and providing a second sealing member on an outer portion of the tubular assembly.

Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the earth removal member is operatively connected to the tubular assembly. In one aspect, the earth removal member is an underreamer. In another aspect, the earth removal member is an expandable bit.

Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises a motor. Another embodiment includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises at least one measuring tool.

Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises at least one logging tool. In another embodiment, the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises a steering system.

One embodiment of the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises a landing sub for a measuring tool. Another embodiment includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises at least one latching assembly.

Yet another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises a liner hanger assembly. Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises at least one sealing member thereon.

Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises at least one stabilizing member thereon. In one aspect, the at least one stabilizing member is eccentrically disposed on at least a portion of the tubular assembly. In another aspect, the at least one stabilizing member is adjustable.

Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the drilling assembly further comprises a bent housing. An embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the earth removal member includes at least one jetting orifice for flowing a fluid therethrough.

In yet another embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the second fluid flow path is within an annular area formed between an outer surface of the tubular assembly and an inner surface of the wellbore lining conduit. Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore, wherein the drilling assembly comprises a tubular assembly, at least a portion of the tubular assembly being disposed within the wellbore lining conduit, wherein the first fluid flow path is within an annular area formed between an outer surface of the tubular assembly and an inner surface of the wellbore lining conduit.

An embodiment of the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the first and second fluid flow paths are in fluid communication when the drilling assembly is disposed in the wellbore. Another embodiment includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein advancing the drilling assembly into the earth comprises rotating at least a portion of the drilling assembly. In one aspect, the rotating portion of the drilling assembly comprises the earth removal member.

An additional embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and removing at least a portion of the drilling assembly from the wellbore. In one aspect, the method further comprises conveying a cementing assembly into the wellbore. In another aspect, the method further comprises supplying a physically alterable bonding material through the cementing assembly to an annular area defined by an inner surface of the wellbore and an outer surface of the wellbore lining conduit.

An embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein at least a portion of the drilling assembly extends below a lower end of the wellbore lining conduit while advancing the drilling assembly into the earth. An additional embodiment provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and relatively moving a portion of the drilling assembly and the wellbore lining conduit. In one aspect, the method further comprises reducing a length of the drilling assembly.

Another embodiment includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; relatively moving a portion of the drilling assembly and the wellbore lining conduit; and advancing the wellbore lining conduit proximate a bottom of the wellbore. In another embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; relatively moving a portion of the drilling assembly and the wellbore lining conduit; and engaging a cementing orifice with the drilling assembly. In one aspect, the method further comprises supplying a physically alterable bonding material through a portion of the first fluid flow path and through the cementing orifice to an annular area defined by an outer surface of the wellbore lining conduit and an inner surface of the wellbore. In another aspect, the method further comprises disengaging the cementing orifice and removing at least a portion of the drilling assembly from the wellbore.

An embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and closing at least a portion of the first fluid flow path. In one aspect, the method further comprises introducing a physically alterable bonding material through the first fluid flow path to an annular area defined by an outer surface of the wellbore lining conduit and an inner surface of the wellbore. In another aspect, the method further comprises activating one or more sealing elements to substantially seal the annular area. In yet another aspect, the inner surface of the wellbore comprises an inner surface of a wellbore casing.

In another embodiment, the present invention includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the wellbore lining conduit comprises at least one fluid flow restrictor on an outer surface thereof. In one aspect, the method further comprises flowing the fluid through an annular area defined by an inner surface of the wellbore and an outer surface of the wellbore lining conduit.

Yet another embodiment includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and conveying a cementing assembly into the wellbore. In one aspect, the method further comprises providing the wellbore lining conduit with a one-way valve disposed at lower portion thereof. In another aspect, the method further comprises supplying a physically alterable bonding material at a first location in an annular area defined by an outer surface of the wellbore lining conduit and an inner surface of the wellbore and a second location in the annular area. In yet another aspect, supplying the physically alterable bonding material to the first location comprises supplying the physically alterable material through the one way valve, and supplying the physically alterable bonding material to the second location comprises supplying the physically alterable material to the second location through a port disposed above the one way valve.

Another embodiment includes a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; conveying a cementing assembly into the wellbore; and providing the cementing assembly with a single direction plug. In one aspect, the method further comprises supplying a physically alterable bonding material to an annular area defined by an outer surface of the wellbore lining conduit and an inner surface of the wellbore. In another aspect, the method further comprises releasing the single direction plug in the wellbore conduit and positioning the single direction plug at a desire location in the wellbore lining conduit. In yet another aspect, the single direction plug is positioned by actuating a gripping member.

In one embodiment, the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and flowing a second portion of the fluid through a third flow path. In one aspect, the third flow path directs the second portion of the fluid to an annular area between the wellbore lining conduit and the wellbore. Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and flowing a second portion of the fluid through a third flow path, wherein the third flow path comprises an annular area between the wellbore lining conduit and the wellbore.

The present invention provides in another embodiment a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the earth removal member is capable of forming a hole having a larger outer diameter than an outer diameter of the wellbore lining conduit. An additional embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the drilling assembly further comprises a geophysical sensor.

Another embodiment provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; and leaving the wellbore lining conduit at a location within the wellbore, wherein the first fluid flow path comprise an annular area between the wellbore lining conduit and the wellbore. In another embodiment, the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and selectively altering a trajectory of the drilling assembly.

In one embodiment, the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and providing the cementing assembly with a cementing plug. The present invention provides in another embodiment a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and providing a sealing member on an outer portion of the wellbore lining conduit.

In one embodiment, the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and providing a balancing fluid followed by a physically alterable bonding material. Another embodiment of the present invention provides a method for lining a wellbore comprising providing a drilling assembly comprising an earth removal member and a wellbore lining conduit, wherein the drilling assembly includes a first fluid flow path and a second fluid flow path; advancing the drilling assembly into the earth; flowing a fluid through the first fluid flow path and returning at least a portion of the fluid through the second fluid flow path; leaving the wellbore lining conduit at a location within the wellbore; and increasing an energy of the return fluid.

In one embodiment, the present invention provides an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore. In one aspect, the drilling assembly further comprises a third fluid flow path.

In another embodiment, the present invention provides an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore, wherein the drilling assembly further comprises a liner hanger assembly. Another embodiment of the present invention includes an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore, wherein the drilling assembly further comprises at least one sealing member.

In one embodiment, the present invention includes an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore, wherein the drilling assembly further comprises a drill string. In an additional embodiment, the present invention provides an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore, wherein the drilling assembly further comprises at least one flow splitting member.

An embodiment of the present invention provides an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore, wherein the drilling assembly further comprises at least one geophysical measuring tool. Another embodiment includes an apparatus for lining a wellbore, comprising a drilling assembly comprising an earth removal member, a wellbore lining conduit, and a first end, the drilling assembly including a first fluid flow path and a second fluid flow path therethrough, wherein fluid is movable from the first end through the first fluid flow path and returnable through the second fluid flow path when the drilling assembly is disposed in the wellbore, further comprising at least one component selected from the group consisting of a mud motor; logging while drilling system; measure while drilling system; gyro landing sub; a geophysical measurement sensor; a stabilizer; an adjustable stabilizer; a steerable system; a bent motor housing; a 3D rotary steerable system; a pilot bit; an underreamer; a bi-center bit; an expandable bit; at least one nozzle for directional drilling; and combination thereof.

An embodiment of the present invention provides a method of drilling with liner, comprising forming a wellbore with an assembly including an earth removal member mounted on a work string and a section of liner disposed therearound, the earth removal member extending below a lower end of the liner; lowering the liner to a location in the wellbore adjacent the earth removal member; circulating a fluid through the earth removal member; fixing the liner section in the wellbore; and removing the work string and the earth removal member from the wellbore. In one aspect, circulating the fluid includes flowing the fluid through an annular area defined between an outer surface of the work string and an inner surface of the liner section.

An additional embodiment of the present invention provides a method of drilling with liner, comprising forming a wellbore with an assembly including an earth removal member mounted on a work string and a section of liner disposed therearound, the earth removal member extending below a lower end of the liner; lowering the liner to a location in the wellbore adjacent the earth removal member; circulating a fluid through the earth removal member; fixing the liner section in the wellbore; and removing the work string and the earth removal member from the wellbore, wherein the liner section is fixed at an upper end to a casing section. Another embodiment includes a method of drilling with liner, comprising forming a wellbore with an assembly including an earth removal member mounted on a work string and a section of liner disposed therearound, the earth removal member extending below a lower end of the liner; lowering the liner to a location in the wellbore adjacent the earth removal member; circulating a fluid through the earth removal member; fixing the liner section in the wellbore; and removing the work string and the earth removal member from the wellbore, wherein the earth removal member and the work string are operatively connected to the liner section during drilling and disconnected therefrom prior to removal of the work string and the earth removal member.

Another embodiment of the present invention provides a method of drilling with liner, comprising forming a wellbore with an assembly including an earth removal member mounted on a work string and a section of liner disposed therearound, the earth removal member extending below a lower end of the liner; lowering the liner to a location in the wellbore adjacent the earth removal member; circulating a fluid through the earth removal member; fixing the liner section in the wellbore; removing the work string and the earth removal member from the wellbore; and cementing the liner section in the wellbore. Another embodiment of the present invention provides a method of drilling with liner, comprising forming a wellbore with an assembly including an earth removal member mounted on a work string and a section of liner disposed therearound, the earth removal member extending below a lower end of the liner; lowering the liner to a location in the wellbore adjacent the earth removal member; circulating a fluid through the earth removal member; fixing the liner section in the wellbore; removing the work string and the earth removal member from the wellbore; and flowing fluid through the section of liner and the wellbore.

An embodiment of the present invention includes a method of casing a wellbore, comprising providing a drilling assembly including a tubular string having an earth removal member operatively connected to its lower end, and a casing, at least a portion of the tubular string extending below the casing; lowering the drilling assembly into a formation; lowering the casing over the portion of the drilling assembly; and circulating fluid through the casing. In one aspect, circulating fluid through the casing comprises flowing at least two fluid paths through the casing. In another aspect, the at least two fluid paths are in opposite directions. Another embodiment of the present invention includes a method of casing a wellbore, comprising providing a drilling assembly including a tubular string having an earth removal member operatively connected to its lower end, and a casing, at least a portion of the tubular string extending below the casing; lowering the drilling assembly into a formation; lowering the casing over the portion of the drilling assembly; and circulating fluid through the casing, wherein circulating fluid through the casing comprises flowing at least two fluid paths through the casing and at least one of the at least two fluid paths flows to a surface of the wellbore.

In another embodiment, the present invention provides a method of drilling with liner, comprising forming a section of wellbore with an earth removal member operatively connected to a section of liner; lowering the section of liner to a location proximate a lower end of the wellbore; and circulating fluid while lowering, thereby urging debris from the bottom of the wellbore upward utilizing a flow path formed within the liner section. In yet another embodiment, the present invention provides a method of drilling with liner, comprising forming a section of wellbore with an assembly comprising an earth removal tool on a work string fixed at a predetermined distance below a lower end of a section of liner; fixing an upper end of the liner section to a section of casing lining the wellbore; releasing a latch between the work string and the liner section; reducing the predetermined distance between the lower end of the liner section and the earth removal tool; releasing the assembly from the section of casing; re-fixing the assembly to the section of casing at a second location; and circulating fluid in the wellbore.

Another embodiment includes a method of casing a wellbore, comprising providing a drilling assembly comprising a casing, and a tubular string releasably connected to the casing, the tubular string having an earth removal member operatively attached to its lower end, a portion of the tubular string located below a lower end of the casing; lowering the drilling assembly into a formation to form a wellbore; hanging the casing within the wellbore; moving the portion of the tubular string into the casing; and lowering the casing into the wellbore. In one aspect, the method further comprises circulating fluid while lowering the casing into the wellbore. Another embodiment includes a method of casing a wellbore, comprising providing a drilling assembly comprising a casing, and a tubular string releasably connected to the casing, the tubular string having an earth removal member operatively attached to its lower end, a portion of the tubular string located below a lower end of the casing; lowering the drilling assembly into a formation to form a wellbore; hanging the casing within the wellbore; moving the portion of the tubular string into the casing; lowering the casing into the wellbore; and releasing the releasable connection prior to moving the portion of the tubular string into the casing.

In one embodiment, the present invention provides a method of cementing a liner section in a wellbore, comprising removing a drilling assembly from a lower end of the liner section, the drilling assembly including an earth removal tool and a work string; inserting a tubular path for flowing a physically alterable bonding material, the tubular path extending to the lower end of the liner section and including a valve assembly permitting the cement to flow from the lower section in a single direction; flowing the physically alterable bonding material through the tubular path and upwards in an annulus between the liner section and the wellbore therearound; closing the valve; and removing the tubular path, thereby leaving the valve assembly in the wellbore. In one aspect, the valve assembly includes one or more sealing members to seal an annulus between the valve assembly and an inside surface of the liner section.

In another embodiment, the present invention provides a method of cementing a liner section in a wellbore, comprising removing a drilling assembly from a lower end of the liner section, the drilling assembly including an earth removal tool and a work string; inserting a tubular path for flowing a physically alterable bonding material, the tubular path extending to the lower end of the liner section and including a valve assembly permitting the cement to flow from the lower section in a single direction; flowing the physically alterable bonding material through the tubular path and upwards in an annulus between the liner section and the wellbore therearound; closing the valve; and removing the tubular path, thereby leaving the valve assembly in the wellbore, wherein the valve assembly is drillable to form a subsequent section of wellbore.

In an embodiment, the present invention provides a method of drilling with liner, comprising providing a drilling assembly comprising a liner having a tubular member therein, the tubular member operatively connected to an earth removal member and having a fluid path through a wall thereof, the fluid path disposed above a lower portion of the tubular member; lowering the drilling assembly into the earth, thereby forming a wellbore; sealing an annulus between an outer diameter of the tubular member and the wellbore; sealing a longitudinal bore of the tubular member; and flowing a physically alterable bonding material through the fluid path, thereby preventing the physically alterable bonding material from entering the lower portion of the tubular member. In one aspect, the method further comprises activating at least one sealing member to seal an annulus above the fluid path, the annulus being between the wellbore and an outer diameter of the liner.

An embodiment of the present invention provides a method for placing tubulars in an earth formation comprising advancing concurrently a portion of a first tubular and a portion of a second tubular to a first location in the earth; and further advancing the second tubular to a second location in the earth. In one aspect, the method further comprises cementing a portion of one of the first and second tubulars. Another embodiment includes a method for placing tubulars in an earth formation comprising advancing concurrently a portion of a first tubular and a portion of a second tubular to a first location in the earth; further advancing the second tubular to a second location in the earth; and cementing each of the first and second tubulars Another embodiment of the present invention includes a method for placing tubulars in an earth formation comprising advancing concurrently a portion of a first tubular and a portion of a second tubular to a first location in the earth; further advancing the second tubular to a second location in the earth; and advancing a portion of a third tubular to a third location. Another embodiment includes a method for placing tubulars in an earth formation comprising advancing concurrently a portion of a first tubular and a portion of a second tubular to a first location in the earth; further advancing the second tubular to a second location in the earth; and expanding a portion of one of the first and second tubulars.

Another embodiment provides a method for placing tubulars in an earth formation comprising advancing concurrently a portion of a first tubular and a portion of a second tubular to a first location in the earth; and further advancing the second tubular to a second location in the earth, wherein the advancing includes drilling. Another embodiment provides a method for placing tubulars in an earth formation comprising advancing concurrently a portion of a first tubular and a portion of a second tubular to a first location in the earth; and further advancing the second tubular to a second location in the earth, wherein the further advancing includes drilling. Yet another embodiment provides a method for placing tubulars in an earth formation comprising advancing concurrently a portion of a first tubular and a portion of a second tubular to a first location in the earth; and further advancing the second tubular to a second location in the earth, wherein a trajectory of the tubulars is selectively altered during the advancing to the first location An embodiment of the present invention includes a method for placing tubulars in an earth formation comprising advancing concurrently a portion of a first tubular and a portion of a second tubular to a first location in the earth; and further advancing the second tubular to a second location in the earth, wherein a trajectory of the second tubular is selectively altered during the further advancing to the second location. An additional embodiment includes a method for placing tubulars in an earth formation comprising advancing concurrently a portion of a first tubular and a portion of a second tubular to a first location in the earth; further advancing the second tubular to a second location in the earth, and sensing a geophysical parameter. Yet another embodiment includes a method for placing tubulars in an earth formation comprising advancing concurrently a portion of a first tubular and a portion of a second tubular to a first location in the earth; further advancing the second tubular to a second location in the earth; and pressure testing one of the first and second tubulars.

Another embodiment of the present invention provides a method for placing tubulars in an earth formation comprising advancing concurrently a portion of a first tubular and a portion of a second tubular to a first location in the earth; and further advancing the second tubular to a second location in the earth, wherein the second tubular is operatively connected to a drilling assembly. Another embodiment provides a method for placing tubulars in an earth formation comprising advancing concurrently a portion of a first tubular and a portion of a second tubular to a first location in the earth; and further advancing the second tubular to a second location in the earth, wherein the drilling assembly is selectively detachable from the second tubular. In one aspect, at least a portion of the drilling assembly is retrievable.

Another embodiment provides a method for placing tubulars in an earth formation comprising advancing concurrently a portion of a first tubular and a portion of a second tubular to a first location in the earth; further advancing the second tubular to a second location in the earth; inserting a drilling assembly in the second tubular; and advancing the drilling assembly through a lower end of the second tubular. In one aspect, the drilling assembly includes an earth removal member and a third tubular. In another aspect, the drilling assembly further includes a first fluid flow path and a second fluid flow path. In yet another aspect, the method further comprises flowing fluid through the first fluid flow path and returning at least a portion of the fluid through the second fluid flow path. In yet another aspect, the method further comprises leaving the third tubular in a third location in the earth. In another aspect, the method further comprises cementing the third tubular with the drilling assembly.

An embodiment of the present invention provides an apparatus for forming a wellbore, comprising a casing string with a drill bit disposed at an end thereof; and a fluid bypass operatively connected to the casing string for diverting a portion of fluid from a first location to a second location within the wellbore as the wellbore is formed. In one aspect, the fluid bypass is formed at least partially within the casing string.

An additional embodiment of the present invention includes a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; and directing a physically alterable bonding material into an annulus between the drill string and the borehole through the at least one secondary fluid passage. In one aspect, the method further comprises flowing a physically alterable bonding material through the drill string and into an annulus between the drill string and the borehole prior to directing the physically alterable bonding material into the annulus between the drill string and the borehole through the at least one secondary fluid passage. In another aspect, opening the at least one secondary fluid passage, comprises providing a barrier across the at least one secondary fluid passage; and rupturing the barrier. In yet another aspect, rupturing the barrier comprises increasing fluid pressure on one side of the barrier to a level sufficient to rupture the barrier.

Another embodiment of the present invention includes a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; directing a physically alterable bonding material into an annulus between the drill string and the borehole through the at least one secondary fluid passage; flowing a physically alterable bonding material through the drill string and into an annulus between the drill string and the borehole prior to directing the physically alterable bonding material into the annulus between the drill string and the borehole through the at least one secondary fluid passage; and opening the at least one secondary passage when the physically alterable bonding material reaches the location of the at least one secondary passage after flowing the physically alterable bonding material through the drill string and into the annulus. In another embodiment, the present invention provides a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; and directing a physically alterable bonding material into an annulus between the drill string and the borehole through the at least one secondary fluid passage, wherein the physically alterable bonding material comprises cement.

Another embodiment provides a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; and directing a physically alterable bonding material into an annulus between the drill string and the borehole through the at least one secondary fluid passage, wherein the earth removal member is a drill bit.

Another embodiment of the present invention provides a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; and directing a physically alterable bonding material into an annulus between the drill string and the borehole through the at least one secondary fluid passage, wherein directing the physically alterable bonding material through the secondary fluid passage includes blocking the at least one fluid passage through the earth removal member. In one aspect, blocking the at least one fluid passage through the earth removal member comprises providing a ball seat positioned in intersection with the at least one fluid passage; and selectively positioning a ball on the ball seat and in a blocking position over the at least one fluid passage. In another aspect, the method further comprises providing the ball to the ball seat from a location remote therefrom.

Another embodiment of the present invention provides a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; directing a physically alterable bonding material into an annulus between the drill string and the borehole through the at least one secondary fluid passage, wherein directing the physically alterable bonding material into the annulus through the at least one secondary fluid passage comprises providing a moveable barrier intermediate the at least one secondary passage and the annulus; and moving the moveable barrier to allow the physically alterable bonding material to flow through the at least one secondary passage. In one aspect, the moveable barrier comprises a sleeve positionable over an element of the drill string and slidably positionable with respect thereto; and at least one pin interconnecting the sleeve and the element of the drill string. In another aspect, the method further comprises providing a piston integral with the sleeve; and using hydrostatic pressure to urge the piston to open the at least one secondary passage to communicate with the annulus.

An additional embodiment of the present invention includes a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; directing a physically alterable bonding material into an annulus between the drill string and the borehole through the at least one secondary fluid passage; providing a float shoe intermediate the location where the physically alterable bonding material is introduced into the interior of the drill string and the at least one secondary passage; and positioning a float collar in the float shoe, thereby preventing flow of the physically alterable bonding material from the location between the drill string and borehole to the interior of the drill string. In one aspect, positioning the float collar is undertaken during the flowing of the physically alterable bonding material into the annulus. In another aspect, positioning the float collar is undertaken after the flowing of the physically alterable bonding material into the annulus is completed.

Another embodiment of the present invention includes a method of cementing a borehole, comprising extending a drill string into the earth to form the borehole, the drill string including an earth removal member having at least one fluid passage therethrough, the earth removal member operatively connected to a lower end of the drill string; drilling the borehole to a desired location using a drilling mud passing through the at least one fluid passage; providing at least one secondary fluid passage between the interior of the drill string and the borehole; directing a physically alterable bonding material into an annulus between the drill string and the borehole through the at least one secondary fluid passage; providing at least one additional secondary passage intermediate the lower terminus of the borehole and a surface location; cementing the borehole at a location adjacent to the terminus of the borehole; further directing the physically alterable bonding material down the drill string; and directing the physically alterable bonding material through the additional secondary passage.

In another embodiment, the present invention provides an apparatus for selectively directing fluids flowing down a hollow portion of a tubular element to selective passageways leading to a location exterior to the tubular element, comprising a first fluid passageway from the hollow portion of the tubular member to a first location; a second passageway from the hollow portion of the tubular member to a second location; a first valve member configurable to selectively block the first fluid passageway; and a second valve member configured to maintain the second fluid passageway in a normally blocked condition, the first valve member including a valve closure element selectively positionable to close the first valve member and thereby effectuate opening of the second valve member. In one aspect, the first valve member comprises a seat through which the first fluid passageway extends and the valve closure element blocks the first fluid passageway when positioned on the seat. In another aspect, the second valve member comprises a membrane positioned to selectively block the second passageway, the membrane configured to rupture as a result of closure of the first valve member.

An additional embodiment includes an apparatus for selectively directing fluids flowing down a hollow portion of a tubular element to selective passageways leading to a location exterior to the tubular element, comprising a first fluid passageway from the hollow portion of the tubular member to a first location; a second passageway from the hollow portion of the tubular member to a second location; a first valve member configurable to selectively block the first fluid passageway; and a second valve member configured to maintain the second fluid passageway in a normally blocked condition, the first valve member including a valve closure element selectively positionable to close the first valve member and thereby effectuate opening of the second valve member, wherein the second valve member comprises a sleeve sealingly engaged about the second fluid passageway; and at least one separation member interconnecting the sleeve and at least a portion of the tubular element. In one aspect, the at least one separation member comprises at least one shear pin.

An embodiment of the present invention provides an apparatus for selectively directing fluids flowing down a hollow portion of a tubular element to selective passageways leading to a location exterior to the tubular element, comprising a first fluid passageway from the hollow portion of the tubular member to a first location; a second passageway from the hollow portion of the tubular member to a second location; a first valve member configurable to selectively block the first fluid passageway; and a second valve member configured to maintain the second fluid passageway in a normally blocked condition, the first valve member including a valve closure element selectively positionable to close the first valve member and thereby effectuate opening of the second valve member, wherein the second valve member comprises a sleeve sealingly engaged about the second fluid passageway; and at least one separation member interconnecting the sleeve and at least a portion of the tubular element, wherein the at least a portion of the tubular element is a float sub. In one aspect, the float sub includes a generally cylindrical outer surface; the second passage extends through the float sub and emerges therefrom at the generally cylindrical outer surface; and the at least one separation member is positioned over the generally cylindrical outer surface. In another aspect, the at least one separation member has a generally tubular profile.

Another embodiment of the present invention provides an apparatus for selectively directing fluids flowing down a hollow portion of a tubular element to selective passageways leading to a location exterior to the tubular element, comprising a first fluid passageway from the hollow portion of the tubular member to a first location; a second passageway from the hollow portion of the tubular member to a second location; a first valve member configurable to selectively block the first fluid passageway; and a second valve member configured to maintain the second fluid passageway in a normally blocked condition, the first valve member including a valve closure element selectively positionable to close the first valve member and thereby effectuate opening of the second valve member, wherein the second valve member comprises a sleeve sealingly engaged about the second fluid passageway; and at least one separation member interconnecting the sleeve and at least a portion of the tubular element, wherein the at least a portion of the tubular element is a float sub, wherein the float sub includes a generally cylindrical outer surface; the second passage extends through the float sub and emerges therefrom at the generally cylindrical outer surface; and the at least one separation member is positioned over the generally cylindrical outer surface, the apparatus further comprising a first seal extendable between the at least one separation member and the float sub; a second seal extendable between the at least one separation member and the float sub; and the second passage is positioned in the float sub between the first and second seals. In one aspect, the at least one separation member further comprises a first cylindrical section having a seal groove therein in which the first seal is received; and a second cylindrical section having a seal groove therein in which the second seal is received, wherein the second cylindrical section forms an annular piston extending about the float sub.

In another aspect, the present invention provides a method of drilling a wellbore with casing, comprising placing a string of casing operatively coupled to a drill bit at the lower end thereof into a previously formed wellbore; urging the string of casing axially downward to form a new section of wellbore; pumping fluid through the string of casing into an annulus formed between the string of casing and the new section of wellbore; and diverting a portion of the fluid into an upper annulus in the previously formed wellbore. In one embodiment, the fluid is diverted into the upper annulus from a flow path in a run-in string of tubulars disposed above the string of casing. Additionally, the flow path is selectively opened and closed to control the amount of fluid flowing through the flow path. In another embodiment, the fluid is diverted into the upper annulus via an independent fluid path. The independent fluid path is formed at least partially within the string of casing. In yet another embodiment, the fluid is diverted into the upper annulus via a flow apparatus disposed in the string of casing.

In another aspect, the present invention provides a method for lining a wellbore, comprising forming a wellbore with an assembly including an earth removal member mounted on a work string, a liner disposed around at least a portion of the work string, a first sealing member disposed on the work string, and a second sealing member disposed on an outer portion of the liner; lowering the liner to a location in the wellbore adjacent the earth removal member while circulating a fluid through the earth removal member; actuating the first sealing member; fixing the liner section in the wellbore; actuating the second sealing member; and removing the work string and the earth removal member from the wellbore. In one embodiment, the first sealing member is disposed below the liner while circulating the fluid. In another embodiment, fixing the liner section in the wellbore comprises supplying a physically alterable bonding material to an annular area between the liner and the wellbore. The physically alterable bonding material is supplied through the work string at a location above the first sealing member.

While the foregoing is directed to embodiments of the present invention, other and further embodiments of the invention may be devised without departing from the basic scope thereof, and the scope thereof is determined by the claims that follow.

We claim:

1. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between the interior of the drill string and the borehole;

providing a barrier across the at least one secondary fluid passage;

rupturing the barrier, thereby opening the at least one secondary fluid passage; and directing a physically alterable bonding material into an annulus between the drill string and the borehole through the at least one secondary fluid passage.

2. The method of claim 1, further comprising flowing a physically alterable bonding material through the drill string and into an annulus between the drill string and the borehole prior to directing the physically alterable bonding material into the annulus between the drill string and the borehole through the at least one secondary fluid passage.

3. The method of claim 1, wherein rupturing the barrier comprises increasing fluid pressure on one side of the barrier to a level sufficient to rupture the barrier.

4. The method of claim 1, wherein the at least one secondary passage is opened when the physically alterable bonding material reaches the location of the at least one secondary passage after flowing the physically alterable bonding material through the drill string and into the annulus.

5. The method of claim 1, wherein the physically alterable bonding material comprises cement.

6. The method of claim 1, wherein the earth removal member is a drill bit.

7. The method of claim 1, wherein directing the physically alterable bonding material through the at least one secondary fluid passage includes blocking the at least one fluid passage through the earth removal member.

8. The method of claim 7, wherein blocking the at least one fluid passage through the earth removal member comprises:

providing a ball seat positioned in intersection with the at least one fluid passage; and selectively positioning a ball on the ball seat and in a blocking position over the at least one fluid passage.

9. The method of claim 8, further comprises providing the ball to the ball seat from a location remote therefrom.

10. The method of claim 1, further comprising providing a float shoe intermediate the location where the physically alterable bonding material is introduced into the interior of the drill string and the at least one secondary passage; and positioning a float collar in the float shoe, thereby preventing flow of the physically alterable bonding material from the location between the drill string and borehole to the interior of the drill string.

11. The method of claim 10, wherein positioning the float collar is undertaken during the flowing of the physically alterable bonding material into the annulus.

12. The method of claim 10, wherein positioning the float collar is undertaken after the flowing of the physically alterable bonding material into the annulus is completed.

13. The method of claim 1, further comprising:

providing at least one additional secondary passage intermediate the lower terminus of the borehole and a surface location;

cementing the borehole at a location adjacent to the terminus of the borehole;

further directing the physically alterable bonding material down the drill string; and directing the physically alterable bonding material through the additional secondary passage.

14. The method of claim 1, further comprising drilling through at least a portion of the earth removal member.

15. The method of claim 1, further comprising milling at least a portion of the earth removal member.

16. The method of claim 1, wherein the at least one secondary fluid passage is located in a sidewall of the earth removal member.

17. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

providing a sleeve positioned over an element of the drill string and intermediate the at least one secondary passage and the annulus and at least one shear element interconnecting the sleeve to the element of the drill string;

moving the sleeve to allow a physically alterable bonding material to flow through the at least one secondary passage; and directing the physically alterable bonding material into an annulus between the drill string and the borehole.

18. The method of claim 17, further comprising using fluid pressure to shear the at least one shear element.

19. The method of claim 17, wherein the at least one shear element comprises a pin.

20. The method of claim 17, further comprising:

providing a piston integral with the sleeve; and using hydrostatic pressure to urge the piston to open the at least one secondary passage to communicate with the annulus.

21. The method of claim 17, further comprising drilling through at least a portion of the earth removal member.

22. The method of claim 17, further comprising milling at least a portion of the earth removal member.

23. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

providing a float shoe intermediate a location where a physically alterable bonding material is introduced into the interior of the drill string and the at least one secondary passage;

positioning a float collar in the float shoe, thereby preventing flow of the physically alterable bonding material from the location between the drill string and borehole to the interior of the drill string; and directing the physically alterable bonding material into an annulus between the drill string and the borehole through the at least one secondary fluid passage.

24. The method of claim 23, wherein positioning the float collar is undertaken during the flowing of the physically alterable bonding material into the annulus.

25. The method of claim 23, wherein positioning the float collar is undertaken after the flowing of the physically alterable bonding material into the annulus is completed.

26. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage; and allowing the physically alterable bonding material to harden in the annulus between the drill string and the borehole.

27. The method of claim 26, further comprising drilling through at least a portion of the earth removal member.

28. The method of claim 26, further comprising milling at least a portion of the earth removal member.

29. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage;

positioning a one way valve intermediate a location where the physically alterable bonding material is introduced into the interior of the drill string and the at least one second passage, thereby preventing flow of the physically alterable bonding material from the location between the drill string and borehole to the interior of the drill string; and allowing the physically alterable bonding material to harden in the annulus.

30. The method of claim 29, further comprising drilling through at least a portion of the earth removal member.

31. The method of claim 29, further comprising milling at least a portion of the earth removal member.

32. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage;

providing at least one additional secondary passage intermediate the lower terminus of the borehole and a surface location;

cementing the borehole at a location adjacent to the terminus of the borehole;

further directing the physically alterable bonding material down the drill string; and directing the physically alterable bonding material through the additional secondary passage.

33. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage; and drilling through at least a portion of the earth removal member.

34. The method of claim 33, wherein the earth removal member comprises a drill bit.

35. The method of claim 33, wherein the drill string comprises a casing.

36. The method of claim 33, wherein the drill string comprises a liner.

37. The method of claim 33, wherein the at least one secondary fluid passage is located in a sidewall of the earth removal member.

38. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage; and milling at least a portion of the earth removal member.

39. A method of cementing a borehole, comprising:

operating a drill string to form the borehole, the drill string including a drill bit positioned at a lower end of the drill string, wherein the drill bit has at least one fluid passage therethrough, and at least one secondary fluid passage between an interior of the drill string and the borehole, wherein the at least one secondary fluid passage is initially closed;

drilling the borehole to a desired location while flowing a drilling mud through the at least one fluid passage;

positioning a one-way valve above the at least one secondary passage after flowing the drilling mud; and directing a cement through the at least one secondary fluid passage into an annulus between the drill string and the borehole, wherein the one way valve prevents the cement in the annulus from flowing back up the interior of the drill string.

40. The method of claim 39, further comprising opening the at least one secondary fluid passage after flowing the drilling mud.

41. The method of claim 40, wherein the at least one secondary fluid passage is opened using fluid pressure.

42. The method of claim 39, further comprising opening the at least one second fluid passage after flowing the drilling mud.

43. The method of claim 42, wherein the cement is directed into the annulus after the one way valve is positioned.

44. The method of claim 43, further comprising drilling through at least a portion of the drill bit.

45. The method of claim 43, further comprising milling through at least a portion of the drill bit.

46. The method of claim 42, wherein the at least one secondary fluid passage is opened using fluid pressure.

47. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage;

positioning a one way valve intermediate a location where the physically alterable bonding material is introduced into the interior of the drill string and the at least one second passage, thereby preventing flow of the physically alterable bonding material from the location between the drill string and borehole to the interior of the drill string; and drilling through at least a portion of the earth removal member.

48. A method of cementing a borehole, comprising:

extending a drill string into the earth to form the borehole, the drill string including an earth removal member having at least one fluid passage therethrough, the earth removal member operatively connected to a lower end of the drill string;

drilling the borehole to a desired location using a drilling mud passing through the at least one fluid passage;

providing at least one secondary fluid passage between an interior of the drill string and the borehole;

directing a physically alterable bonding material into an annulus between the drill string and the borehole through the at least one secondary fluid passage;

positioning a one way valve intermediate a location where the physically alterable bonding material is introduced into the interior of the drill string and the at least one second passage, thereby preventing flow of the physically alterable bonding material from the location between the drill string and borehole to the interior of the drill string; and milling at least a portion of the earth removal member.

* * * * *